US012743859B2

(12) United States Patent
El Asmar et al.

(10) Patent No.: US 12,743,859 B2
(45) Date of Patent: Sep. 22, 2026

(54) TECHNIQUES FOR INTERACTING WITH VIRTUAL AVATARS AND/OR USER REPRESENTATIONS

(71) Applicant: Apple Inc., Cupertino, CA (US)

(72) Inventors: Karen El Asmar, San Francisco, CA (US); Amy E. Dedonato, San Francisco, CA (US); Stephen O. Lemay, Palo Alto, CA (US); Peter D. Anton, Portola Valley, CA (US); William A. Sorrentino, III, Mill Valley, CA (US); Wesley M. Holder, Union City, CA (US); Jason D. Rickwald, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 18/391,199

(22) Filed: Dec. 20, 2023

(65) Prior Publication Data

US 2024/0257486 A1 Aug. 1, 2024

Related U.S. Application Data

(60) Provisional application No. 63/470,089, filed on May 31, 2023, provisional application No. 63/440,820, filed on Jan. 24, 2023.

(51) Int. Cl.

| | |
|---|---|
| ***G06T 19/20*** | (2011.01) |
| ***G06T 13/40*** | (2011.01) |
| ***G06T 19/00*** | (2011.01) |

(52) U.S. Cl.
CPC .............. *G06T 19/20* (2013.01); *G06T 13/40* (2013.01); *G06T 19/003* (2013.01); *G06T 2219/2016* (2013.01); *G06T 2219/2021* (2013.01)

(58) Field of Classification Search
CPC ....... G06T 19/20; G06T 13/40; G06T 19/003; G06T 2219/2016; G06T 2219/2021
See application file for complete search history.

(56) References Cited

U.S. PATENT DOCUMENTS

| | | | |
|---|---|---|---|
| 8,584,031 | B2 | 11/2013 | Moore et al. |
| 8,732,609 | B1 | 5/2014 | Bayersdorfer et al. |
| 8,996,639 | B1 | 3/2015 | Faaborg et al. |
| 9,298,257 | B2 | 3/2016 | Hwang et al. |
| 9,349,414 | B1 | 5/2016 | Furment et al. |
| 9,411,506 | B1 | 8/2016 | Marra et al. |
| 9,461,876 | B2 | 10/2016 | Van Dusen et al. |
| 9,489,074 | B2 | 11/2016 | Oonishi |
| 9,542,422 | B2 | 1/2017 | Duggal et al. |

(Continued)

FOREIGN PATENT DOCUMENTS

| | | | |
|---|---|---|---|
| CA | 2792987 | A1 | 10/2011 |
| CN | 101042618 | A | 9/2007 |

(Continued)

OTHER PUBLICATIONS

Extended European Search Report received for European Patent Application No. 25160012.8, mailed on Jun. 10, 2025, 8 pages.

(Continued)

*Primary Examiner* — Xin Sheng
(74) *Attorney, Agent, or Firm* — YHE Law LLP

(57) ABSTRACT

The present disclosure generally relates to techniques for interacting with virtual avatars and/or user representations.

36 Claims, 57 Drawing Sheets

(56) References Cited

U.S. PATENT DOCUMENTS 10,289,265 B2 5/2019 Kulkarni
10,325,417 B1 6/2019 Scapel et al.
10,356,136 B2 7/2019 Van Wie et al.
10,375,313 B1 8/2019 Van Os et al.
10,376,153 B2 8/2019 Tzvieli et al.
10,496,244 B2 12/2019 Reynolds et al.
10,505,726 B1 12/2019 Andon et al.
10,659,405 B1 5/2020 Chang et al.
10,796,480 B2 10/2020 Chen et al.
10,984,569 B2 4/2021 Bondich et al.
11,217,036 B1 1/2022 Albuz et al.
11,381,521 B2 7/2022 Lee et al.
11,467,713 B2 10/2022 Buzyn et al.
2001/0019330 A1 9/2001 Bickmore et al.
2002/0180797 A1 12/2002 Bachmann
2003/0074647 A1 4/2003 Andrew et al.
2003/0206170 A1 11/2003 Bickmore et al.
2004/0179039 A1 9/2004 Blattner et al.
2005/0125744 A1 6/2005 Hubbard et al.
2005/0168566 A1 8/2005 Tada et al.
2006/0035632 A1 2/2006 Sorvari et al.
2006/0046684 A1 3/2006 Kameyama
2006/0055700 A1 3/2006 Niles et al.
2007/0097113 A1 5/2007 Lee et al.
2007/0113181 A1 5/2007 Blattner et al.
2007/0115350 A1* 5/2007 Currivan ................ H04N 7/147 348/14.08
2007/0162872 A1 7/2007 Hong et al.
2008/0030496 A1 2/2008 Lee et al.
2008/0046839 A1 2/2008 Mehra et al.
2008/0082934 A1 4/2008 Kocienda et al.
2008/0155428 A1 6/2008 Lee
2008/0158232 A1 7/2008 Shuster
2008/0250315 A1 10/2008 Eronen et al.
2008/0309677 A1 12/2008 Fleury et al.
2008/0316227 A1 12/2008 Fleury et al.
2009/0044113 A1 2/2009 Jones et al.
2009/0100342 A1 4/2009 Jakobson et al.
2009/0144639 A1 6/2009 Nims et al.
2009/0231356 A1 9/2009 Barnes et al.
2009/0249247 A1 10/2009 Tseng et al.
2009/0254624 A1 10/2009 Baudin et al.
2009/0254859 A1 10/2009 Arrasvuori et al.
2009/0300525 A1 12/2009 Jolliff et al.
2009/0325701 A1 12/2009 Andres Del Valle
2010/0026640 A1 2/2010 Kim et al.
2010/0030660 A1 2/2010 Edwards
2010/0097375 A1 4/2010 Tadaishi et al.
2010/0123724 A1 5/2010 Moore et al.
2010/0125811 A1 5/2010 Moore et al.
2010/0156807 A1 6/2010 Stallings et al.
2010/0169801 A1 7/2010 Blattner et al.
2010/0225773 A1 9/2010 Lee
2010/0251176 A1 9/2010 Fong et al.
2010/0302138 A1* 12/2010 Poot ........................ G06F 3/017 348/143
2011/0004524 A1 1/2011 Paul et al.
2011/0016425 A1 1/2011 Homburg et al.
2011/0057903 A1 3/2011 Yamano et al.
2011/0061017 A1 3/2011 Ullrich et al.
2011/0175832 A1 7/2011 Miyazawa et al.
2011/0205182 A1 8/2011 Miyazawa et al.
2011/0248992 A1 10/2011 Van et al.
2011/0252344 A1 10/2011 Van Os
2011/0265002 A1 10/2011 Hong et al.
2011/0285656 A1 11/2011 Yaksick et al.
2011/0302518 A1 12/2011 Zhang
2012/0011449 A1 1/2012 Sasson et al.
2012/0059787 A1 3/2012 Brown et al.
2012/0075328 A1 3/2012 Goossens
2012/0081356 A1 4/2012 Filippov et al.
2012/0084692 A1 4/2012 Bae
2012/0102399 A1 4/2012 Nicholson
2012/0113008 A1 5/2012 Makinen et al.
2012/0158515 A1 6/2012 K
2012/0254318 A1 10/2012 Poniatowski
2012/0256967 A1 10/2012 Baldwin et al.
2012/0293686 A1 11/2012 Karn et al.
2012/0314047 A1 12/2012 Kasahara et al.
2013/0014019 A1 1/2013 Kim et al.
2013/0015946 A1 1/2013 Lau et al.
2013/0024781 A1 1/2013 Douillet et al.
2013/0024802 A1 1/2013 Zeng et al.
2013/0038759 A1 2/2013 Jo et al.
2013/0063366 A1 3/2013 Paul
2013/0067391 A1 3/2013 Pittappilly et al.
2013/0080287 A1 3/2013 Currie et al.
2013/0113956 A1 5/2013 Anderson et al.
2013/0117383 A1 5/2013 Hymel et al.
2013/0141365 A1 6/2013 Lynn et al.
2013/0157729 A1 6/2013 Tabe
2013/0198210 A1 8/2013 Lee et al.
2013/0263043 A1 10/2013 Sarbin et al.
2013/0275875 A1 10/2013 Gruber et al.
2013/0286161 A1 10/2013 Lv et al.
2013/0293686 A1 11/2013 Blow et al.
2013/0342730 A1 12/2013 Lee et al.
2014/0015784 A1 1/2014 Oonishi
2014/0075004 A1 3/2014 Van Dusen et al.
2014/0078144 A1 3/2014 Berriman et al.
2014/0123005 A1 5/2014 Forstall et al.
2014/0143682 A1 5/2014 Druck et al.
2014/0143693 A1 5/2014 Goossens et al.
2014/0149878 A1 5/2014 Mischari et al.
2014/0157167 A1 6/2014 Zhu
2014/0164955 A1 6/2014 Thiruvidam et al.
2014/0181219 A1 6/2014 Wang et al.
2014/0195972 A1 7/2014 Lee et al.
2014/0218371 A1 8/2014 Du et al.
2014/0237393 A1 8/2014 Van Wie et al.
2014/0267618 A1 9/2014 Esteban et al.
2014/0306898 A1 10/2014 Cueto
2014/0351720 A1 11/2014 Yin
2014/0362195 A1 12/2014 Ng-Thow-Hing et al.
2015/0036883 A1 2/2015 Deri et al.
2015/0052462 A1 2/2015 Kulkarni
2015/0077502 A1 3/2015 Jordan et al.
2015/0091896 A1 4/2015 Tarquini et al.
2015/0100537 A1 4/2015 Grieves et al.
2015/0113435 A1 4/2015 Phillips
2015/0149899 A1 5/2015 Bernstein et al.
2015/0153952 A1 6/2015 Grossman et al.
2015/0195179 A1 7/2015 Skare et al.
2015/0213604 A1 7/2015 Li et al.
2015/0248235 A1 9/2015 Offenberg et al.
2015/0281145 A1 10/2015 Ji
2015/0312175 A1 10/2015 Langholz
2015/0366293 A1 12/2015 Clarkson
2015/0370529 A1 12/2015 Zambetti et al.
2016/0005211 A1 1/2016 Sarkis et al.
2016/0034133 A1 2/2016 Wilson et al.
2016/0117147 A1 4/2016 Zambetti et al.
2016/0150215 A1 5/2016 Chen et al.
2016/0217601 A1 7/2016 Tsuda et al.
2016/0284123 A1 9/2016 Hare et al.
2016/0357720 A1 12/2016 Thimbleby
2017/0068439 A1 3/2017 Mohseni
2017/0069124 A1 3/2017 Tong et al.
2017/0080346 A1 3/2017 Abbas
2017/0123571 A1 5/2017 Huang et al.
2017/0124751 A1 5/2017 Ross et al.
2017/0236298 A1 8/2017 Vetter
2017/0323266 A1 11/2017 Seo
2017/0332045 A1 11/2017 Metter et al.
2017/0352091 A1 12/2017 Chen et al.
2018/0024726 A1 1/2018 Hviding
2018/0047200 A1 2/2018 O'Hara et al.
2018/0074693 A1 3/2018 Jones et al.
2018/0081515 A1 3/2018 Block et al.
2018/0091732 A1 3/2018 Wilson et al.
2018/0095635 A1* 4/2018 Valdivia ............. G02B 27/0093
2018/0329587 A1 11/2018 Ko et al.
2018/0335930 A1 11/2018 Scapel et al.
2018/0336715 A1 11/2018 Rickwald et al.

(56) References Cited

U.S. PATENT DOCUMENTS

| | | | |
|---|---|---|---|
| 2018/0349795 A1 | 12/2018 | Boyle et al. | |
| 2019/0080070 A1 | 3/2019 | Van Os et al. | |
| 2019/0080072 A1 | 3/2019 | Van Os et al. | |
| 2019/0080189 A1 | 3/2019 | Van Os et al. | |
| 2019/0114038 A1 | 4/2019 | Geiger et al. | |
| 2019/0158735 A1 | 5/2019 | Wilson et al. | |
| 2019/0266775 A1 | 8/2019 | Lee et al. | |
| 2019/0266807 A1 | 8/2019 | Lee et al. | |
| 2019/0295056 A1 | 9/2019 | Wright | |
| 2019/0339847 A1 | 11/2019 | Scapel et al. | |
| 2019/0342507 A1* | 11/2019 | Dye | G06T 13/40 |
| 2019/0354265 A1 | 11/2019 | Winnemoeller | |
| 2019/0369836 A1 | 12/2019 | Faulkner et al. | |
| 2019/0370448 A1 | 12/2019 | Devine et al. | |
| 2019/0371033 A1 | 12/2019 | Scapel et al. | |
| 2020/0034025 A1 | 1/2020 | Brady et al. | |
| 2020/0104620 A1 | 4/2020 | Cohen et al. | |
| 2020/0201540 A1 | 6/2020 | Zambetti et al. | |
| 2020/0234481 A1 | 7/2020 | Scapel et al. | |
| 2020/0234508 A1 | 7/2020 | Shaburov et al. | |
| 2020/0264738 A1 | 8/2020 | Lee et al. | |
| 2020/0265234 A1 | 8/2020 | Lee et al. | |
| 2020/0311429 A1 | 10/2020 | Chen | |
| 2020/0358725 A1 | 11/2020 | Scapel et al. | |
| 2020/0402304 A1 | 12/2020 | Hwang et al. | |
| 2020/0409533 A1 | 12/2020 | Blackstock et al. | |
| 2021/0090329 A1* | 3/2021 | Ohashi | G06F 3/0304 |
| 2021/0311609 A1 | 10/2021 | Dandoko | |
| 2021/0349612 A1 | 11/2021 | Triverio | |
| 2021/0405831 A1 | 12/2021 | Mourkogiannis et al. | |
| 2022/0206675 A1 | 6/2022 | Hawkes | |
| 2022/0229546 A1 | 7/2022 | Lee et al. | |
| 2022/0230379 A1 | 7/2022 | Shriram et al. | |
| 2022/0253136 A1 | 8/2022 | Holder et al. | |
| 2022/0291793 A1 | 9/2022 | Zambetti et al. | |
| 2022/0301041 A1 | 9/2022 | Lee et al. | |
| 2022/0319075 A1 | 10/2022 | Hu et al. | |
| 2022/0374137 A1 | 11/2022 | Triverio et al. | |
| 2023/0214107 A1 | 7/2023 | Zambetti et al. | |
| 2023/0305688 A1 | 9/2023 | Triverio et al. | |
| 2023/0379573 A1 | 11/2023 | Wilson et al. | |
| 2023/0384860 A1 | 11/2023 | Dedonato et al. | |
| 2024/0036717 A1 | 2/2024 | Triverio | |
| 2024/0078846 A1 | 3/2024 | Chyn et al. | |
| 2024/0104859 A1 | 3/2024 | Chand et al. | |
| 2024/0259676 A1 | 8/2024 | Wilson et al. | |
| 2024/0393871 A1 | 11/2024 | Thiebot et al. | |
| 2024/0395073 A1 | 11/2024 | Huergo Wagner et al. | |
| 2025/0022237 A1 | 1/2025 | Burton et al. | |
| 2025/0044921 A1 | 2/2025 | Triverio et al. | |
| 2025/0165136 A1 | 5/2025 | Zambetti et al. | |

FOREIGN PATENT DOCUMENTS

| | | | |
|---|---|---|---|
| CN | 101098535 | A | 1/2008 |
| CN | 101203821 | A | 6/2008 |
| CN | 102012738 | A | 4/2011 |
| CN | 102163098 | A | 8/2011 |
| CN | 102271241 | A | 12/2011 |
| CN | 102446059 | A | 5/2012 |
| CN | 102622085 | A | 8/2012 |
| CN | 102790826 | A | 11/2012 |
| CN | 102854979 | A | 1/2013 |
| CN | 103092469 | A | 5/2013 |
| CN | 103516894 | A | 1/2014 |
| CN | 103703438 | A | 4/2014 |
| CN | 103713843 | A | 4/2014 |
| CN | 103744671 | A | 4/2014 |
| CN | 103927190 | A | 7/2014 |
| CN | 104182741 | A | 12/2014 |
| CN | 104246793 | A | 12/2014 |
| CN | 105190700 | A | 12/2015 |
| CN | 105611275 | A | 5/2016 |
| CN | 110046020 | A | 7/2019 |
| CN | 112634416 | A | 4/2021 |
| EP | 1215867 | A2 | 6/2002 |
| EP | 1736931 | A2 | 12/2006 |
| EP | 1777611 | A1 | 4/2007 |
| EP | 2040146 | A2 | 3/2009 |
| EP | 2302493 | A2 | 3/2011 |
| EP | 2437148 | A2 | 4/2012 |
| EP | 2615607 | A2 | 7/2013 |
| EP | 2653961 | A1 | 10/2013 |
| EP | 2677775 | A1 | 12/2013 |
| EP | 2720126 | A1 | 4/2014 |
| EP | 3047884 | A1 | 7/2016 |
| EP | 3190563 | A1 | 7/2017 |
| GB | 2370208 | A | 6/2002 |
| JP | 9-9072 | A | 1/1997 |
| JP | 10-293860 | A | 11/1998 |
| JP | 11-312159 | A | 11/1999 |
| JP | 2000-76460 | A | 3/2000 |
| JP | 2003-219217 | A | 7/2003 |
| JP | 2004-519033 | A | 6/2004 |
| JP | 2005-227581 | A | 8/2005 |
| JP | 2005-532607 | A | 10/2005 |
| JP | 2006-69296 | A | 3/2006 |
| JP | 2006-102327 | A | 4/2006 |
| JP | 2006-520053 | A | 8/2006 |
| JP | 2008-97202 | A | 4/2008 |
| JP | 2011-209887 | A | 10/2011 |
| JP | 2011-530101 | A | 12/2011 |
| JP | 2012-18569 | A | 1/2012 |
| JP | 2012-78982 | A | 4/2012 |
| JP | 2012-123475 | A | 6/2012 |
| JP | 2012-159781 | A | 8/2012 |
| JP | 2013-97760 | A | 5/2013 |
| JP | 2013-526099 | A | 6/2013 |
| JP | 2016-136324 | A | 7/2016 |
| JP | 2017-527917 | A | 9/2017 |
| JP | 2019-532400 | A | 11/2019 |
| JP | 2020-187775 | A | 11/2020 |
| JP | 2022-8997 | A | 1/2022 |
| KR | 10-2004-0009115 | A | 1/2004 |
| KR | 10-2004-0046272 | A | 6/2004 |
| KR | 10-2008-0050336 | A | 6/2008 |
| KR | 10-2010-0086052 | A | 7/2010 |
| KR | 10-2011-0028581 | A | 3/2011 |
| KR | 10-2014-0033088 | A | 3/2014 |
| KR | 10-2014-0049340 | A | 4/2014 |
| KR | 10-2014-0073232 | A | 6/2014 |
| KR | 10-2015-0067197 | A | 6/2015 |
| KR | 10-1540544 | B1 | 7/2015 |
| KR | 10-1587115 | B1 | 1/2016 |
| KR | 10-2020-0101206 | A | 8/2020 |
| KR | 10-2020-0132995 | A | 11/2020 |
| WO | 99/66394 | A1 | 12/1999 |
| WO | 99/66395 | A2 | 12/1999 |
| WO | 03/058589 | A2 | 7/2003 |
| WO | 2004/010672 | A2 | 1/2004 |
| WO | 2004/079530 | A2 | 9/2004 |
| WO | 2006/094308 | A2 | 9/2006 |
| WO | 2009/073607 | A2 | 6/2009 |
| WO | 2009/133710 | A1 | 11/2009 |
| WO | 2011/127309 | A1 | 10/2011 |
| WO | 2011/130849 | A8 | 5/2012 |
| WO | 2012/128361 | A1 | 9/2012 |
| WO | 2012/170354 | A2 | 12/2012 |
| WO | 2013/120851 | A1 | 8/2013 |
| WO | 2013/169851 | A2 | 11/2013 |
| WO | 2013/169854 | A2 | 11/2013 |
| WO | 2013/169870 | A1 | 11/2013 |
| WO | 2013/169877 | A2 | 11/2013 |
| WO | 2014/024000 | A1 | 2/2014 |
| WO | 2014/053063 | A1 | 4/2014 |
| WO | 2014/105279 | A1 | 7/2014 |
| WO | 2016/036218 | A1 | 3/2016 |
| WO | 2016/036522 | A2 | 3/2016 |
| WO | 2016/042926 | A1 | 3/2016 |
| WO | 2018/057272 | A1 | 3/2018 |
| WO | 2019/216999 | A1 | 11/2019 |
| WO | 2020/226785 | A1 | 11/2020 |

(56) References Cited

FOREIGN PATENT DOCUMENTS

WO 2021/071532 A1 4/2021
WO 2022/147146 A1 7/2022

OTHER PUBLICATIONS

Notice of Allowance received for Korean Patent Application No. 10-2023-7037034, mailed on May 28, 2025, 7 pages (2 pages of English Translation and 5 pages of Official Copy).
Decision to Grant received for European Patent Application No. 22729935.1, mailed on Mar. 27, 2025, 3 pages.
International Preliminary Report on Patentability received for PCT Patent Application No. PCT/US2023/033376, mailed on Apr. 3, 2025, 15 pages.
Non-Final Office Action received for U.S. Appl. No. 18/131,833, mailed on Apr. 3, 2025, 15 pages.
Notice of Acceptance received for Australian Patent Application No. 2023219926, mailed on Apr. 7, 2025, 3 pages.
Final Office Action received for U.S. Appl. No. 18/131,833, mailed on Aug. 19, 2025, 14 pages.
International Preliminary Report on Patentability received for PCT Patent Application No. PCT/US2024/012658, mailed on Aug. 7, 2025, 15 pages.
Notice of Allowance received for U.S. Appl. No. 18/367,418, mailed on Aug. 15, 2025, 14 pages.
Corrected Notice of Allowance received for U.S. Appl. No. 18/378,470, mailed on Jan. 23, 2025, 2 pages.
Notice of Allowance received for U.S. Appl. No. 18/378,470, mailed on Jan. 15, 2025, 40 pages.
Advisory Action received for U.S. Appl. No. 14/833,014, mailed on Jan. 27, 2017, 3 pages.
Advisory Action received for U.S. Appl. No. 16/259,771, mailed on Feb. 26, 2020, 3 pages.
Advisory Action received for U.S. Appl. No. 16/259,771, mailed on Jul. 14, 2020, 6 pages.
Advisory Action received for U.S. Appl. No. 16/806,981, mailed on Jun. 14, 2021, 6 pages.
Advisory Action received for U.S. Appl. No. 17/093,408, mailed on Jun. 5, 2023, 4 pages.
Applicant-Initiated Interview Summary received for U.S. Appl. No. 16/806,981, mailed on Jan. 28, 2022, 4 pages.
Applicant-Initiated Interview Summary received for U.S. Appl. No. 16/259,771, mailed on Apr. 18, 2022, 2 pages.
Applicant-Initiated Interview Summary received for U.S. Appl. No. 16/259,771, mailed on May 5, 2020, 10 pages.
Applicant-Initiated Interview Summary received for U.S. Appl. No. 17/093,408, mailed on Jan. 5, 2023, 3 pages.
Applicant-Initiated Interview Summary received for U.S. Appl. No. 17/093,408, mailed on Jul. 1, 2022, 3 pages.
Applicant-Initiated Interview Summary received for U.S. Appl. No. 17/093,408, mailed on Mar. 1, 2022, 3 pages.
Applicant-Initiated Interview Summary received for U.S. Appl. No. 17/093,408, mailed on May 10, 2023, 3 pages.
Applicant-Initiated Interview Summary received for U.S. Appl. No. 17/093,408, mailed on May 25, 2023, 2 pages.
Applicant-Initiated Interview Summary received for U.S. Appl. No. 17/746,179, mailed on Nov. 28, 2022, 4 pages.
Applicant-Initiated Interview Summary received for U.S. Appl. No. 18/119,789, mailed on Jul. 31, 2023, 4 pages.
Applicant-Initiated Interview Summary received for U.S. Appl. No. 18/119,789, mailed on Sep. 27, 2023, 3 pages.
Applivgames, ""Super Mario Run" Stickers for iMessage: Free Delivery Started!", Available online at: <https://games.app-liv.jp/archives/178627>, Sep. 13, 2016, 3 pages (Official Copy Only). {See Communication Under Rule 37 CFR § 1.98(a) (3)}.
Board Decision received for Chinese Patent Application No. 202010295272.4, mailed on Dec. 14, 2023, 2 pages (1 page of English Translation and 1 page of Official Copy).
Brief Communication Regarding Oral Proceedings received for European Patent Application No. 20176616.9, mailed on Jun. 9, 2022, 1 page.
Brief Communication Regarding Oral Proceedings received for European Patent Application No. 20176616.9, mailed on May 27, 2022, 1 page.
Contents Pocket, "Line Stamp Information", Available online at: <https://web.archive.org/web/20150404080541/http://contents-pocket.net/linestamp.html>, Apr. 2015, 2 pages (Official Copy Only). {See Communication Under Rule 37 CFR § 1.98(a) (3)}.
Corrected Notice of Allowance received for U.S. Appl. No. 15/713,490, mailed on May 1, 2019, 2 pages.
Corrected Notice of Allowance received for U.S. Appl. No. 17/093,408, mailed on Sep. 13, 2023, 2 pages.
Corrected Notice of Allowance received for U.S. Appl. No. 17/093,408, mailed on Sep. 20, 2023, 3 pages.
Decision on Appeal received for Korean Patent Application No. 10-2021-7002582, mailed on May 13, 2022, 29 pages (2 pages of English Translation and 27 pages of Official Copy).
Decision on Appeal received for U.S. Appl. No. 14/833,014, mailed on Oct. 30, 2019, 10 pages.
Decision on Appeal received for U.S. Appl. No. 16/259,771, mailed on Aug. 19, 2021, 12 pages.
Decision on Appeal received for U.S. Appl. No. 16/259,771, mailed on Feb. 8, 2024, 18 pages.
Decision to Grant received for Danish Patent Application No. PA201670320, mailed on Oct. 18, 2018, 2 pages.
Decision to Grant received for European Patent Application No. 15759998.6, mailed on Jun. 18, 2020, 2 pages.
Decision to Refuse received for European Patent Application No. 17853657.9, mailed on Feb. 2, 2024, 17 pages.
Decision to Refuse received for European Patent Application No. 19212057.4, mailed on Feb. 5, 2024, 18 pages.
Examiner-Interview Summary received for U.S. Appl. No. 16/806,981, mailed on Mar. 26, 2021, 2 pages.
Examiner-Initiated Interview Summary received for U.S. Appl. No. 16/806,981, mailed on Jan. 13, 2022, 4 pages.
Examiner-Initiated Interview Summary received for U.S. Appl. No. 16/806,981, mailed on May 24, 2021, 4 pages.
Examiner's Answer to Appeal Brief received for U.S. Appl. No. 14/833,014, mailed on Nov. 2, 2017, 48 pages.
Examiner's Answer to Appeal Brief received for U.S. Appl. No. 16/259,771, mailed on May 26, 2023, 23 pages.
Examiner's Answer to Appeal Brief received for U.S. Appl. No. 16/259,771, mailed on Oct. 23, 2020, 15 pages.
Examiner's Answer to Appeal Brief received for U.S. Appl. No. 18/119,789, mailed on Jan. 22, 2024, 45 pages.
Examiner's Pre-Review Report received for Japanese Patent Application No. 2019-215503, mailed on Aug. 20, 2021, 15 pages (8 pages of English Translation and 7 pages of Official Copy).
Extended European Search Report received for European Patent Application No. 17853657.9, mailed on May 28, 2020, 9 pages.
Extended European Search Report received for European Patent Application No. 19212057.4, mailed on Feb. 27, 2020, 8 pages.
Extended European Search Report received for European Patent Application No. 20176616.9, mailed on Sep. 8, 2020, 7 pages.
Extended European Search Report received for European Patent Application No. 22179347.4, mailed on Oct. 13, 2022, 7 pages.
Extended European Search Report received for European Patent Application No. 23173355.1, mailed on Aug. 4, 2023, 8 pages.
Final Office Action received for U.S. Appl. No. 14/833,014, mailed on Oct. 26, 2016, 32 pages.
Final Office Action received for U.S. Appl. No. 15/352,215, mailed on Mar. 7, 2019, 22 pages.
Final Office Action received for U.S. Appl. No. 16/259,771, mailed on Aug. 12, 2022, 25 pages.
Final Office Action received for U.S. Appl. No. 16/259,771, mailed on Nov. 18, 2019, 13 pages.
Final Office Action received for U.S. Appl. No. 16/806,981, mailed on Apr. 14, 2021, 24 pages.
Final Office Action received for U.S. Appl. No. 16/806,981, mailed on Mar. 1, 2022, 33 pages.

(56) References Cited

OTHER PUBLICATIONS

Final Office Action received for U.S. Appl. No. 17/093,408, mailed on Mar. 2, 2023, 51 pages.
Final Office Action received for U.S. Appl. No. 17/093,408, mailed on May 18, 2022, 41 pages.
Final Office Action received for U.S. Appl. No. 18/119,789, mailed on Aug. 30, 2023, 29 pages.
Horowitz, Paul, "Always Show Scroll Bars in Mac OS X", OS X Daily, available online at: URL: http:jjosxdaily.com/2011/08/03/show-scroll-bars-mac-os-x-lion/, Aug. 3, 2011, 7 pages.
Intention to Grant received for Danish Patent Application No. PA201570563, mailed on Mar. 17, 2016, 7 pages.
Intention to Grant received for Danish Patent Application No. PA201670320, mailed on May 17, 2018, 2 pages.
Intention to Grant received for European Patent Application No. 15759998.6, mailed on Apr. 17, 2020, 10 pages.
Intention to Grant received for European Patent Application No. 15759998.6, mailed on Nov. 21, 2019, 12 pages.
International Preliminary Report on Patentability received for PCT Patent Application No. PCT/US2015/046262, mailed on Mar. 16, 2017, 26 pages.
International Preliminary Report on Patentability received for PCT Patent Application No. PCT/US2017/049795, mailed on Apr. 4, 2019, 16 pages.
International Preliminary Report on Patentability received for PCT Patent Application No. PCT/US2021/031096, mailed on Nov. 24, 2022, 11 pages.
International Preliminary Report on Patentability received for PCT Patent Application No. PCT/US2022/029811, mailed on Nov. 30, 2023, 10 pages.
International Search Report and Written Opinion received for PCT Patent Application No. PCT/US2017/049795, mailed on Dec. 27, 2017, 26 pages.
International Search Report and Written Opinion received for PCT Patent Application No. PCT/US2015/046262, mailed on Mar. 15, 2016, 34 pages.
International Search Report and Written Opinion received for PCT Patent Application No. PCT/US2021/031096, mailed on Oct. 13, 2021, 16 pages.
International Search Report and Written Opinion received for PCT Patent Application No. PCT/US2022/029811, mailed on Nov. 7, 2022, 15 pages.
International Search Report and Written Opinion received for PCT Patent Application No. PCT/US2023/023273, mailed on Sep. 15, 2023, 19 pages.
Invitation to Pay Additional Fees and Partial International Search Report received for PCT Patent Application No. PCT/US2022/029811, mailed on Sep. 14, 2022, 9 pages.
Invitation to Pay Additional Fees received for PCT Patent Application No. PCT/US2015/046262, mailed on Nov. 23, 2015, 7 pages.
Invitation to Pay Additional Fees received for PCT Patent Application No. PCT/US2017/049795, mailed on Nov. 3, 2017, 3 pages.
Invitation to Pay Additional Fees received for PCT Patent Application No. PCT/US2021/031096, mailed on Aug. 19, 2021, 8 pages.
Krotov Ilya, "Bellus3D app experience", Available online at: https://www.youtube.com/watch?v=aSu688IY26c&t=45s, Aug. 17, 2021, 2 pages.
Minutes of the Oral Proceedings received for European Patent Application No. 19212057.4, mailed on Jan. 31, 2024, 6 pages.
Non-Final Office Action received for U.S. Appl. No. 14/833,014, mailed on Mar. 21, 2016, 26 pages.
Non-Final Office Action received for U.S. Appl. No. 15/352,215, mailed on Sep. 20, 2018, 31 pages.
Non-Final Office Action received for U.S. Appl. No. 16/259,771, mailed on Jan. 25, 2022, 20 pages.
Non-Final Office Action received for U.S. Appl. No. 16/259,771, mailed on May 8, 2019, 11 pages.
Non-Final Office Action received for U.S. Appl. No. 16/806,981, mailed on Nov. 13, 2020, 22 pages.
Non-Final Office Action received for U.S. Appl. No. 16/806,981, mailed on Sep. 1, 2021, 27 pages.
Non-Final Office Action received for U.S. Appl. No. 17/093,408, mailed on Dec. 8, 2021, 37 pages.
Non-Final Office Action received for U.S. Appl. No. 17/093,408, mailed on Sep. 14, 2022, 46 pages.
Non-Final Office Action received for U.S. Appl. No. 17/746,179, mailed on Oct. 25, 2022, 18 pages.
Non-Final Office Action received for U.S. Appl. No. 17/827,004, mailed on Nov. 9, 2022, 27 pages.
Non-Final Office Action received for U.S. Appl. No. 18/119,789, mailed on Jun. 28, 2023, 31 pages.
Notice of Acceptance received for Australian Patent Application No. 2017330212, mailed on Apr. 28, 2020, 3 pages.
Notice of Acceptance received for Australian Patent Application No. 2020213402, mailed on Sep. 21, 2020, 3 pages.
Notice of Acceptance received for Australian Patent Application No. 2020294208, mailed on Mar. 2, 2022, 3 pages.
Notice of Acceptance received for Australian Patent Application No. 2022200965, mailed on May 11, 2023, 3 pages.
Notice of Allowance received for Chinese Patent Application No. 201510557356.X, mailed on Mar. 5, 2020, 2 pages (1 page of English Translation and 1 pages of Official Copy).
Notice of Allowance received for Chinese Patent Application No. 201780058426.4, mailed on Jun. 30, 2023, 2 pages (1 page of English Translation and 1 page of Official Copy).
Notice of Allowance received for Chinese Patent Application No. 201910315328.5, mailed on Aug. 24, 2022, 4 pages (1 page of English Translation and 3 pages of Official Copy).
Notice of Allowance received for Danish Patent Application No. PA201570563, mailed on May 24, 2016, 2 pages.
Notice of Allowance received for Japanese Patent Application No. 2018-107114, mailed on Mar. 22, 2019, 4 pages (1 page of English Translation and 3 pages of Official Copy.
Notice of Allowance received for Japanese Patent Application No. 2019-215503, mailed on Aug. 26, 2022, 3 pages (1 page of English Translation and 2 pages of Official Copy).
Notice of Allowance received for Japanese Patent Application No. 2019-511767, mailed on Mar. 30, 2020, 4 pages (1 page of English Translation and 3 pages of Official Copy).
Notice of Allowance received for Japanese Patent Application No. 2021-092483, mailed on Sep. 30, 2022, 4 pages (1 page of English Translation and 3 pages of Official Copy).
Notice of Allowance received for Korean Patent Application No. 10-2019-7005369, mailed on Oct. 26, 2020, 4 pages (1 page of English Translation and 3 pages of Official Copy).
Notice of Allowance received for Korean Patent Application No. 10-2022-7003364, mailed on Jul. 28, 2023, 7 pages (2 pages of English Translation and 5 pages of Official Copy).
Notice of Allowance received for Netherland Patent Application No. 2019753, mailed on Jul. 6, 2018, 6 pages (2 pages of English Translation and 4 pages of Official copy).
Notice of Allowance received for Taiwanese Patent Application No. 104128684, mailed on Feb. 23, 2017, 3 pages (Official Copy only). {See Communication Under Rule 37 CFR § 1.98(a) (3)}.
Notice of Allowance received for U.S. Appl. No. 14/833,014, mailed on Nov. 20, 2019, 5 pages.
Notice of Allowance received for U.S. Appl. No. 15/352,215, mailed on Nov. 27, 2019, 20 pages.
Notice of Allowance received for U.S. Appl. No. 15/713,490, mailed on Mar. 20, 2019, 15 pages.
Notice of Allowance received for U.S. Appl. No. 17/093,408, mailed on Aug. 30, 2023, 59 pages.
Notice of Allowance received for U.S. Appl. No. 17/746,179, mailed on Mar. 6, 2023, 8 pages.
Office Action received for Australian Patent Application No. 2017330212, mailed on Feb. 21, 2020, 2 pages.
Office Action received for Australian Patent Application No. 2020294208, mailed on Dec. 17, 2021, 2 pages.
Office Action received for Australian Patent Application No. 2022200965, mailed on Feb. 14, 2023, 4 pages.

(56) References Cited

OTHER PUBLICATIONS

Office Action received for Chinese Patent Application No. 201510557356.X, mailed on Aug. 15, 2019, 12 pages (7 pages of English Translation and 5 pages of Official Copy).
Office Action received for Chinese Patent Application No. 201510557356.X, mailed on Dec. 29, 2017, 11 pages (5 pages of English Translation and 6 pages of Official Copy).
Office Action received for Chinese Patent Application No. 201510557356.X, mailed on Nov. 23, 2018, 12 pages (5 pages of English Translation and 7 pages of Official Copy).
Office Action received for Chinese Patent Application No. 201520679198.0, mailed on Jun. 24, 2016, 5 pages (3 pages of English Translation and 2 pages of Official Copy).
Office Action received for Chinese Patent Application No. 2015206791980, mailed on Mar. 7, 2016, 6 pages (4 pages of English Translation and 2 pages of Official Copy).
Office Action Received for Chinese Patent Application No. 2015206791980, mailed on Nov. 18, 2015, 4 pages (2 pages English Translation and 2 pages Official copy).
Office Action received for Chinese Patent Application No. 201621208900.6, mailed on Apr. 26, 2017, 2 pages (Official Copy only). {See Communication Under Rule 37 CFR § 1.98(a) (3)}.
Office Action received for Chinese Patent Application No. 201780058426.4, mailed on Dec. 2, 2022, 11 pages (5 pages of English Translation and 6 pages of Official Copy).
Office Action received for Chinese Patent Application No. 201810411708.4, mailed on Feb. 24, 2022, 10 pages (5 pages of English Translation and 5 pages of Official Copy).
Office Action received for Chinese Patent Application No. 201810411708.4, mailed on Feb. 26, 2021, 16 pages (8 pages of English Translation and 8 pages of Official Copy).
Office Action received for Chinese Patent Application No. 201810411708.4, mailed on Nov. 12, 2021, 12 pages (6 pages of English Translation and 6 pages of Official Copy).
Office Action received for Chinese Patent Application No. 201910315328.5, mailed on Nov. 30, 2021, 21 pages (10 pages of English Translation and 11 pages of Official Copy).
Office Action received for Chinese Patent Application No. 201911199054.4, mailed on Jan. 20, 2021, 19 pages (11 pages of English Translation and 8 pages of Official Copy).
Office Action received for Chinese Patent Application No. 201911199054.4, mailed on Jul. 3, 2020, 15 pages (9 pages of English Translation and 6 pages of Official Copy).
Office Action received for Chinese Patent Application No. 201911199054.4, mailed on Jun. 10, 2021, 13 pages (7 pages of English Translation and 6 pages of Official Copy).
Office Action received for Chinese Patent Application No. 202010295272.4, mailed on Aug. 28, 2023, 8 pages (4 pages of English Translation and 4 pages of Official Copy).
Office Action received for Chinese Patent Application No. 202010295272.4, mailed on Feb. 27, 2023, 15 pages (6 pages of English Translation and 9 pages of Official Copy).
Office Action received for Danish Patent Application No. PA201670319, mailed on Aug. 2, 2016, 6 pages.
Office Action received for Danish Patent Application No. PA201670319, mailed on Jun. 21, 2017, 6 pages.
Office Action received for Danish Patent Application No. PA201670319, mailed on Nov. 24, 2016, 7 pages.
Office Action received for Danish Patent Application No. PA201670320, mailed on Aug. 4, 2016, 9 pages.
Office Action received for Danish Patent Application No. PA201670320, mailed on Dec. 5, 2016, 4 pages.
Office Action received for Danish Patent Application No. PA201670320, mailed on Jan. 18, 2018, 2 pages.
Office Action received for Danish Patent Application No. PA201670320, mailed on Jul. 3, 2017, 4 pages.
Office Action received for European Patent Application No. 15759998.6, mailed on Dec. 19, 2018, 6 pages.
Office Action received for European Patent Application No. 15759998.6, mailed on Jul. 16, 2018, 6 pages.
Office Action received for European Patent Application No. 15759998.6, mailed on May 29, 2019, 6 pages.
Office Action received for European Patent Application No. 17853657.9, mailed on Apr. 1, 2021, 6 pages.
Office Action received for European Patent Application No. 19212057.4, mailed on Mar. 9, 2021, 6 pages.
Office Action received for European Patent Application No. 20176616.9, mailed on Jun. 10, 2021, 4 pages.
Office Action received for Japanese Patent Application No. 2017-510631, mailed on Mar. 2, 2018, 12 pages (7 pages of English Translation and 5 pages of Official Copy).
Office Action received for Japanese Patent Application No. 2018-107114, mailed on Oct. 9, 2018, 4 pages (2 pages of English Translation and 2 pages of Official copy).
Office Action received for Japanese Patent Application No. 2019-215503, mailed on Feb. 5, 2021, 12 pages (6 pages of English Translation and 6 pages of Official Copy).
Office Action received for Japanese Patent Application No. 2019-215503, mailed on Jul. 3, 2020, 12 pages (6 pages of English Translation and 6 pages of Official Copy).
Office Action received for Japanese Patent Application No. 2021-092483, mailed on Apr. 1, 2022, 8 pages (4 pages of English Translation and 4 pages of Official Copy).
Office Action received for Japanese Patent Application No. 2022-170806, mailed on Nov. 17, 2023, 14 pages (7 pages of English Translation and 7 pages of Official Copy).
Office Action received for Korean Patent Application No. 10-2019-7005369, mailed on Mar. 13, 2020, 12 pages (5 pages of English Translation and 7 pages of Official Copy).
Office Action received for Korean Patent Application No. 10-2021-7002582, mailed on Apr. 16, 2021, 13 pages (6 pages of English Translation and 7 pages of Official Copy).
Office Action received for Korean Patent Application No. 10-2021-7002582, mailed on Oct. 29, 2021, 6 pages (3 pages of English Translation and 3 pages of Official Copy).
Office Action received for Korean Patent Application No. 10-2022-7003364, mailed on Apr. 22, 2022, 14 pages (6 pages of English Translation and 8 pages of Official Copy).
Office Action received for Korean Patent Application No. 10-2022-7003364, mailed on Dec. 26, 2022, 8 pages (3 pages of English Translation and 5 pages of Official Copy).
Office Action received for Netherland Patent Application No. 2019753, mailed on Apr. 12, 2018, 8 pages (3 page of English Translation and 5 pages of Official Copy).
Office Action received for Taiwanese Patent Application No. 104128684, mailed on Nov. 8, 2016, 24 pages (9 pages of English Translation and 15 pages of Official Copy).
Office Action received for Australian Patent Application No. 2015101183, issued on Nov. 6, 2015, 4 pages.
Record of Oral Hearing received for U.S. Appl. No. 16/259,771, mailed on Aug. 4, 2021, 15 pages.
Record of Oral Hearing received for U.S. Appl. No. 16/259,771, mailed on Feb. 4, 2024, 15 pages.
Search Report and Opinion received for Netherlands Patent Application No. 2015364, issued on Jul. 4, 2017, 12 pages (5 pages of English Translation of Search Opinion and 7 pages of official copy).
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 80 pages.
Summons to Attend Oral Proceedings received for European Patent Application No. 17853657.9, mailed on May 2, 2023, 8 pages.
Summons to Attend Oral Proceedings received for European Patent Application No. 19212057.4, mailed on Apr. 19, 2023, 9 pages.
Summons to Attend Oral Proceedings received for European Patent Application No. 20176616.9, mailed on Dec. 17, 2021, 7 pages.
Supplemental Notice of Allowance received for U.S. Appl. No. 14/833,014, mailed on Mar. 12, 2020, 2 pages.
Supplemental Notice of Allowance received for U.S. Appl. No. 15/713,490, mailed on May 30, 2019, 2 pages.
Supplemental Notice of Allowance received for U.S. Appl. No. 17/746,179, mailed on Apr. 3, 2023, 2 pages.

(56) References Cited

OTHER PUBLICATIONS

Theunlockr, "Galaxy Watch Complete Walkthrough: The Best Watch They've Made So Far", Available online at: https://www.youtube.com/watch?v=xiECIfe1SN4, Sep. 11, 2018, 27 pages.
Wikipedia, "Emoji", Online Available at: https://web.archive.org/web/20140829025736/https://en.wikipedia.org/wiki/Emoji, 2014, 13 pages.
ZY News, "Generate Cartoon Face within Three Seconds, You are the New-generation Expression Emperor", Online available at: <http://inews.ifeng.com/48551936/news.shtml>, Apr. 22, 2016, 3 pages (Official Copy Only). {See Communication Under Rule 37 CFR § 1.98(a) (3)}.
Office Action received for Japanese Patent Application No. 2024-083562, mailed on Jun. 26, 2025, 5 pages (3 pages of English Translation and 2 pages of Official Copy).
Applicant-Initiated Interview Summary received for U.S. Appl. No. 18/204,908, mailed on Jul. 2, 2024, 4 pages.
Board Decision received for Chinese Patent Application No. 201911199054.4, mailed on Sep. 25, 2024, 40 pages (17 pages of English Translation and 23 pages of Official Copy).
Board Opinion received for Chinese Patent Application No. 201911199054.4, mailed on May 10, 2024, 24 pages (13 pages of English Translation and 11 pages of Official Copy).
Corrected Notice of Allowance received for U.S. Appl. No. 18/230,465, mailed on Nov. 5, 2024, 2 pages.
Corrected Notice of Allowance received for U.S. Appl. No. 18/230,465, mailed on Oct. 9, 2024, 2 pages.
Corrected Notice of Allowance received for U.S. Appl. No. 18/230,465, mailed on Oct. 17, 2024, 2 pages.
Corrected Notice of Allowance received for U.S. Appl. No. 18/230,465, mailed on Oct. 24, 2024, 2 pages.
Decision to Grant received for European Patent Application No. 23173355.1, mailed on Oct. 24, 2024, 3 pages.
Decision to Grant received for Japanese Patent Application No. 2023-572180, mailed on Apr. 22, 2024, 3 pages (1 page of English Translation and 2 pages of Official Copy).
Extended European Search Report received for European Patent Application No. 24203946.9, mailed on Oct. 24, 2024, 9 pages.
Intention to Grant received for European Patent Application No. 22729935.1, mailed on Nov. 22, 2024, 9 pages.
Intention to Grant received for European Patent Application No. 23173355.1, mailed on Jun. 28, 2024, 9 pages.
International Preliminary Report on Patentability received for PCT Patent Application No. PCT/US2023/023273, mailed on Dec. 5, 2024, 13 pages.
International Search Report and Written Opinion received for PCT Patent Application No. PCT/US2023/033376, mailed on Mar. 18, 2024, 21 pages.
International Search Report and Written Opinion received for PCT Patent Application No. PCT/US2024/012658, mailed on Jun. 21, 2024, 22 pages.
Invitation to Pay Additional Fees and Partial International Search Report received for PCT Patent Application No. PCT/US2023/033376, mailed on Jan. 24, 2024, 13 pages.
Invitation to Pay Additional Fees and Partial International Search Report received for PCT Patent Application No. PCT/US2024/012658, mailed on Apr. 30, 2024, 13 pages.
Invitation to Pay Search Fees received for European Patent Application No. 21727979.3, mailed on Jul. 10, 2024, 4 pages.
Non-Final Office Action received for U.S. Appl. No. 18/204,908, mailed on Jun. 5, 2024, 16 pages.
Non-Final Office Action received for U.S. Appl. No. 18/230,465, mailed on Aug. 15, 2024, 37 pages.
Notice of Allowance received for Japanese Patent Application No. 2022-170806, mailed on Aug. 9, 2024, 4 pages (1 page of English Translation and 3 pages of Official Copy).
Notice of Allowance received for Korean Patent Application No. 10-2023-7039673, mailed on Aug. 21, 2024, 4 pages (1 page of English Translation and 3 pages of Official Copy).
Notice of Allowance received for U.S. Appl. No. 18/204,908, mailed on Jul. 24, 2024, 6 pages.
Notice of Allowance received for U.S. Appl. No. 18/230,465, mailed on Sep. 16, 2024, 5 pages.
Office Action received for Australian Patent Application No. 2023219926, mailed on Aug. 24, 2024, 5 pages.
Office Action received for Australian Patent Application No. 2023219926, mailed on Dec. 3, 2024, 4 pages.
Office Action received for Chinese Patent Application No. 202010295272.4, mailed on Feb. 5, 2024, 14 pages (6 pages of English Translation and 8 pages of Official Copy).
Office Action received for Chinese Patent Application No. 202010295272.4, mailed on Jun. 11, 2024, 12 pages (5 pages of English Translation and 7 pages of Official Copy).
Office Action received for Chinese Patent Application No. 202010295272.4, mailed on Oct. 10, 2024, 9 pages (4 pages of English Translation and 5 pages of Official Copy).
Office Action received for Chinese Patent Application No. 202280036173.1, mailed on Jul. 21, 2024, 12 pages (6 pages of English Translation and 6 pages of Official Copy).
Office Action received for Chinese Patent Application No. 202280036173.1, mailed on May 10, 2024, 16 pages (8 pages of English Translation and 8 pages of Official Copy).
Office Action received for European Patent Application No. 21727979.3, mailed on Sep. 26, 2024, 11 pages.
Office Action received for European Patent Application No. 22729935.1, mailed on May 10, 2024, 7 pages.
Office Action received for Japanese Patent Application No. 2022-170806, mailed on May 13, 2024, 4 pages (2 pages of English Translation and 2 pages of Official Copy).
Office Action received for Korean Patent Application No. 10-2023-7037034, mailed on Jul. 22, 2024, 23 pages (11 pages of English Translation and 12 pages of Official Copy).
Office Action received for Korean Patent Application No. 10-2023-7039673, mailed on Feb. 20, 2024, 11 pages (2 pages of English Translation and 9 pages of Official Copy).
Supplemental Notice of Allowance received for U.S. Appl. No. 18/204,908, mailed on Aug. 13, 2024, 2 pages.
Supplemental Notice of Allowance received for U.S. Appl. No. 18/204,908, mailed on Oct. 9, 2024, 2 pages.
Supplemental Notice of Allowance received for U.S. Appl. No. 18/204,908, mailed on Sep. 26, 2024, 2 pages.
Corrected Notice of Allowance received for U.S. Appl. No. 18/378,470, mailed on May 29, 2025, 2 pages.
Notice of Allowance received for U.S. Appl. No. 18/378,470, mailed on May 20, 2025, 41 pages.
Decision on Appeal received for U.S. Appl. No. 18/119,789, mailed on Feb. 20, 2025, 16 pages.
Record of Oral Hearing received for U.S. Appl. No. 18/119,789, mailed on Feb. 23, 2025, 14 pages.
Board Opinion received for Chinese Patent Application No. 201810411708.4, mailed on Sep. 15, 2025, 4 pages (1 page of English Translation and 3 pages of Official Copy).
Non-Final Office Action received for U.S. Appl. No. 18/623,712, mailed on Oct. 1, 2025, 9 pages.
Intention to Grant received for European Patent Application No. 24203946.9, mailed on Sep. 5, 2025, 9 pages.
Office Action received for Japanese Patent Application No. 2024-152389, mailed on Aug. 25, 2025, 12 pages (6 pages of English Translation and 6 pages of Official Copy).
Applicant-Initiated Interview Summary received for U.S. Appl. No. 18/131,833, mailed on Jun. 27, 2025, 2 pages.
Corrected Notice of Allowance received for U.S. Appl. No. 18/367,418, mailed on Jul. 8, 2025, 12 pages.
Notice of Allowance received for U.S. Appl. No. 18/367,418, mailed on Jun. 24, 2025, 18 pages.

* cited by examiner 11.1.2-104
11.1.2-100
11.1.2-102
11.1.2-109
11.1.2-106a
11.1.2-110d
11.1.2-106b
11.1.2-108
11.1.2-116
11.1.2-110c
11.1.2-111
11.1.2-114
11.1.2-110a
11.1.2-112
11.1.2-110e
11.1.2-118
11.1.2-110b
11.1.2-110f

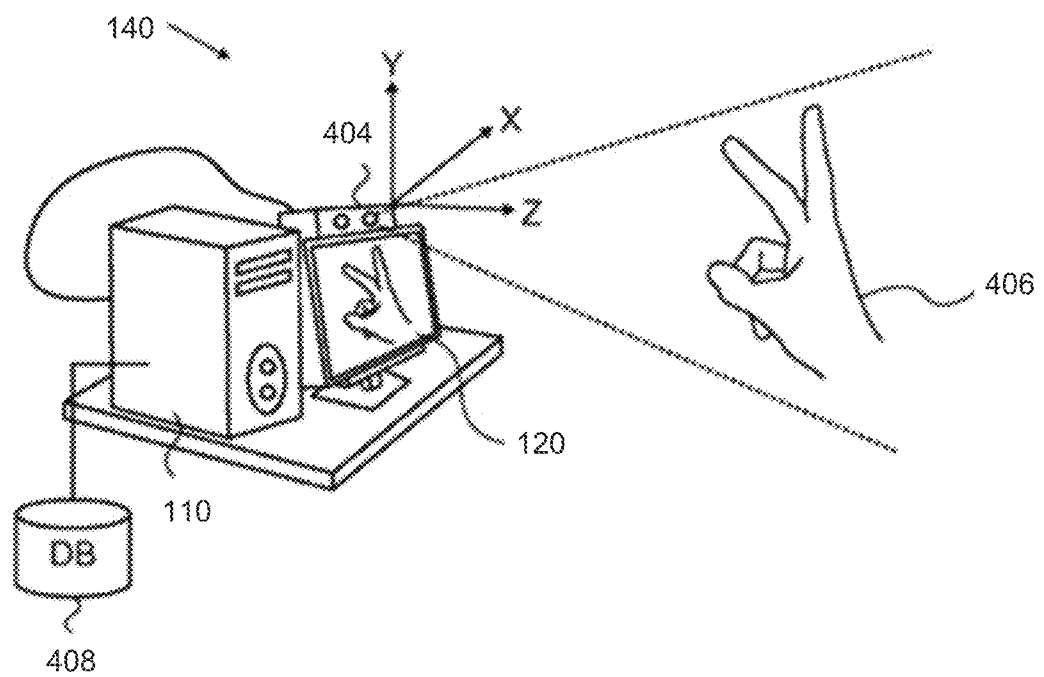
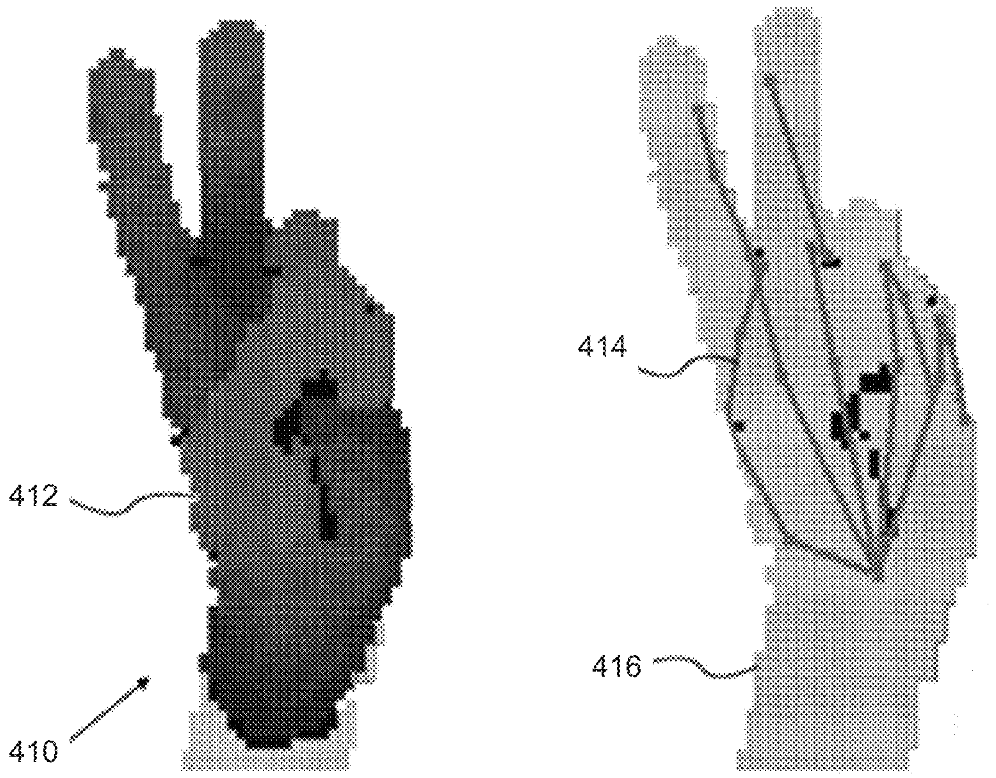
*FIG. 4*

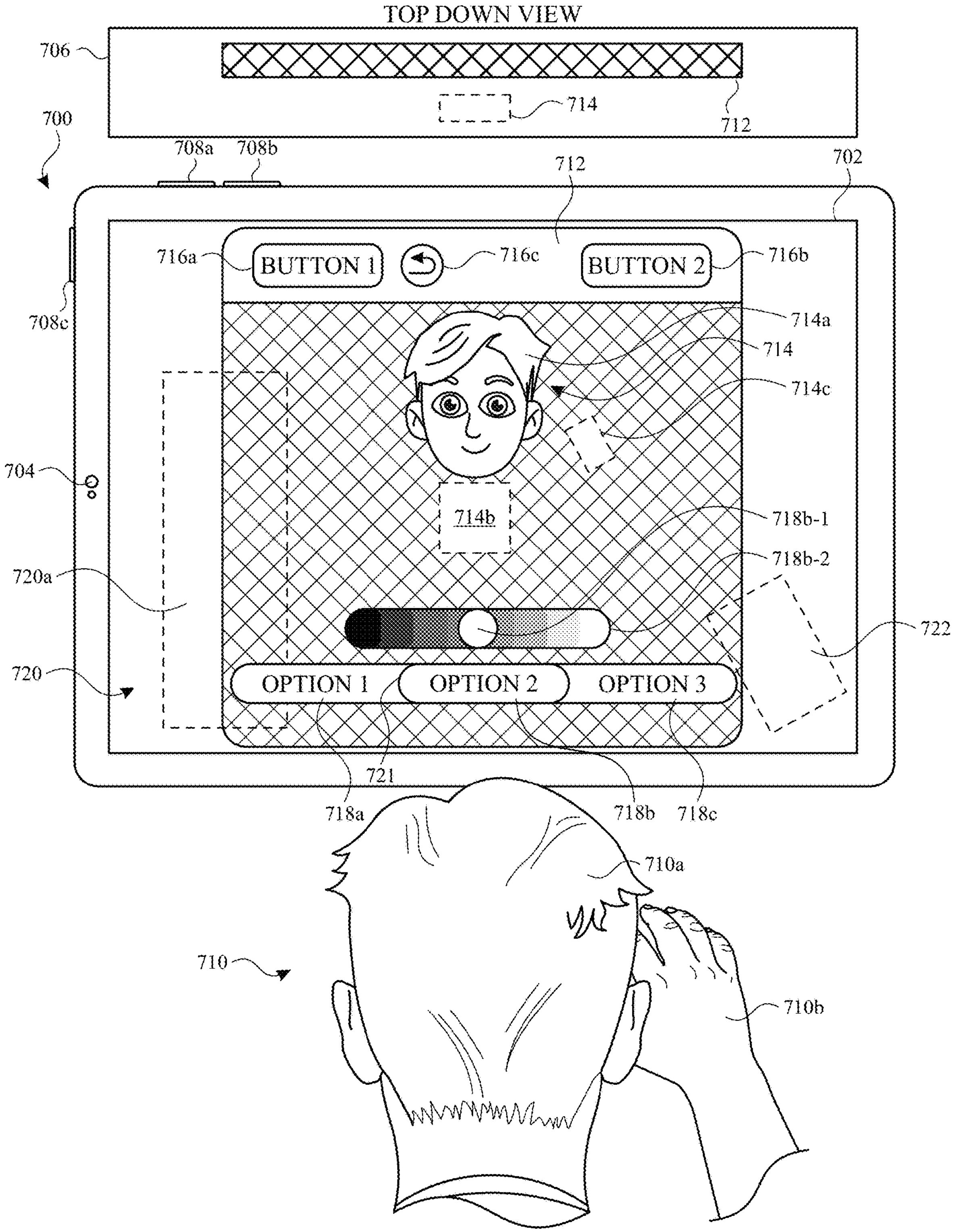
FIG. 7B1

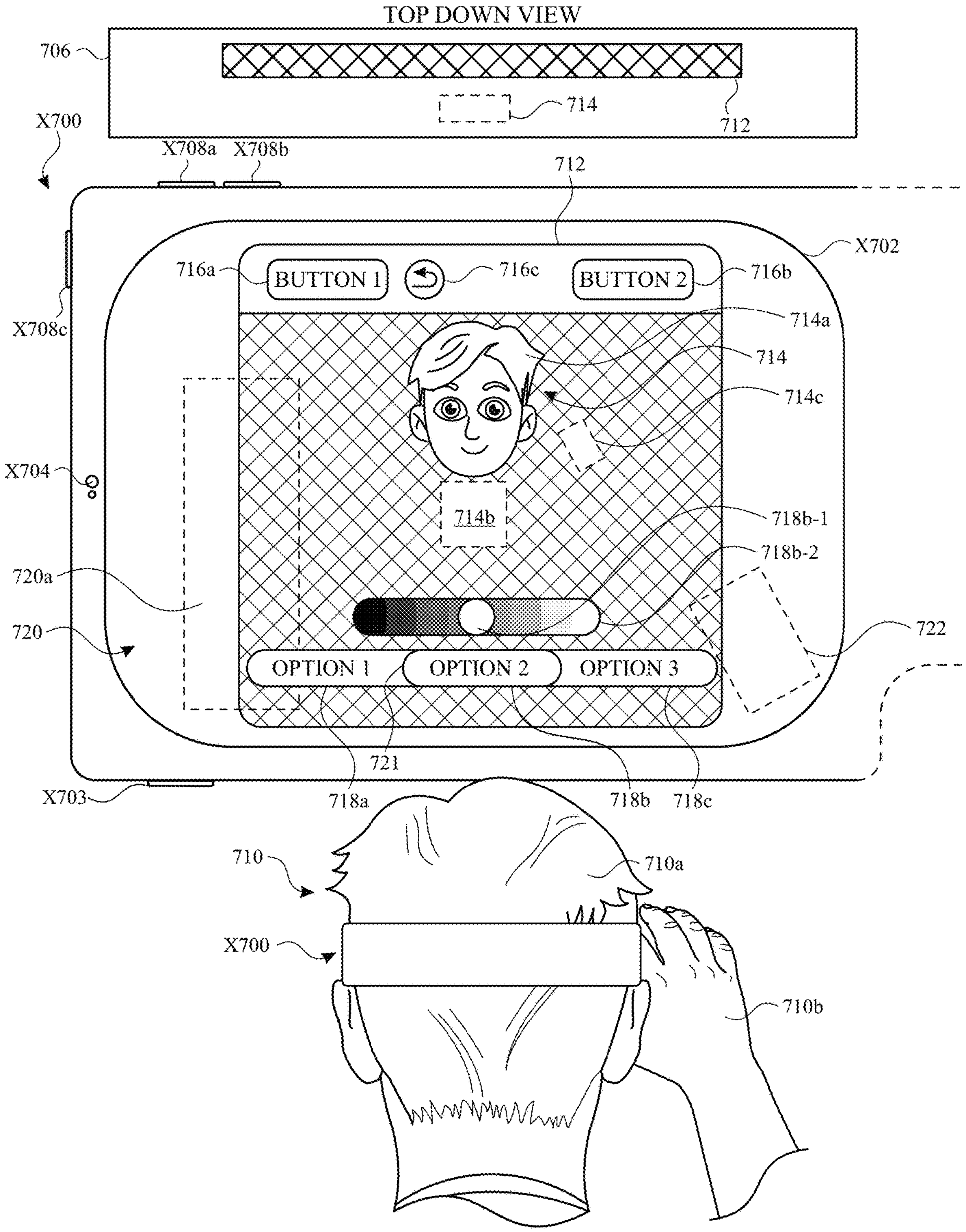
*FIG. 7B2*

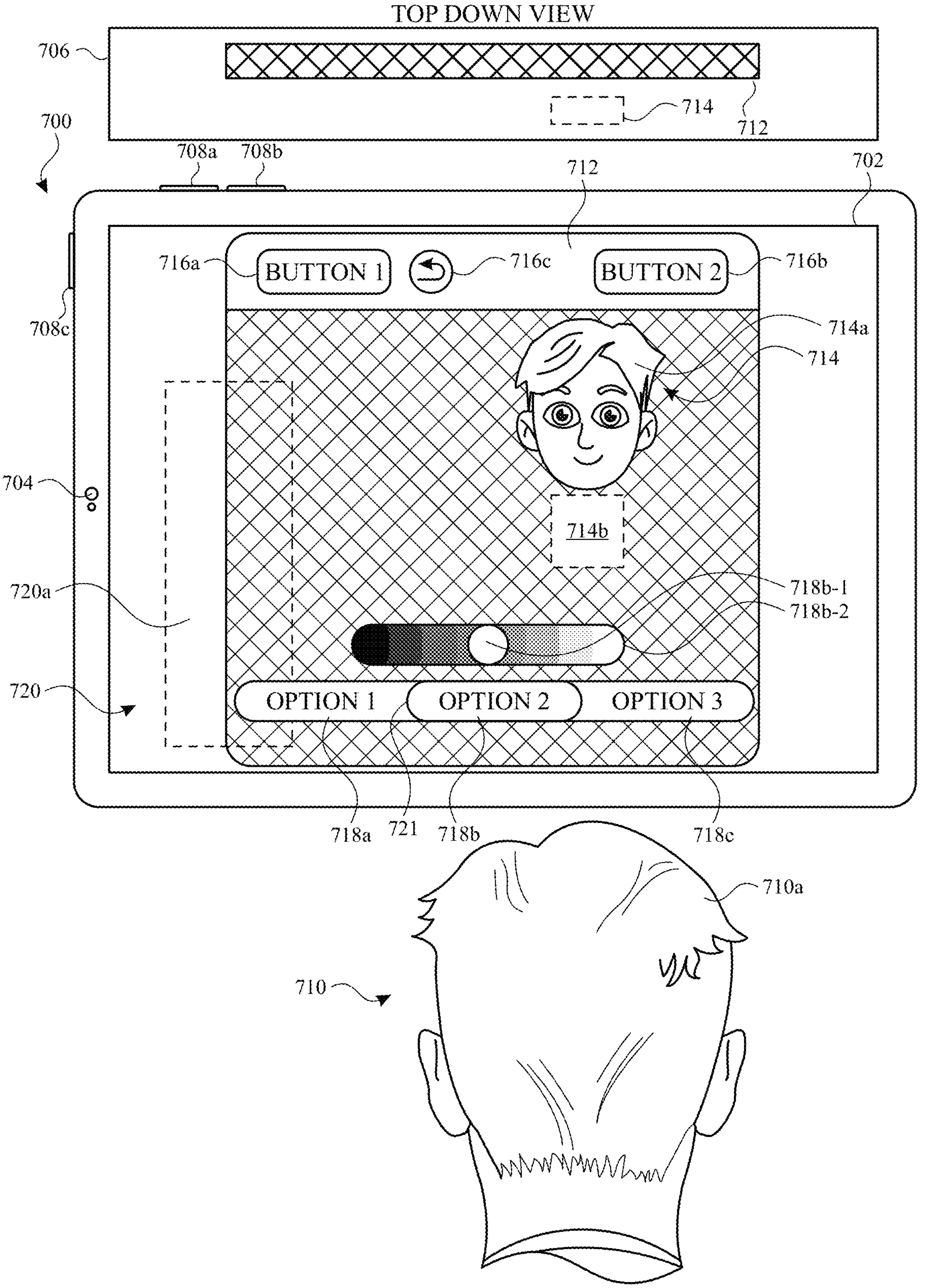
FIG. 7C1

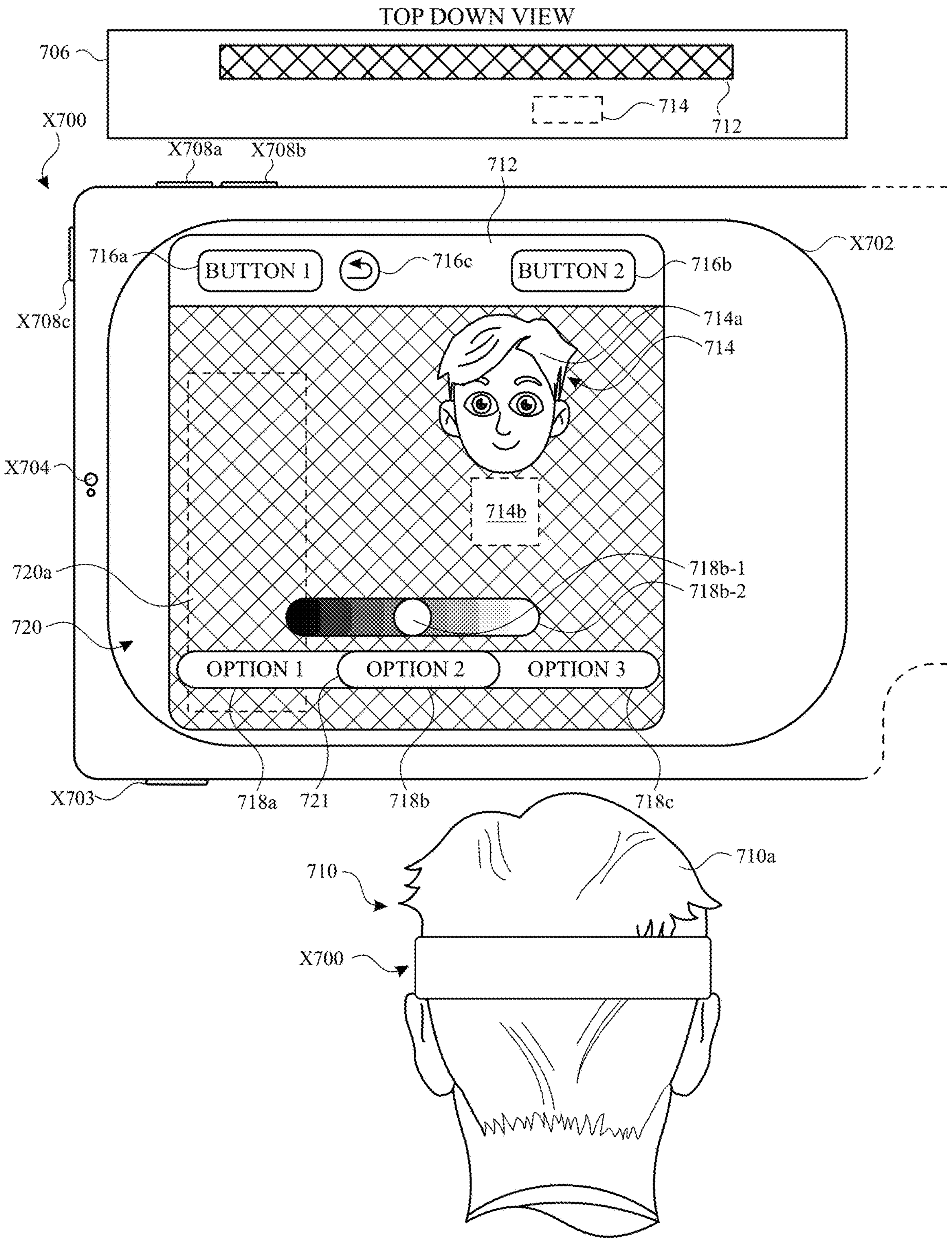
*FIG. 7C2*

TOP DOWN VIEW
706
714
712
700
708a
708b
712
702
708c
716a
BUTTON 1
716c
BUTTON 2
716b
714a
714
704
714b
720
718b-1
718b-2
724
720b
OPTION 1
OPTION 2
OPTION 3
718a
721
718b
718c
720c

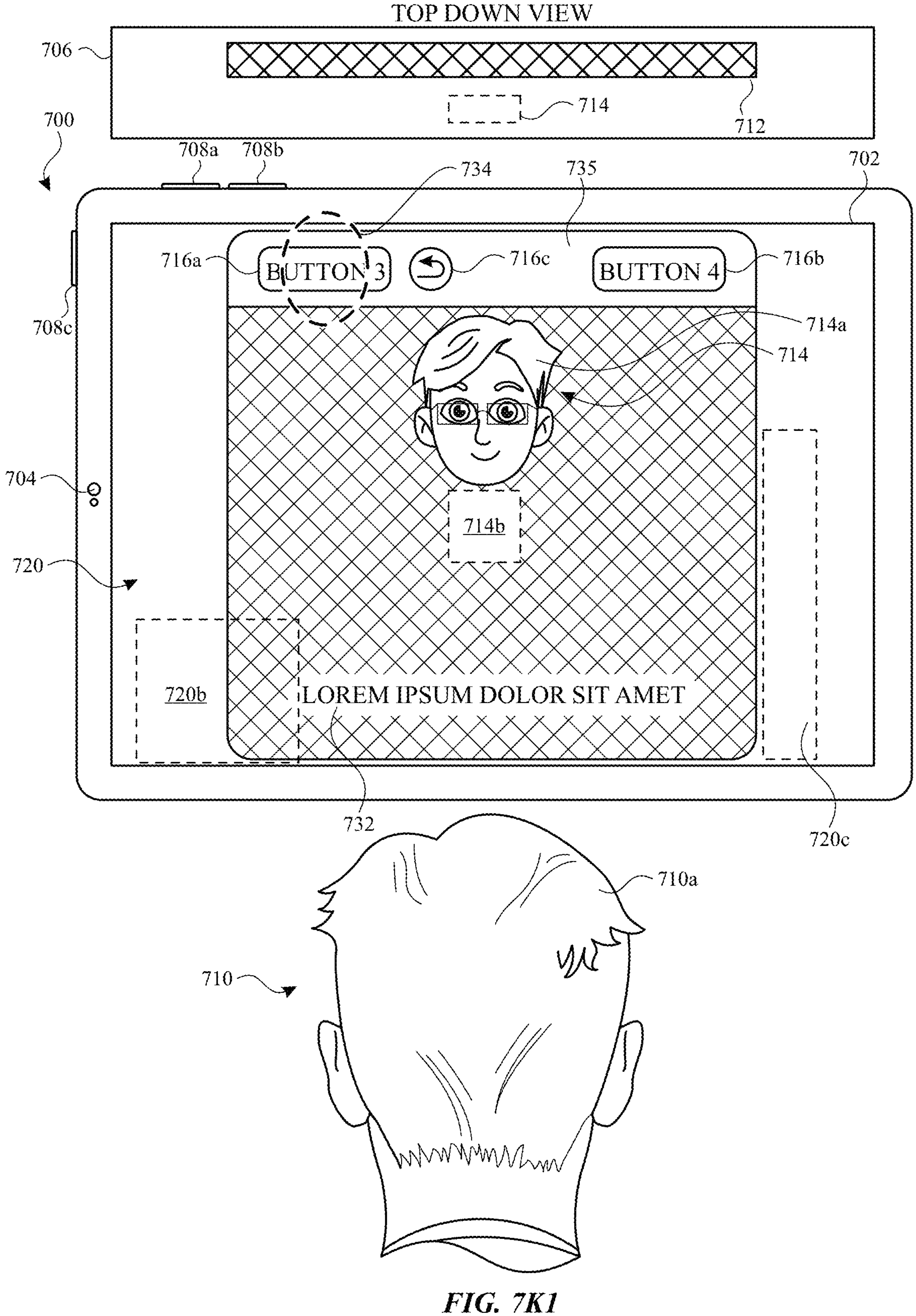
FIG. 7K1

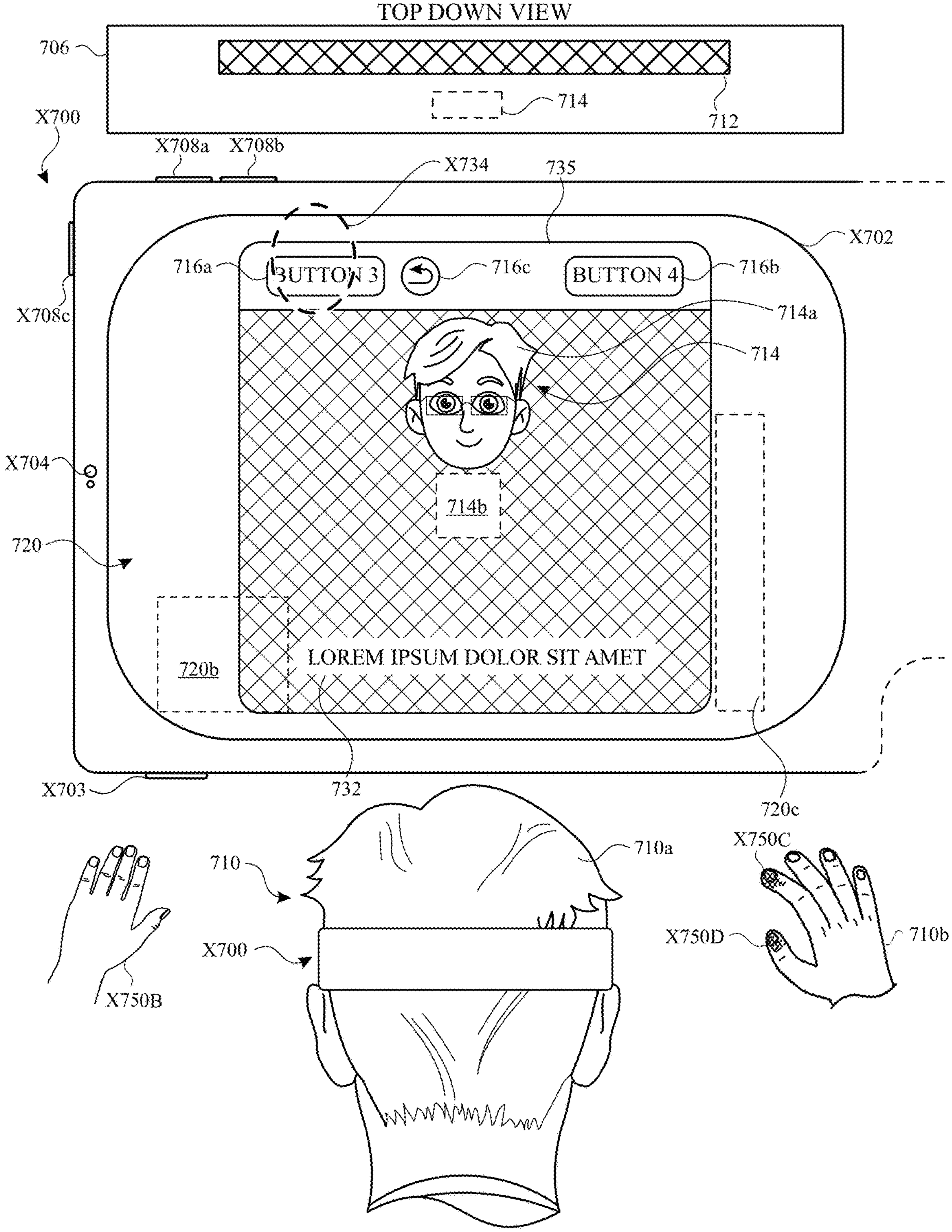
*FIG. 7K2*

800

802
Concurrently display, via the one or more display generation components:

804
An avatar at a first location in a three-dimensional environment.

806
A respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user of the computer system.

808
While concurrently displaying the avatar and the respective user interface:

810
Detect an input directed to a control in the respective user interface.

812
In response to detecting the input directed to the control in the respective user interface:

814
Change an appearance of the avatar based on the input.

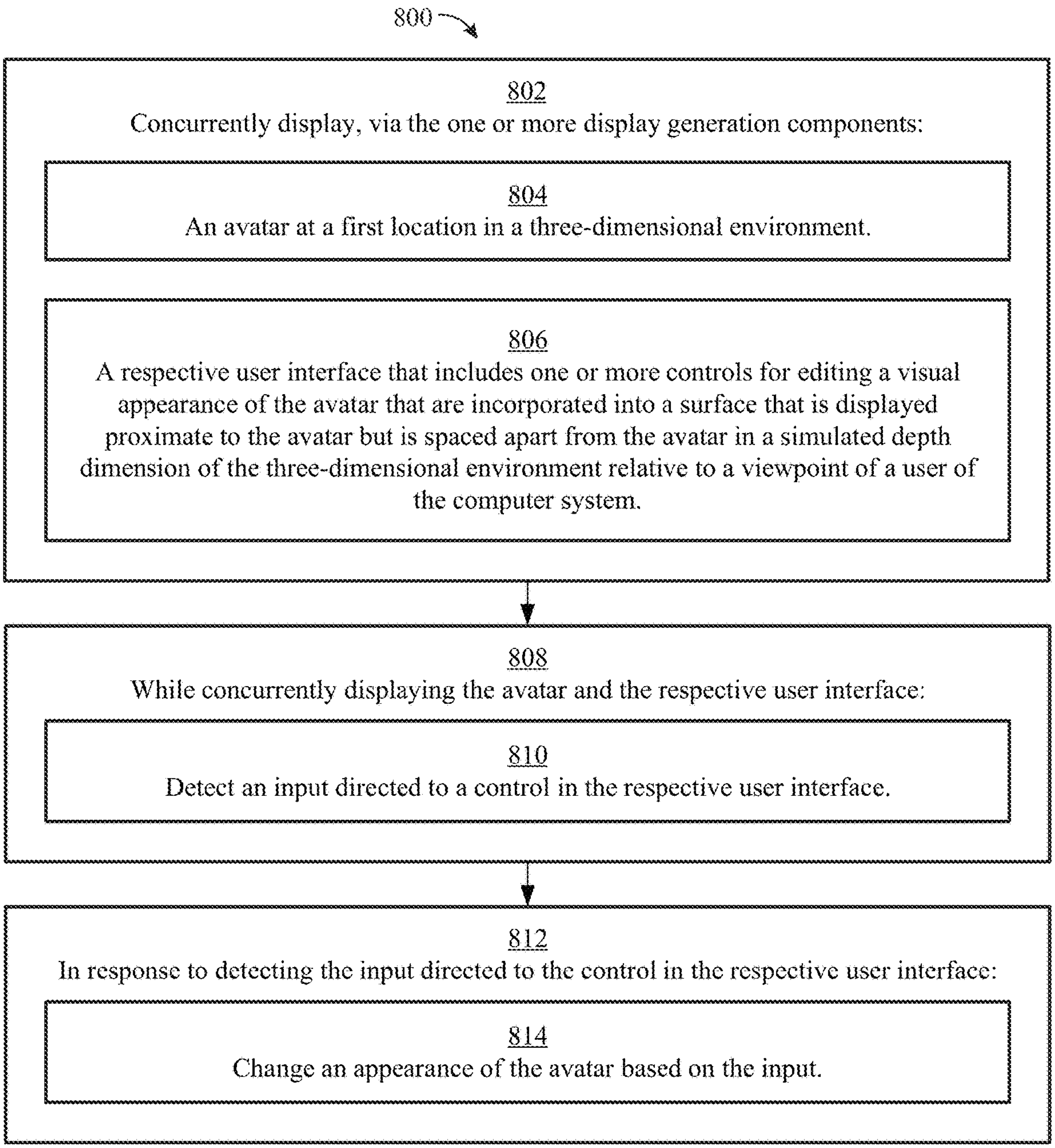

902
Display, via the one or more display generation components, a representation of an avatar that was generated to have an appearance based on an appearance of a person using image-based user information corresponding to the person.

904
Receive, via the one or more input devices, a first set of inputs corresponding to a decision not to use the avatar for one or more functions of the computer system.

906
In response to receiving the first set of user inputs corresponding to a decision not to use the avatar for the one or more functions of the computer system:

908
Display, via the one or more display generation components, a selectable user interface object that is selectable to indicate a user request to user an alternate visual representation of the person different from the avatar to represent the person.

910
While displaying the selectable user interface object:

912
Receive, via the one or more input devices, a second set of user inputs corresponding to selection of the selectable user interface object.

914
In response to receiving the second set of user inputs:

916
Display, via the one or more display generation components, one or more alternative options that can be used to represent the person for the one or more functions of the computer system.

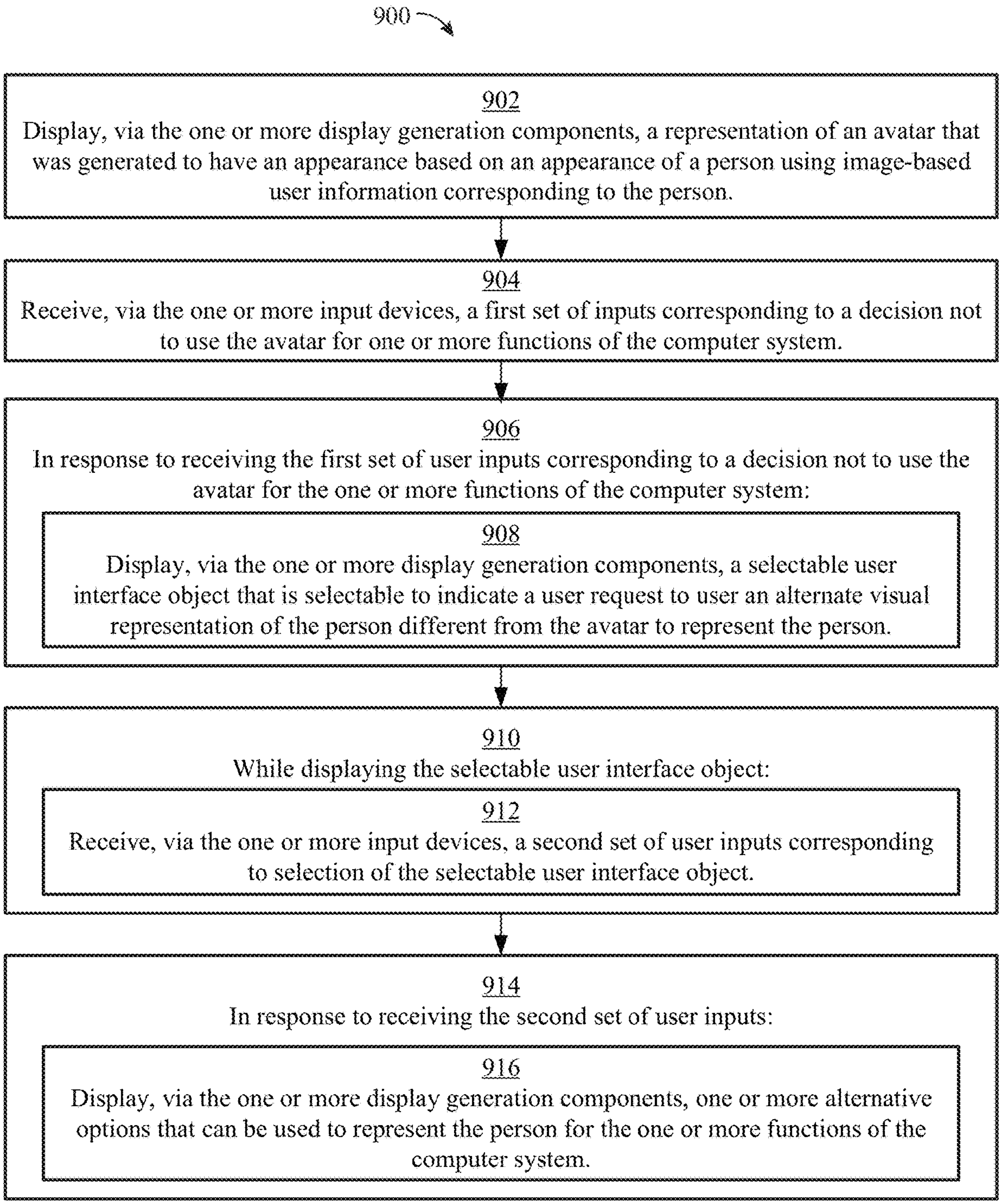

*FIG. 9*

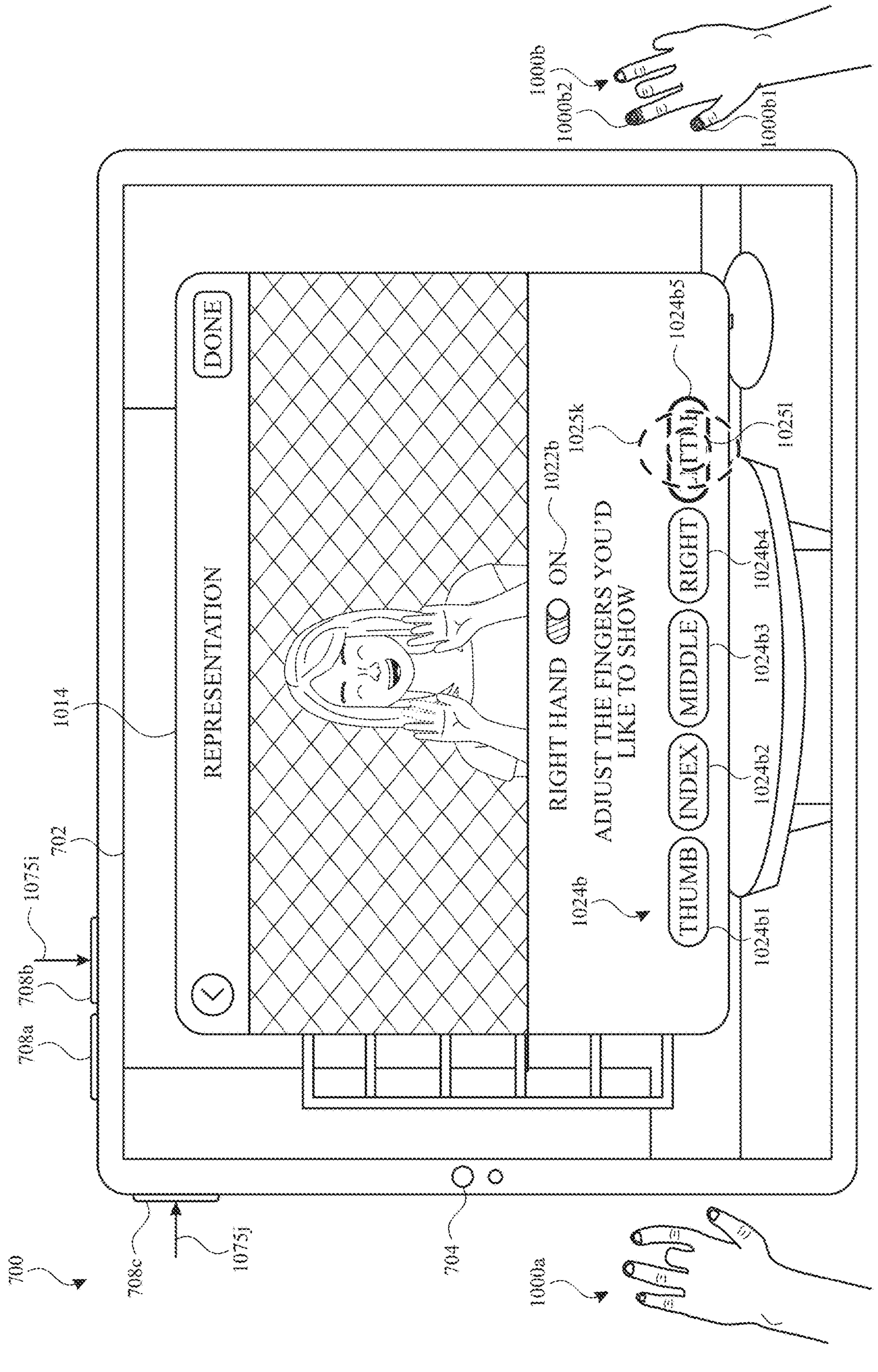
FIG. 10L1

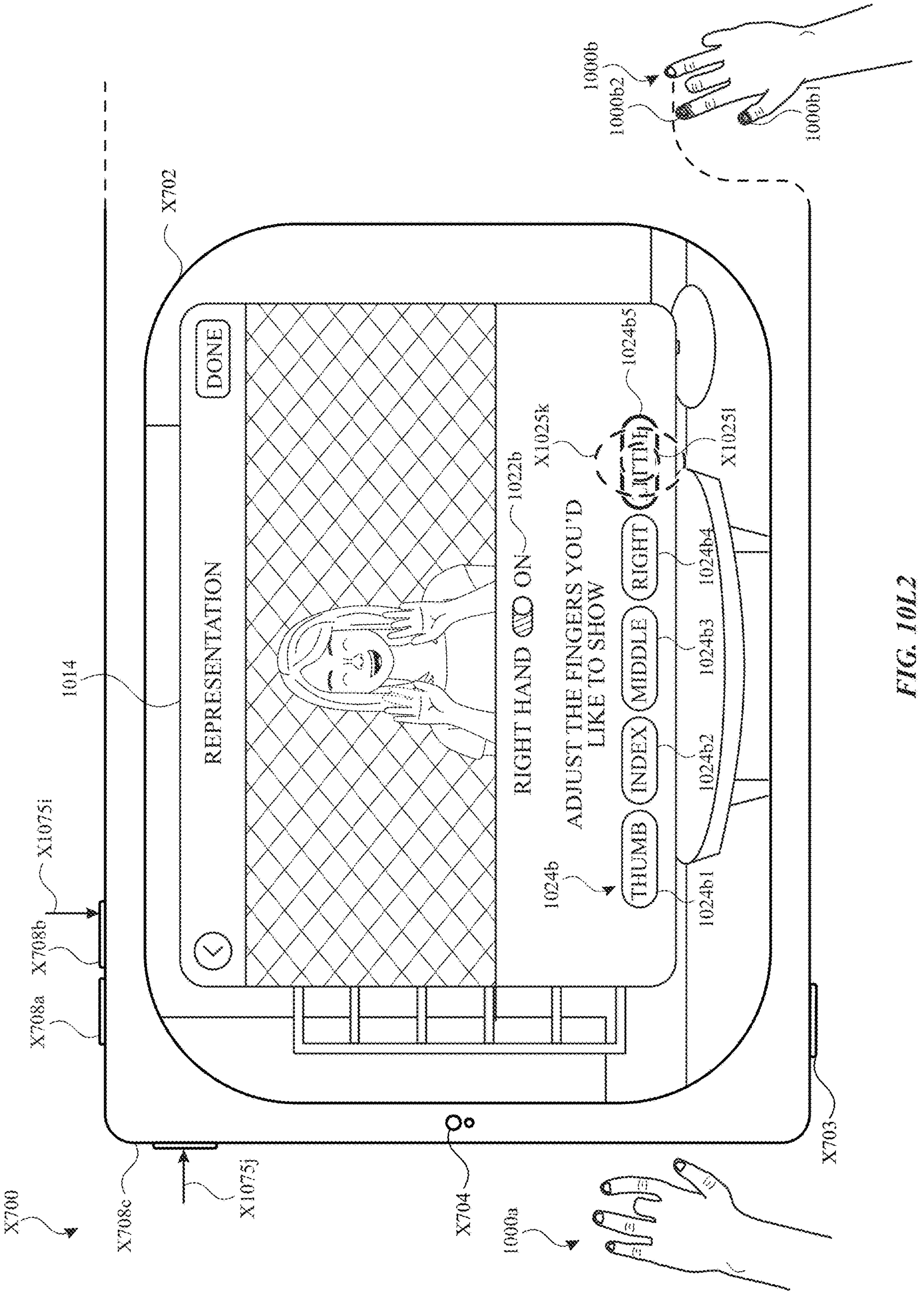
FIG. 10L2

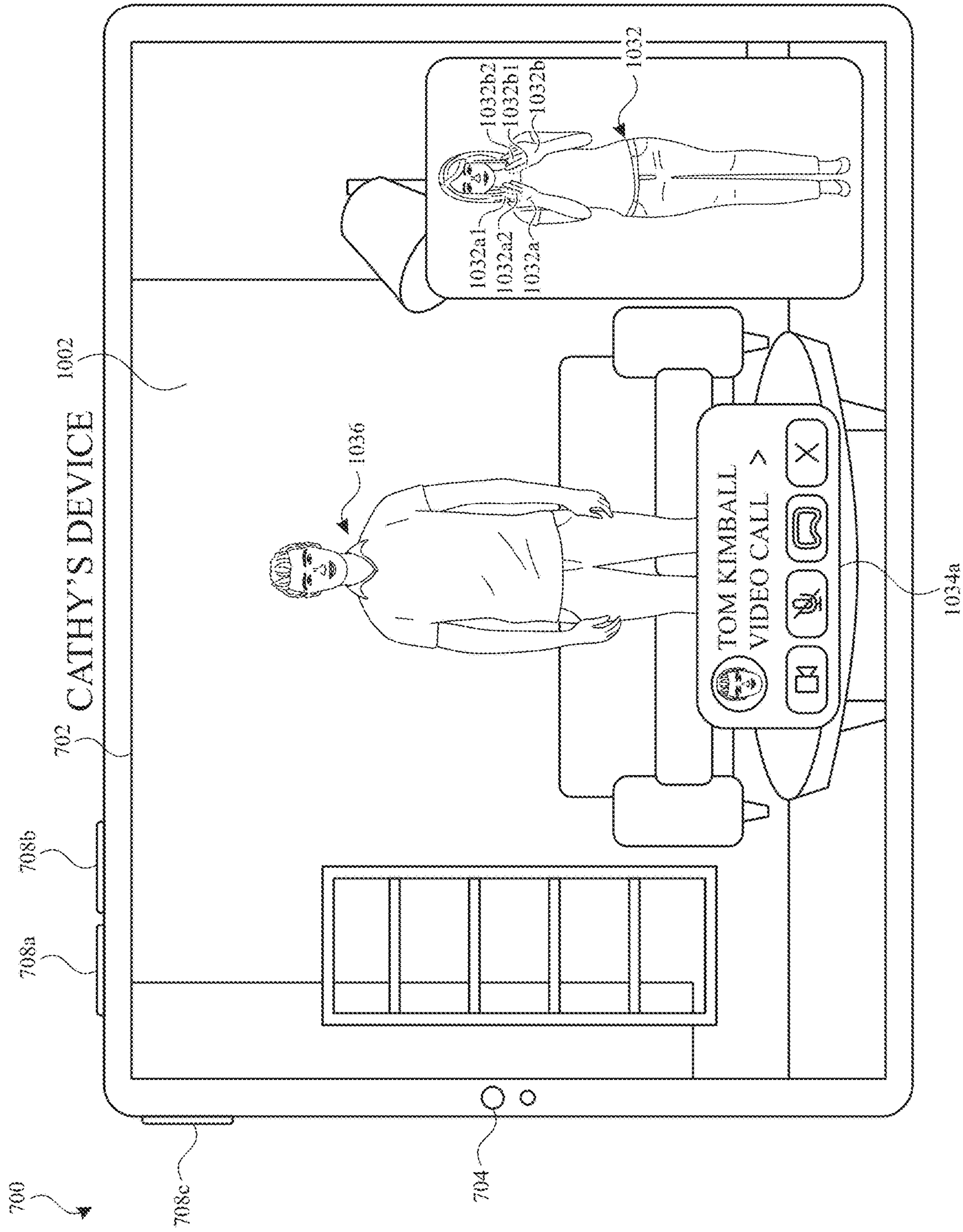
FIG. 10Q1

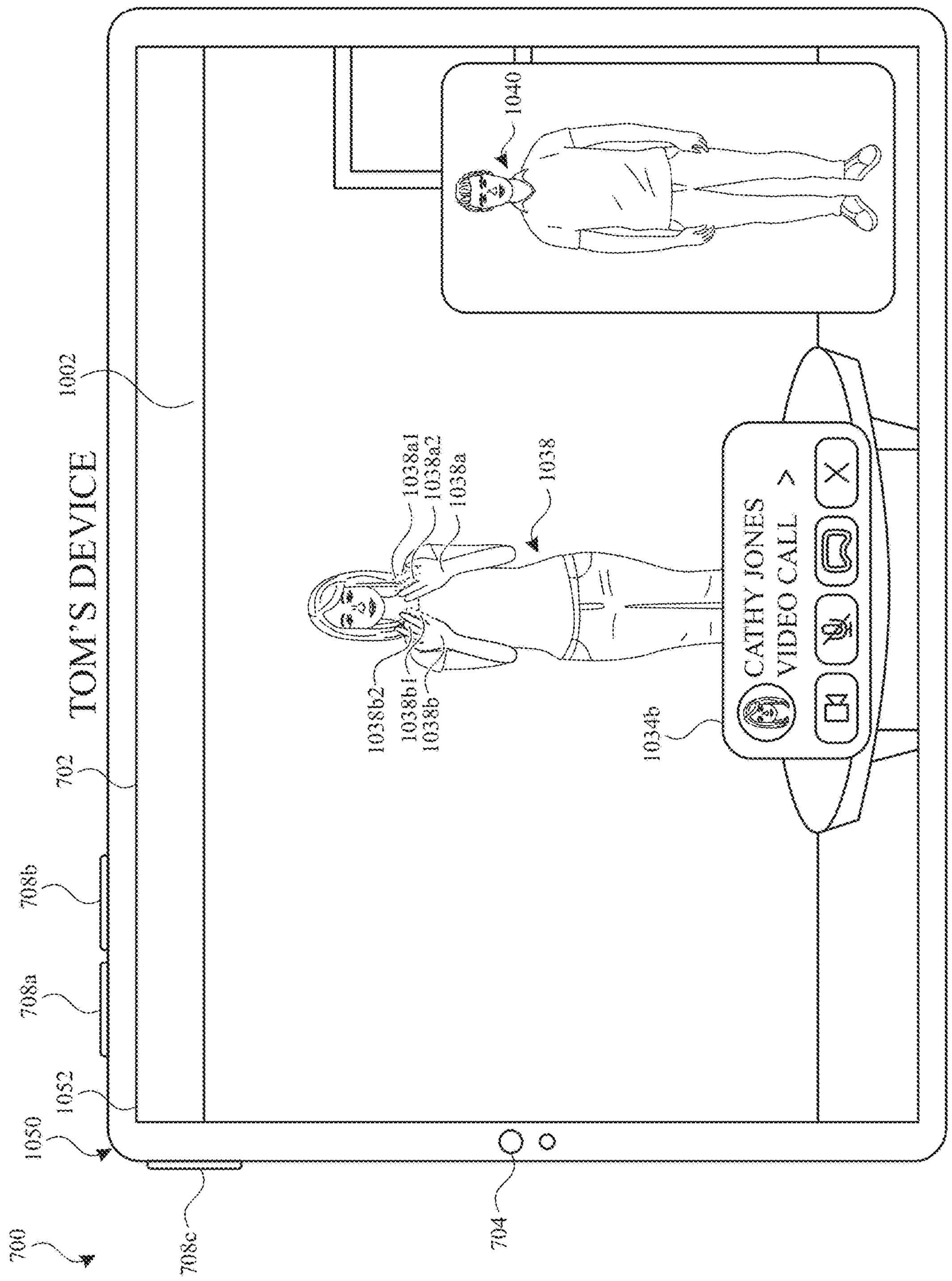
*FIG. 10Q2*

1102
After performing an enrollment process that includes capturing information about a physical feature of a person:

1104
Display, via one or more display generation components, a set of one or more appendage options corresponding to one or more respective appendages of the person, including displaying a first appendage option corresponding to a first appendage of the person.

1106
While displaying the first appendage option, detect, via one or more input devices, a first set of one or more inputs that includes an input selecting the first appendage option.

1108
In response to detecting the first set of one or more inputs, set a respective availability state of the first appendage.

1110
After setting the respective availability state of the first appendage, perform a tracking function based on the respective availability state of the first appendage.

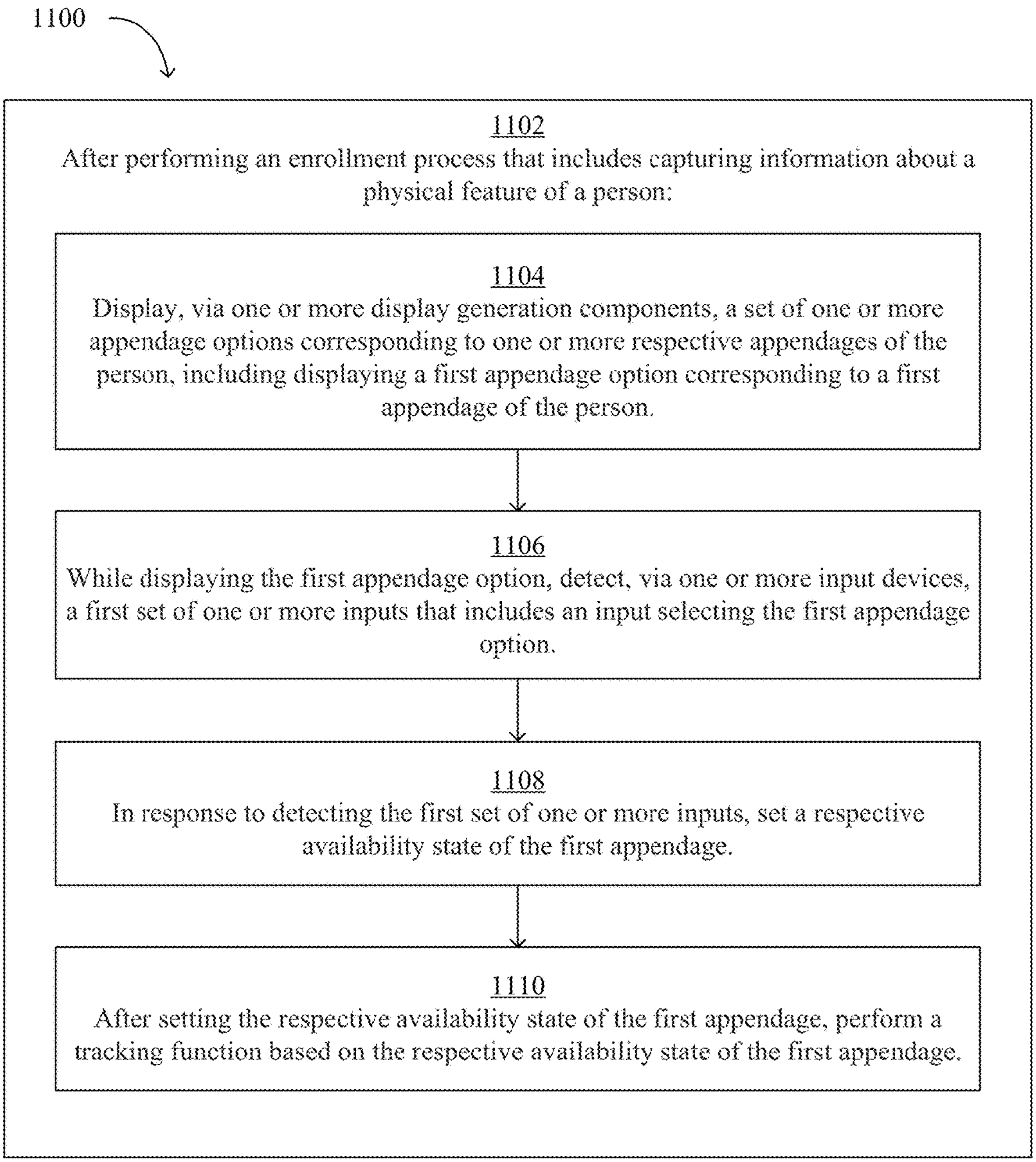

*FIG. 11*

TECHNIQUES FOR INTERACTING WITH VIRTUAL AVATARS AND/OR USER REPRESENTATIONS

CROSS-REFERENCE TO RELATED APPLICATIONS

This application claims priority to U.S. provisional patent application 63/470,089, entitled "TECHNIQUES FOR INTERACTING WITH VIRTUAL AVATARS AND/OR USER REPRESENTATIONS", filed on May 31, 2023; and claims priority to U.S. provisional patent application 63/440,820, entitled "TECHNIQUES FOR INTERACTING WITH VIRTUAL AVATARS AND/OR USER REPRESENTATIONS", filed on Jan. 24, 2023, the contents of which are hereby incorporated by reference in their entireties.

TECHNICAL FIELD

The present disclosure relates generally to computer systems that are in communication with one or more display generation components and, optionally, one or more input devices that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with virtual avatars and/or user representations are cumbersome, inefficient, and limited. For example, systems that provide insufficient feedback for performing actions associated with virtual objects, systems that require a series of inputs to achieve a desired outcome, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for interacting with virtual avatars and/or user representations that make interaction with the computer systems more efficient and intuitive for a user. Such methods and interfaces optionally complement or replace conventional methods for interacting with virtual avatars and/or user representations. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a virtual avatars and/or user representations. Such methods and interfaces may complement or replace conventional methods for interacting with a virtual avatars and/or user representations. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In accordance with some embodiments, a method is described. The method comprises: at a computer system that is in communication with one or more display generation components: concurrently displaying, via the one or more display generation components: an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user; while concurrently displaying the avatar and the respective user interface, detecting an input directed to a control in the respective user interface; and in response to detecting the input directed to the control in the respective user interface, changing an appearance of the avatar based on the input.

In accordance with some embodiments, a non-transitory computer-readable storage medium is described. The non-transitory computer-readable storage medium stores one or more programs configured to be executed by one or more processors of a computer system that is in communication with one or more display generation components, the one or more programs including instructions for: concurrently displaying, via the one or more display generation components: an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user; while concurrently displaying the avatar and the respective user interface, detecting an input directed to a control in the respective user interface; and in response to detecting the input directed to the control in the respective user interface, changing an appearance of the avatar based on the input.

In accordance with some embodiments, a transitory computer-readable storage medium is described. The transitory computer-readable storage medium stores one or more programs configured to be executed by one or more processors of a computer system that is in communication with one or more display generation components, the one or more programs including instructions for: concurrently displaying, via the one or more display generation components: an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user; while concurrently displaying the avatar and the respective user interface, detecting an input directed to a control in the respective user interface; and in response to detecting the input directed to the control in the respective user interface, changing an appearance of the avatar based on the input.

In accordance with some embodiments, a computer system is described. The computer system is configured to communicate with one or more display generation components, and comprises: one or more processors; and memory storing one or more programs configured to be executed by the one or more processors, the one or more programs including instructions for: concurrently displaying, via the one or more display generation components: an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user; while concurrently displaying the avatar and the respective user interface, detecting an input directed to a control in the respective user interface; and in response to detecting the input directed to the control in the respective user interface, changing an appearance of the avatar based on the input.

In accordance with some embodiments, a computer system is described. The computer system is configured to communicate with one or more display generation components, and comprises: means for concurrently displaying, via the one or more display generation components: an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user; means for, while concurrently displaying the avatar and the respective user interface, detecting an input directed to a control in the respective user interface; and means for, in response to detecting the input directed to the control in the respective user interface, changing an appearance of the avatar based on the input.

In accordance with some embodiments, a computer program product is described. The computer program product comprises one or more programs configured to be executed by one or more processors of a computer system that is in communication with one or more display generation components, the one or more programs including instructions for: concurrently displaying, via the one or more display generation components: an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user; while concurrently displaying the avatar and the respective user interface, detecting an input directed to a control in the respective user interface; and in response to detecting the input directed to the control in the respective user interface, changing an appearance of the avatar based on the input.

In accordance with some embodiments, a method is described. The method comprises: at a computer system that is in communication with one or more display generation components and one or more input devices: displaying, via the one or more display generation components, a representation of an avatar that was generated to have an appearance based on an appearance of a person using image-based user information corresponding to the person; receiving, via the one or more input devices, a first set of inputs corresponding to a decision not to use the avatar for one or more functions of the computer system; in response to receiving the first set of user inputs corresponding to a decision not to use the avatar for the one or more functions of the computer system, displaying, via the one or more display generation components, a selectable user interface object that is selectable to indicate a user request to use an alternate visual representation of the person different from the avatar to represent the person; while displaying the selectable user interface object, receiving, via the one or more input devices, a second set of user inputs corresponding to selection of the selectable user interface object; and in response to receiving the second set of user inputs, displaying, via the one or more display generation components, one or more alternative options that can be used to represent the person for the one or more functions of the computer system.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices, the one or more programs including instructions for: displaying, via the one or more display generation components, a representation of an avatar that was generated to have an appearance based on an appearance of a person using image-based user information corresponding to the person; receiving, via the one or more input devices, a first set of inputs corresponding to a decision not to use the avatar for one or more functions of the computer system; in response to receiving the first set of user inputs corresponding to a decision not to use the avatar for the one or more functions of the computer system, displaying, via the one or more display generation components, a selectable user interface object that is selectable to indicate a user request to use an alternate visual representation of the person different from the avatar to represent the person; while displaying the selectable user interface object, receiving, via the one or more input devices, a second set of user inputs corresponding to selection of the selectable user interface object; and in response to receiving the second set of user inputs, displaying, via the one or more display generation components, one or more alternative options that can be used to represent the person for the one or more functions of the computer system.

In accordance with some embodiments, a transitory computer-readable storage medium is described. The transitory computer-readable storage medium stores one or more programs configured to be executed by one or more processors of a computer system that is in communication with one or more display generation components and one or more input devices, the one or more programs including instructions for: displaying, via the one or more display generation components, a representation of an avatar that was generated to have an appearance based on an appearance of a person using image-based user information corresponding to the person; receiving, via the one or more input devices, a first set of inputs corresponding to a decision not to use the avatar for one or more functions of the computer system; in response to receiving the first set of user inputs corresponding to a decision not to use the avatar for the one or more functions of the computer system, displaying, via the one or more display generation components, a selectable user interface object that is selectable to indicate a user request to use an alternate visual representation of the person different from the avatar to represent the person; while displaying the selectable user interface object, receiving, via the one or more input devices, a second set of user inputs corresponding to selection of the selectable user interface object; and in response to receiving the second set of user inputs, displaying, via the one or more display generation components, one or more alternative options that can be used to represent the person for the one or more functions of the computer system.

In accordance with some embodiments, a computer system is described. The computer system is configured to communicate with one or more display generation components and one or more input devices, and comprises: one or more processors; and memory storing one or more programs configured to be executed by the one or more processors, the one or more programs including instructions for: displaying, via the one or more display generation components, a representation of an avatar that was generated to have an appearance based on an appearance of a person using image-based user information corresponding to the person; receiving, via the one or more input devices, a first set of inputs corresponding to a decision not to use the avatar for one or more functions of the computer system; in response to receiving the first set of user inputs corresponding to a decision not to use the avatar for the one or more functions of the computer system, displaying, via the one or more display generation components, a selectable user interface object that is selectable to indicate a user request to use an alternate visual representation of the person different from the avatar to represent the person; while displaying the selectable user interface object, receiving, via the one or more input devices, a second set of user inputs corresponding to selection of the selectable user interface object; and in response to receiving the second set of user inputs, displaying, via the one or more display generation components, one or more alternative options that can be used to represent the person for the one or more functions of the computer system.

In accordance with some embodiments, a computer system is described. The computer system is configured to communicate with one or more display generation components and one or more input devices, and comprises: means for displaying, via the one or more display generation components, a representation of an avatar that was generated to have an appearance based on an appearance of a person using image-based user information corresponding to the person; means for receiving, via the one or more input devices, a first set of inputs corresponding to a decision not to use the avatar for one or more functions of the computer system; means for, in response to receiving the first set of user inputs corresponding to a decision not to use the avatar for the one or more functions of the computer system, displaying, via the one or more display generation components, a selectable user interface object that is selectable to indicate a user request to use an alternate visual representation of the person different from the avatar to represent the person; means for, while displaying the selectable user interface object, receiving, via the one or more input devices, a second set of user inputs corresponding to selection of the selectable user interface object; and means for, in response to receiving the second set of user inputs, displaying, via the one or more display generation components, one or more alternative options that can be used to represent the person for the one or more functions of the computer system.

In accordance with some embodiments, a computer program product is described. The computer program product comprises one or more programs configured to be executed by one or more processors of a computer system that is in communication with one or more display generation components and one or more input devices, the one or more programs including instructions for: displaying, via the one or more display generation components, a representation of an avatar that was generated to have an appearance based on an appearance of a person using image-based user information corresponding to the person; receiving, via the one or more input devices, a first set of inputs corresponding to a decision not to use the avatar for one or more functions of the computer system; in response to receiving the first set of user inputs corresponding to a decision not to use the avatar for the one or more functions of the computer system, displaying, via the one or more display generation components, a selectable user interface object that is selectable to indicate a user request to use an alternate visual representation of the person different from the avatar to represent the person; while displaying the selectable user interface object, receiving, via the one or more input devices, a second set of user inputs corresponding to selection of the selectable user interface object; and in response to receiving the second set of user inputs, displaying, via the one or more display generation components, one or more alternative options that can be used to represent the person for the one or more functions of the computer system.

In accordance with some embodiments, a method is described. The method comprises: at a computer system that is in communication with one or more display generation components and one or more input devices: after performing an enrollment process that includes capturing information about a physical feature of a person: displaying, via the one or more display generation components, a set of one or more appendage options corresponding to one or more respective appendages of the person, including displaying a first appendage option corresponding to a first appendage of the person; while displaying the first appendage option, detecting, via the one or more input devices, a first set of one or more inputs that includes an input selecting the first appendage option; in response to detecting the first set of one or more inputs, setting a respective availability state of the first appendage; and after setting the respective availability state of the first appendage, performing a tracking function based on the respective availability state of the first appendage.

In accordance with some embodiments, a non-transitory computer-readable storage medium is described. The non-transitory computer-readable storage medium stores one or more programs configured to be executed by one or more processors of a computer system that is in communication with one or more display generation components and one or more input devices. The one or more programs include instructions for: after performing an enrollment process that includes capturing information about a physical feature of a person: displaying, via the one or more display generation components, a set of one or more appendage options corresponding to one or more respective appendages of the person, including displaying a first appendage option corresponding to a first appendage of the person; while displaying the first appendage option, detecting, via the one or more input devices, a first set of one or more inputs that includes an input selecting the first appendage option; in response to detecting the first set of one or more inputs, setting a respective availability state of the first appendage; and after setting the respective availability state of the first appendage, performing a tracking function based on the respective availability state of the first appendage.

In accordance with some embodiments, a transitory computer-readable storage medium is described. The transitory computer-readable storage medium stores one or more programs configured to be executed by one or more processors of a computer system that is in communication with one or more display generation components and one or more input devices. The one or more programs include instructions for: after performing an enrollment process that includes capturing information about a physical feature of a person: displaying, via the one or more display generation components, a set of one or more appendage options corresponding to one or more respective appendages of the person, including displaying a first appendage option corresponding to a first appendage of the person; while displaying the first appendage option, detecting, via the one or more input devices, a first set of one or more inputs that includes an input selecting the first appendage option; in response to detecting the first set of one or more inputs, setting a respective availability state of the first appendage; and after setting the respective availability state of the first appendage, performing a tracking function based on the respective availability state of the first appendage.

In accordance with some embodiments, a computer system configured to communicate with one or more display generation components and one or more input devices is described. The computer system comprises: one or more processors; and memory storing one or more programs configured to be executed by the one or more processors. The one or more programs include instructions for: after performing an enrollment process that includes capturing information about a physical feature of a person: displaying, via the one or more display generation components, a set of one or more appendage options corresponding to one or more respective appendages of the person, including displaying a first appendage option corresponding to a first appendage of the person; while displaying the first appendage option, detecting, via the one or more input devices, a first set of one or more inputs that includes an input selecting the first appendage option; in response to detecting the first set of one or more inputs, setting a respective availability state of the first appendage; and after setting the respective availability state of the first appendage, performing a tracking function based on the respective availability state of the first appendage.

In accordance with some embodiments, a computer system configured to communicate with one or more display generation components and one or more input devices is described. The computer system comprises means for, after performing an enrollment process that includes capturing information about a physical feature of a person: displaying, via the one or more display generation components, a set of one or more appendage options corresponding to one or more respective appendages of the person, including displaying a first appendage option corresponding to a first appendage of the person; while displaying the first appendage option, detecting, via the one or more input devices, a first set of one or more inputs that includes an input selecting the first appendage option; in response to detecting the first set of one or more inputs, setting a respective availability state of the first appendage; and after setting the respective availability state of the first appendage, performing a tracking function based on the respective availability state of the first appendage.

In accordance with some embodiments, a computer program product is described. The computer program product comprises one or more programs configured to be executed by one or more processors of a computer system that is in communication with one or more display generation components and one or more input devices. The one or more programs include instructions for: after performing an enrollment process that includes capturing information about a physical feature of a person: displaying, via the one or more display generation components, a set of one or more appendage options corresponding to one or more respective appendages of the person, including displaying a first appendage option corresponding to a first appendage of the person; while displaying the first appendage option, detecting, via the one or more input devices, a first set of one or more inputs that includes an input selecting the first appendage option; in response to detecting the first set of one or more inputs, setting a respective availability state of the first appendage; and after setting the respective availability state of the first appendage, performing a tracking function based on the respective availability state of the first appendage.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in some embodiments.

FIG. 8 is a flow diagram of methods of providing user interfaces for modifying a virtual avatar and/or user representation, in some embodiments.

FIG. 9 is a flow diagram of methods of providing user interfaces for selecting a virtual avatar and/or user representation, in some embodiments.

FIGS. 10A-10Q2 illustrate example techniques for configuring a representation of a person, in some embodiments.

FIG. 11 is a flow diagram of methods of providing user interfaces for configuring a representation of a person, in some embodiments.

DESCRIPTION OF EMBODIMENTS

Figure 1A:
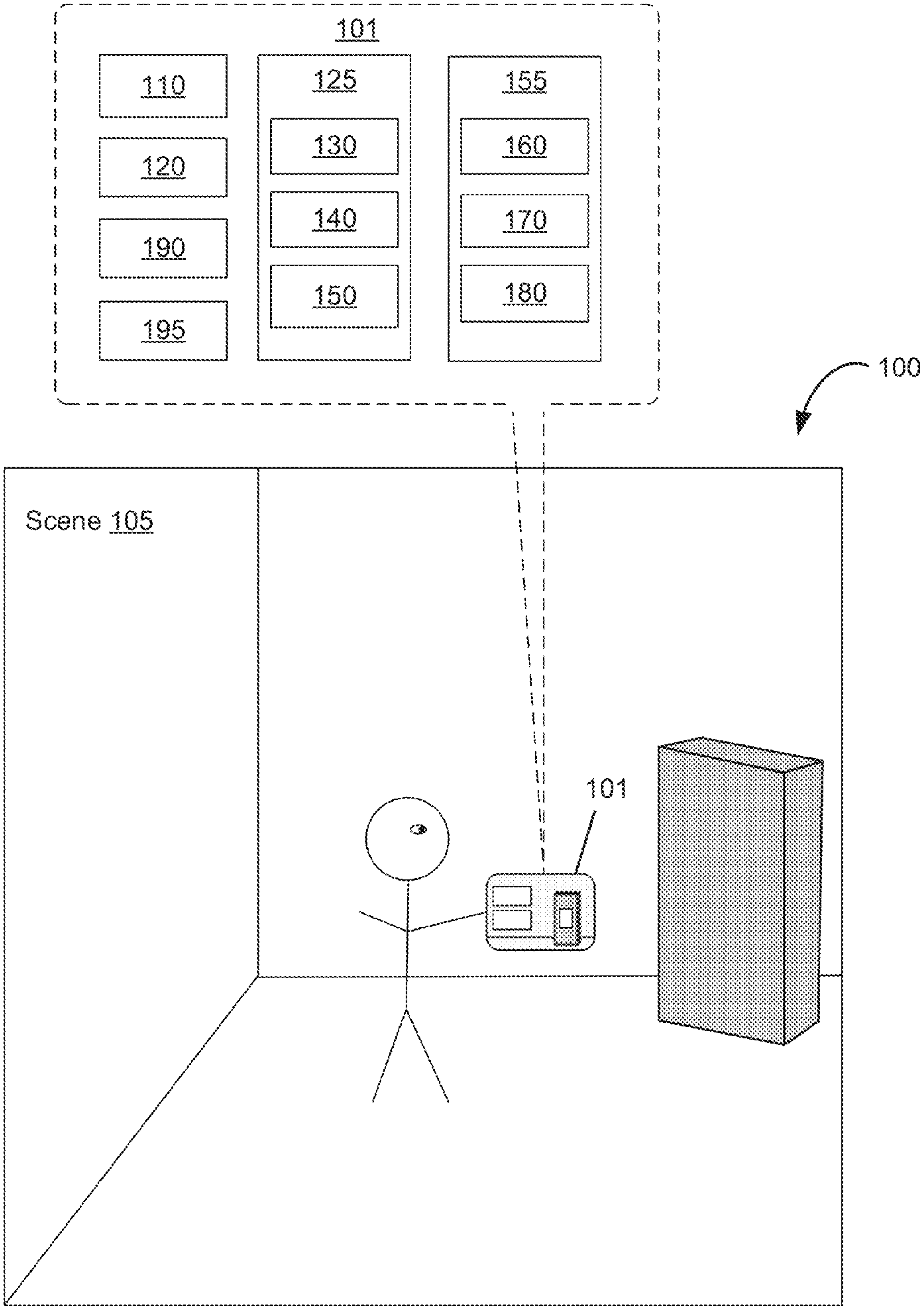
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve user interface interactions with virtual avatars and/or user representations in multiple ways.

In some embodiments, a computer system concurrently displays an avatar and a respective user interface. The respective user interface includes one or more controls for editing a visual appearance of the avatar. The avatar is displayed at a first location in a three-dimensional environment, and the respective user interface is displayed proximate to the avatar but is spaced apart from the avatar in a simulated depth dimension of the three-dimensional environment. In some embodiments, the computer system detects one or more user inputs directed to a control in the respective user interface, and in response to detecting the one or more user inputs, changes an appearance of the avatar based on the one or more user inputs.

In some embodiments, a computer system displays a representation of an avatar that was generated to have an appearance based on an appearance of a person using image-based user information corresponding to the person. The computer system receives a first set of user inputs corresponding to a decision not to use the avatar for one or more functions of the computer system. In response to receiving the first set of user input, the computer system displays a selectable user interface object that is selectable to indicate a user request to use an alternate visual representation of the person different from the avatar to represent the person. The computer system receives a second set of user inputs corresponding to selection of the selectable user interface object, and in response to receiving the second set of user inputs, the computer system displays one or more alternative options that can be used to represent the person for the one or more functions of the computer system.

In some embodiments, after performing an enrollment process that includes capturing information about a physical feature of a person, a computer system displays a set of one or more appendage options corresponding to one or more respective appendages of the person, including displaying a first appendage option corresponding to a first appendage of the person. While displaying the first appendage option, the computer system detects a first set of one or more inputs that includes an input selecting the first appendage option. In response to detecting the first set of one or more inputs, the computer system sets a respective availability state of the first appendage. After setting the respective availability state of the first appendage, the computer system performs a tracking function based on the respective availability state of the first appendage.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

Figure 1B:
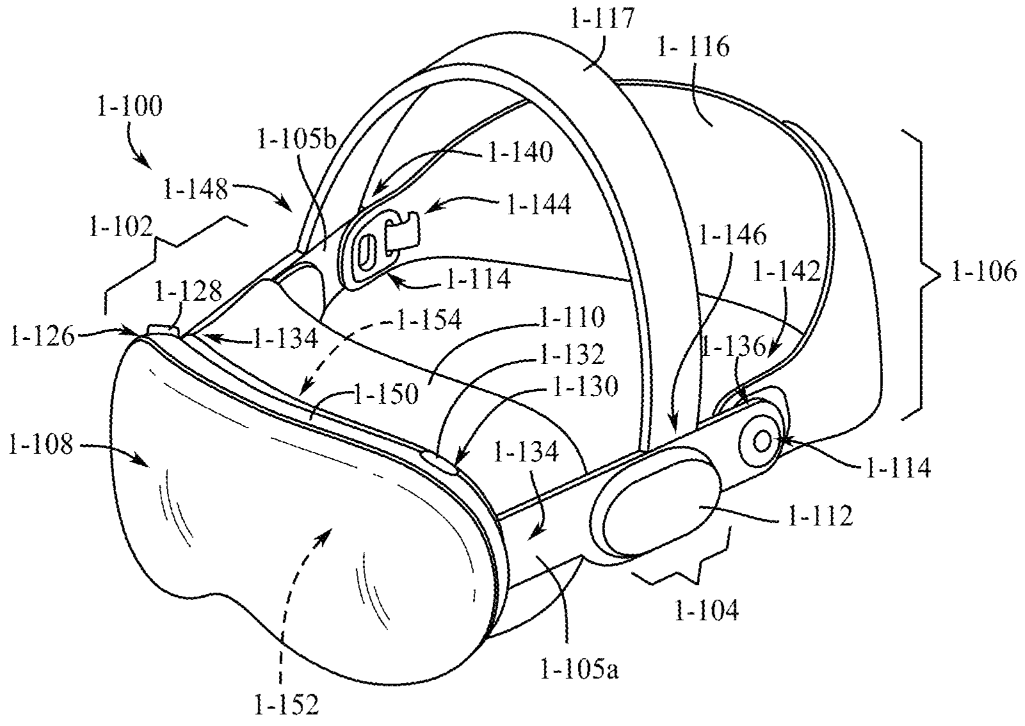
FIGS. 1B-1P are examples of a computer system for providing XR experiences in the operating environment of FIG. 1A.
Figure 1C:
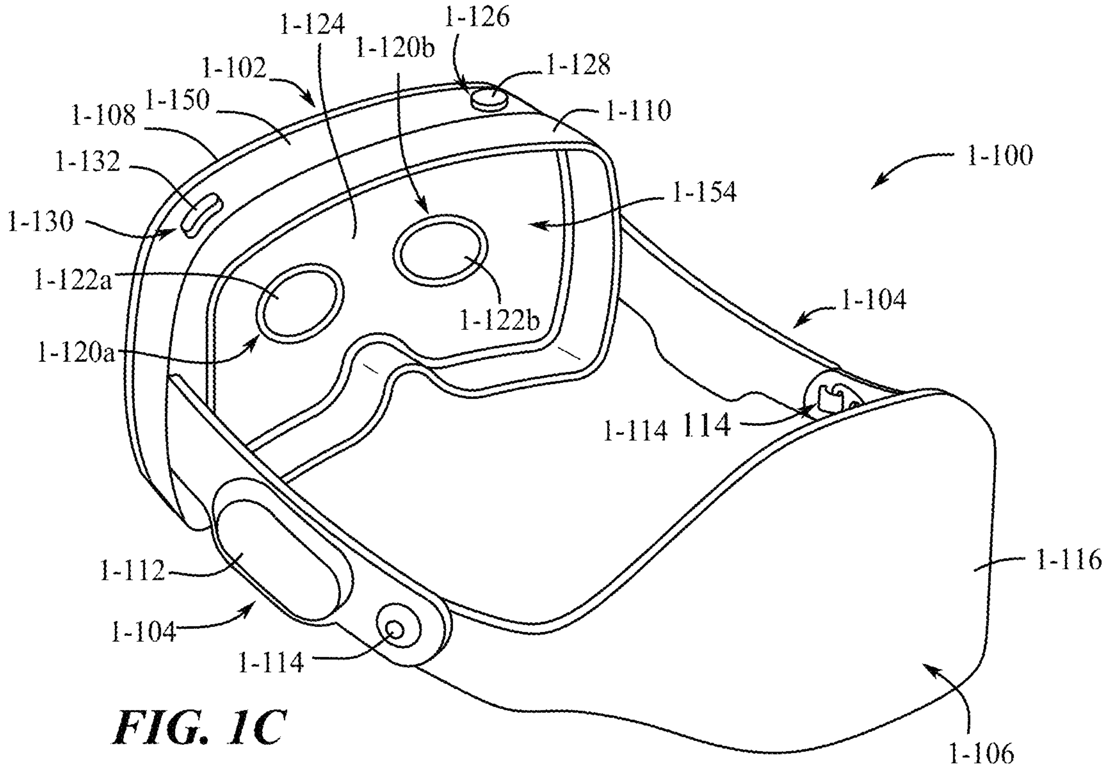
Figure 1D:
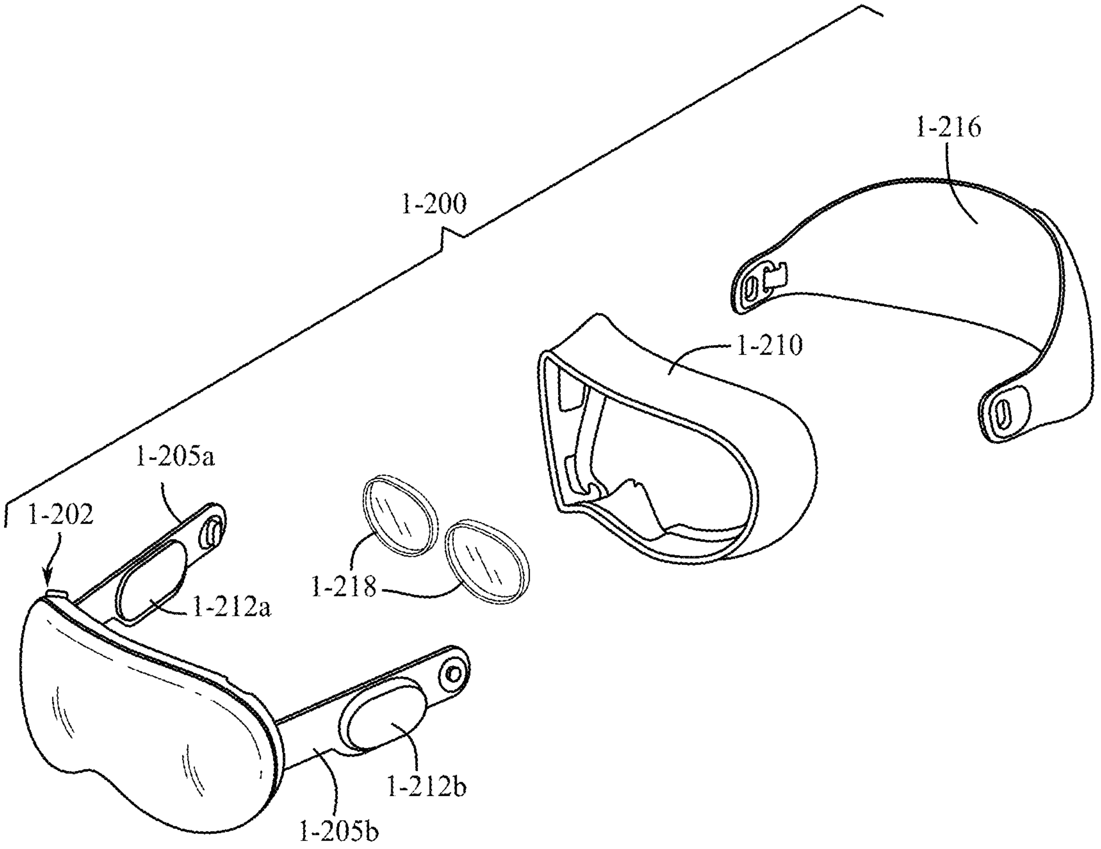
Figure 1E:
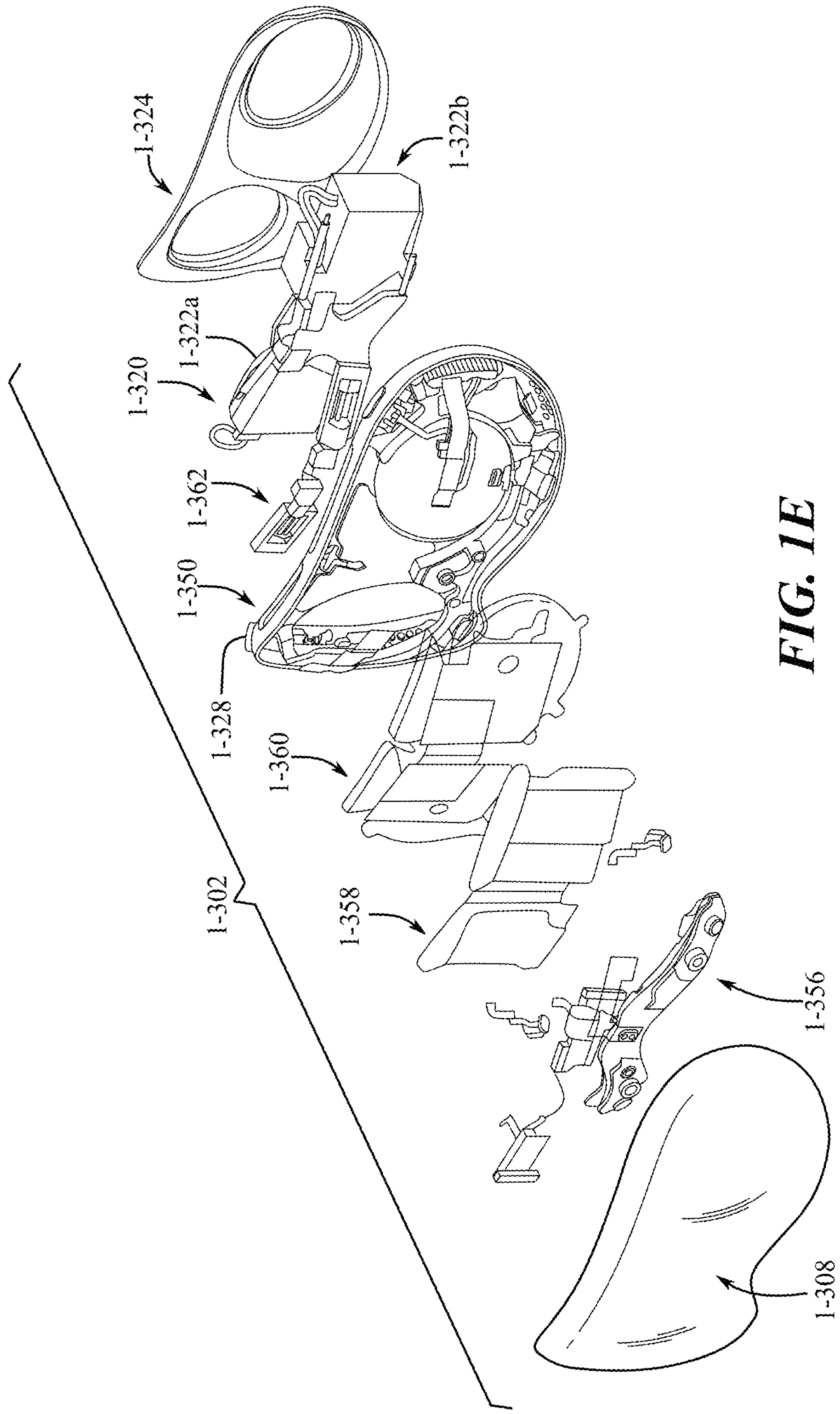
Figure 1F:
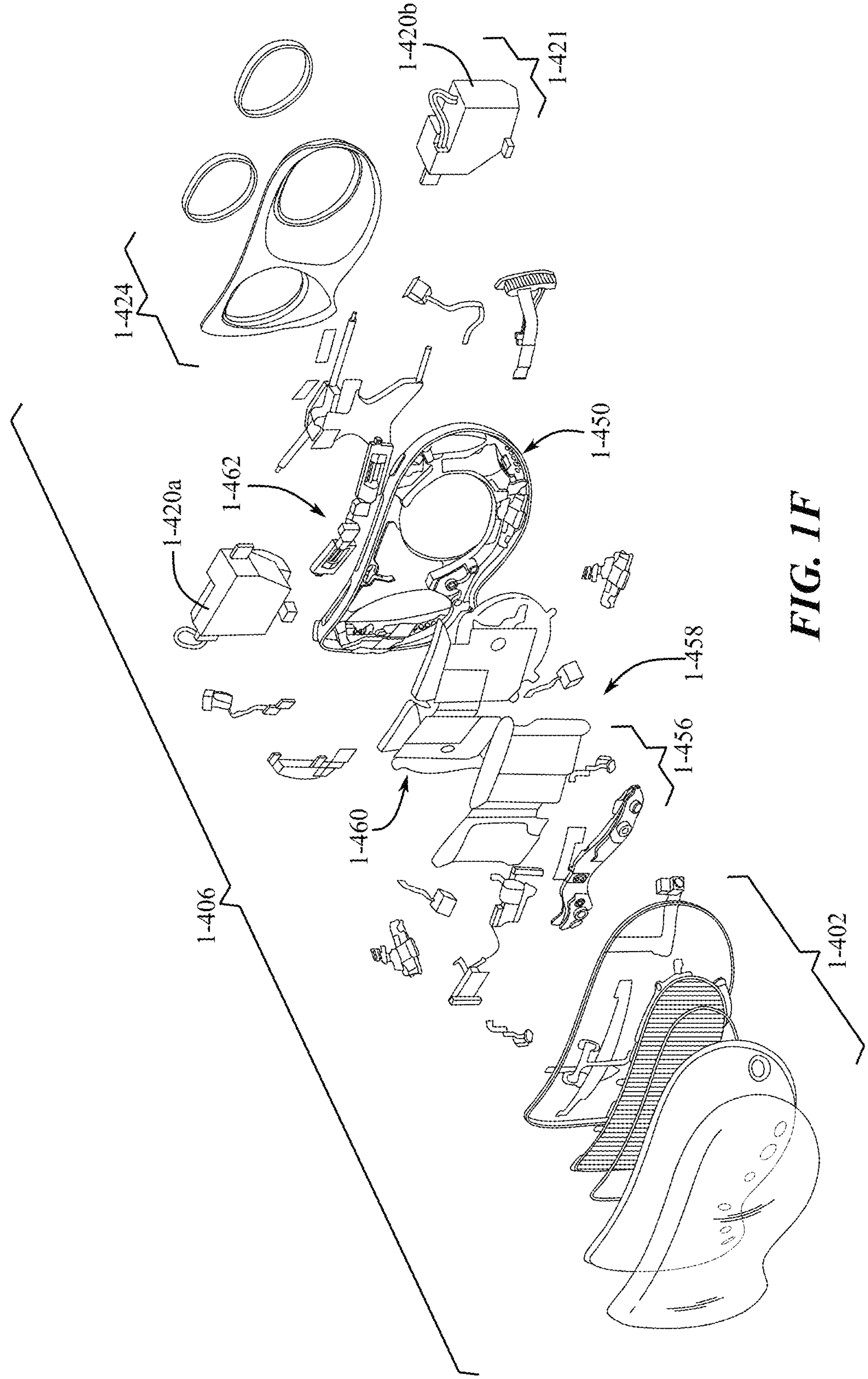
Figure 1G:
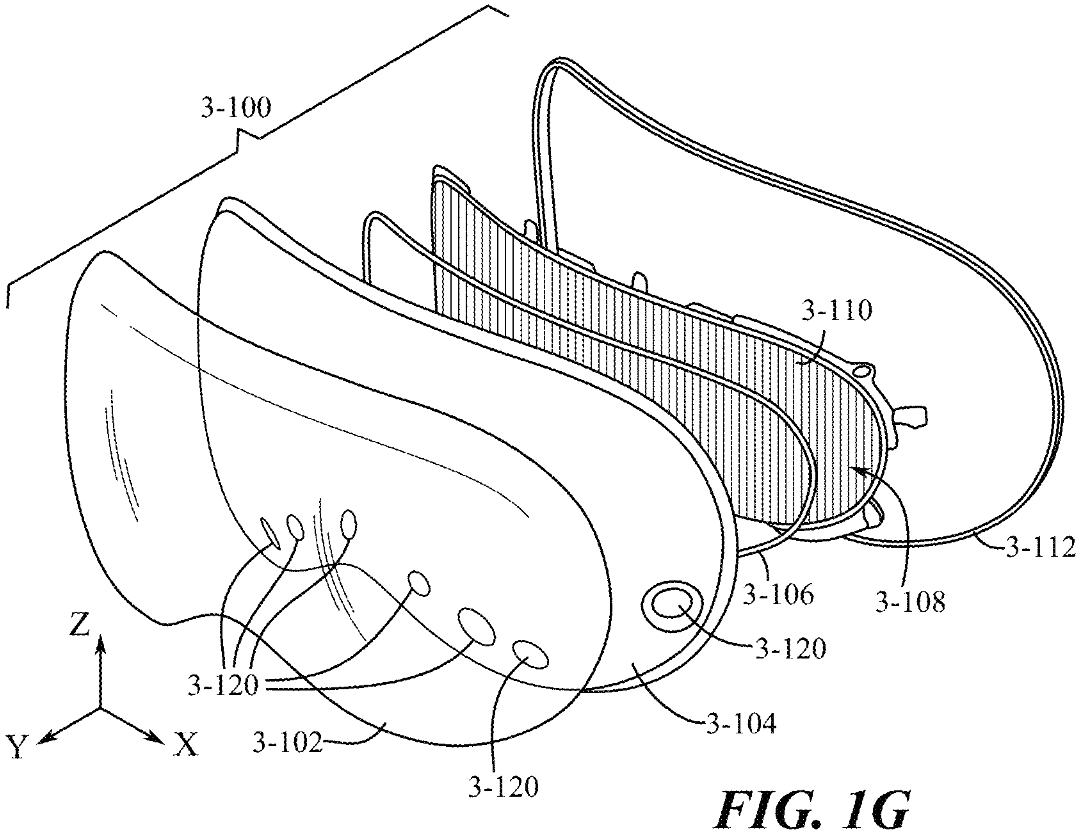
Figure 1H:
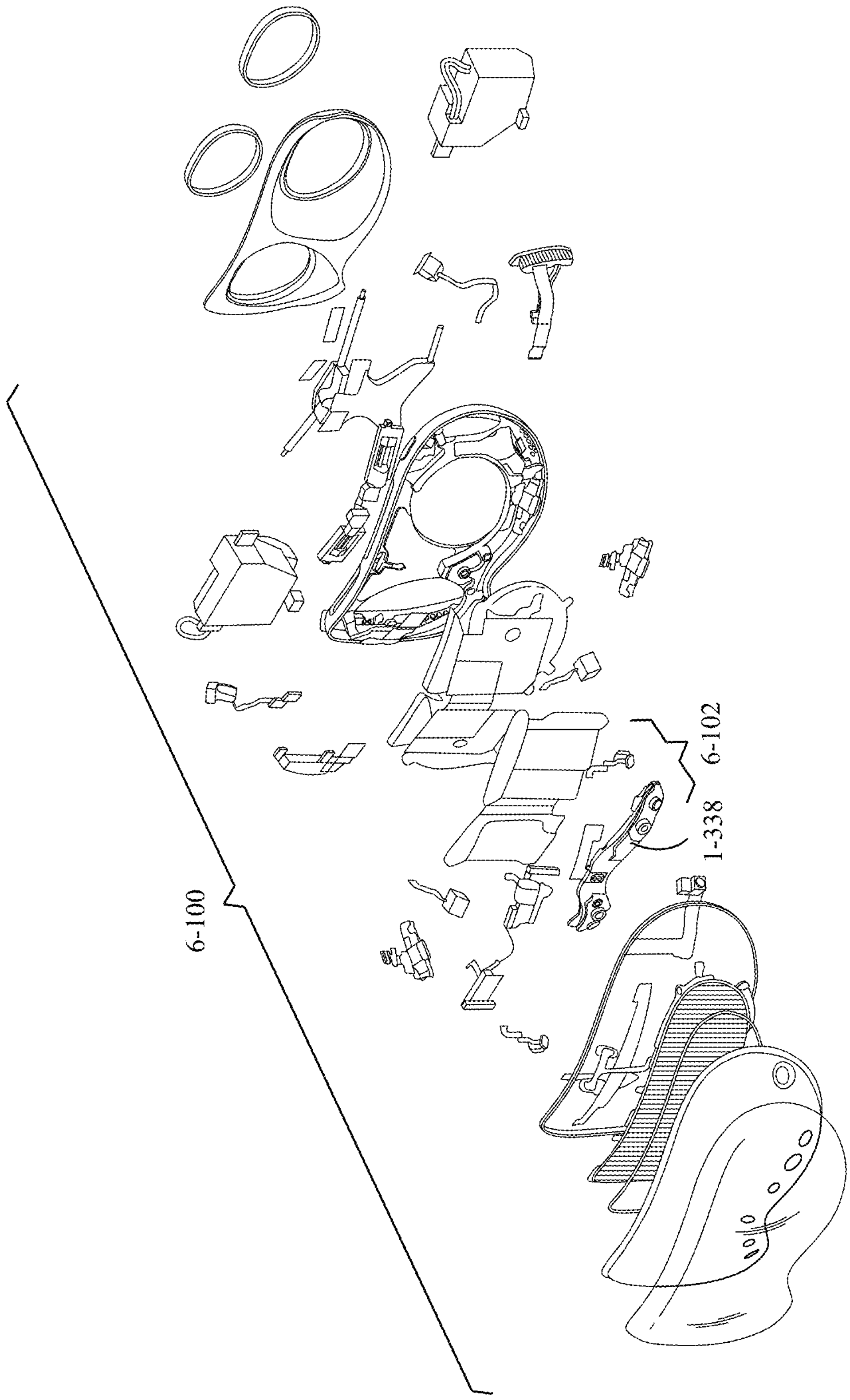
Figure 1I:
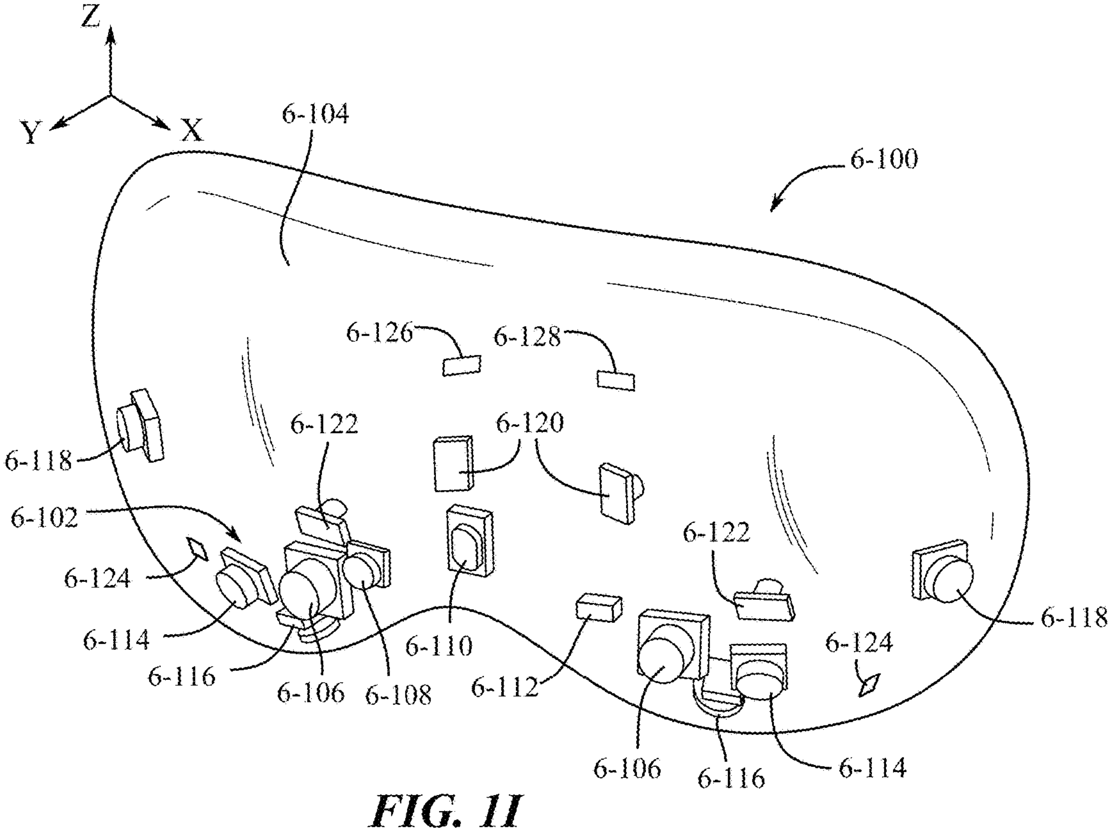
Figure 1J:
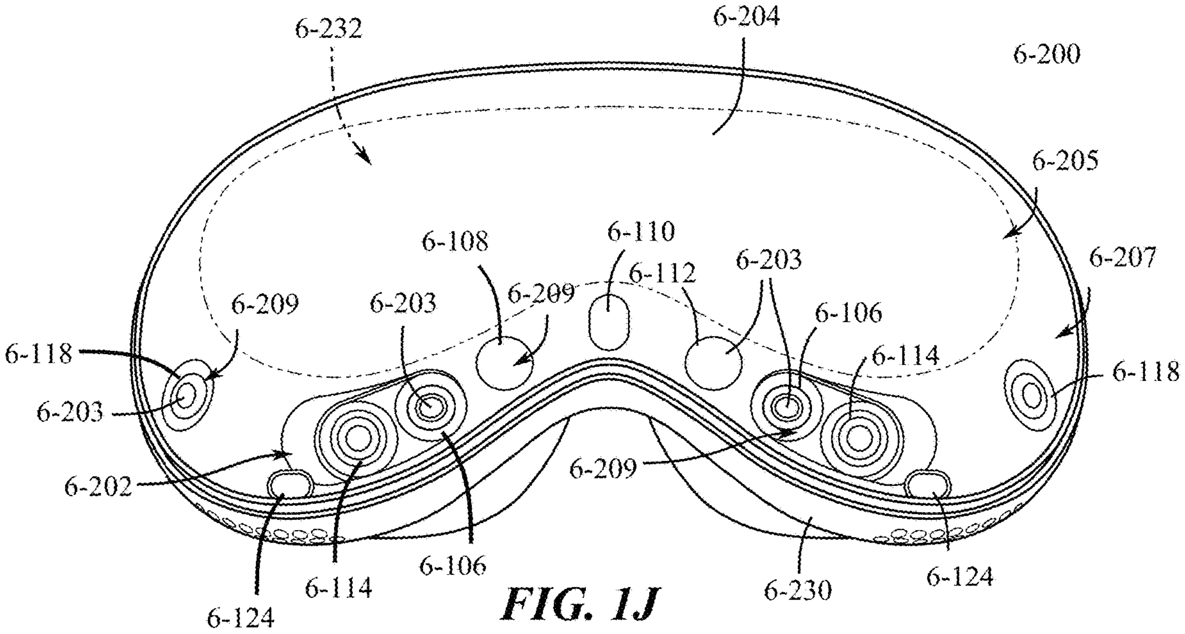
Figure 1K:
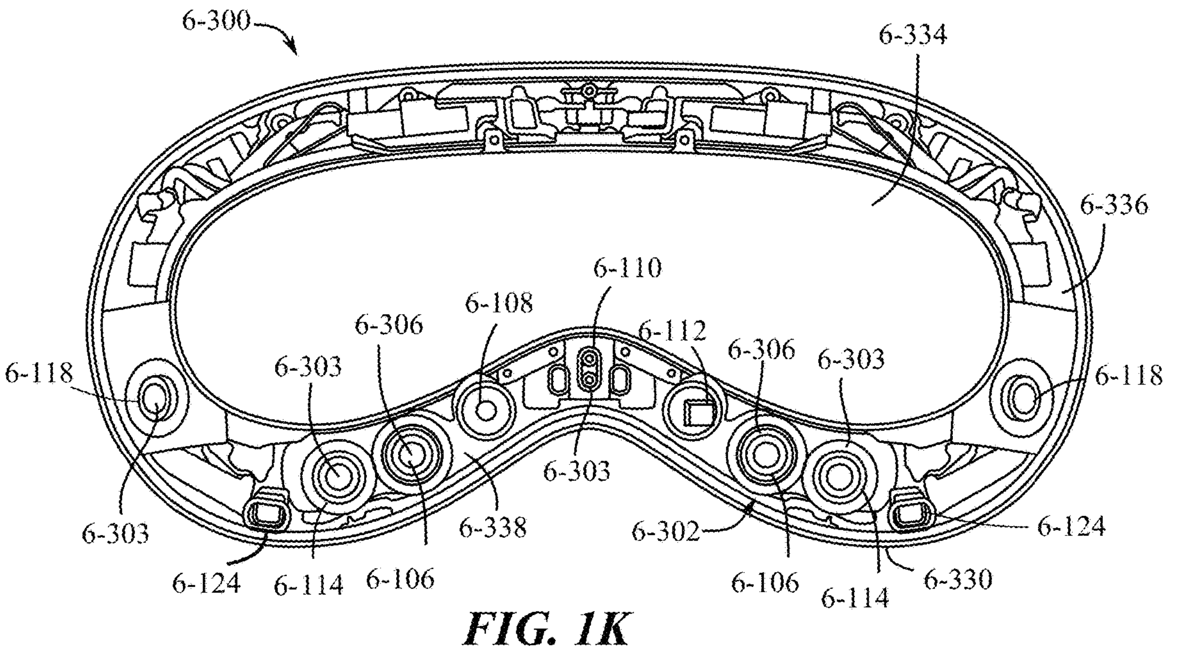
Figure 1L:
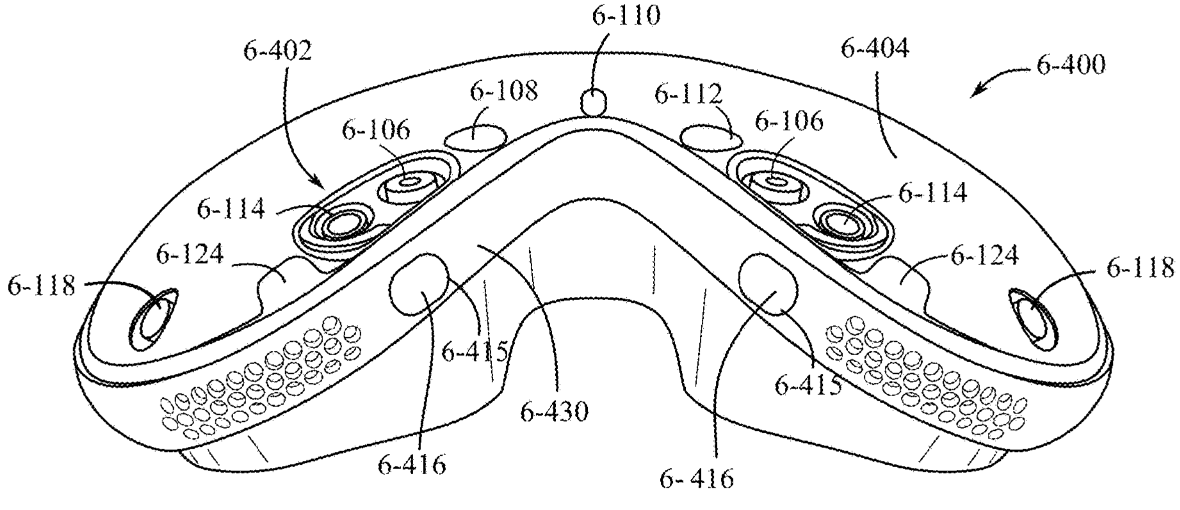
Figure 1M:
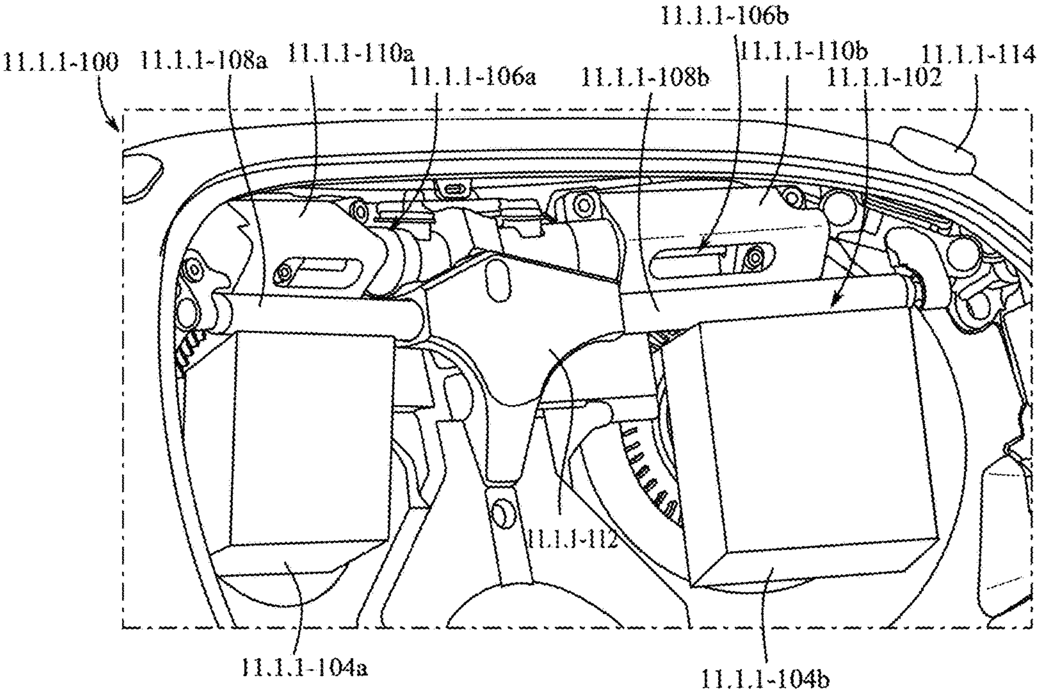
Figure 1N:
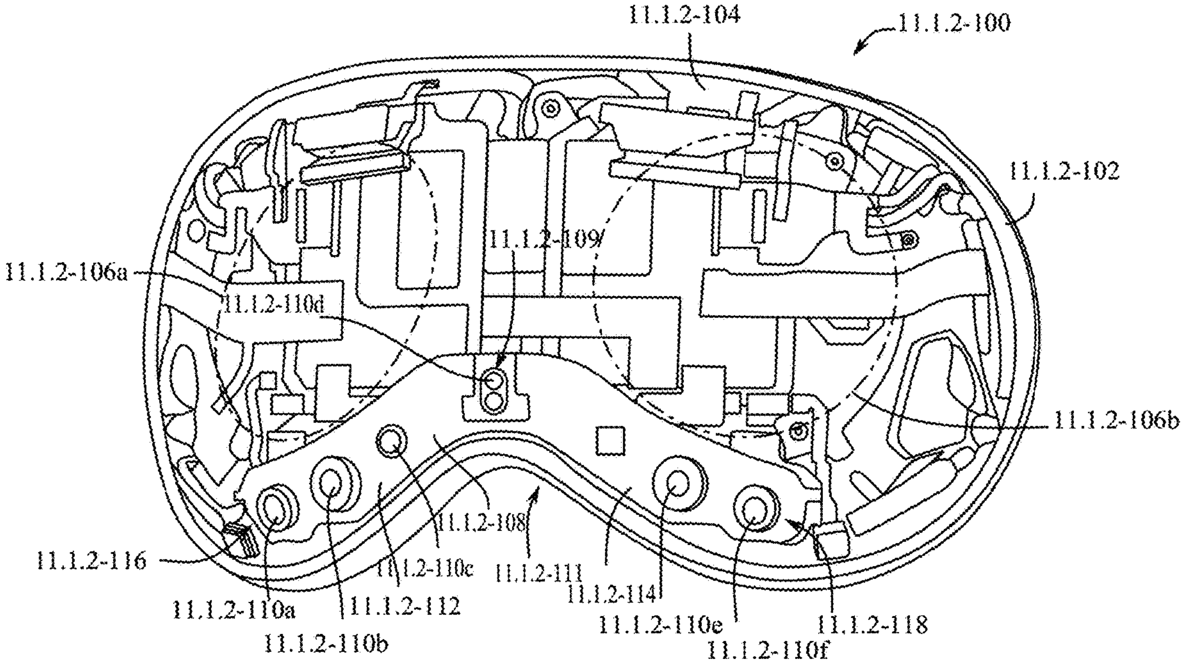
Figure 1O:
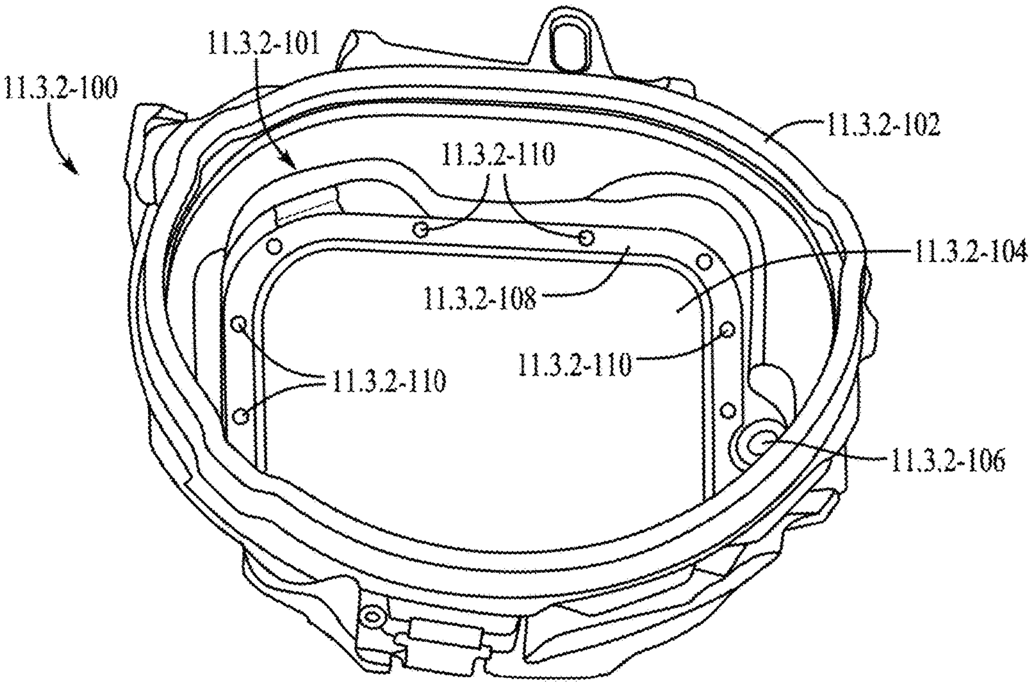
Figure 1P:
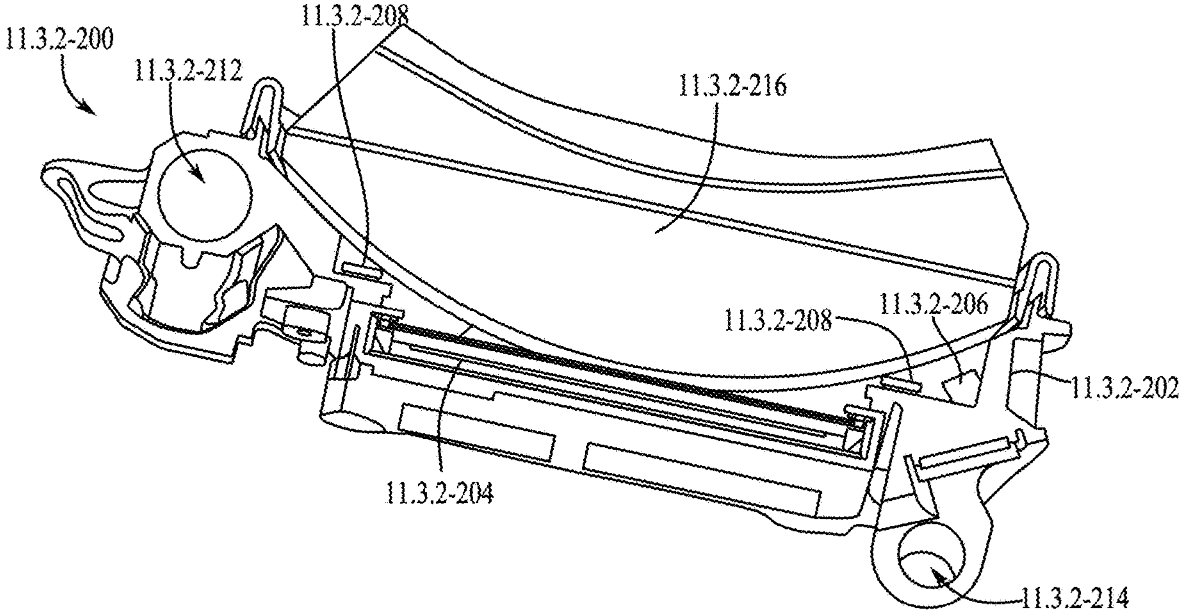
Figure 2:
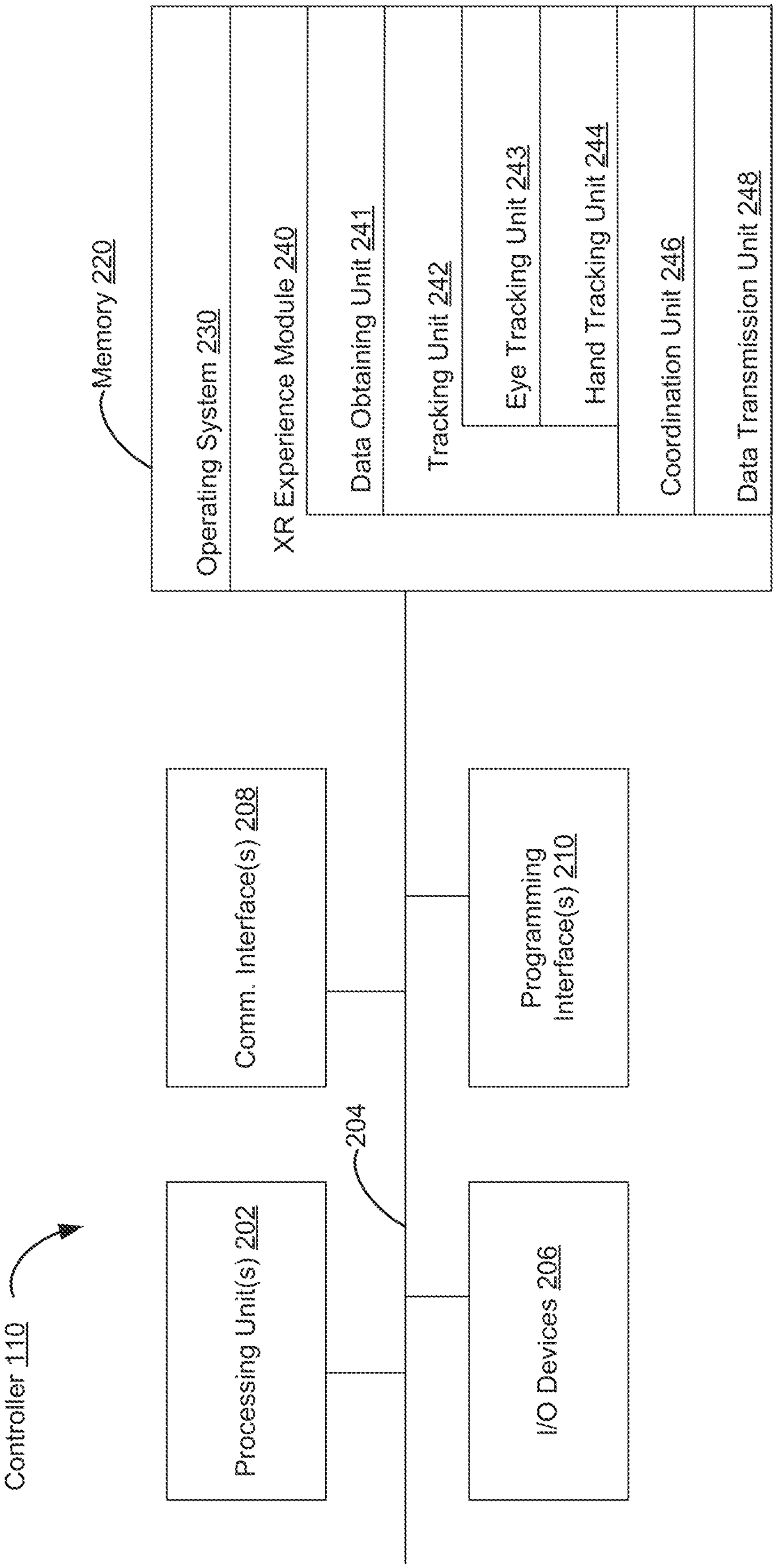
FIG. 2 is a block diagram illustrating a controller of a computer system that is configured to manage and coordinate a XR experience for the user in some embodiments.
Figure 10A:
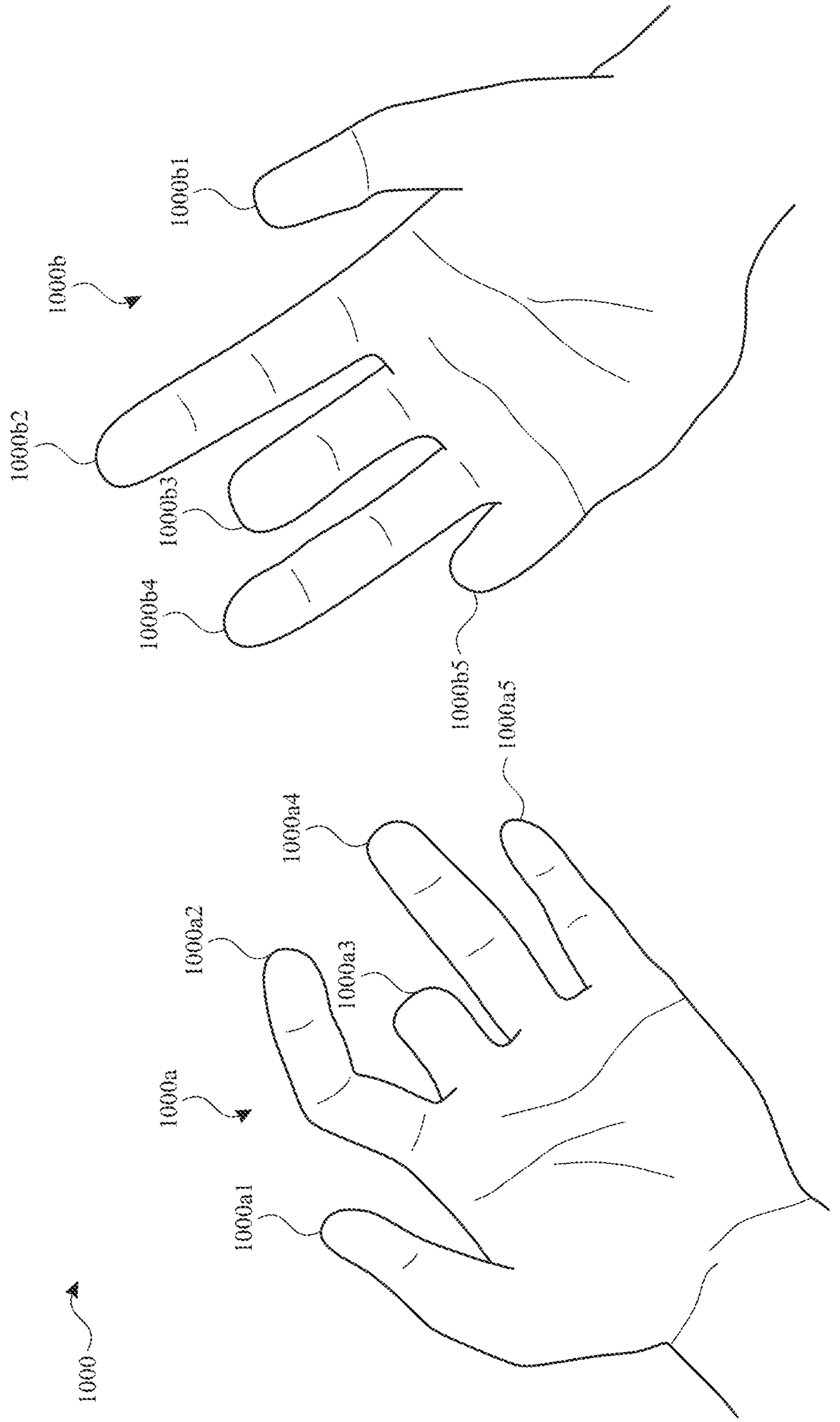

FIGS. 1A-6 provide a description of example computer systems for providing XR experiences to users. FIGS. 7A-7P illustrate example techniques for interacting with virtual avatars and/or user representations, in some embodiments. FIG. 8 is a flow diagram of methods of providing user interfaces for modifying a virtual avatar and/or user representation, in some embodiments. FIG. 9 is a flow diagram of methods of providing user interfaces for selecting a virtual avatar and/or user representation. The user interfaces in FIGS. 7A-7P are used to illustrate the processes in FIG. 8 and FIG. 9. FIGS. 10A-10Q2 illustrate example techniques for configuring a representation of a person, in some embodiments. FIG. 11 is a flow diagram of methods of providing user interfaces for configuring a representation of a person, in some embodiments. The user interfaces in FIGS. 10A-10Q2 are used to illustrate the processes in FIG. 11.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR Include Virtual Reality and Mixed Reality

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of Mixed Realities Include Augmented Reality and Augmented Virtuality Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 11) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B—1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin, for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 11-1J and 1L and described herein. Likewise, any of the features, components, and/or parts, including the arrangements and configurations thereof shown and described with reference to FIGS. 11-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 11-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 11-1K and described herein. Likewise, any of the features, components, and/or parts, including the arrangements and configurations thereof shown and described with reference to FIGS. 11-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
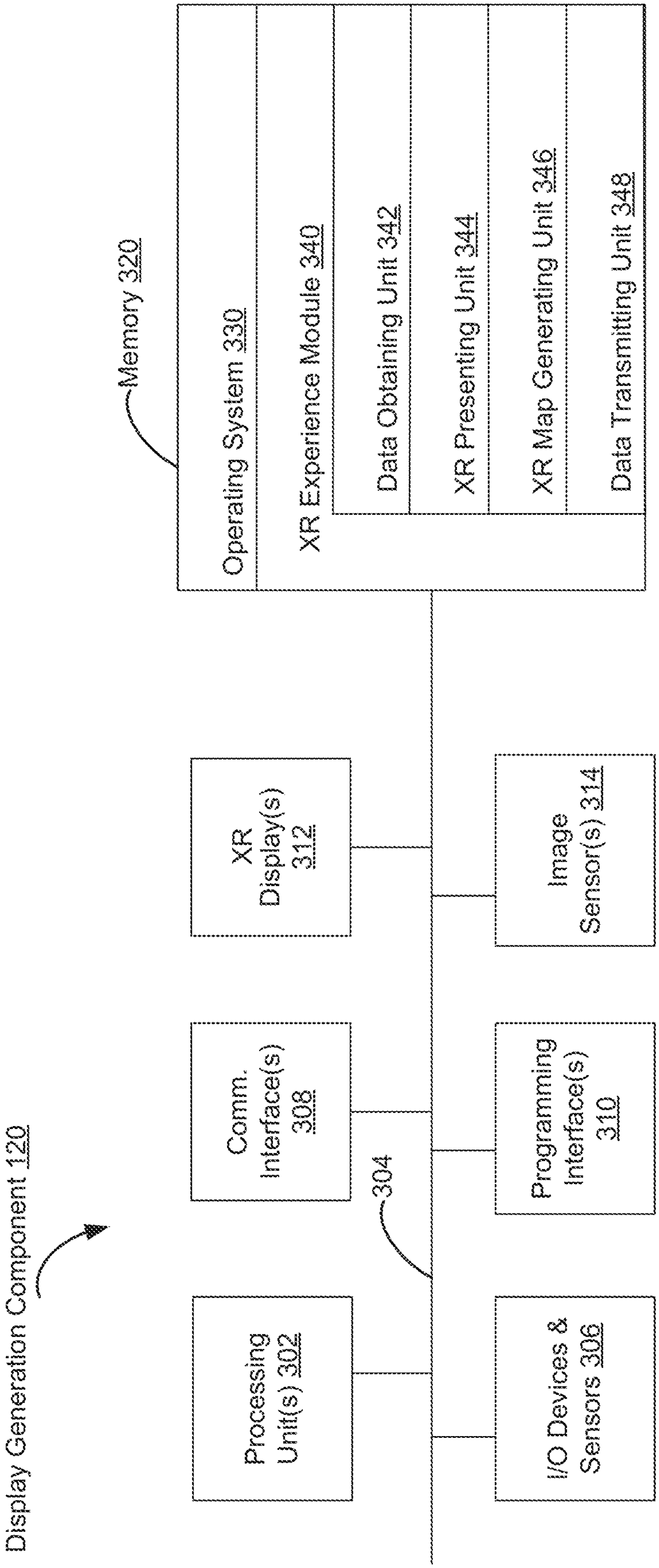
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICS, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units, and user inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, and/or other hardware input device controls. For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected by with a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
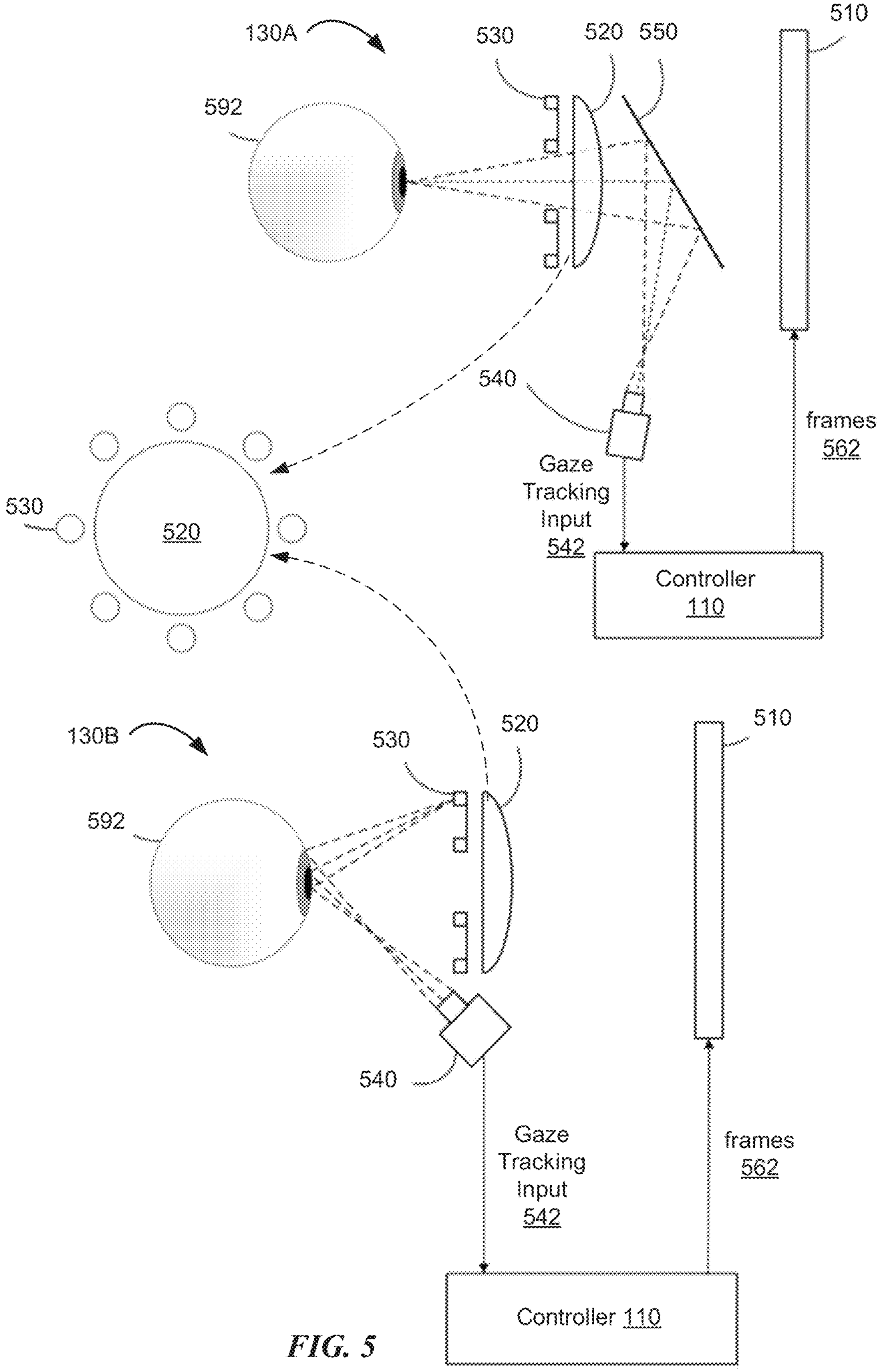
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
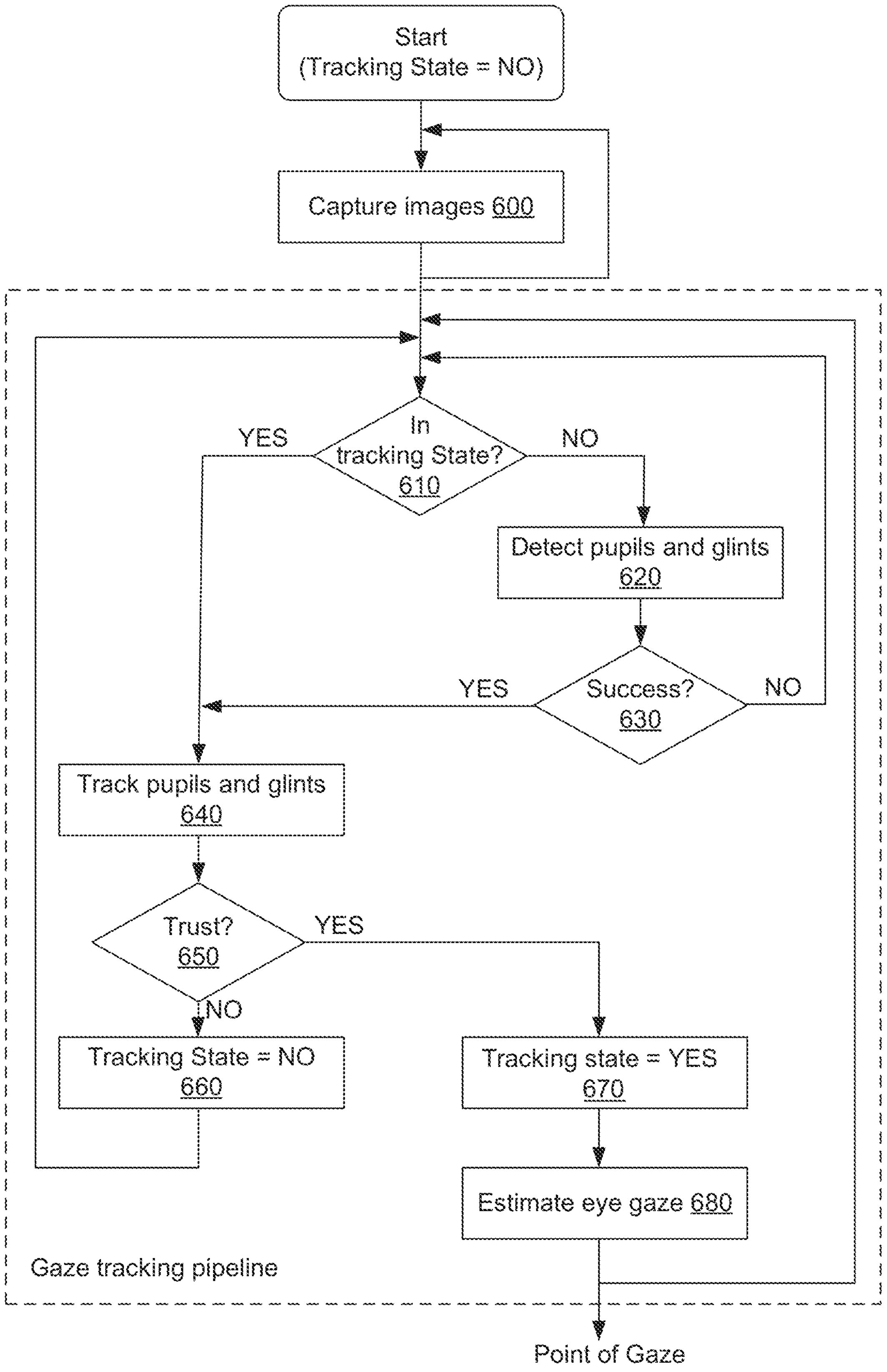
FIG. 6 is a flow diagram illustrating a glint-assisted gaze tracking pipeline in some embodiments.
Figure 7A:
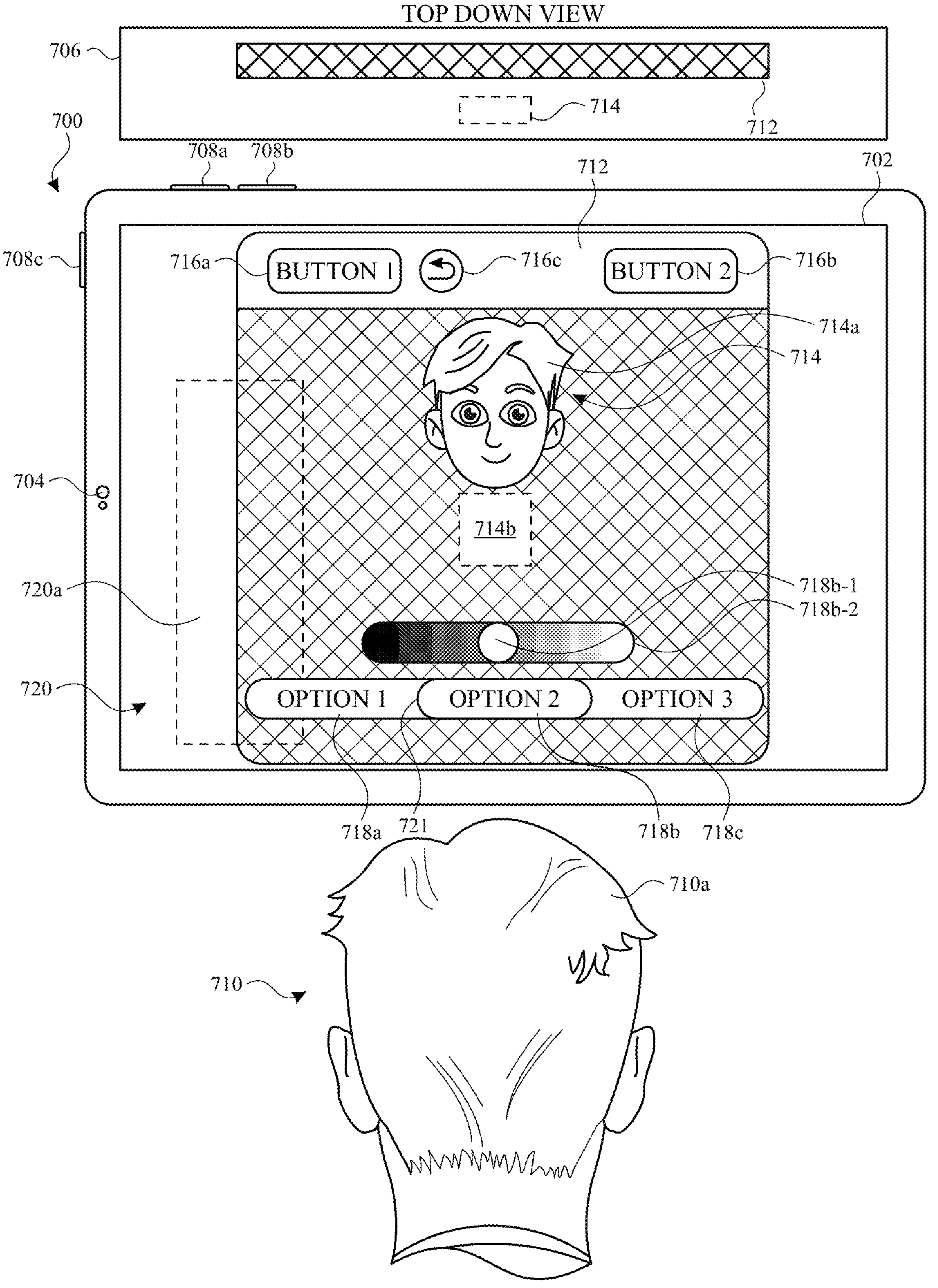
FIGS. 7A-7P illustrate example techniques for interacting with virtual avatars and/or user representations, in some embodiments.

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in some embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with one or more display generation components and, optionally, one or more input devices.

FIGS. 7A-7P illustrate examples of interacting with virtual avatars and/or user representations. FIG. 8 is a flow diagram of an exemplary method 800 for providing user interfaces for modifying a virtual avatar and/or user representation. FIG. 9 is a flow diagram of an exemplary method 900 for providing user interfaces for selecting a virtual avatar and/or user representation. The user interfaces in FIGS. 7A-7P are used to illustrate the processes described below, including the processes in FIG. 8 and FIG. 9.

FIG. 7A depicts electronic device 700, which is a tablet that includes touch-sensitive display 702, buttons **708*a*-708*c*, and one or more input sensors 704 (e.g., one or more cameras, eye gaze trackers, hand movement trackers, and/or head movement trackers). Electronic device 700 is being used by user 710 with head 710*a*. In some embodiments described below, electronic device 700 is a tablet. In some embodiments, electronic device 700 is a smartphone, a wearable device, a wearable smartwatch device, a head-mounted system (e.g., headset), or other computer system that includes and/or is in communication with one or more display devices (e.g., display screen and/or projection device). In some embodiments in which electronic device 700 is a head-mounted system, electronic device 700 optionally includes two displays (e.g., one for each eye of a user), with each display displaying respective various content, to enable a user of electronic device 700 to perceive the various depths of the various content (e.g., physical objects and/or virtual objects) of three-dimensional environments. Electronic device 700 is a computer system (e.g., computer system 101 in FIG. 1**A).

At FIG. 7A, electronic device 700 displays user interface 712 and avatar 714 in three-dimensional environment 720. In the depicted scenario, three-dimensional environment 720 includes object **720*a*. In some embodiments, three-dimensional environment 720 is displayed by a display (e.g., display 702, as depicted in FIG. 7A). In some embodiments, three-dimensional environment 720 includes a virtual environment or an image (or video) of a physical environment captured by one or more cameras (e.g., one or more cameras that are part of input sensors 704 and/or one or more external cameras). For example, object 720*a* is a virtual object that is representative of a physical object that has been captured by one or more cameras and/or detected by one or more sensors. In some embodiments, three-dimensional environment 720 is visible to a user behind avatar 714 and user interface 712, but is not displayed by a display. For example, in some embodiments, three-dimensional environment 720 is a physical environment (and, for example, object 720*a* is a physical object) that is visible to a user (e.g., through a transparent display) behind user interface 712 and/or avatar 714 without being displayed by a display. In some embodiments, user interface 712, avatar 714**, and/or three-dimensional environment are part of an extended reality experience.

In FIG. 7A, user interface 712 is an avatar editing user interface that includes one or more controls for modifying a visual appearance of avatar 714. In some embodiments, one or more visual features of avatar 714 are automatically generated and/or automatically selected by electronic device 700 (e.g., from a plurality of visual feature options) based on visual information and/or biometric information corresponding to user 710 captured by electronic device 700 (e.g., via sensors 704). For example, in some embodiments, electronic device 700 captures one or more photographs and/or one or more facial scans of user 710 (e.g., via sensors 704), and electronic device 700 automatically generates avatar 714 based on the visual information and/or biometric information corresponding to the user (e.g., electronic device 700 automatically generates avatar 714 to have an appearance that approximates the appearance of user 710, and/or that has one or more visual characteristics that are selected based on visual features and/or characteristics of user 710 (e.g., hair color, eye color, skin color, head size, face size relative to head size, hair style, head shape, and/or facial feature positions)).

As mentioned above, in the depicted embodiments, user interface 712 is an avatar editing user interface that includes one or more controls for modifying a visual appearance of avatar 714. In some embodiments, a user is able to use user interface 712 to create, modify, and/or design an avatar that will represent the user for one or more functions performed by electronic device 700. For example, in some embodiments, avatar 714 is used to represent the user (e.g., visually represent the user) in real-time communications sessions (e.g., with other users and/or people). Avatar 714 includes head 714*a* and body 714*b*. User interface 712 includes button 716*a* (e.g., a delete button that is selectable to delete avatar 714 and/or cease display of user interface 712), button 716*b* (e.g., a done button that is selectable to indicate that the user is done modifying the visual appearance of avatar 714 and/or is selectable to display a different user interface), button 716*c* (e.g., an undo button that is selectable to undo one or more changes to the visual appearance of avatar 714). User interface 712 also includes options 718*a*-718*c*. Each of options 718*a*-718*c* corresponds to a respective visual characteristic of avatar 714, and is selectable by a user to initiate a process for modifying the respective visual characteristic. For example, in some embodiments, option 718*a* corresponds to an eyewear visual characteristic, and is selectable to display a plurality of eyewear options that are selectable by the user to apply to avatar 714; option 718*b* corresponds to a brightness visual characteristic and is selectable to display a plurality of brightness settings that the user can apply to avatar 714; and option 718*c* corresponds to a color temperature visual characteristic and is selectable to display a plurality of color temperature settings that the user can apply to avatar 714.

In FIG. 7A, option 718*b* is selected, as indicated by indication 721. In accordance with option 718*b* being selected, user interface 712 displays slider bar 718*b*-2 that includes a plurality of selectable options corresponding to option 718*b*. For example, in some embodiments, option 718*b* corresponds to a brightness setting, and slider bar 718*b*-2 includes a plurality of brightness options. In the depicted embodiment, electronic device 700 is configured to receive user inputs to move object 718*b*-1 along slider bar 718*b*-2 to change the brightness characteristic of avatar 714. In some embodiments, as object 718*b*-1 is moved along slider bar 718*b*-2, display of avatar 714 is updated to change the brightness of avatar 714 (e.g., when object 718*b*-1 is moved to the left, avatar 714 is changed to be darker, and when object 718*b*-1 is moved to the right, avatar 714 is changed to be brighter).

In FIGS. 7A-7P, top-down view 706 corresponds to the spatial arrangement of certain elements displayed by electronic device 700, including user interface 712 and avatar 714. Top-down view 706 provides additional information about the spatial arrangement of user interface 712 and avatar 714 within three-dimensional environment 720, including the locations, sizes, and orientations of these objects. Top-down view 706 is illustrated to provide a more detailed explanation of the techniques and is not part of the user interfaces of electronic device 700.

As seen in top down view 706 in FIG. 7A, user interface 712 is displayed on a planar and/or flat object (e.g., on a front surface of the planar and/or flat object) that is spaced apart from avatar 714 within three-dimensional environment 720. In FIG. 7A, avatar 714 is displayed as being closer to the viewpoint of user 710 than user interface 712. In some embodiments, electronic device 700 is a head-mounted system, and avatar 714 and user interface 712 are displayed as virtual objects in three-dimensional environment 720 such that avatar 714 appears at a position within three-dimensional environment 720 that is closer to the viewpoint of user 710 than user interface 712.

In some embodiments, avatar 714 moves based on movements made by user 710 (e.g., as detected by sensors 704). In FIG. 7B1, electronic device 700 detects that user 710 has raised his hand 710*b*. In response, electronic device 700 displays avatar 714's virtual hand 714*c* being raised in a manner that mirrors the movement of user 710. In some embodiments, electronic device 700 is a head-mounted system, and display 702 displays representation 722 representative of the user's hand 710*b*. In some embodiments, rather than displaying representation 722, electronic device 700 is a head-mounted system with one or more transparent displays, and user 710 is able to see his hand 710*b* through the transparent displays.

In some embodiments, the techniques and user interface (s) described in FIGS. 7A-7P are provided by one or more of the devices described in FIGS. 1A-1P. For example, FIG. 7B2 illustrates an embodiment in which communication interface 712 (e.g., as described in FIGS. 7A and 7B1) is displayed on display module X702 of head-mounted device (HMD) X700 worn by user 710. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

As seen in top down view 706 in FIG. 7B2, user interface 712 is displayed on a planar and/or flat object (e.g., on a front surface of the planar and/or flat object) that is spaced apart from avatar 714 within three-dimensional environment 720. In FIG. 7B2, avatar 714 is displayed as being closer to the viewpoint of user 710 than user interface 712. In some embodiments, avatar 714 and user interface 712 are displayed as virtual objects in three-dimensional environment 720 such that avatar 714 appears at a position within three-dimensional environment 720 that is closer to the viewpoint of user 710 than user interface 712.

In some embodiments, avatar 714 moves based on movements made by user 710 (e.g., as detected by sensors X704). In FIG. 7B2, HMD X700 detects that user 710 has raised his hand 710*b*. In response, electronic device 700 displays avatar 714's virtual hand 714*c* being raised in a manner that mirrors the movement of user 710. In some embodiments, display X702 displays representation 722 representative of the user's hand 710*b*. In some embodiments, rather than displaying representation 722, HMD X700 is a head-mounted system with one or more transparent displays, and user 710 is able to see his hand 710*b* through the transparent displays.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7D:
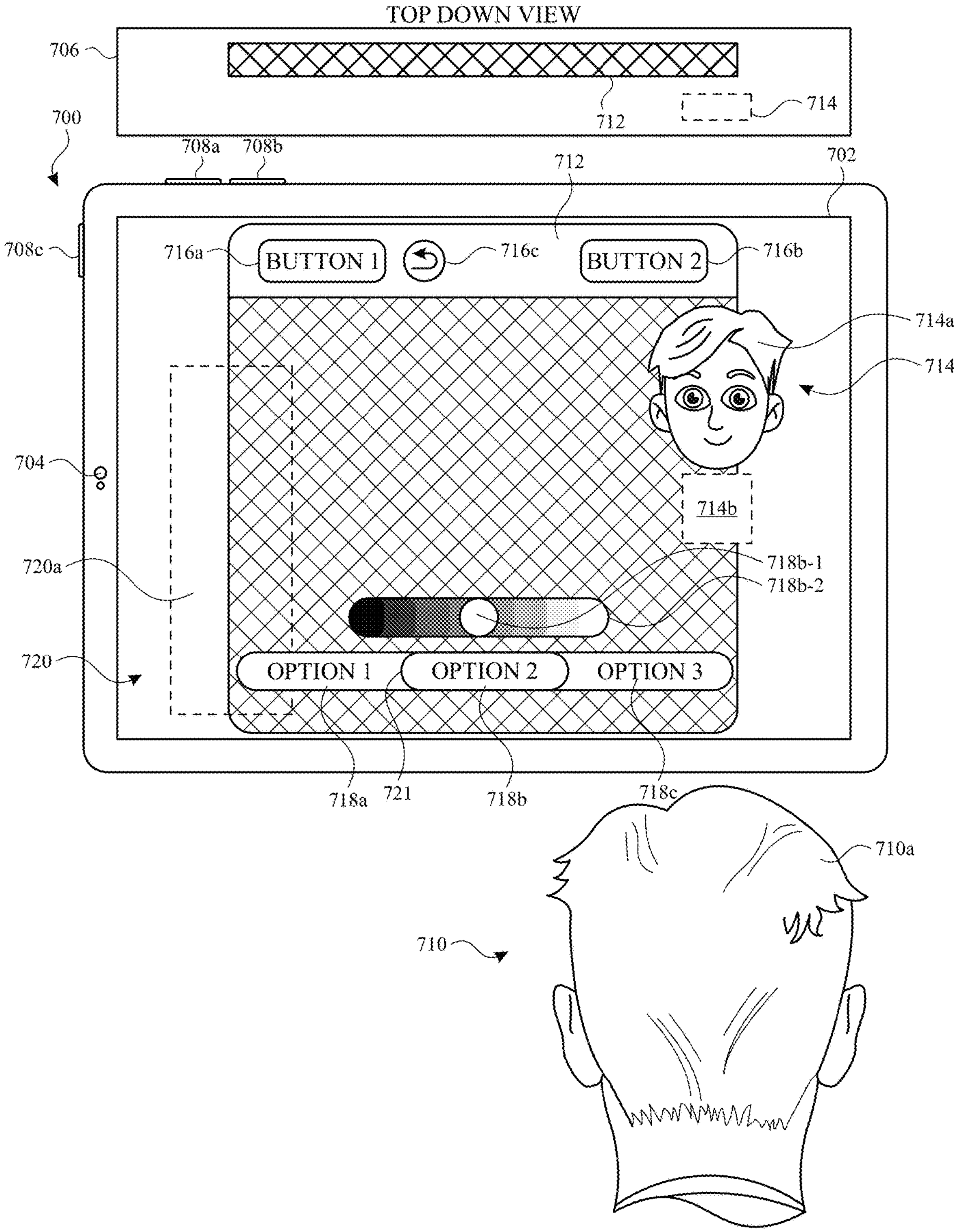

In some embodiments, user interface 712 is an environment-locked object, such that even when user 710 moves, user interface 712 remains at a fixed position within three-dimensional environment 720. At FIG. 7C1, electronic device 700 detects that user 710 has moved to his right, and mirrors that movement by displaying avatar 714 moving to the right. At FIG. 7D, electronic device 700 detects that user 710 has moved further to his right, and mirrors that movement by displaying avatar 714 moving further to the right. At FIG. 7D, avatar 714 is at least partially offset from (e.g., partially overlapping and partially not overlapping) user interface 712 (e.g., from the view point of user 710).

In some embodiments, user interface 712 is an environment-locked object, such that even when user 710 moves, user interface 712 remains at a fixed position within three-dimensional environment 720 provided by HMD X700 described above in FIG. 7B2. At FIG. 7C2, HMD X700 detects that user 710 has moved to his right, and mirrors that movement by displaying avatar 714 moving to the right (e.g., as described in FIG. 7D with reference to electronic device 700) and the corresponding user interface 712 shifting to the left to indicate that the viewpoint of the user in the three-dimensional environment has shifted to the right (e.g., as the user 710 or user's head has moved to the right). For example, HMD X700 can detect that user 710 has moved further to his right, and mirrors that movement by displaying avatar 714 moving further to the right (e.g., HMD X700 displays avatar 714 is at least partially offset from user interface 712 from the view point of user 710) and the corresponding user interface 712 shifting further to the left to indicate that the viewpoint of the user in the three-dimensional environment has shifted further to the right (e.g. as the user 710 or user's head has moved further to the right).

Figure 7E:
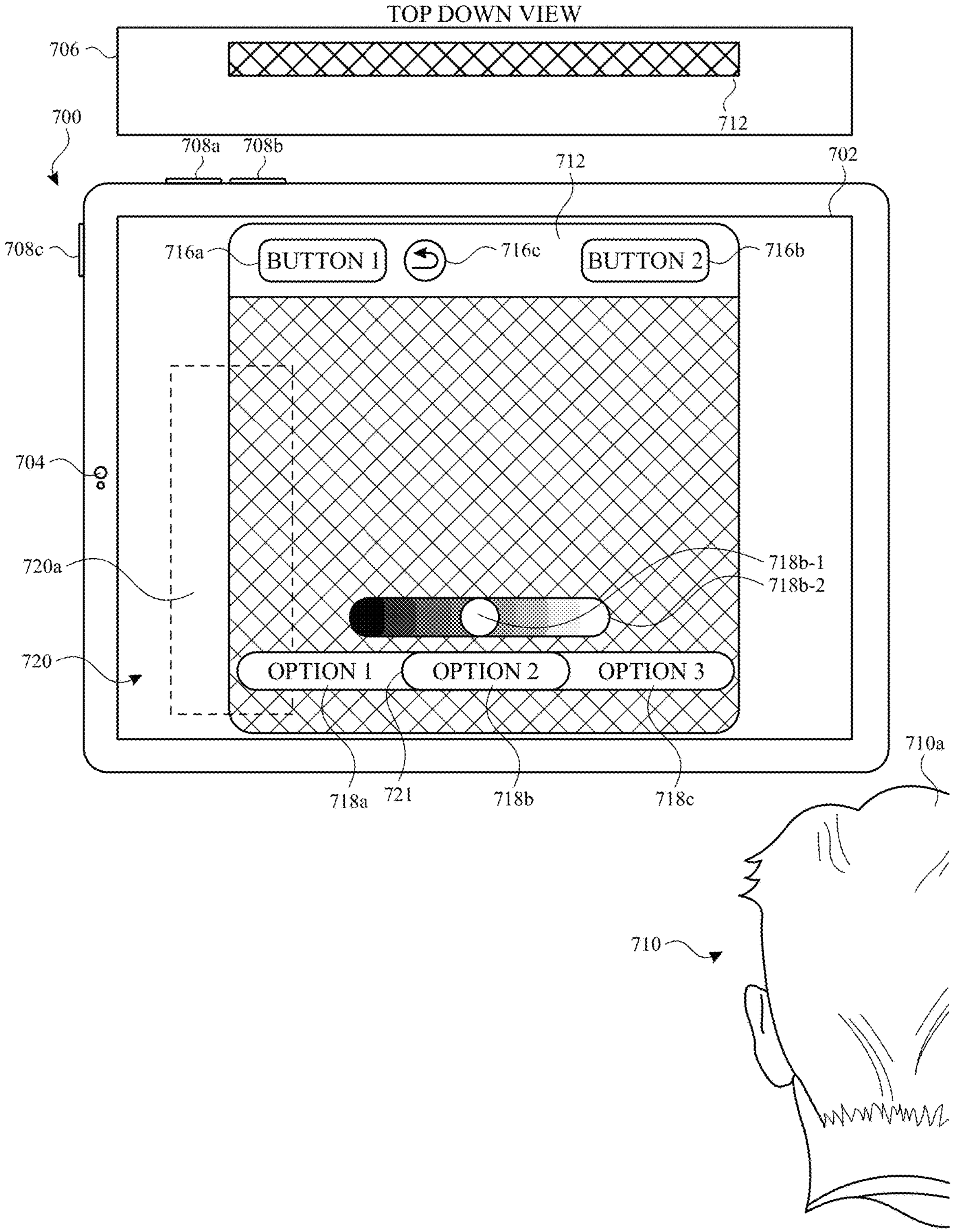

At FIG. 7E, electronic device 700 detects that user 710 has moved even further to the right. In FIG. 7E, electronic device 700 detects that user 710 has moved greater than a first threshold distance relative to a first reference position. For example, in some embodiments, electronic device 700 detects that user 710 has moved beyond an outer threshold of user interface 712 (e.g., the user has moved beyond a threshold distance from the center of user interface 712, the user has moved greater than a first threshold distance from the starting position of avatar 714 in FIG. 7A, and/or the user has moved beyond an outer edge of user interface 712). In accordance with this determination, electronic device 700 ceases display of avatar 714 while maintaining display of user interface 712 at its fixed position (or, in some embodiments, semi-fixed position, as will be described in greater detail below) within three-dimensional environment 720.

Figure 7F:
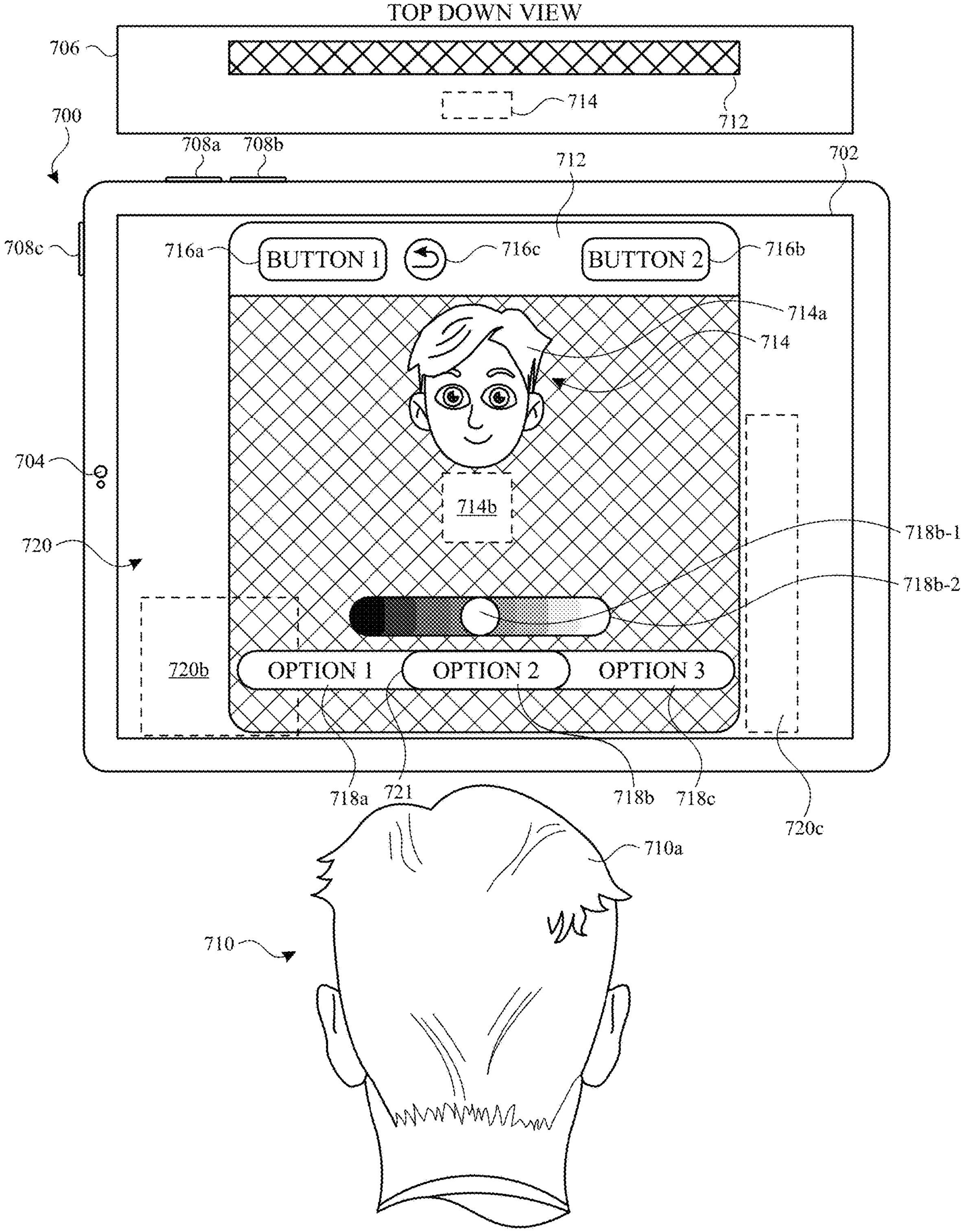

At FIG. 7F, electronic device 700 detects that user 710 has moved greater than a second threshold amount relative to a reference position (e.g., greater than a second threshold amount from the center of user interface 712, greater than a second threshold amount from the starting position of avatar 714 in FIG. 7A, moved to the left or right a threshold distance, and/or rotated by a threshold degree (e.g., greater than 90 degrees)). In the depicted embodiment, in response to this determination, electronic device 700 moves user interface 712 within three-dimensional environment 720 so that user interface 712 is within and/or re-centered in the viewpoint of user 710. In some embodiments, prior to the user moving by greater than the second threshold amount (e.g., while the user has moved by less than the second threshold amount (e.g., while the user moves less than a threshold distance laterally and/or while the user rotates by less than a threshold amount)), user interface 712 is displayed as an environment-locked object with a fixed position within three-dimensional environment 720 even as user 710 and avatar 714 move. However, when user 710 moves by more than the second threshold amount, user interface 712 is moved within three-dimensional environment 720 based on the position of user 710 (e.g., such that user interface 712 is re-centered within the viewpoint of user 710). As can be seen in FIG. 7F, user interface 712 has moved within three-dimensional environment 720 as it is now positioned in front of object 720*b* and 720*c* in three-dimensional environment 720, and object 720*a* is no longer visible. In some embodiments, electronic device 700 is a head-mounted system, and three-dimensional environment 720 is a passthrough environment (e.g., a virtual passthrough environment or optical passthrough environment) that surrounds the user, and user interface 712 is displayed via one or more display generation components that are worn on the head of the user (e.g., one or more optical lenses positioned in front of the eyes of the user). In some such embodiments, when electronic device 700 detects that user 710 has moved greater than the second threshold amount relative to a reference position, electronic device 700 moves user interface 712 within the three-dimensional passthrough environment so that user interface 712 is within and/or re-centered in the viewpoint of user 710. For example, in some such embodiments, when the user has moved greater than the second threshold distance, user interface 712 is no longer in the viewpoint of the user (e.g., the user has turned greater than 90 degrees or the user has moved horizontally and/or laterally by greater than a threshold distance), but electronic device 700 moves user interface 712 in the three-dimensional environment so that user interface 712 is once again made visible to the user.

Figure 7G:
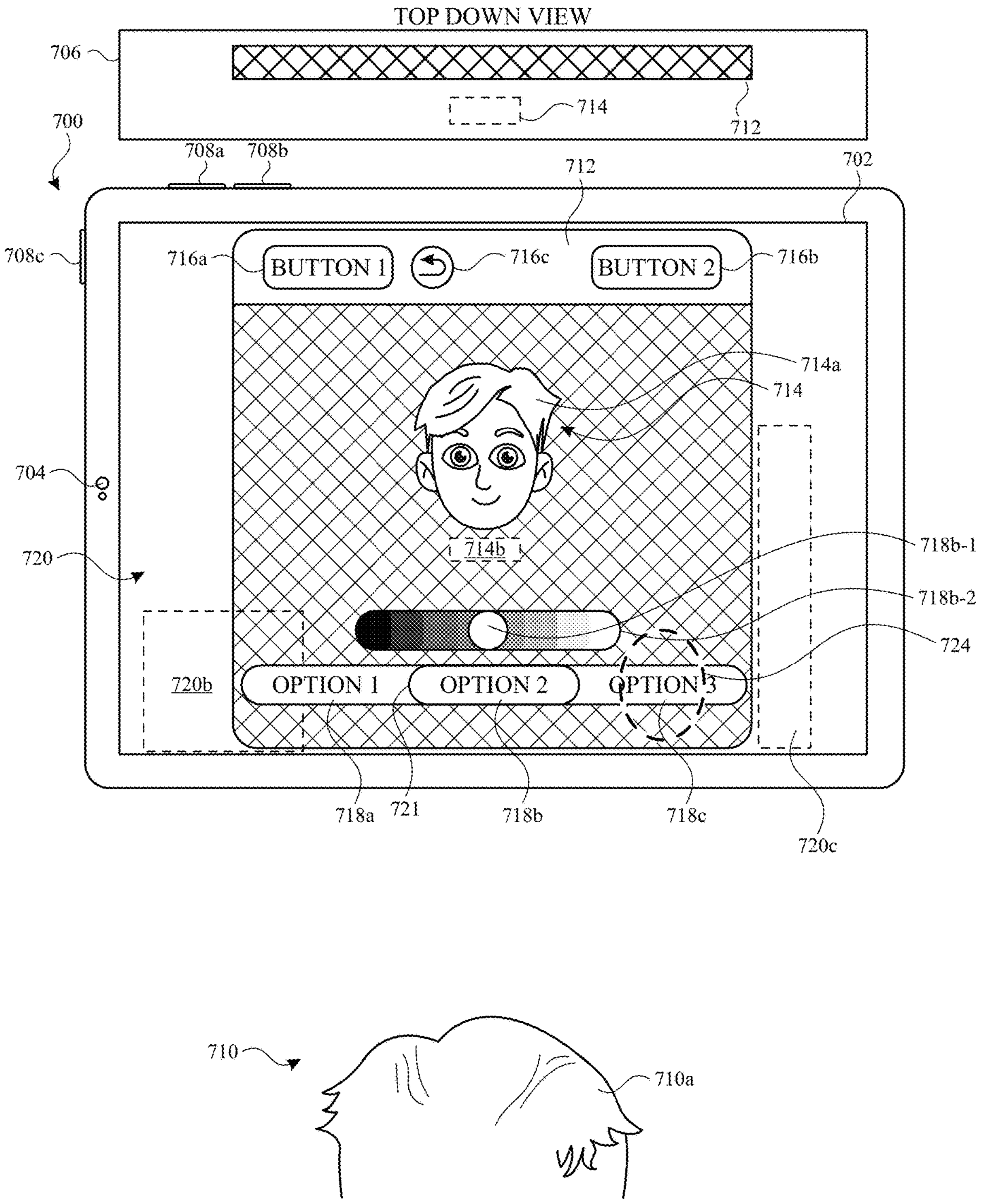

At FIG. 7G, with user interface 712 re-centered in the viewpoint of user 710, electronic device 700 detects that user 710 has moved downward vertically (e.g., has crouched down), and, in response, displays avatar 714 moving downward. In the depicted embodiment, a portion of body **714*b* of avatar 714 is cropped based on the downward movement of user 710. At FIG. 7G, electronic device 700 detects user input 724 corresponding to selection of option 718*c*. In FIG. 7G, user input 724 is a tap input on touch-sensitive display 702. However, in some embodiments, user input 724 is a different type of user input, such as a gesture or other action taken by a user. For example, in some embodiments, electronic device 700 is a head-mounted system, and detecting user input 724 includes, for example, detecting a user performing a gesture (e.g., an air gesture (e.g., a pinch air gesture in which the user pinches his index finger and thumb together)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze at object 718*c*** in conjunction with a pinch air gesture).

Figure 7H:
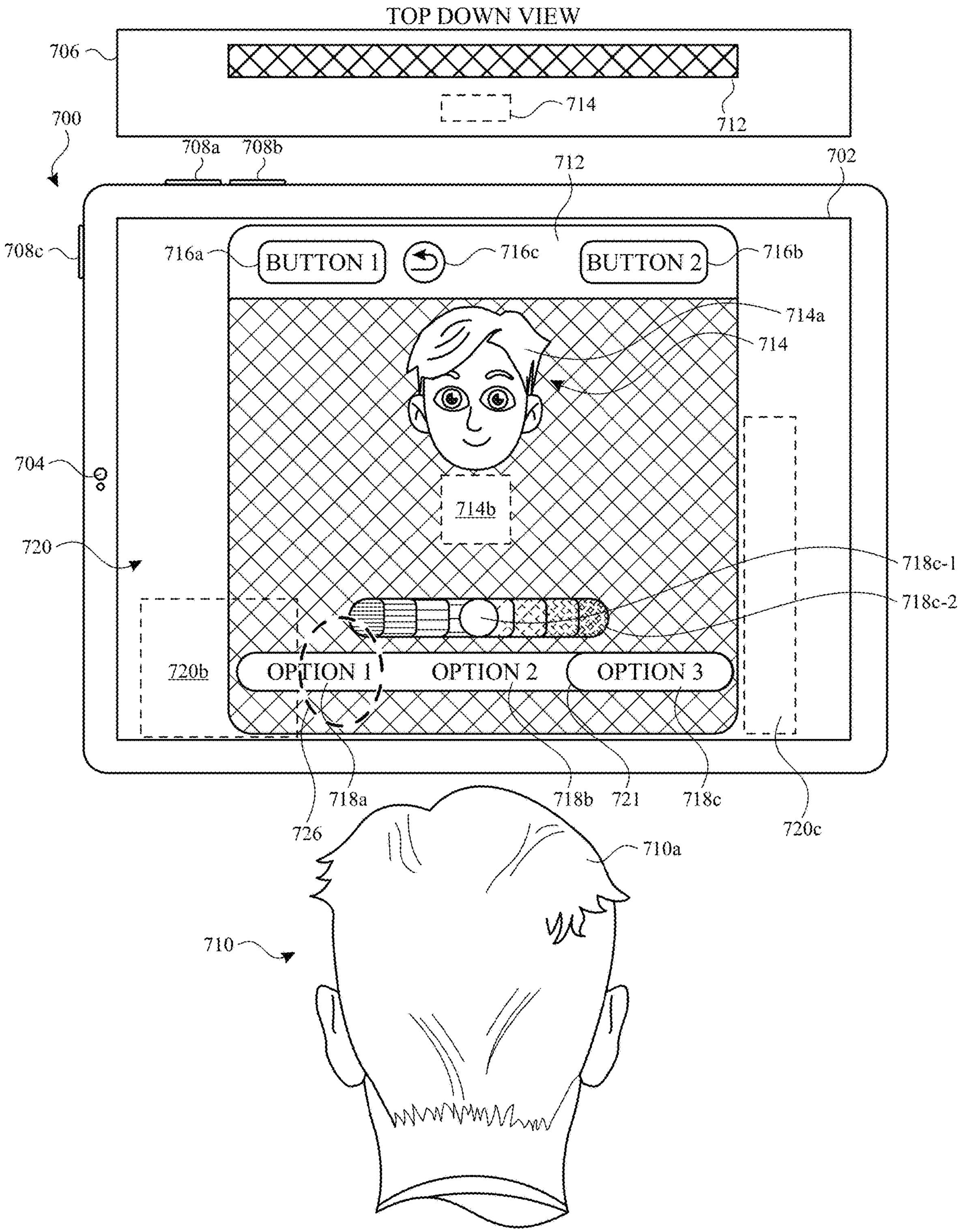

At FIG. 7H, in response to detecting user input 724, electronic device 700 replaces display of slider bar **718*b*-2 and object 718*b*-1, which corresponded to option 718*b*, with slider bar 718*c*-2 and object 718*c*-1, which correspond to option 718*c*. Electronic device 700 also displays indication 721 surrounding option 718*c* to indicate that option 718*c* is currently selected. Slider bar 718*c*-1 includes a plurality of selectable options corresponding to option 718*c*. For example, in some embodiments, option 718*c* corresponds to a color temperature setting, and slider bar 718*c*-2 includes a plurality of color temperature settings. In the depicted embodiment, a user is able to move object 718*c*-1 along slider bar 718*c*-2 to change the color temperature characteristic of avatar 714. In some embodiments, as the user moves object 718*c*-1 along slider bar 718*c*-2, display of avatar 714 is updated to change the color temperature of avatar 714 (e.g., when object 718*c*-1 is moved to the left, avatar 714 is changed to a cooler tone, and when object 718*c*-1 is moved to the right, avatar 714** is changed to a warmer tone).

At FIG. 7H, electronic device 700 detects user input 726 corresponding to selection of option **718*a*. In FIG. 7H, user input 726 is a tap input on touch-sensitive display 702. However, in some embodiments, user input 726 is a different type of user input, such as a gesture or other action taken by a user. For example, in some embodiments, electronic device 700 is a head-mounted system, and detecting user input 726 includes, for example, detecting a user performing a gesture (e.g., an air gesture (e.g., a pinch air gesture)) while electronic device 700 is worn, detecting a button press while electronic device 700 is worn, detecting rotation of a rotatable input mechanism while electronic device 700 is worn, detecting a gaze-based gesture (e.g., looking at an object and/or moving his or her gaze in a particular manner), and/or any combination of the foregoing (e.g., detecting a gaze input directed at option 718*a*** in conjunction with a pinch air gesture).

Figure 7I:
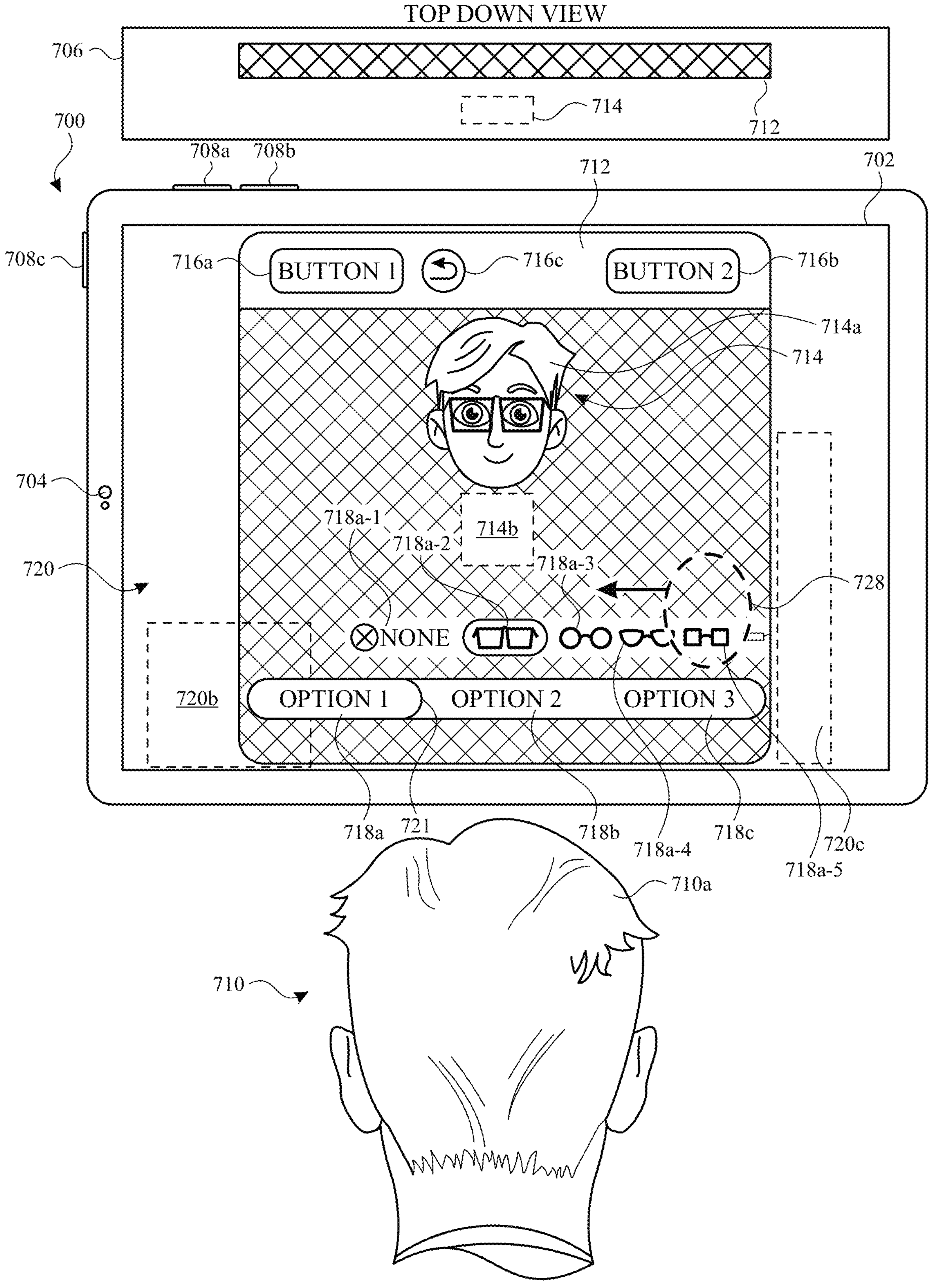

At FIG. 7I, in response to detecting user input 726, electronic device 700 ceases display of slider bar **718*c*-2 and object 718*c*-1, and now displays options 718*a*-1 through 718*a*-5 which correspond to option 718*a*. Electronic device 700 also displays indication 721 surrounding option 718*a* to indicate that option 718*a* is currently selected. In some embodiments, option 718*a* corresponds to an eyewear setting, and electronic device 700 receives user selection from a plurality of eyewear options to change the eyewear that is displayed on avatar 714. In FIG. 7I, option 718*a*-2 has been selected, and the corresponding style of eyewear is displayed on avatar 714. At FIG. 7I, electronic device detects user input 728, which has a leftward direction of movement. In FIG. 7I, user input 728 is a touch swipe input moving to the left on touch-sensitive display 702. However, in some embodiments, user input 728 is a different type of user input, such as a gesture or other action taken by a user. For example, in some embodiments, electronic device 700 is a head-mounted system, and detecting user input 728 includes, for example, detecting a user performing a gesture (e.g., an air gesture (e.g., an air gesture that includes movement of the user's hand to the left)) while electronic device 700 is worn, detecting a button press while electronic device 700 is worn, detecting rotation of a rotatable input mechanism while electronic device 700** is worn, detecting a gaze-based gesture (e.g., detecting the user looking at an object and/or moving his or her gaze in a particular manner), and/or any combination of the foregoing.

Figure 7J:
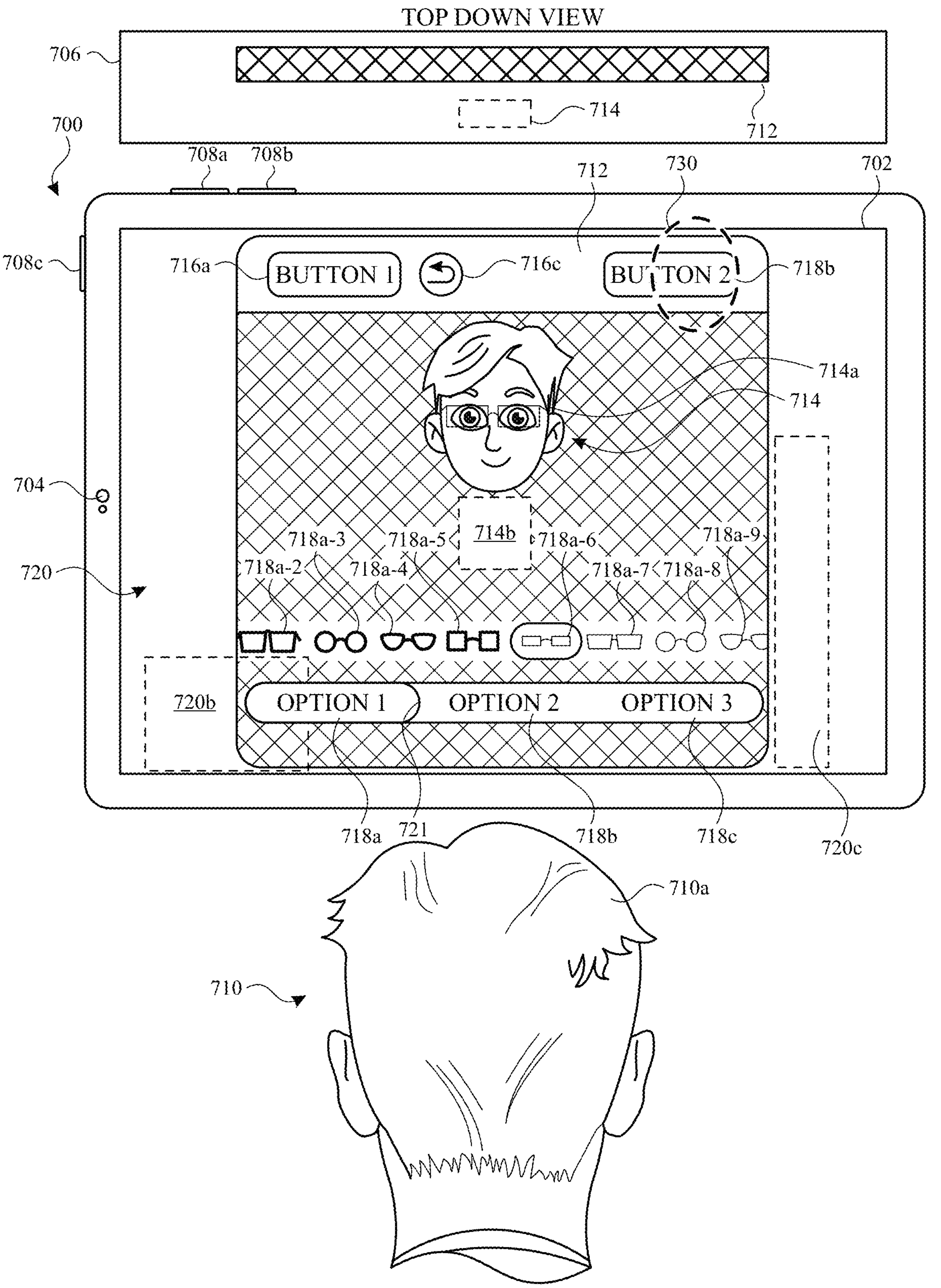

At FIG. 7J, in response to detecting user input 728, electronic device 700 shifts display of options **718*a*-1 through 718*a*-5 to the left (including ceasing display of option 718*a*-1), and displays additional options 718*a*-6 through 718*a*-9. Furthermore, in FIG. 7J, in response to user input 728, option 718*a*-6 is now selected, and avatar 714 is updated to display avatar 714 wearing eyewear corresponding to option 718*a*-6**.

At FIG. 7J, electronic device 700 detects user input 730 corresponding to selection of button **718*b*. In some embodiments, button 718*b* corresponds to a done button indicating that the user has completed editing avatar 714. In FIG. 7J, user input 730 is a touch input (e.g., tap input) on touch-sensitive display 702. However, in some embodiments, user input 730 is a different type of user input, such as a gesture or other action taken by a user. For example, in some embodiments, electronic device 700 is a head-mounted system, and detecting user input 730 includes, for example, detecting a user performing a gesture (e.g., an air gesture (e.g., a pinch air gesture)) while electronic device 700 is worn, detecting a button press while electronic device 700 is worn, detecting rotation of a rotatable input mechanism while electronic device 700 is worn, detecting a gaze-based gesture (e.g., detecting the user looking at an object and/or moving his or her gaze in a particular manner), and/or any combination of the foregoing (e.g., detecting a gaze input directed at button 718*b*** in conjunction with a pinch air gesture).

At FIG. 7K1, in response to detecting user input 730, electronic device 700 ceases display of avatar editing user interface 712, and now displays confirmation user interface 735. In some embodiments, confirmation user interface 735 displays avatar 714 with one or more visual characteristics that were applied to avatar 714 at the time the user selected button **718*b* so that the user can review the visual appearance of avatar 714. In some embodiments, user interface 735 includes prompt 732 (e.g., a prompt that indicates that avatar 714, as displayed, is how the user will appear (e.g., avatar 714 will represent the user (e.g., in real-time communication sessions and/or one or more other functions of electronic system 700))), button 716***a* (e.g., a delete button that is selectable to delete avatar 714 and/or to indicate that the user does not wish to use avatar 714 to represent the user for one or more functions of electronic device 700), and button 716*b* (e.g., a confirm button that is selectable to indicate that the user wants to use avatar 714 to represent the user for one or more functions of electronic device 700). At FIG. 7K1, electronic device 700 detects user input 734. In FIG. 7K1, user input 734 is a touch input (e.g., tap input) on touch-sensitive display 702. However, in some embodiments, user input 734 is a different type of user input, such as a gesture or other action taken by a user. For example, in some embodiments, electronic device 700 is a head-mounted system, and user input 734 includes, for example, detecting a user performing a gesture (e.g., an air gesture (e.g., a pinch air gesture)) while electronic device 700 is worn, detecting a button press while electronic device 700 is worn, detecting rotation of a rotatable input mechanism while electronic device 700 is worn, detecting a gaze-based gesture (e.g., detecting a user looking at an object and/or moving his or her gaze in a particular manner), and/or any combination of the foregoing (e.g., detecting a gaze input directed at button 716*a* in conjunction with a pinch air gesture).

In some embodiments, the techniques and user interface (s) described in FIG. 7K1 are provided by one or more of the devices described in FIGS. 1A-1P. FIG. 7K2 illustrates an embodiment in which confirmation user interface 735 (e.g., as described in FIG. 7K1) is displayed on display module X702 of HMD X700 described above in FIG. 7B2. In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

At FIG. 7K2, in response to detecting user input 730, HMD X700 ceases display of avatar editing user interface 712, and now displays confirmation user interface 735. In some embodiments, confirmation user interface 735 displays avatar 714 with one or more visual characteristics that were applied to avatar 714 at the time the user selected button 718*b* so that the user can review the visual appearance of avatar 714. In some embodiments, user interface 735 includes prompt 732 (e.g., a prompt that indicates that avatar 714, as displayed, is how the user will appear (e.g., avatar 714 will represent the user (e.g., in real-time communication sessions and/or one or more other functions of electronic system 700))), button 716*a* (e.g., a delete button that is selectable to delete avatar 714 and/or to indicate that the user does not wish to use avatar 714 to represent the user for one or more functions of HMD X700), and button 716*b* (e.g., a confirm button that is selectable to indicate that the user wants to use avatar 714 to represent the user for one or more functions of electronic device 700). At FIG. 7K2, HMD X700 detects user input X734. In response to detecting user input X734, HMD X700 deletes and ceases display of avatar 714, and displays user interface 736 (e.g., as described in FIG. 7L).

In some embodiments, user input X734 is a touch input (e.g., tap input) on a touch-sensitive display (e.g., touch-sensitive display 702). However, in some embodiments, user input X734 is a different type of user input, such as a gesture or other action taken by a user. For example, in some embodiments, user input X734 includes, for example, detecting a user performing a gesture (e.g., an air gesture (e.g., a pinch air gesture)) while HMD X700 is worn, detecting a button press while HMD X700 is worn, detecting rotation of a rotatable input mechanism while HMD X700 is worn, detecting a gaze-based gesture (e.g., detecting a user looking at an object and/or moving his or her gaze in a particular manner), and/or any combination of the foregoing (e.g., detecting a gaze input directed at button 716*a* in conjunction with a pinch air gesture).

In some embodiments, HMD X700 detects selection of button 716*a* based on an air gesture performed by a user of HMD X700. In some embodiments, HMD X700 detects hands X750*b* and/or 710*b* of the user of HMD X700 and determines whether motion of hands X750*b* and/or 710*b* perform a predetermined air gesture corresponding to selection of button 716*a*. In some embodiments, the predetermined air gesture selecting button 716*a* includes a pinch gesture. In some embodiments, the pinch gesture includes detecting movement of finger X750*c* and thumb X750*d* toward one another. In some embodiments, HMD X700 detects selection of button 716*a* based on a gaze and air gesture input performed by the user of HMD X700. In some embodiments, the gaze and air gesture input includes detecting that the user of HMD X700 is looking at button 716*a* (e.g., for more than a predetermined amount of time) and hands X710*a* and/or X750*b* of the user of HMD X700 perform a pinch gesture.

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 7L:
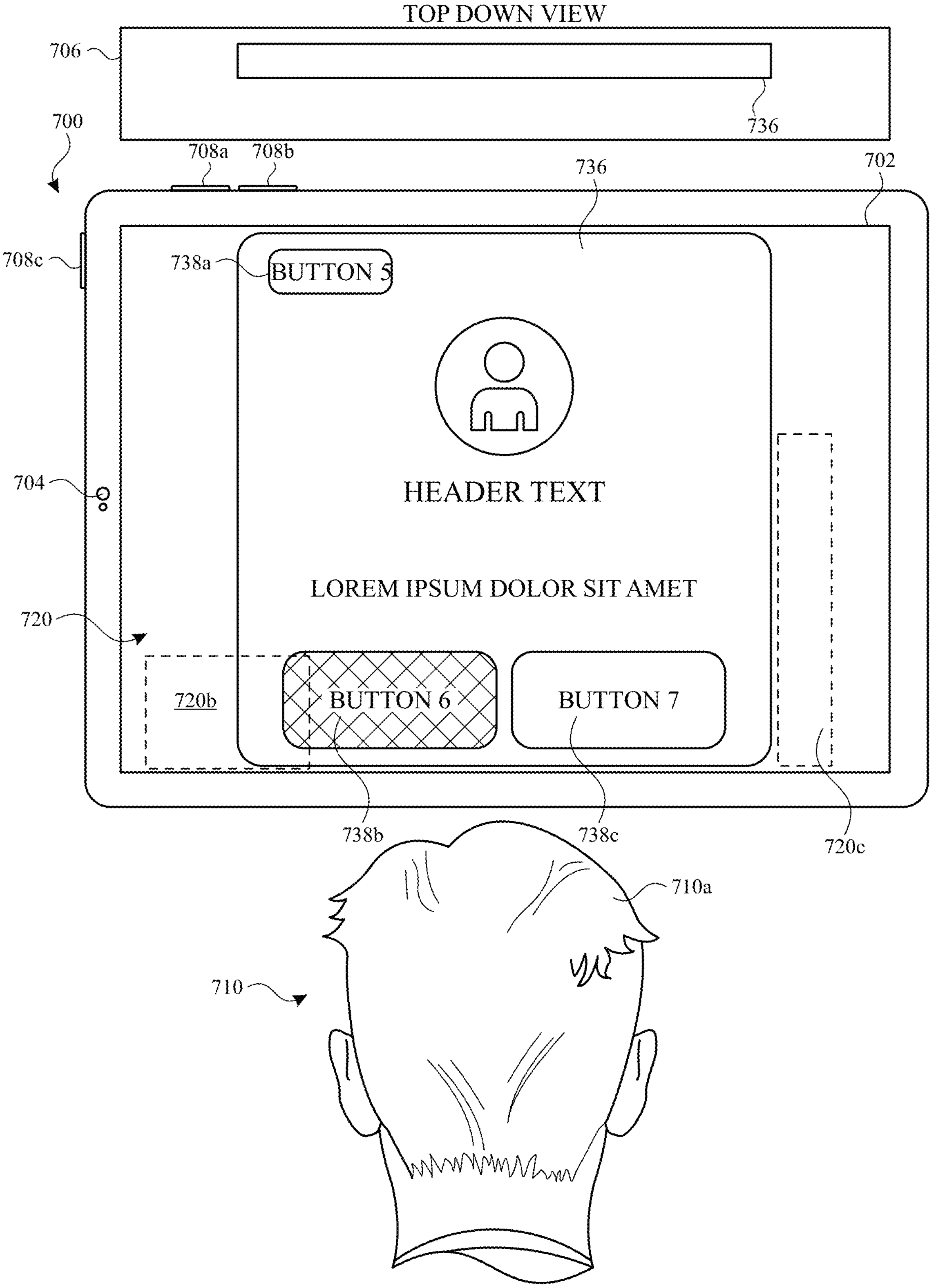

At FIG. 7L, in response to detecting user input 734, electronic device 700 deletes and ceases display of avatar 714, and displays user interface 736. In some embodiments, user interface 736 is an alternative representation user interface that allows a user to select an alternative representation (e.g., a representation different from avatar 714) to represent the user (e.g., visually represent the user) for one or more functions of electronic device 700 (e.g., in real-time communication sessions or other functions of electronic device 700). In the depicted embodiments, user interface 736 includes buttons 738*a*-738*c*. In some embodiments, button 738*a* is a cancel button that is selectable to cease display of user interface 736. In some embodiments, button 738*b* is an alternative representation button that is selectable by a user to initiate a process for receiving user selection of an alternative visual representation to represent the user for the one or more functions of electronic device 700. In some embodiments, button 738*c* is a retake button that is selectable by a user to initiate a process for creating a new avatar (e.g., in some embodiments, re-display avatar editing user interface 712) (e.g., similar to the steps shown in FIGS. 7A-7K2). In some embodiments, button 738*c* is selectable to cause electronic device 700 to re-capture visual information and/or biometric information (e.g., one or more photographs and/or one or more facial scans) to generate an avatar (e.g., avatar 714) based on the visual information and/or biometric information corresponding to user 710. In some embodiments, user interface 736 also includes instruction 737, which provides one or more tips and/or instructions for the user to generate a new avatar. For example, in some embodiments, instruction 737 instructs the user to move to a location with better lighting or instructs the user on how to hold electronic device 700 in order to improve capture of image-based information for use in generating a new avatar.

Figure 7M:
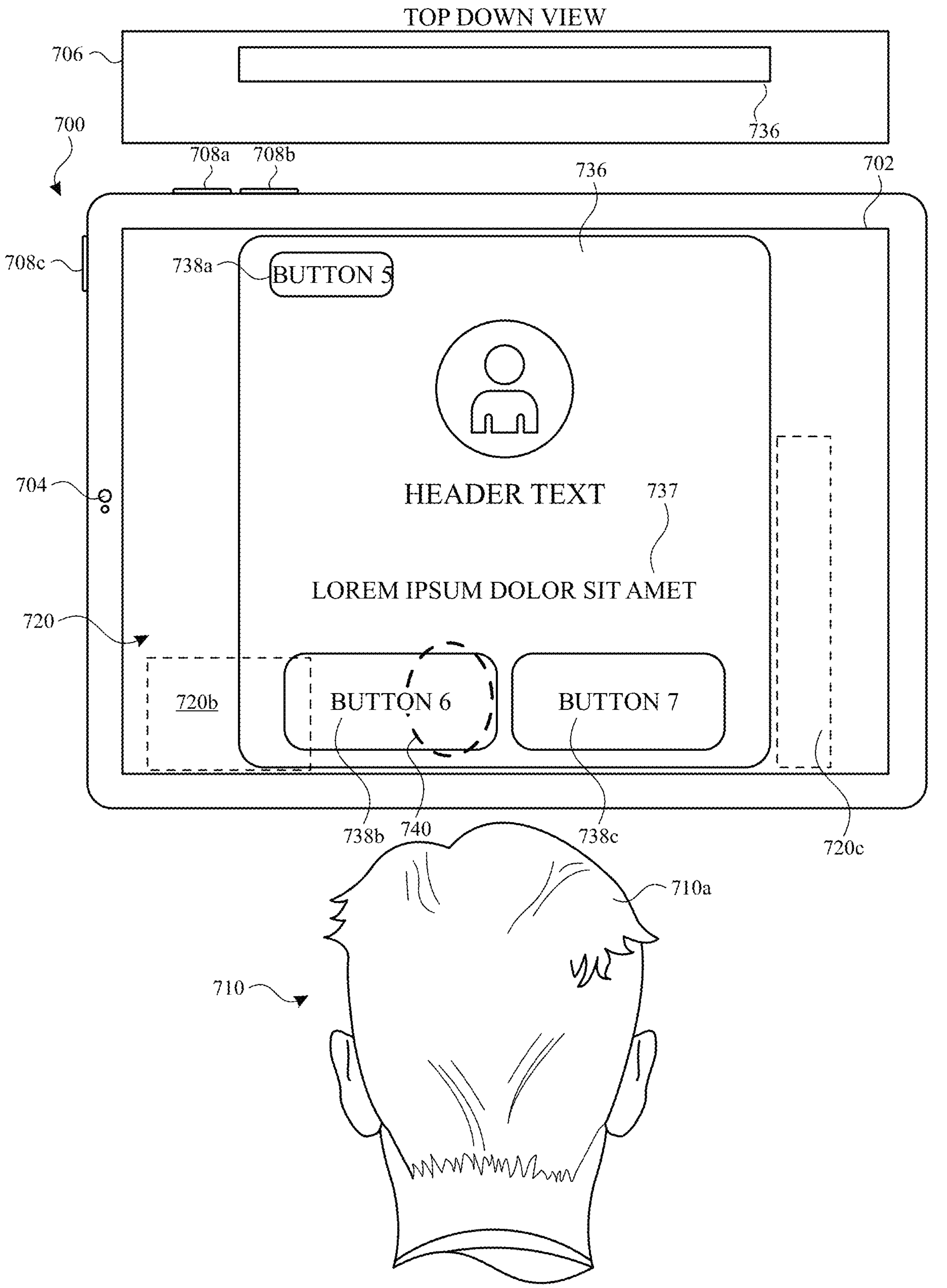

FIG. 7L depicts a first scenario in which user 710 does not have any previously created and/or previously stored visual representations that the user can choose to represent the user for the one or more functions of electronic device 700. As such, button 738*b* is grayed out and cannot be selected by the user. FIG. 7M depicts an alternate scenario in which the user does have one or more previously created and/or previously stored visual representations that the user can choose to represent the user for the one or more functions of electronic device 700. Accordingly, button 738*b* is not grayed out and is selected by the user. At FIG. 7M, electronic device 700 detects user input 740 corresponding to selection of button 738*b*. In FIG. 7M, user input 740 is a touch input (e.g., tap input) on touch-sensitive display 702. However, in some embodiments, user input 740 is a different type of user input, such as a gesture or other action taken by a user. For example, in some embodiments, electronic device 700 is a head-mounted system, and detecting user input 740 includes, for example, detecting a user performing a gesture (e.g., an air gesture (e.g., a pinch air gesture)) while electronic device 700 is worn, detecting a button press while electronic device 700 is worn, detecting rotation of a rotatable input mechanism while electronic device 700 is worn, detecting a gaze-based gesture (e.g., detecting a user looking at an object and/or moving his or her gaze in a particular manner), and/or any combination of the foregoing (e.g., detecting a gaze input directed at button 738*b* in conjunction with a pinch air gesture).

Figure 7N:
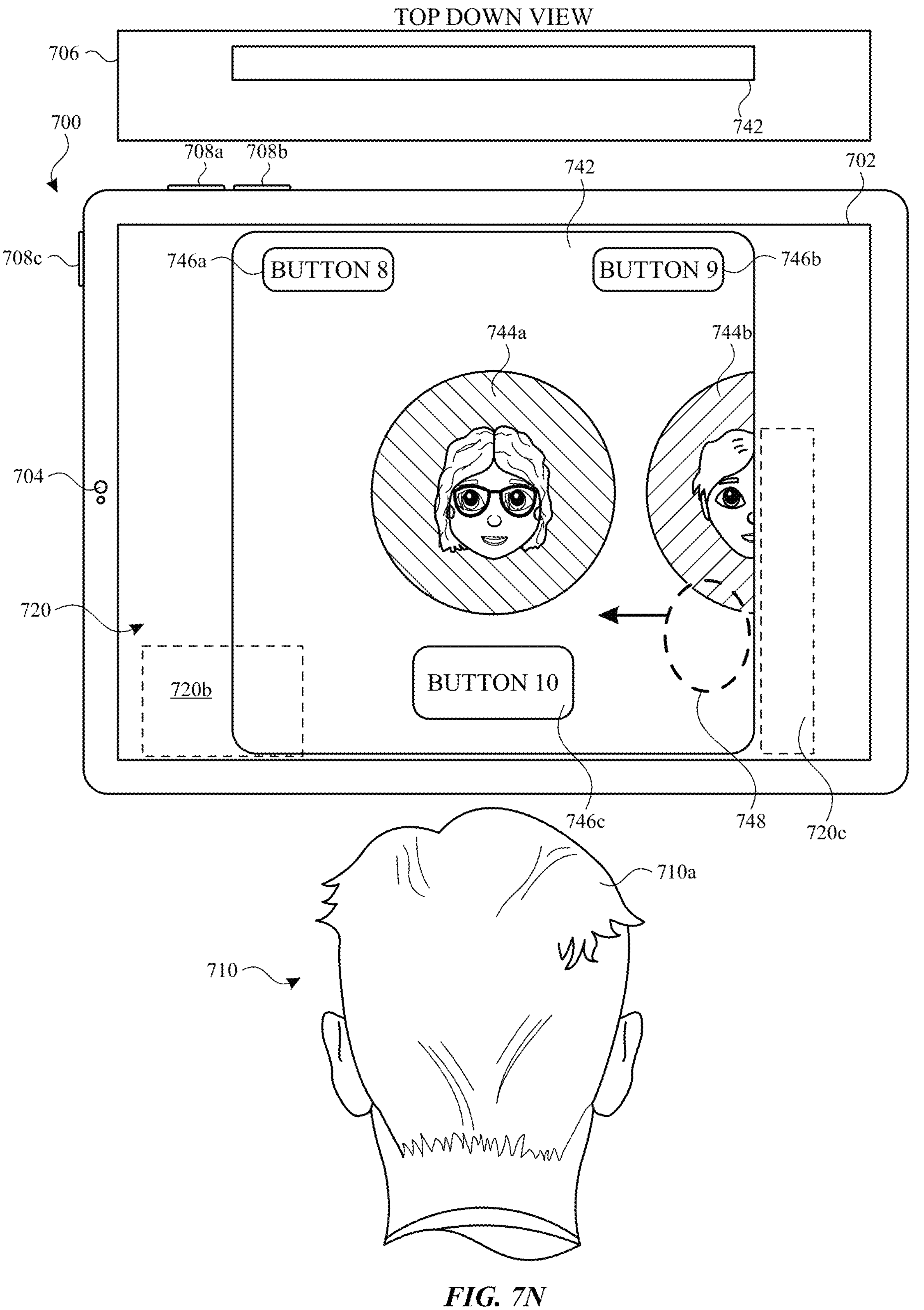

At FIG. 7N, in response to detecting user input 740, electronic device 700 displays representation selection user interface 742. Representation selection user interface 742 includes option 744*a* corresponding to a first visual representation and option 744*b* corresponding to a second visual representation. In some embodiments, the visual representations shown in user interface 742 are of a second type and avatar 714 is of a first type different from the second type. For example, in some embodiments, the visual representations shown in user interface 742 are two-dimensional and/or static visual representations, whereas avatar 714 is a three-dimensional and/or non-static visual representation. In some embodiments, avatar 714 is a visual representation that is (e.g., at least in part) automatically generated based on visual information and/or biometric information captured by electronic device 700 and corresponding to the user, whereas visual representations shown in user interface 742 include visual representations that were not automatically generated (e.g., by electronic device 700 or other devices) based on visual information and/or biometric information corresponding to the user. Option 744*a* is selectable by a user for the user to choose the first visual representation to represent the user for the one or more functions of electronic device 700, and option 744*b* is selectable by a user for the user to choose the second visual representation to represent the user for the one or more functions of electronic device 700. User interface 742 also includes buttons 746*a*-746*c*. In some embodiments, button 746*a* is a cancel button that is selectable to cease display of user interface 742. In some embodiments, button 746*b* is a create new button that is selectable to initiate a process for creating a new visual representation (e.g., in some embodiments, create a new avatar 714 and/or, in some embodiments, create a visual representation of a second type different from avatar 714). In some embodiments, button 746*c* is a modify button that is selectable to modify one or more visual characteristics of a currently selected visual representation (e.g., in FIG. 7N, option 744*a* is centered, so the first visual representation corresponding to option 744*a* is currently selected).

At FIG. 7N, electronic device 700 detects user input 748, which has a leftward direction of movement. In FIG. 7N, user input 748 is a touch swipe input moving to the left on touch-sensitive display 702. However, in some embodiments, user input 748 is a different type of user input, such as a gesture or other action taken by a user. For example, in some embodiments, electronic device 700 is a head-mounted system, and detecting user input 748 includes, for example, detecting a user performing a gesture (e.g., an air gesture (e.g., an air gesture that includes movement of the user's hand to the left)) while electronic device 700 is worn, detecting a user pressing a button while electronic device 700 is worn, detecting a user rotating a rotatable input mechanism while electronic device 700 is worn, detecting a gaze-based gesture (e.g., detecting a user looking at an object and/or moving his or her gaze in a particular manner), and/or any combination of the foregoing.

Figure 7O:
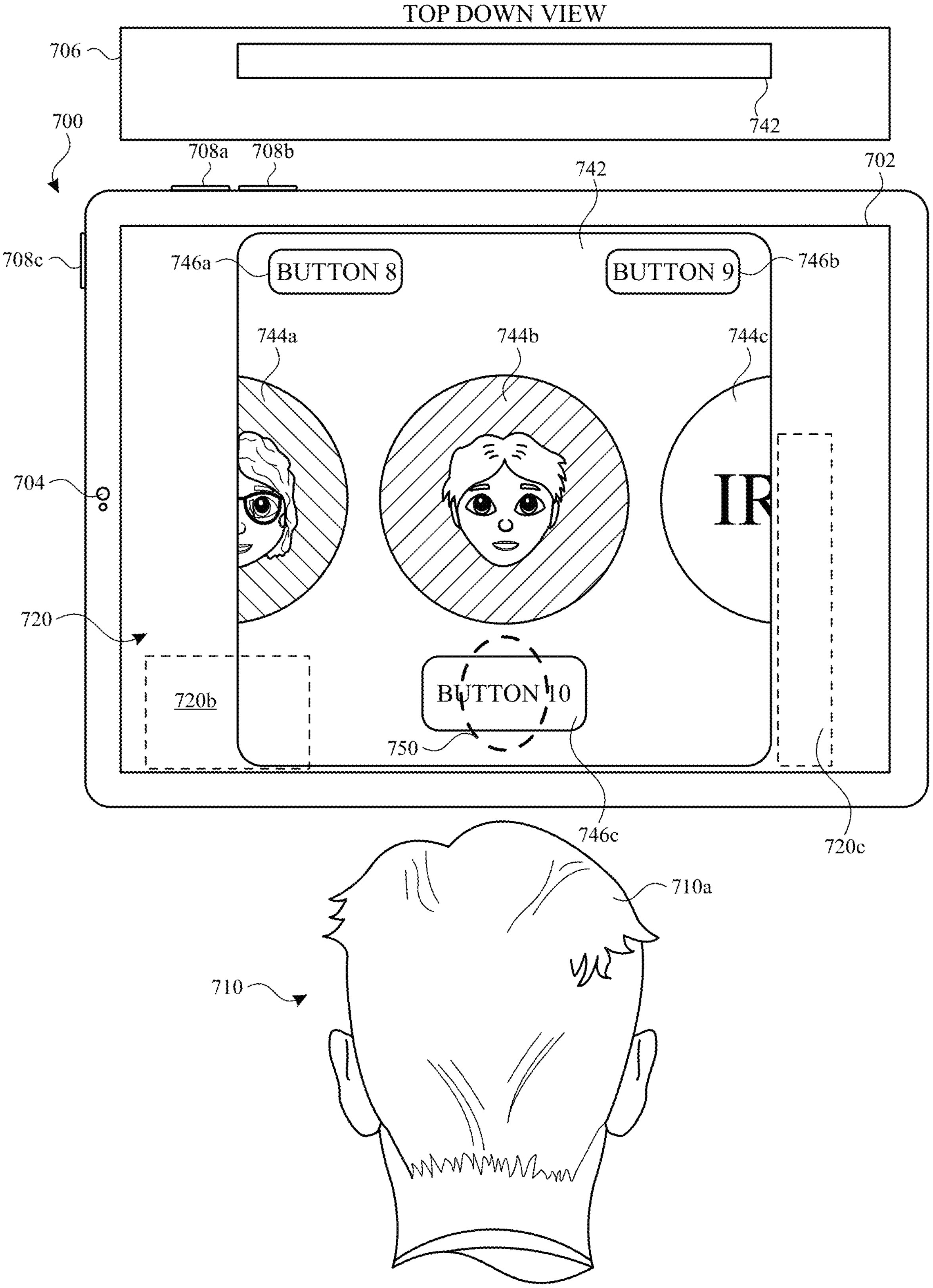
Figure 7P:
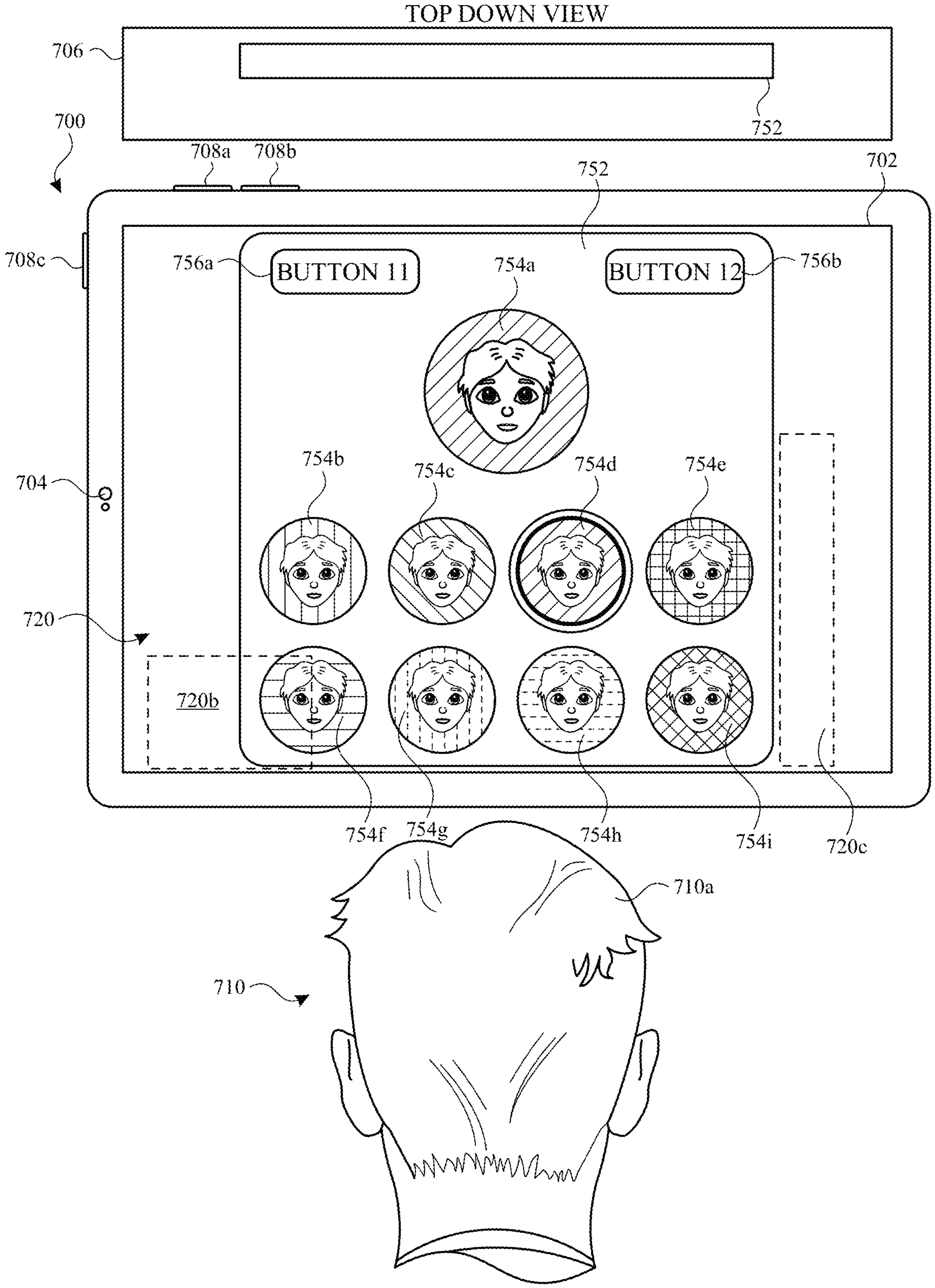

At FIG. 7O, in response to detecting user input 748, electronic device 700 displays options 744*a* and 744*b* moving to the left, and now displays additional option 744*c* corresponding to a third visual representation. In the depicted embodiments, option 744*c* corresponds to a monogram visual representation (e.g., selection of option 744*c* will cause a monogram to visually represent the user for the one or more functions of electronic device 700). In FIG. 7O, while option 744*b* is selected (e.g., displayed in the center of user input 742), electronic device 700 detects user input 750. In FIG. 7O, user input 750 is a touch input (e.g., tap input) on touch-sensitive display 702. However, in some embodiments, user input 750 is a different type of user input, such as a gesture or other action taken by a user. For example, in some embodiments, electronic device 700 is a head-mounted system, and user input 750 includes, for example, detecting a user performing a gesture (e.g., an air gesture (e.g., a pinch air gesture)) while electronic device 700 is worn, detecting a button press while electronic device 700 is worn, detecting rotation of a rotatable input mechanism while electronic device 700 is worn, detecting a gaze-based gesture (e.g., detecting a user looking at an object and/or moving his or her gaze in a particular manner), and/or any combination of the foregoing (e.g., detecting a gaze input directed at an object in conjunction with a pinch air gesture).

At FIG. 7P, in response to detecting user input 750, electronic device 700 displays user interface 752. User interface 752 displays representation 754*a*, which displays the second visual representation (corresponding to option 744*b* of FIG. 7O) with a currently selected set of visual characteristics. User interface 752 also includes a plurality of additional visual characteristic options 754*b*-754*i* that are selectable by a user to change one or more visual characteristics of the second visual representation (e.g., in the depicted embodiment, options 754*b*-754*i* are selectable to change a background of the second visual representation). User interface 752 also includes button 756*a* and button 756*b*. In some embodiments, button 756*a* is a cancel button that is selectable to cease display of user interface 752 and re-display user interface 742 without changing any visual characteristics of the second visual representation. In some embodiments, button 756*b* is a done button that is selectable to cease display of user interface 752 and re-display user interface 742, and also to apply one or more changes to one or more visual characteristics of the second visual representation.

Additional descriptions regarding FIGS. 7A-7P are provided below in reference to method 800 described with respect to FIG. 8 and method 900 described with respect to FIG. 9.

FIG. 8 is a flow diagram of an exemplary method 800 for providing user interfaces for modifying a virtual avatar and/or user representation, in some embodiments. In some embodiments, method 800 is performed at a computer system (e.g., computer system 101 in FIG. 1A) (e.g., a smart phone, a smart watch, a tablet, a laptop, a desktop, a wearable device, and/or head-mounted device) that is in communication with one or more display generation components (e.g., display generation component 120 in FIGS. 1A, 3, and 4) (e.g., a heads-up display, a display, a touchscreen, a projector, a visual output device, a 3D display, a display having at least a portion that is transparent or translucent on which images can be projected (e.g., a see-through display), a projector, a heads-up display, and/or a display controller). In some embodiments, the computer system is, optionally, in communication with one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial)). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

In some embodiments, the computer system (e.g., 700) concurrently displays (802), via the one or more display generation components (e.g., 702): an avatar (804) (e.g., 714) (e.g., an avatar representative of a user (e.g., 710) (e.g., a user of the computer system); a virtual representation of a user (e.g., a user of the computer system); and/or a virtual representation of at least a portion of a user (e.g., a user of the computer system)) at a first location in a three-dimensional environment (e.g., 720) (e.g., a virtual reality or augmented reality environment that includes representations of one or more real objects and/or one or more virtual objects) (e.g., a first simulated depth, a first simulated distance from a viewpoint of a user of the computer system; and/or a first depth in a depth dimension); and a respective user interface (806) (e.g., 712) (e.g., a user interface that is planar; includes a planar surface; and/or defines a plane) that includes one or more controls (e.g., 718*a*-718*c*) for editing a visual appearance of the avatar (e.g., 714) (e.g., a user interface that includes a first control (e.g., first object, first button, and/or first slider) corresponding to a first visual characteristic of the avatar (e.g., eyewear, brightness, temperature, color, clothes, accessories, hairstyle, and/or hair color) (e.g., a first control that is selectable to initiate a process for modifying the first visual characteristic of the avatar (e.g., without modifying a second visual characteristic of the avatar)) and a second control corresponding to a second visual characteristic (e.g., eyewear, brightness, temperature, color, clothes, accessories, hairstyle, and/or hair color) different from the first visual characteristic) (e.g., a second control that is selectable to initiate a process for modifying the second visual characteristic of the avatar (e.g., without modifying the first visual characteristic of the avatar)) that are incorporated into a surface that is displayed proximate to the avatar but is spaced apart from the avatar in a simulated depth dimension of the three-dimensional environment relative to a viewpoint of a user (e.g., in FIG. 7A, user interface 712 is spaced apart from avatar 714, as shown by the top down view in FIG. 7A) (e.g., a user of the computer system) (e.g., in front of the avatar; behind the avatar; closer to the user of the computer system than the avatar; and/or farther from the user of the computer system than the avatar). While concurrently displaying the avatar and the respective user interface (808), the computer system detects (810) an input (e.g., 726, 728) (e.g., a touch input, a gesture input, an air gesture, and/or a gaze input) directed to a control in the respective user interface (e.g., objects 718*a*-1 through 718*a*-9 in user interface 712) (e.g., a control to modify one or more visual characteristics of the avatar). In response to detecting the input directed to the control in the respective user interface (812), the computer system changes (814) an appearance of the avatar based on the input (e.g., in response to user input 726, avatar 714 is displayed with a first set of eyewear (FIG. 7I), and in response to user input 728, avatar 714 is displayed with a second set of eyewear (FIG. 7J)). In some embodiments, the avatar and the respective user interface are displayed within a three-dimensional environment (e.g., a virtual three-dimensional environment, a virtual passthrough three-dimensional environment, and/or an optical passthrough three-dimensional environment). Providing a user with one or more controls to modify the appearance of an avatar reduces the number of inputs needed to perform this operation. Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the avatar (e.g., 714) is positioned in front of the surface (e.g., 712) relative to a viewpoint of the user (e.g., 710) (e.g., the avatar is closer to the viewpoint of the user than the surface on which the respective user interface is displayed and/or the avatar appears closer to the viewpoint of the user than the surface on which the respective user interface is displayed). Providing a user with one or more controls to modify the appearance of an avatar reduces the number of inputs needed to perform this operation. Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the avatar (e.g., 714) is positioned behind the surface (e.g., 712) relative to a viewpoint of the user (e.g., 710) (e.g., the avatar is further from the viewpoint of the user than the surface on which the respective user interface is displayed and/or the avatar appears further from the viewpoint of the user than the surface on which the respective user interface is displayed). Providing a user with one or more controls to modify the appearance of an avatar reduces the number of inputs needed to perform this operation. Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 700 and/or X700) concurrently displays, via the one or more display generation components (e.g., 702 and/or X702): the avatar (e.g., 714) at a first avatar location in the three-dimensional environment (e.g., 720); and the respective user interface (e.g., 712) incorporated into the surface at a first user interface location in the three-dimensional environment (e.g., 720) that is proximate to the avatar but is spaced apart from the avatar in a simulated depth dimension of the three-dimensional environment relative to a viewpoint of the user (e.g., in FIG. 7A, user interface 712 is spaced apart from avatar 714, as shown in the top down view). While concurrently displaying the avatar at the first avatar location in the three-dimensional environment and the respective user interface at the first user interface location in the three-dimensional environment, the computer system detects, via one or more input devices (e.g., 702, 704, and/or 708*a-c*) (in some embodiments, the computer system is optionally in communication with one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor); one or more mechanical input devices (e.g., a depressible input mechanism; a button; a rotatable input mechanism; a crown; and/or a dial)), one or more optical sensors (e.g., one or more sensors that detects changes in the viewpoint of a user as the user and/or the head of the user moves), and/or one or more motion sensors (e.g., accelerometer, gyroscope, and/or other motion sensors)), movement by the user (e.g., 710) (e.g., lateral movement by the user, movement of the user's torso, and/or movement of the user's body from a first position to a second position). In response to detecting the movement by the user, the computer system (e.g., 700) displays, via the one or more display generation components (e.g., 702), movement of the avatar (e.g., 714) from the first avatar location in the three-dimensional environment to a modified avatar location in the three-dimensional environment different from the first avatar location in the three-dimensional environment while maintaining display of the respective user interface incorporated into the surface at the first user interface location in the three-dimensional environment (e.g., in FIGS. 7B1-7D, user 710 moves to the right, and avatar 714 moves within three-dimensional environment 720 while user interface 712 does not move within three-dimensional environment 720). In some embodiments, the avatar moves in a direction that corresponds to a direction of movement by the user (e.g., the avatar mirrors movement by the user). In some embodiments, the avatar follows the user's movement while the respective user interface remains locked to the three-dimensional environment (e.g., the user interface is a world-locked and/or environment-locked user interface element). Moving an avatar in response to user movement reduces the number of inputs needed to perform this operation and enables this operation to be performed without displaying additional controls. Furthermore, keeping the respective user interface in the same position while the avatar moves enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the avatar is configured to move in a first direction (e.g., horizontally relatively to the viewpoint of the user and/or relative to the surface on which the respective user interface is displayed), and is not configured to move in a second direction (e.g., vertically and/or in the simulated depth direction relative to the viewpoint of the user and/or relative to the surface on which the respective user interface is displayed) different from the first direction (e.g., in some embodiments, avatar 714 is configured to move horizontally (e.g., left and right), but is not configured to move vertically (e.g., up and down)). In some embodiments, displaying movement of the avatar from the first avatar location in the three-dimensional environment to the modified avatar location in the three-dimensional environment comprises displaying movement of the avatar in the first direction (e.g., a first permitted direction) without moving the avatar in the second direction (e.g., a second direction in which movement of the avatar is not permitted) (e.g., in FIGS. 7B1-7D, avatar 714 is shown moving left and right without moving vertically (e.g., up or down)). In some embodiments, movement of the avatar is limited in one or more directions. In some embodiments, the avatar is permitted to move and/or able to move a first distance in a first direction (e.g., horizontally, left, right, vertically, up, and/or down) (e.g., the avatar is prevented from moving and/or stops moving when the user attempts to move beyond the first distance in the first direction and/or the avatar ceases to be displayed when the user attempts to move beyond the first distance in the first direction) (e.g., avatar 714 is permitted to move a certain distance horizontally (e.g., in FIGS. 7B1-7E, when user 710 moves more than a threshold amount horizontally, avatar 714 stops being displayed)); and the avatar is permitted to move and/or able to move a second distance in a second direction (e.g., vertically, up, down, horizontally, left, and/or right) (e.g., the avatar is prevented from moving and/or stops moving when the user attempts to move beyond the second distance in the second direction and/or the avatar ceases to be displayed when the user attempts to move beyond the second direction in the second direction) (e.g., avatar 714 is permitted to move a certain distance vertically (e.g., in FIGS. 7F-7G, when the user moves vertically, the avatar 714 becomes cropped)), wherein the first direction is greater than the second direction (e.g., the avatar is permitted to move a greater distance in the first direction than in the second direction and/or the avatar has limited movement in the second direction) (e.g., in FIGS. 7B1-7G, avatar 714 is permitted greater freedom of movement horizontally than vertically). In some embodiments, the first distance is an unlimited distance. Limiting movement of the avatar in one or more directions enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while concurrently displaying the avatar (e.g., 714) at the first avatar location in the three-dimensional environment (e.g., 720) and the respective user interface (e.g., 712) at the first user interface location in the three-dimensional environment (e.g., 720), the computer system detects, via the one or more input devices (e.g., 704), second movement by the user (e.g., 710) (e.g., lateral movement by the user, movement of the user's torso, movement of the user's head, and/or movement of the user's body from a first position to a second position). In response to detecting the second movement by the user: in accordance with a determination that the second movement by the user exceeds a distance threshold (e.g., the user has moved greater than a threshold distance (e.g., greater than a threshold distance from the first avatar location in the three-dimensional environment and/or greater than a threshold distance from the respective user interface)), the computer system displays, via the one or more display generation components (e.g., 702), movement of the respective user interface (e.g., 712) incorporated into the surface from the first user interface location in the three-dimensional environment (e.g., 720) to a modified user interface location in the three-dimensional environment different from the first user interface location in the three-dimensional environment (e.g., in FIGS. 7E-7F, based on a determination that user 710 has moved greater than a threshold amount, user interface 712 is moved from a first position within three-dimensional environment 720 (e.g. in front of object 720*a*) to a second position within three-dimensional environment 720 (e.g., in front of objects 720*b* and 720*c*)). In some embodiments, the modified user interface location is selected based on a viewpoint of the user (e.g., 710) at the time the respective user interface is moved (e.g., moving the respective user interface to be positioned in front of the viewpoint of the user and a pre-defined distance away from the viewpoint of the user). In some embodiments, in response to detecting the second movement of the user: in accordance with a determination that the second movement by the user does not exceed the distance threshold (e.g., the user has not moved greater than the threshold distance (e.g., greater than a threshold distance from the first avatar location in the three-dimensional environment and/or greater than a threshold distance from the respective user interface)), the computer system maintains display of the respective user interface incorporated into the surface at the first user interface location in the three-dimensional environment (e.g., in FIGS. 7B1-7E, user interface 712 is maintained at its position within three-dimensional environment 720 even as user 710 moves). Automatically moving the user interface when the user moves beyond a distance threshold reduces the number of inputs needed to perform this operation and enables this operation to be performed without displaying additional controls. Furthermore, doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while concurrently displaying the avatar (e.g., 714) at the first avatar location in the three-dimensional environment (e.g., 720) and the respective user interface (e.g., 712) at the first user interface location in the three-dimensional environment, the computer system (e.g., 700) detects, via the one or more input devices (e.g., 704), third movement by the user (e.g., 710) (e.g., lateral movement by the user, movement of the user's torso, and/or movement of the user's body from a first position to a second position). In response to detecting the third movement by the user: in accordance with a determination that the third movement by the user exceeds a second distance threshold (e.g., a second distance threshold different from the distance threshold) (e.g., the user has moved greater than a second threshold distance (e.g., greater than a second threshold distance from the first avatar location in the three-dimensional environment and/or greater than a second threshold distance from the respective user interface)), the computer system ceases display of the avatar (e.g., 714) while maintaining display of the respective user interface (e.g., 712) incorporated into the surface at the first user interface location in the three-dimensional environment (e.g., 720) (e.g., in FIGS. 7D-7E, in response to movement by user 710, electronic device 700 ceases display of avatar 714 while maintaining display of user interface 712). Ceasing display of the avatar when the user moves beyond a second threshold distance enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., the device has detected movement of the user and/or the movement of the user exceeds a distance threshold).

In some embodiments, while concurrently displaying the avatar (e.g., 714) at the first avatar location in the three-dimensional environment (e.g., 720) and the respective user interface (e.g., 712) at the first user interface location in the three-dimensional environment (e.g., 720), the computer system (e.g., 700) detects, via the one or more input devices (e.g., 704), fourth movement by the user (e.g., 710) (e.g., lateral movement by the user, movement of the user's torso, and/or movement of the user's body from a first position to a second position). In response to detecting the fourth movement by the user: in accordance with a determination that the fourth movement by the user exceeds a third distance threshold (e.g., the user has moved greater than a third threshold distance (e.g., greater than a third threshold distance from the first avatar location in the three-dimensional environment and/or greater than a third threshold distance from the respective user interface)), the computer system ceases display of the avatar (e.g., 714) while maintaining display of the respective user interface (e.g., 712) incorporated into the surface at the first user interface location in the three-dimensional environment (e.g., 720) (e.g., in FIG. 7E, electronic device 700 ceases display of avatar 714 and maintains display of user interface 712); and in accordance with a determination that the fourth movement by the user exceeds a fourth distance threshold different from the third distance threshold (e.g., a fourth distance threshold that is greater (e.g., a larger distance) than the third distance threshold) (e.g., the user has moved greater than a fourth threshold distance (e.g., greater than a fourth threshold distance from the first avatar location in the three-dimensional environment and/or greater than a fourth threshold distance from the respective user interface)): the computer system (e.g., 700) displays, via the one or more display generation components (e.g., 702), movement of the respective user interface (e.g., 712) incorporated into the surface from the first user interface location in the three-dimensional environment to a second user interface location in the three-dimensional environment different from the first user interface location in the three-dimensional environment (e.g., in FIGS. 7E-7F, based on movement by user 710, user interface 712 is moved from a first position within user interface 720 (e.g., in front of object 720*a*) to a second position within user interface 720 (e.g., in front of objects 720*b*, 720*c*)); and displays, via the one or more display generation components (e.g., 702), the avatar (e.g., 714) at a second avatar location in the three-dimensional environment (e.g., FIG. 7F). In some embodiments, the second user interface location in the three-dimensional environment and the second avatar location in the three-dimensional environment are centered on a viewpoint of the user after the fourth movement by the user (e.g., in FIG. 7F, avatar 714 and user interface 712 are centered on a viewpoint of user 710); and the second user interface location in the three-dimensional environment is proximate to the second avatar location in the three-dimensional environment but is spaced apart from the second avatar location in the three-dimensional environment in a simulated depth dimension of the three-dimensional environment relative to a viewpoint of the user after the fourth movement by the user (e.g., in FIG. 7F, user interface 712 is proximate to avatar 714, but is spaced apart from avatar 714 (e.g., is positioned behind avatar 714 from the viewpoint of user 710)). In some embodiments, the second user interface location and the second avatar location are selected based on a viewpoint of the user after the fourth movement by the user. Automatically maintaining the respective user interface at its some position when the user moves less than a fourth distance threshold, and automatically moving the user interface when the user moves beyond the fourth distance threshold reduces the number of inputs needed to perform these operations and enables these operations to be performed without displaying additional controls. Furthermore, doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, while concurrently displaying the avatar (e.g., 714) and the respective user interface (e.g., 712) incorporated into the surface, the computer system (e.g., 700) detects, via one or more input devices (e.g., 704) (in some embodiments, the computer system is optionally in communication with one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; a biometric sensor (e.g., a fingerprint sensor, a face identification sensor, a gaze tracking sensor, and/or an iris identification sensor); and/or one or more mechanical input devices (e.g., a depressible input mechanism; a button; a rotatable input mechanism; a crown; and/or a dial))), fifth movement by the user (e.g., 710) (e.g., lateral movement by the user, movement of the user's torso, and/or movement of the user's body from a first position to a second position). In response to detecting the fifth movement by the user: in accordance with a determination that the fifth movement by the user includes movement in a third direction (e.g., upwards and/or downwards) that exceeds a threshold distance of movement in the third direction, the computer system crops (e.g., ceasing display of) at least a portion of the avatar (e.g., 714) (e.g., in FIGS. 7F-7G, user 710 moves vertically, and electronic device crops a bottom portion of avatar 714 in FIG. 7G). In some embodiments, in response to detecting the fifth movement by the user: in accordance with a determination that the fifth movement by the user includes movement in the third direction, the computer system displays movement of the user in the third direction (e.g., displays movement of the user in one or more directions that correspond to the fifth movement by the user, and that includes the third direction) (e.g., in FIGS. 7F-7G, in response to vertical movement by user 710, electronic device 700 displays vertical movement by avatar 714). In some embodiments, in response to detecting the fifth movement by the user: in accordance with a determination that the fifth movement by the user does not include movement in the third direction, the computer system forgoes cropping the avatar (e.g., maintains display of the avatar without cropping the avatar) (in some embodiments, the computer system displays movement of the avatar in a direction (e.g., one or more directions) that corresponds to the fifth movement by the user) (e.g., in FIGS. 7B1-7D, electronic device 700 and/or HMD X700 displays horizontal movement of avatar 714 without cropping avatar 714). In some embodiments, in response to detecting the fifth movement by the user: in accordance with a determination that the fifth movement by the user includes movement in the third direction but does not exceed the threshold distance of movement in the third direction (e.g., the user moves in the third direction but the movement in the third direction does not exceed the threshold distance of movement in the third direction), the computer system forgoes cropping the avatar (e.g., maintains display of the avatar without cropping the avatar) (in some embodiments, the computer system displays movement of the avatar in a direction (e.g., one or more directions) that corresponds to the fifth movement by the user). Automatically cropping a portion of the avatar if the user moves too far in a particular direction enhances the operability of the system and makes the user-system interface more efficient (e.g., by helping the user to provide proper inputs and reducing errors) which, additionally, reduces power usage and improves battery life of the device by enabling the user to use the system more quickly and efficiently. Furthermore, doing so also provides the user with visual feedback about a state of the device (e.g., that the device has detected the movement by the user and/or the user has moved beyond a threshold distance permitted by the device in the third direction).

In some embodiments, displaying the avatar (e.g., 714) comprises displaying the avatar (e.g., 714) at a height relative to a floor of a three-dimensional environment (e.g., 720) (e.g., a physical environment in which the computer system is located or a virtual environment that corresponds to the physical environment) that corresponds to a height of the user (e.g., 710) (e.g., the avatar is displayed so that the head (e.g., 714*a*) of the avatar (e.g., 714) is displayed in front of the head (e.g., 710*a*) of the user (e.g., 710); the avatar (e.g., 714) has the same height as the user (e.g., 710); and/or the avatar (e.g., 714) is displayed at the head height of the user (e.g., 710)). In some embodiments, the height of the user is determined based on user profile information. In some embodiments, the height of the user is determined based on detecting the height of the user. In some embodiments, the height of the user is determined based on detecting a distance of the computer system from the floor. Displaying the avatar at a height that corresponds to the height of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the avatar (e.g., 714) comprises displaying the avatar at a predetermined height in a three-dimensional environment (e.g., 720) (e.g., a virtual environment and/or a passthrough environment) (e.g., the avatar is displayed at the same height for multiple (e.g., all) users, regardless of the height of the user; and/or the avatar is displayed at a predetermined "average" height). Displaying the avatar at a predetermined height enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, displaying the avatar (e.g., 714) comprises displaying that avatar at a scale that corresponds to a size of the user (e.g., 714) (e.g., at 1:1 scale or approximately a 1:1 scale with the user, such as being within 15%, 10%, or 5% of a 1:1 scale with the user) (e.g., avatar 714 is displayed at the same size as user 710) (e.g., the avatar is displayed at a various sizes based on a distance from a viewpoint of the user such that the avatar is presented to the user with a 1:1 scale between the avatar and the user) (in some embodiments, the avatar is displayed at a different size for different users; in some embodiments, the avatar is displayed at the same scale (e.g., 1:1) for all users). Displaying the avatar at a size that corresponds to the size of the user enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, aspects/operations of methods 800 and/or 900 may be interchanged, substituted, and/or added between these methods. For example, the avatar recited in method 800 is the avatar recited in method 900. For brevity, these details are not repeated here.

FIG. 9 is a flow diagram of an exemplary method 900 for providing user interfaces for selecting a virtual avatar and/or user representation, in some embodiments. In some embodiments, method 900 is performed at a computer system (e.g., computer system 101 in FIG. 1A, 700, and/or X700) (e.g., a smart phone, a smart watch, a tablet, a laptop, a desktop, a wearable device, and/or head-mounted device) that is in communication with one or more display generation components (e.g., X702, display generation component 120 in FIGS. 1A, 3, and 4) (e.g., a heads-up display, a display, a touchscreen, a projector, a visual output device, a 3D display, a display having at least a portion that is transparent or translucent on which images can be projected (e.g., a see-through display), a projector, a heads-up display, and/or a display controller) and one or more input devices (e.g., a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; and/or a biometric sensor (e.g., a fingerprint sensor, a face identification sensor, a gaze tracking sensor, and/or an iris identification sensor)). In some embodiments, method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

In some embodiments, the computer system (e.g., 700) displays (902), via the one or more display generation components (e.g., 702), a representation of an avatar (e.g., 714) that was generated (e.g., automatically generated by a computer system) to have an appearance based on an appearance of a person (e.g., 710) using image-based user information corresponding to the person (e.g., one or more images of the person; one or more facial scans of the person; and/or one or more eye scans of the person). The computer system receives (904), via the one or more input devices (e.g., 702, 704, and/or 708*a*-708*c*), a first set of inputs (e.g., 734 and/or X734) (e.g., one or more user inputs) (e.g., one or more inputs on a touch-sensitive surface (e.g., one or more tap inputs and/or one or more swipe inputs no the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to a decision not to use the avatar for one or more functions of the computer system (e.g., user input 734 and/or X734 corresponds to a user request to delete avatar 714) (e.g., a request to delete the avatar or a request to forgo use of the avatar to represent the person and/or a user of the device in one or more contexts such as in a real-time communication session, to represent the person and/or the user of the device in an asynchronous communication such as instant messages, text, or email, or to represent the person and/or the user of the device during a content sharing or collaboration session). In response to receiving the first set of user inputs (e.g., 734 and/or X734) corresponding to a decision not to use the avatar (e.g., 714) for the one or more functions of the computer system (906), the computer system displays (908), via the one or more display generation components (e.g., 702), a selectable user interface object (e.g., 738*b*) (e.g., a virtual object and/or a virtual button) that is selectable to indicate a user request to use an alternate visual representation of the person different from the avatar to represent the person (e.g., 710) (e.g., for at least some of the one or more functions of the computer system; to represent the user and/or person in a virtual environment; and/or to represent the user and/or person in interactions with other users (e.g., virtual calls, virtual meetings, and/or virtual transactions)). While displaying the selectable user interface object (e.g., 738*b*) (910), the computer system receives (912), via the one or more input devices (e.g., 702, 704, and/or 708*a*-708*c*), a second set of user inputs (e.g., 740) corresponding to selection of the selectable user interface object (e.g., 738*b*) (e.g., one or more user inputs) (e.g., one or more inputs on a touch-sensitive surface (e.g., one or more tap inputs and/or one or more swipe inputs no the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures). In response to receiving the second set of user inputs (914), the computer system (e.g., 700) displays (916), via the one or more display generation components (e.g., 702), one or more alternative options (e.g., 744*a*-744*c*) that can be used to represent the person (e.g., 710) for the one or more functions of the computer system (e.g., without displaying the avatar) (in some embodiments, in response to receiving the second set of user inputs, the computer system causes an external device separate from the computer system (e.g., a separate computer system; a separate computer system corresponding to a different user; and/or a separate computer system participating in a communication session with the computer system) to display the alternate visual representation of the person (e.g., without displaying the avatar)). Providing a user with the option to use an alternative visual representation in response to a user decision not to use an avatar reduces the number of inputs needed to perform this operation. Doing so also enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the one or more alternative options (e.g., 744*a*-744*c*) includes a first alternative avatar (e.g., 744*a*-744*c*) that was not generated using image-based user information corresponding to the person (e.g., was not generated using one more images, one or more facial scans, and/or one or more eye scans of the person; and/or was generated based on one or more user selections by a user without image-based user information corresponding to the person) (e.g., in some embodiments, representations 744*a*-744*c* are created by a user without using image-based user information corresponding to person 710). Displaying an alternative avatar option that is selectable by a user to use the alternative avatar option for the one or more functions of the computer system reduces the number of inputs needed to perform this operation.

In some embodiments, the one or more alternative options includes a second alternative option (e.g., 744*c*) that is a text representation of a user (e.g., one or more letters; one or more letters selected by the person; one or more letters automatically selected (e.g., based on the name of the person such as a monogram); and/or one or more letters that correspond to the name of a person). Displaying a monogram option that is selectable by a user to use a monogram for the one or more functions of the computer system reduces the number of inputs needed to perform this operation.

In some embodiments, the one or more alternative options include at least one alternative option (e.g., 744*a*-744*c*) (in some embodiments, an alternative avatar that was not generated using image based user information corresponding to the person (e.g., was not generated using one more images, one or more facial scans, and/or one or more eye scans of the person; and/or was generated based on one or more user selections by a user without image-based user information corresponding to the person)) that is retrieved from a remote server based on user account information corresponding to the person (e.g., 710) (e.g., one or more virtual representation options that are stored on a cloud server and associated with the user account of the person) (in some embodiments, the at least one alternative option that is retrieved from the remote server is used for one or more functions of the computer system and/or for one or more functions associated with the user account (e.g., one or more watch faces associated with the user account, within messaging user interfaces (e.g., on the computer system and/or on other users' computer systems) to visually represent the user account, within user interfaces (e.g., on the computer system, on other computer systems associated with the user account, and/or other computer systems not associated with the user account) to visually represent the user account, in one or more automatically generated stickers, in one or more camera augmentation options (e.g., camera augmentation within a camera application and/or within a real-time communication application), and/or in one or more videos and/or video augmentation options)). Displaying one or more alternative options that are retrieved from a remote server based on user account information corresponding to the person reduces the number of inputs needed to perform this operation.

In some embodiments, while displaying the one or more alternative options (e.g., 744*a*-744*c*) that can be used to represent the person (e.g., 710) for the one or more functions of the computer system (e.g., 710), the computer system receives, via the one or more input devices (e.g., 702, 704, and/or 708*a*-708*c*), a third set of user inputs (e.g., 748) (e.g., one or more user inputs) (e.g., one or more inputs on a touch-sensitive surface (e.g., one or more tap inputs and/or one or more swipe inputs no the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to a request to scroll the one or more alternative options (e.g., 744*a*-744*c*). In response to receiving the third set of user inputs (e.g., 748), the computer system displays, via the one or more display generation components (e.g., 702), scrolling of the one or more alternative options (e.g., in FIGS. 7N-7O, options 744*a*-744*c* are scrolled in response to user input 748). Allowing a user to provide a user input to scroll through the one of more alternative options reduces the number of inputs needed to perform this operation and also allows the user to perform this operation without displaying additional user interface elements. Furthermore, doing so also allows a user to access multiple options without having to crowd the display with all of the available options.

In some embodiments, the computer system (e.g., 700) displays, via the one or more display generation components (e.g., 702), and concurrently with the one or more alternative options (e.g., 744*a*-744*c*) that can be used to represent the person (e.g., 710) for the one or more functions of the computer system, a second selectable user interface object (e.g., 746*b*) (e.g., a virtual object and/or a virtual button) that is selectable to indicate a user request to create a new alternative option that can be used to represent the person for the one or more functions of the computer system (e.g., to create a new virtual avatar and/or a new animated and/or virtual representation of the user) (e.g., in some embodiments, button 746*b* is a "create new" button that is selectable to initiate a process for creating a new visual representation (e.g., in some embodiments, create a new avatar 714 and/or, in some embodiments, create a visual representation of a second type different from avatar 714)). While displaying the second selectable user interface object (e.g., **746*b*), the computer system receives, via the one or more input devices (e.g., 702, 704, and/or 708*a*-708*c*), a user input (e.g., one or more user inputs) (e.g., one or more inputs on a touch-sensitive surface (e.g., one or more tap inputs and/or one or more swipe inputs no the touch-sensitive surface); one or more gestures; one or more voice inputs; one or more gaze inputs; one or more mechanical inputs via one or more mechanical input mechanisms (e.g., one or more physical buttons, one or more physical dials, and/or one or more physical crowns); and/or one or more air gestures) corresponding to selection of the second selectable user interface object (e.g., a user input corresponding to selection of button 746*b*). In response to receiving the user input corresponding to selection of the second selectable user interface object (e.g., 746*b*), the computer system (e.g., 700**) initiates a process to create a new alternative option that can be used to represent the person for the one or more functions of the computer system (e.g., displays a user interface that includes one or more selectable objects for designing a new alternative option that can be used to represent the user for the one or more functions of the computer system (e.g., a new virtual avatar and/or a new virtual representation of the user)). Displaying a second selectable user interface object that is selectable to indicate a user request to create a new alternative option that can be used to represent the person for the one or more functions of the computer system reduces the number of inputs needed to perform this operation.

In some embodiments, the computer system (e.g., 700) displays, via the one or more display generation components (e.g., 702), a representation of the person for a first function of the one or more functions of the computer system, including: in accordance with a determination that a first virtual avatar (e.g., **744*a*-744*c*) (e.g., a non-image-based virtual avatar (e.g., a memoji)) is selected (e.g., by a user and/or based on one or more user settings) to represent the person (e.g., 710) for the first function (in some embodiments, the first virtual avatar is a non-image-based avatar and/or is generated without using image-based user information corresponding to the person (e.g., without using photographs, facial scans, and/or eye scans corresponding to the person)), displaying, via the one or more display generation components (e.g., 702), the first virtual avatar (e.g., 744*a*-744*c*) within a virtual user interface element that surrounds at least a portion of the first virtual avatar (e.g., representations 744*a*-744*c* are displayed with a circular object displayed behind the user representation/avatar) (e.g., a shape, frame, and/or portal that surrounds at least a portion of the first virtual avatar); and in accordance with a determination that a first image-based avatar (e.g., 714) is selected (e.g., by a user and/or based on one or more user settings) to represent the person (e.g., 710) for the first function, the first image-based avatar (e.g., 714) being generated to have an appearance based on an appearance of the person (e.g., 710) using image-based user information corresponding to the person, displaying, via the one or more display generation components, the first image-based avatar without displaying a virtual user interface element that surrounds the first image-based avatar (e.g., avatar 714 is displayed without the circular object in the background that is used in representations 744*a*-744*c***) (e.g., the first image-based avatar is displayed without a surrounding virtual user interface element, and/or the first image-based avatar is overlaid directly on a passthrough environment without a surrounding virtual user interface element between the first image-based avatar and the passthrough environment). Displaying the first visual avatar within a virtual user interface element and displaying the first image-based avatar without the virtual user interface elements provides the user with feedback about the state of the device (e.g., the device has detected that the user has selected either the first virtual avatar or the first image-based avatar to represent the user).

In some embodiments, displaying the first virtual avatar (e.g., **744*a*-744*b*) within the virtual user interface element that surrounds at least a portion of the first virtual avatar (e.g., the circular object behind representations 744*a*-744*b*) comprises displaying one or more virtual hands of the first virtual avatar within (e.g., completely within and/or at least partially within) the virtual user interface element (e.g., in some embodiments, one or more virtual hands of representation 744*a* are shown within the circular background object displayed behind representation 744*a*). In some embodiments, while displaying the first virtual avatar (e.g., 744*a*-744*b*) within the virtual user interface element that surrounds at least a portion of the first virtual avatar (e.g., the circular object displayed behind representations 744*a*-744*b*), including displaying one or more virtual hands of the first virtual avatar within the virtual user interface element, the computer system (e.g., 700) detects one or more inputs from a user (e.g., 710) (e.g., a user of the computer system) (e.g., one or more movements of a hand (e.g., 710*b*) and/or one or more hands of the user (e.g., 700)); and, in response to detecting the one or more inputs from the user, the computer system displays, via the one or more display generation components (e.g., 702**), movement of the one or more virtual hands of the first virtual avatar within the virtual user interface element. In some embodiments, the first function of the one or more functions of the computer system is an enrollment function. In some embodiments, the first virtual avatar, including the one or more hands of the first virtual avatar, is displayed within the virtual user interface element during an enrollment process (e.g., during a process in which the user is being enrolled on to the computer system, during a process in which a user account corresponding to the user is being created, and/or during a process in which a biometric profile corresponding to the user is being enrolled and/or created on the computer system (e.g., a hand movement profile and/or a user movement profile)). In some embodiments, the first of the one or more functions of the computer system is a real-time communication function, and the first virtual avatar, including the one or more hands of the first virtual avatar, is displayed within the virtual user interface element during a real-time communication session. Displaying virtual hands corresponding to the first virtual avatar provides the user with feedback about the state of the device (e.g., the device is configured to detect and reflect movement by the person's hands).

In some embodiments, displaying the first virtual avatar (e.g., **744*a*-744*b*) within the virtual user interface element that surrounds at least a portion of the first virtual avatar (e.g., the circular object displayed behind representations 744*a*-744*b*) comprises displaying a head of the first virtual avatar within the virtual user interface element (e.g., as shown in FIG. 7N) and displaying one or more virtual hands of the first virtual avatar outside (e.g., completely outside of and/or at least partially outside of) of the virtual user interface element (e.g., one or more virtual hands that extend, at least partially and/or completely, outside of the circular object displayed behind representations 744*a*-744*b*). In some embodiments, while displaying the first virtual avatar (e.g., 744***a* and/or 744*b*), including displaying the head of the first virtual avatar within the virtual user interface element (e.g., the circular object displayed behind representations 744*a*-744*b*) and displaying the one or more virtual hands of the first virtual avatar outside of the virtual user interface element (e.g., the circular object displayed behind representations 744*a*-744*b*), the computer system (e.g., 700) detects one or more inputs from a user (e.g., 710) (e.g., a user of the computer system) (e.g., one or more movements of a hand (e.g., 710*b*) and/or one or more hands of the user); and, in response to detecting the one or more inputs from the user, the computer system displays, via the one or more display generation components (e.g., 702), movement of the one or more virtual hands of the first virtual avatar outside of the virtual user interface element (e.g., the circular object displayed behind representations 744*a*-744*b*) (e.g., while maintaining display of the head of the first virtual avatar within the virtual user interface element). In some embodiments, the first function of the one or more functions of the computer system is an enrollment function. In some embodiments, the first virtual avatar (e.g., 744*a* and/or 744*b*) is displayed (e.g., with the head within the virtual user interface element and the one or more virtual hands outside of the virtual user interface element) during an enrollment process (e.g., during a process in which the user is being enrolled on to the computer system, during a process in which a user account corresponding to the user (e.g., 710) is being created, and/or during a process in which a biometric profile corresponding to the user (e.g., 710) is being enrolled and/or created on the computer system (e.g., a hand movement profile and/or a user movement profile)). In some embodiments, the first of the one or more functions of the computer system is a real-time communication function, and the first virtual avatar (e.g., 744*a* and/or 744*b*) is displayed (e.g., with the head within the virtual user interface element and the one or more virtual hands outside of the virtual user interface element) during a real-time communication session. Displaying virtual hands corresponding to the first virtual avatar provides the user with feedback about the state of the device (e.g., the device is configured to detect and reflect movement by the person's hands).

In some embodiments, in response to receiving the first set of user inputs (e.g., 734 and/or X734) corresponding to the decision not to use the avatar (e.g., 714) for the one or more functions of the computer system (e.g., 700), the computer system displays, via the one or more display generation components (e.g., 702), and concurrently with the selectable user interface object (e.g., 738*b*), a third selectable user interface object (e.g., 738*c*) that is selectable to indicate a user request to recapture image-based user information (e.g., capture one or more photographs, facial scans, and/or eye scans) to generate a new avatar (e.g., 714) that has an appearance based on an appearance of the person (e.g., 710) using image-based user information corresponding to the person. Displaying a third selectable user interface object that is selectable to indicate a user request to recapture image-based user information to generate a new avatar that has an appearance based on an appearance of the person using image-based user information corresponding to the person reduces the number of inputs needed to perform this operation.

In some embodiments, in response to receiving the first set of user inputs (e.g., 734 and/or X734) corresponding to the decision not to use the avatar (e.g., 714) for the one or more functions of the computer system (e.g., 700), the computer system (e.g., 700) outputs (e.g., displays or plays), via one or more output generation components (e.g., one or more display generation components (e.g., 702) and/or one or more audio generation components), and concurrently with the selectable user interface object (e.g., 738*b*), one or more instructions (e.g., 737) (e.g., textual instructions, audio instructions, visual instructions, graphical instructions, tips and/or suggestions) for generating a new avatar (e.g., a new avatar that has an appearance based on an appearance of a person using image-based user information corresponding to the person) (in some embodiments, one or more instructions for re-capturing image-based user information corresponding to the person) (e.g., one or more instructions instructing the user to move to a location that has better lighting, to use better lighting, and/or one or more instructions instructing the user on how to hold and/or move the computer system). Displaying one or more instructions for generating a new avatar enhances the operability of the system and makes the user-system interface more efficient (e.g., by helping the user to provide proper inputs and reducing errors) which, additionally, reduces power usage and improves battery life of the device by enabling the user to use the system more quickly and efficiently.

In some embodiments, the computer system (e.g., 700) displays, via the one or more display generation components (e.g., 702), a real-time communication session user interface corresponding to a real-time communication session that includes the computer system (e.g., 700) and one or more external computer systems separate from the computer system (e.g., a real-time communication session that includes communication between a user of the computer system, and one or more users of one or more external computer systems separate from the computer system), including displaying a representation (e.g., an image-based representation, a virtual representation, and/or an avatar) of a first user of a first external computer system of the one or more external computer systems separate from the computer system within a three-dimensional environment (e.g., 720) (e.g., a pass-through environment (e.g., virtual and/or optical pass-through) and/or a virtual three-dimensional environment). While displaying the real-time communication session user interface, the computer system (e.g., 700) detects, via the one or more input devices (e.g., 702, 704, and/or 708*a*-708*c*), movement by a user (e.g., 710) of the computer system (e.g., 700) (e.g., movement from one location to another (e.g., one location in a room to another location in the room) and/or movement of the user's body). In response to detecting the movement by the user (e.g., 710) of the computer system: in accordance with a determination that a first type of representation (e.g., 744*a* and/or 744*b*) (e.g., a non-image-based virtual avatar (e.g., a virtual avatar designed and/or created by the user and/or designed without using image-based information (e.g. photographs, facial scans, and/or eye scans) corresponding to the user); an image-based representation; an image-based avatar; a virtual avatar that is generated based on an appearance of the user of the computer system using image-based user information corresponding to the user of the computer system; and/or a first type of representation that moves based on physical movements made by the user of the computer system) is selected (e.g., by a user and/or based on one or more user settings) to represent the user (e.g., 710) of the computer system in the real-time communication session (in some embodiments, the first type of representation is generated without using image-based user information corresponding to the user of the computer system (e.g., without using photographs, facial scans, and/or eye scans corresponding to the user of the computer system)), the computer system causes the first type of representation (e.g., 744*a* and/or 744*b*) of the user of the computer system to move within the three-dimensional environment (e.g., 720) based on the movement by the user (e.g., 710) of the computer system (in some embodiments, movement of the first type of representation (e.g., 744*a* and/or 744*b*) of the user of the computer system within the three-dimensional environment (e.g., 720) is displayed by at least some of the one or more external computer systems participating in the real-time communication session) (in some embodiments, movement of the first type of representation (e.g., 744*a* and/or 744*b*) of the user (e.g., 710) of the computer system is displayed by the computer system (e.g., 700) (e.g., via the one or more display generation components (e.g., 702))); in accordance with a determination that a second type of representation (e.g., 714) (e.g., a non-image-based virtual avatar (e.g., a virtual avatar designed and/or created by the user and/or designed without using image-based information (e.g. photographs, facial scans, and/or eye scans) corresponding to the user); an image-based representation; an image-based avatar; a virtual avatar that is generated based on an appearance of the user of the computer system using image-based user information corresponding to the user of the computer system; and/or a second type of representation that moves based on physical movements made by the user of the computer system) different from the first type of representation (e.g., 744*a* and/or 744*b*) is selected (e.g., by a user and/or based on one or more user settings) to represent the user (e.g., 710) of the computer system in the real-time communication session (in some embodiments, the second type of representation is generated to have an appearance based on an appearance of the user of the computer system using image-based user information corresponding to the user of the computer system), the computer system (e.g., 700) causes the second type of representation (e.g., 714) of the user (e.g., 700) of the computer system to move within the three-dimensional environment (e.g., 720) based on the movement by the user of the computer system (in some embodiments, movement of the second type of representation (e.g., 714) of the user (e.g., 710) of the computer system within the three-dimensional environment (e.g., 720) is displayed by at least some of the one or more external computer systems participating in the real-time communication session) (in some embodiments, movement of the second type of representation (e.g., 714) of the user (e.g., 710) of the computer system is displayed by the computer system (e.g., 700) (e.g., via the one or more display generation components (e.g., 702))); and in accordance with a determination that a third type of representation (e.g., 744*c*) (e.g., a visual representation indicating that the computer system is not capturing video content and/or the computer system is capturing only audio content; and/or a visual representation indicating that the computer system is transmitting audio content into the real-time communication session but is not transmitting video content into the real-time communication session) different from the first type of representation (e.g., 744*a* and/or 744*b*) and the second type of representation (e.g., 714) is selected (e.g., by a user and/or based on one or more user settings) to represent the user (e.g., 710) of the computer system in the real-time communication session, the computer system forgoes causing the third type of representation (e.g., 744*c*) of the user (e.g., 710) the computer system to move within the three-dimensional environment (e.g., 720) based on the movement by the user (e.g., 710) of the computer system (e.g., maintaining the third type of representation (e.g., 744*c*) of the user of the computer system at the same position in the three-dimensional environment and/or forgoing display of the third type of representation of the user of the computer system in the three-dimensional environment). In some embodiments, certain types of representations (e.g., 744*a*, 744*b*, and/or 714) (e.g., visual representations, avatar representations, visual avatar representations, and/or image-based representations) participate spatially in a real-time communication session such that the representation of the user moves within a three-dimensional environment (e.g., 720) in accordance with actual physical movements made by the user (e.g., 710); and other types of representations (e.g., 744*c*) (e.g., audio-only representations and/or visual representations indicative of audio-only participation in the real-time communication session by the user of the computer system) do not participate spatially in the real-time communication session such that the representation of the user (e.g., 744*c*) does not move within the three-dimensional environment (e.g., 720) when the user (e.g., 710) makes physical movements. Having certain types of representations move within a three-dimensional environment based on actual physical movements by a user, and having other types of representations not move based on actual physical movements by the user, improves privacy and security by allowing the user to choose when to share physical movement information in a real-time communication session and when not to share such information (e.g., by selecting what type of representation to use to represent the user in the real-time communication session).

In some embodiments, while computer system (e.g., 700) is engaged in a real-time communication session with an external computer system (e.g., one or more external computer systems), a representation of a user (e.g., 710) of the computer system is visible to a user of the external computer system (e.g., visible to users of the one or more external computer systems), wherein the representation of the user (e.g., 714, and/or 744*a*-744*c*) of the computer system (e.g., 700) is displayed in a respective three-dimensional environment (e.g., 720) (e.g., an AR or VR environment) that is visible via one or more display generation components of the external computer system (in some embodiments, the representation (e.g., 714 and/or 744*a*-744*c*) of the user (e.g., 710) of the computer system (e.g., 700) is displayed in the respective three-dimensional environment (e.g., 720) that is visible via one or more display generation components of the one or more external computer systems (e.g., respective sets of one or more display generation components for each of the one or more external computer systems)). In some embodiments, displaying the representation (e.g., 714 and/or 744*a*-744*c*) of the user (e.g., 710) of the computer system (e.g., 700) in the respective three-dimensional environment (e.g., 720) (e.g., an AR or VR environment) that is visible via one or more display generation components of the external computer system includes (in some embodiments, displaying the representation of the user of the computer system int eh respective three-dimensional environment that is visible via the one or more display generation components of the one or more external computer systems includes): in accordance with a determination that a first type of representation (e.g., 744*a* and/or 744*b*) (e.g., a non-image-based virtual avatar (e.g., a virtual avatar designed and/or created by the user and/or designed without using image-based information (e.g. photographs, facial scans, and/or eye scans) corresponding to the user); an image-based representation; an image-based avatar; a virtual avatar that is generated based on an appearance of the user of the computer system using image-based user information corresponding to the user of the computer system; and/or a first type of representation that moves based on physical movements made by the user of the computer system) is selected (e.g., by a user and/or based on one or more user settings) to represent the user (e.g., 710) of the computer system (e.g., 700) in the real-time communication session (in some embodiments, the first type of representation is generated without using image-based user information corresponding to the user of the computer system (e.g., without using photographs, facial scans, and/or eye scans corresponding to the user of the computer system)), causing the first type of representation (e.g., 744*a* and/or 744*b*) of the user (e.g., 710) of the computer system (e.g., 700) to move within the respective three-dimensional environment (e.g., 720), that is visible via the one or more display generation components of the external computer system (e.g., visible via the one or more display generation components of the one or more external computer systems participating in the real-time communication session), based on the movement by the user (e.g., 710) of the computer system (e.g., 700) (in some embodiments, movement of the first type of representation (e.g., 744*a* and/or 744*b*) of the user (e.g., 710) of the computer system (e.g., 700) within the three-dimensional environment (e.g., 720) is displayed by at least some of the one or more external computer systems participating in the real-time communication session) (in some embodiments, movement of the first type of representation (e.g., 744*a* and/or 744*b*) of the user (e.g., 710) of the computer system (e.g., 700) is displayed by the computer system (e.g., 700) (e.g., via the one or more display generation components (e.g., 702))); in accordance with a determination that a second type of representation (e.g., 714) (e.g., a non-image-based virtual avatar (e.g., a virtual avatar designed and/or created by the user and/or designed without using image-based information (e.g. photographs, facial scans, and/or eye scans) corresponding to the user); an image-based representation; an image-based avatar; a virtual avatar that is generated based on an appearance of the user of the computer system using image-based user information corresponding to the user of the computer system; and/or a second type of representation that moves based on physical movements made by the user of the computer system) different from the first type of representation (e.g., 744*a* and/or 744*b*) is selected (e.g., by a user and/or based on one or more user settings) to represent the user (e.g., 710) of the computer system (e.g., 700) in the real-time communication session (in some embodiments, the second type of representation (e.g., 714) is generated to have an appearance based on an appearance of the user of the computer system using image-based user information corresponding to the user of the computer system), causing the second type of representation (e.g., 714) of the user (e.g., 710) of the computer system (e.g., 700) to move within the respective three-dimensional environment (e.g., 720), that is visible via the one or more display generation components of the external computer system (e.g., visible via the one or more display generation components of the one or more external computer systems participating in the real-time communication session), based on the movement by the user (e.g., 710) of the computer system (e.g., 700) (in some embodiments, movement of the second type of representation (e.g., 714) of the user (e.g., 710) of the computer system (e.g., 700) within the three-dimensional environment (e.g., 720) is displayed by at least some of the one or more external computer systems participating in the real-time communication session) (in some embodiments, movement of the second type of representation (e.g., 714) of the user (e.g., 710) of the computer system (e.g., 700) is displayed by the computer system (e.g., 700) (e.g., via the one or more display generation components (e.g., 702))); and in accordance with a determination that a third type of representation (e.g., 744*c*) (e.g., a visual representation indicating that the computer system is not capturing video content and/or the computer system is capturing only audio content; and/or a visual representation indicating that the computer system is transmitting audio content into the real-time communication session but is not transmitting video content into the real-time communication session) different from the first type of representation (e.g., 744*a* and/or 744*b*) and the second type of representation (e.g., 714) is selected (e.g., by a user and/or based on one or more user settings) to represent the user (e.g., 710) of the computer system (e.g., 700) in the real-time communication session, forgoing causing the third type of representation (e.g., 744*c*) of the user the computer system to move within the respective three-dimensional environment (e.g., 720), that is visible via the one or more display generation components of the external computer system (e.g., visible via the one or more display generation components of the one or more external computer systems participating in the real-time communication session), based on the movement by the user (e.g., 710) of the computer system (e.g., 700) (e.g., maintaining the third type of representation (e.g., 744*c*) of the user (e.g., 710) of the computer system (e.g., 700) at the same position in the three-dimensional environment (e.g., 720) and/or forgoing display of the third type of representation of the user of the computer system in the three-dimensional environment). Having certain types of representations move within a three-dimensional environment based on actual physical movements by a user, and having other types of representations not move based on actual physical movements by the user, improves privacy and security by allowing the user to choose when to share physical movement information in a real-time communication session and when not to share such information (e.g., by selecting what type of representation to use to represent the user in the real-time communication session).

In some embodiments, the computer system (e.g., 700) displays, via the one or more display generation components (e.g., 702), a real-time communication session user interface corresponding to a real-time communication session that includes the computer system (e.g., 700) and one or more external computer systems separate from the computer system (e.g., a real-time communication session that includes communication between a user of the computer system, and one or more users of one or more external computer systems separate from the computer system), including displaying a representation (e.g., an image-based representation, a virtual representation, and/or an avatar) of a first user of a first external computer system of the one or more external computer systems separate from the computer system within a three-dimensional environment (e.g., 720) (e.g., a pass-through environment (e.g., virtual and/or optical pass-through) and/or a virtual three-dimensional environment), wherein: in accordance with a determination that a first type of representation (e.g., a representation such as representations 744*a* and/or 744*b*, but representative of the first user of the first external computer system rather than user 710) (e.g., a non-image-based virtual avatar (e.g., a virtual avatar designed and/or created by the user and/or designed without using image-based information (e.g. photographs, facial scans, and/or eye scans) corresponding to the first user); an image-based representation; an image-based avatar; a virtual avatar that is generated based on an appearance of the first user of the first external computer system using image-based user information corresponding to the first user of the first external computer system; and/or a first type of representation that moves based on physical movements made by the first user of the first external computer system) is selected (e.g., by the first user and/or based on one or more user settings of the first external computer system) to represent the first user of the first external computer system in the real-time communication session (in some embodiments, the first type of representation is generated without using image-based user information corresponding to the first user of the first external computer system (e.g., without using photographs, facial scans, and/or eye scans corresponding to the first user of the first external computer system)), displaying, via the one or more display generation components (e.g., 702), movement of the first type of representation of the first user of the first external computer system within the three-dimensional environment (e.g., 720) based on movement by the first user of the first external computer system; in accordance with a determination that a second type of representation (e.g., a representation such as representation 714, but representative of the first user of the first external computer system rather than user 710) (e.g., a non-image-based virtual avatar (e.g., a virtual avatar designed and/or created by the first user and/or designed without using image-based information (e.g. photographs, facial scans, and/or eye scans) corresponding to the first user); an image-based representation; an image-based avatar; a virtual avatar that is generated based on an appearance of the first user of the first external computer system using image-based user information corresponding to the first user of the first external computer system; and/or a second type of representation that moves based on physical movements made by the first user of the first external computer system) different from the first type of representation is selected (e.g., by the first user and/or based on one or more user settings of the first external computer system) to represent the first user of the first external computer system in the real-time communication session (in some embodiments, the second type of representation is generated to have an appearance based on an appearance of the first user of the first external computer system using image-based user information corresponding to the first user of the first external computer system), displaying, via the one or more display generation components (e.g., 702), movement of the second type of representation of the first user of the first external computer system within the three-dimensional environment (e.g., 720) based on movement by the first user of the first external computer system; and in accordance with a determination that a third type of representation (e.g., a representation such as representation 744*c*, but representative of the first user of the first external computer system rather than user 710) (e.g., a visual representation indicating that the first external computer system is not capturing video content and/or the first external computer system is capturing only audio content; and/or a visual representation indicating that the first external computer system is transmitting audio content into the real-time communication session but is not transmitting video content into the real-time communication session) different from the first type of representation and the second type of representation is selected (e.g., by the first user and/or based on one or more user settings of the first external computer system) to represent the first user of the first external computer system in the real-time communication session, forgoing displaying movement of the third type of representation of the first user of the first external computer system within the three-dimensional environment (e.g., 720) based on the movement by the first user of the first external computer system (e.g., maintaining the third type of representation of the first user of the first external computer system at the same position in the three-dimensional environment (e.g., even as the first user of the first external computer system moves) and/or forgoing display of the third type of representation of the first user of the first external computer system in the three-dimensional environment). In some embodiments, certain types of representations (e.g., visual representations, avatar representations, visual avatar representations, and/or image-based representations) participate spatially in a real-time communication session such that the representation of the user moves within a three-dimensional environment in accordance with actual physical movements made by the user; and other types of representations (e.g., audio-only representations and/or visual representations indicative of audio-only participation in the real-time communication session by the user of the computer system) do not participate spatially in the real-time communication session such that the representation of the user does not move within the three-dimensional environment when the user makes physical movements. Having certain types of representations move within a three-dimensional environment based on actual physical movements by a user, and having other types of representations not move based on actual physical movements by the user, improves privacy and security by allowing the user to choose when to share physical movement information in a real-time communication session and when not to share such information (e.g., by selecting what type of representation to use to represent the user in the real-time communication session).

FIGS. 10A-10Q2 illustrate examples of configuring a representation of a person. FIG. 11 is a flow diagram of an exemplary method 1100 for providing user interfaces for configuring a representation of a person. The user interfaces in FIGS. 10A-10Q2 are used to illustrate the processes described below, including the processes in FIG. 11.

FIG. 10A illustrates hands 1000 of a person (e.g., user 710), including left hand 1000*a* and right hand 1000*b*. Left hand 1000*a* includes left thumb 1000*a*1, left index finger 1000*a*2, left middle finger 1000*a*3, left ring finger 1000*a*4, and left little finger 1000*a*5. Right hand 1000*b* includes right thumb 1000*b*1, right index finger 1000*b*2, right middle finger 1000*b*3, right ring finger 1000*b*4, and right little finger 1000*b*5. Left index finger 1000*a*2 is crooked, left middle finger 1000*a*3 does not have the two distal phalanxes furthest from the palm of left hand 1000*a*, right middle finger 1000*b*3 does not have the phalanx furthest from the palm of right hand 1000*b*, and right little finger 1000*b*5 does not have the two distal phalanxes furthest from the palm of right hand 1000*b*.

Figure 10B:
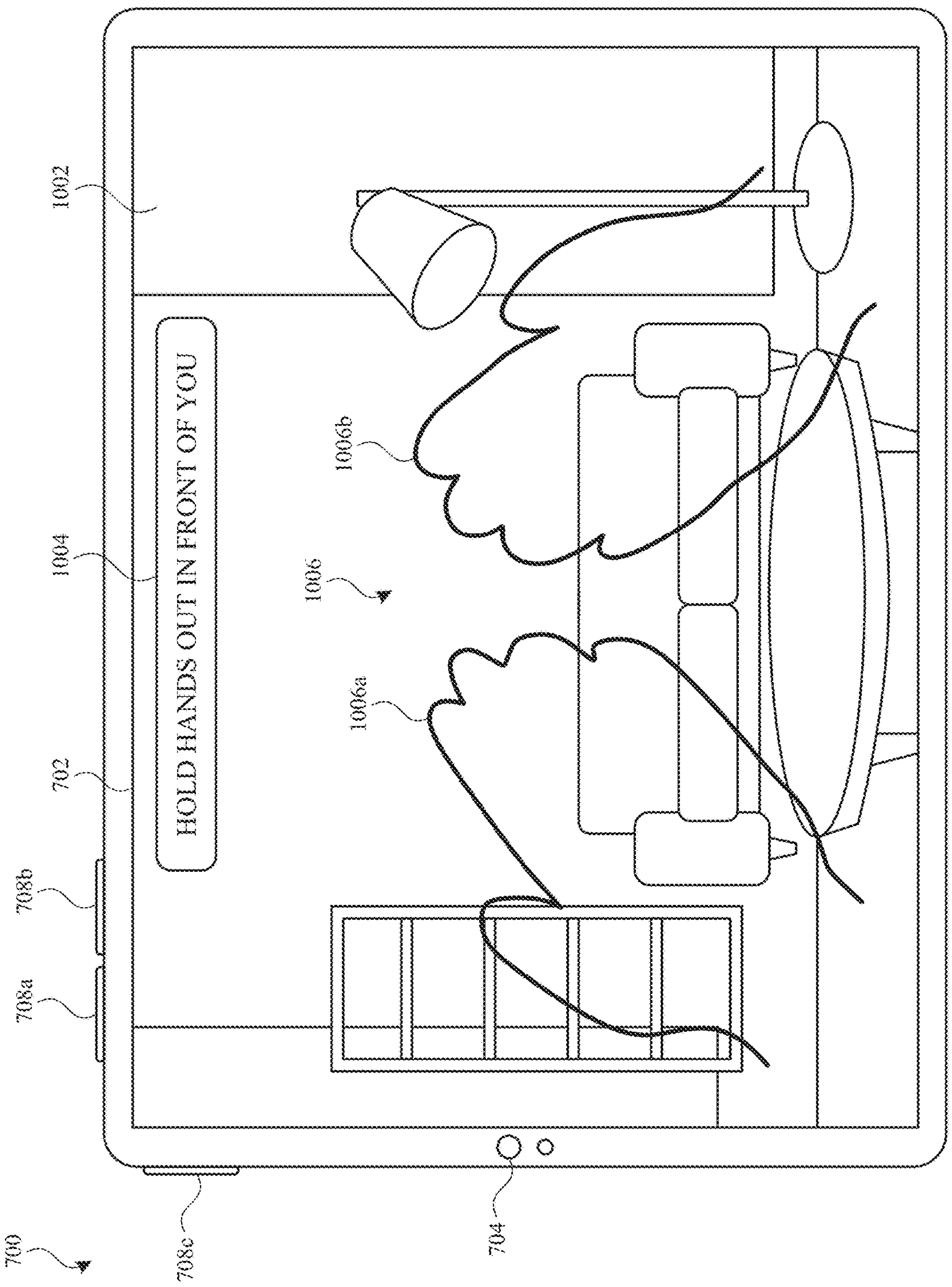

FIG. 10B illustrates computer system 700 described above. In FIG. 10B, computer system 700 displays environment 1002 (e.g., a three-dimensional environment, a physical environment, a virtual environment, and/or an XR environment). Environment 1002 includes instructions 1004*a* for performing an enrollment process that includes capturing information about the hands of the user of computer system 700. Instructions 1004*a* instruct the user to hold their hands out in front of the user in the field of view of one or more sensors (e.g., one or more cameras and/or depth sensors) of computer system 700 so that one or more sensors of computer system 700 can capture information about hands 1000. As part of the enrollment process, computer system 700 displays hand guide 1006 in a first position (e.g., location and/or orientation). Hand guide 1006 includes left hand guide 1006*a* and right hand guide 1006*b* indicating a position (e.g., location and/or orientation) in which the hands of the user are to be placed for enrollment. In FIG. 10B, hand guide 1006 indicates that the user is supposed to place hands

1000 with thumbs out and palms facing the user (e.g., back of hands 1000 facing away from the user).

Figure 10C:
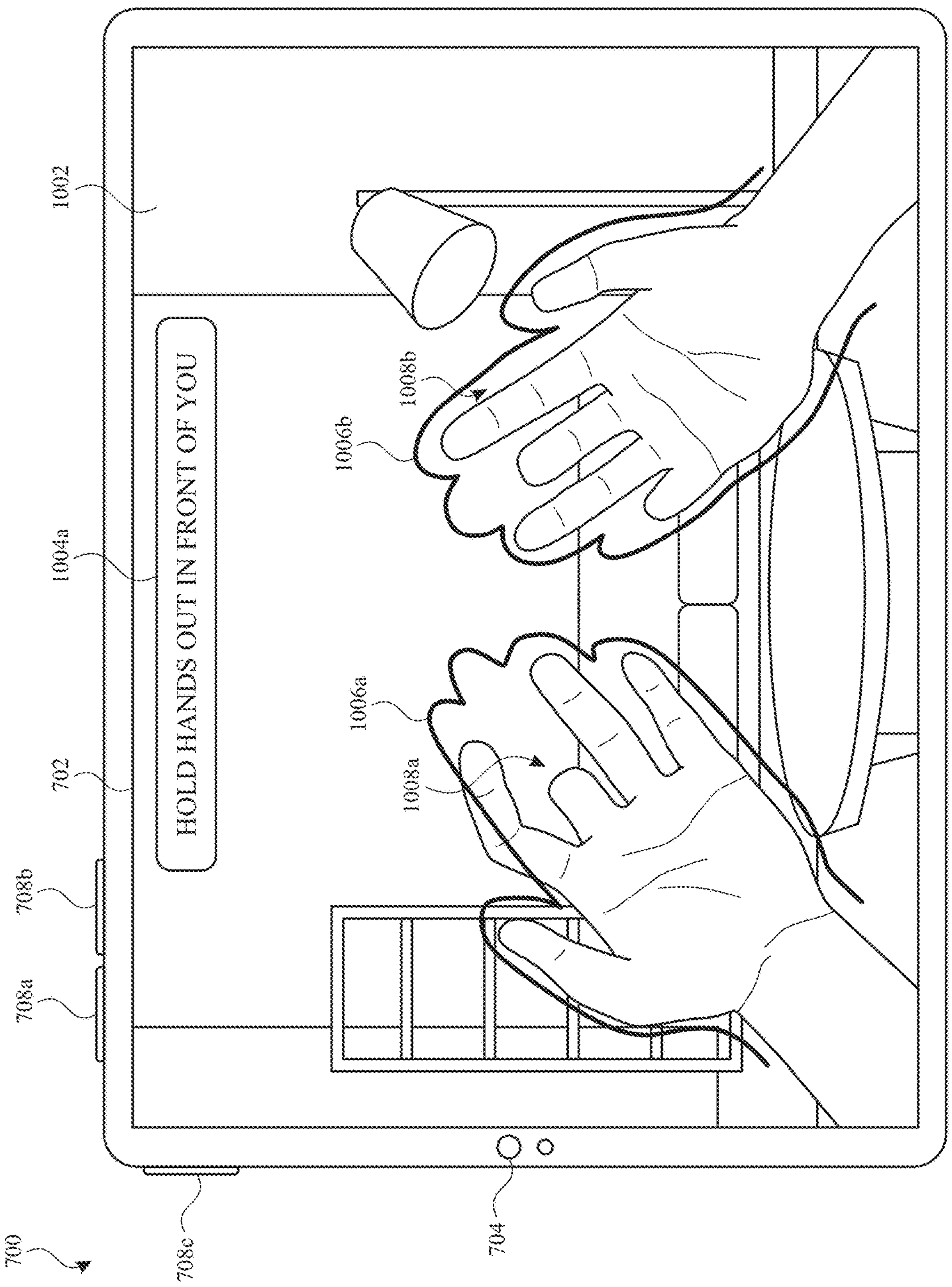

In FIG. 10C, the user attempts to align hands 1000 with hand guide 1006. Hands 1000 are in the field of view of one or more sensors of computer system 700, and computer system 700 displays left hand representation 1008*a* (e.g., an image and/or video of left hand 1000*a* captured by one or more sensors of computer system 700) and right hand representation 1008*b* (e.g., an image and/or video of right hand 1000*b* captured by one or more sensors of computer system 700).

Figure 10D:
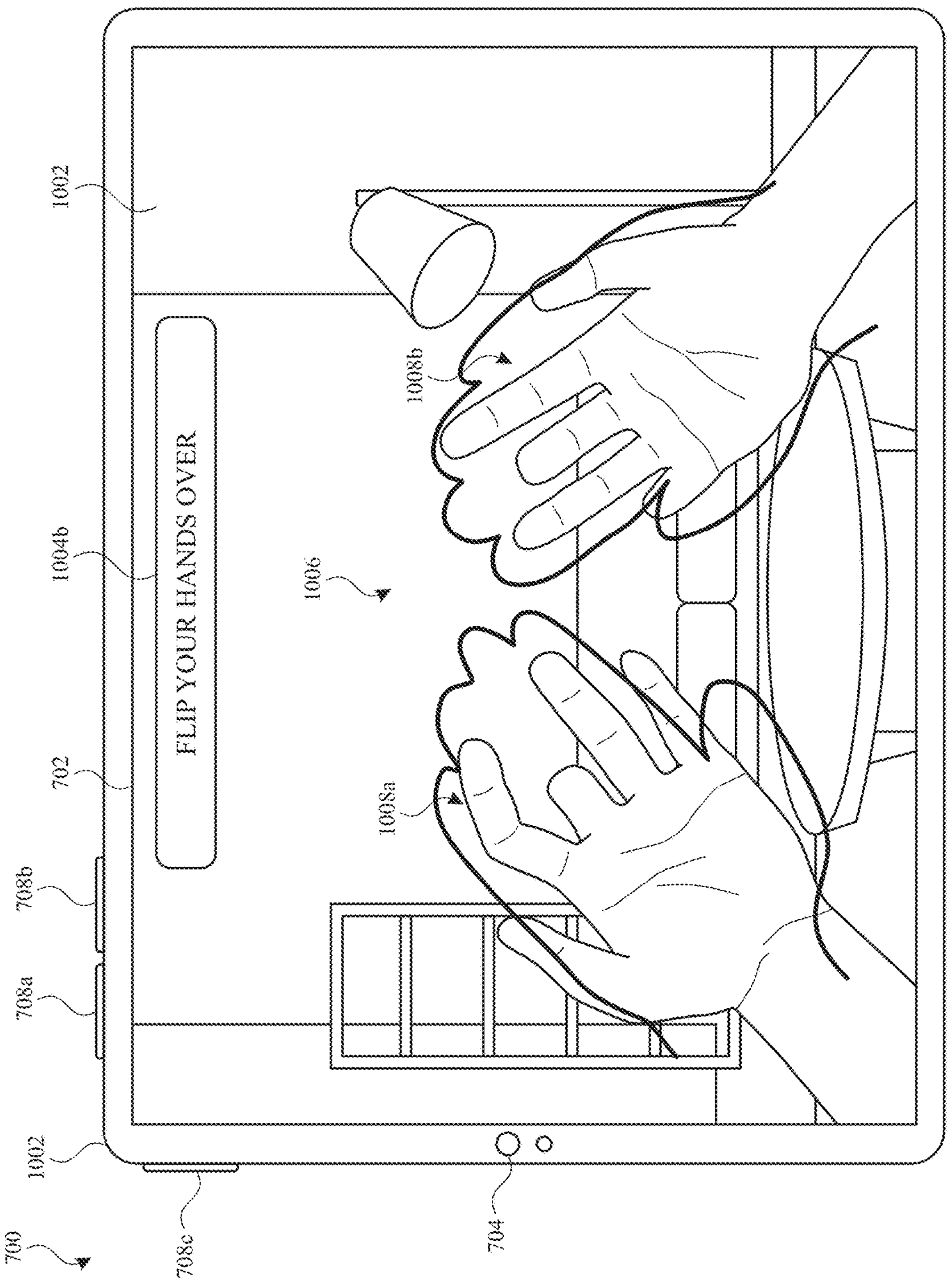
Figure 10E:
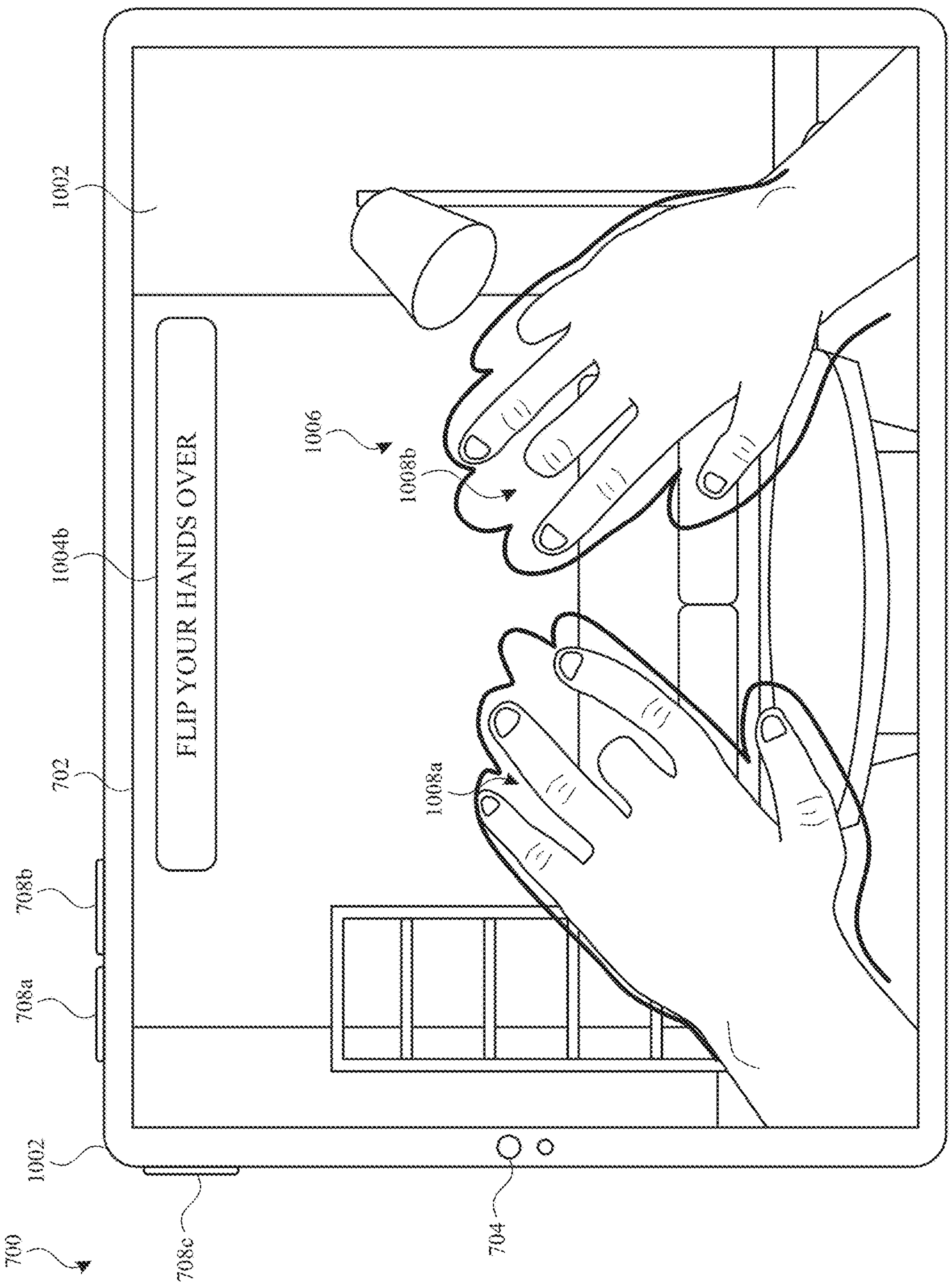

After computer system 700 captures information about hands 1000 in the first position represented by hand guide 1006, computer system 700 displays instructions 1004*b* to flip hands 1000 over and displays hand guide 1006 in a second position indicating that the user is supposed to place hands 1000 with thumbs in and palms facing away from the user (e.g., back of hands 1000 facing the user), as shown in FIG. 10D. In FIG. 10E, the user turns hands 1000 over according to instructions 1004*b* and aligns hands 1000 with the second position of hand guide 1006.

Figure 10F:
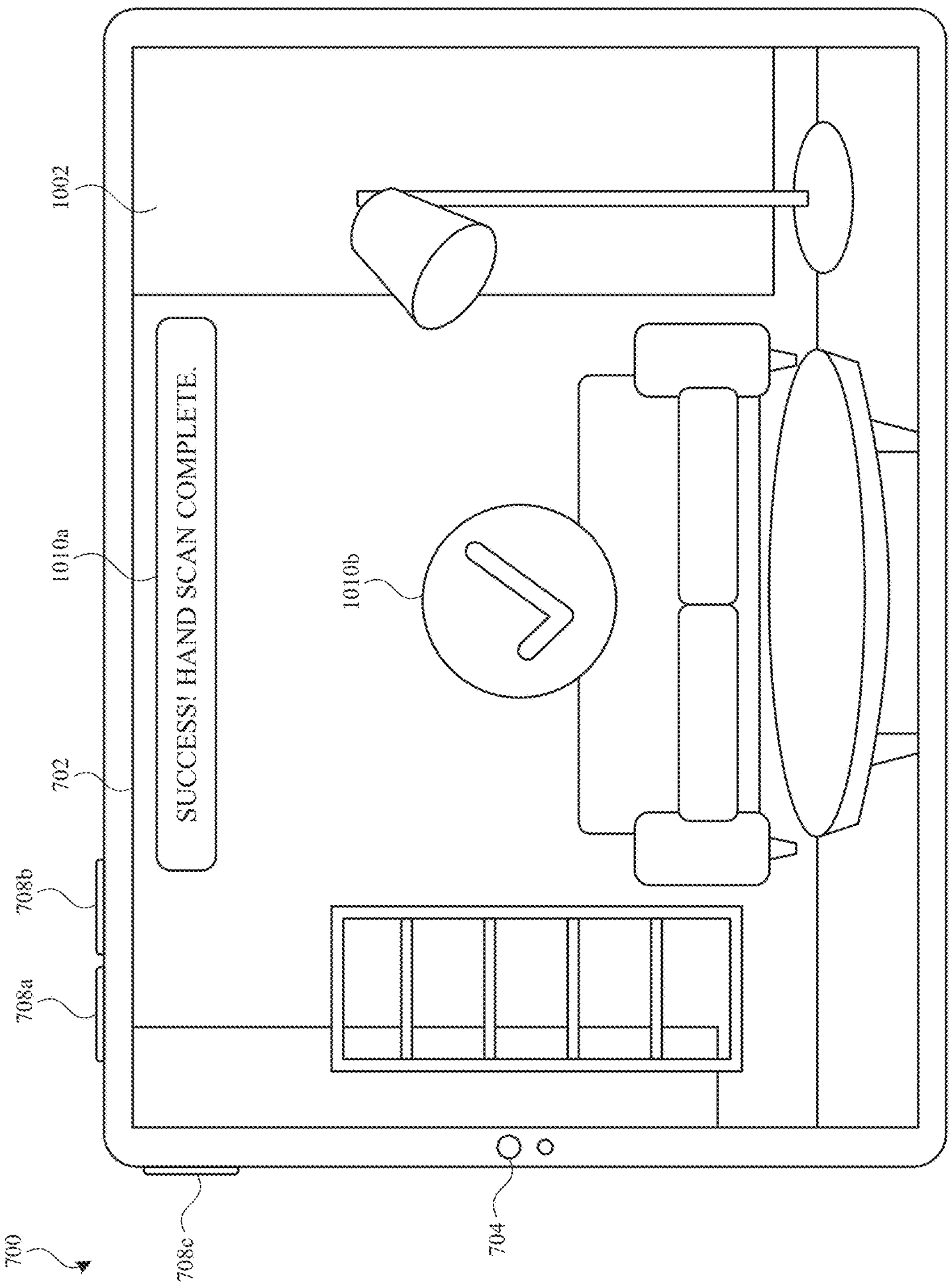
Figure 10G:
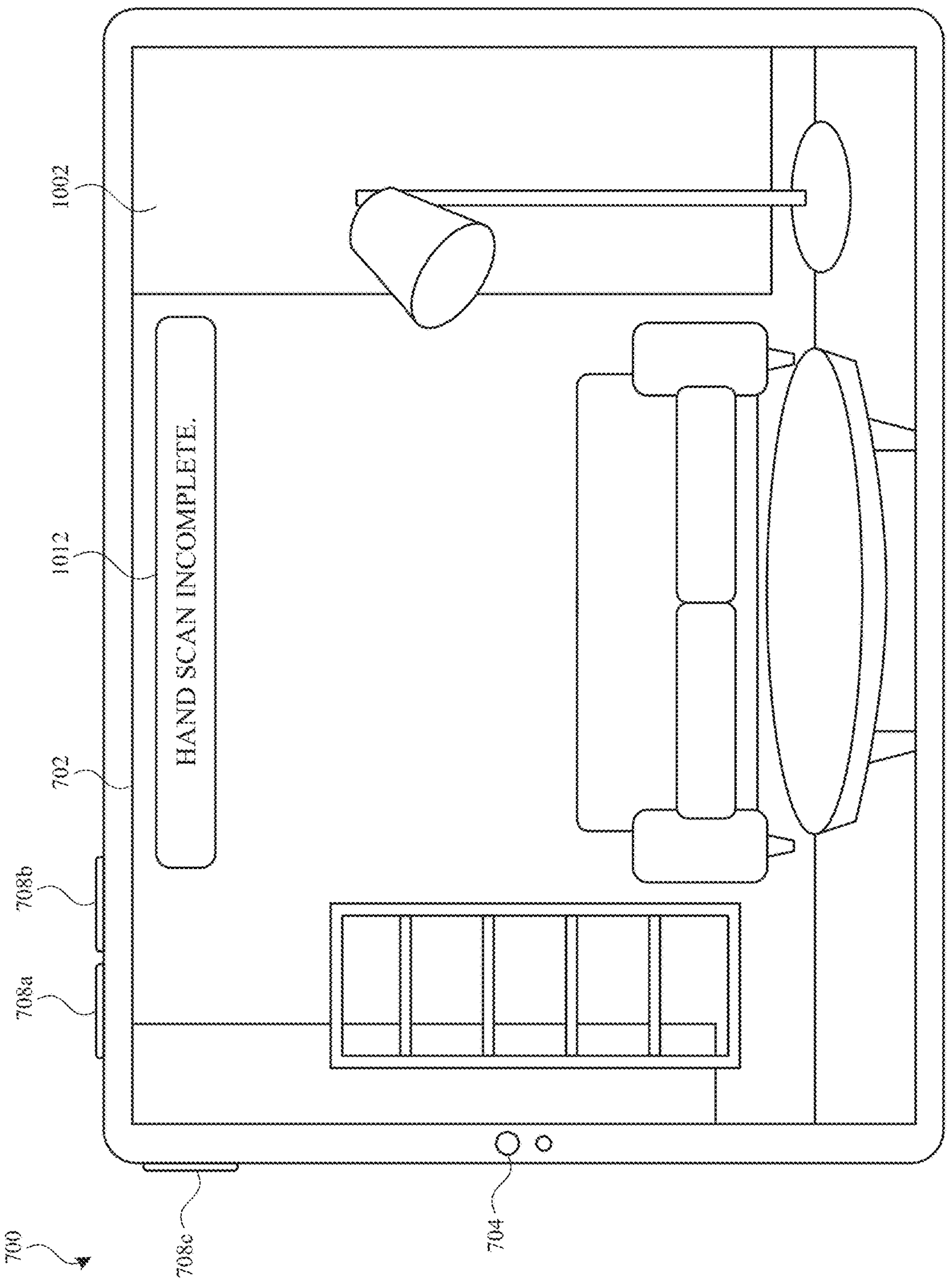

In FIG. 10F, after computer system 700 captures information about hands 1000 in the second position, computer system 700 displays indication 1010*a* (e.g., a textual indication) and indication 1010*b* (e.g., a graphical indication) indicating that computer system 700 has completed capturing information about hands 1000 (e.g., that the hand scan is complete) in response to a determination that the information captured about hands 1000 satisfies a set of criteria (e.g., if the hand scan was successful). Alternatively, in response to a determination that the if the information captured about hands 1000 does not satisfy the set of criteria (e.g., if the hand scan was in complete and/or unsuccessful), computer system 700 displays indication 1012 indicating that the information captured about hands 1000 is incomplete, as shown in FIG. 10G.

Figure 10H:
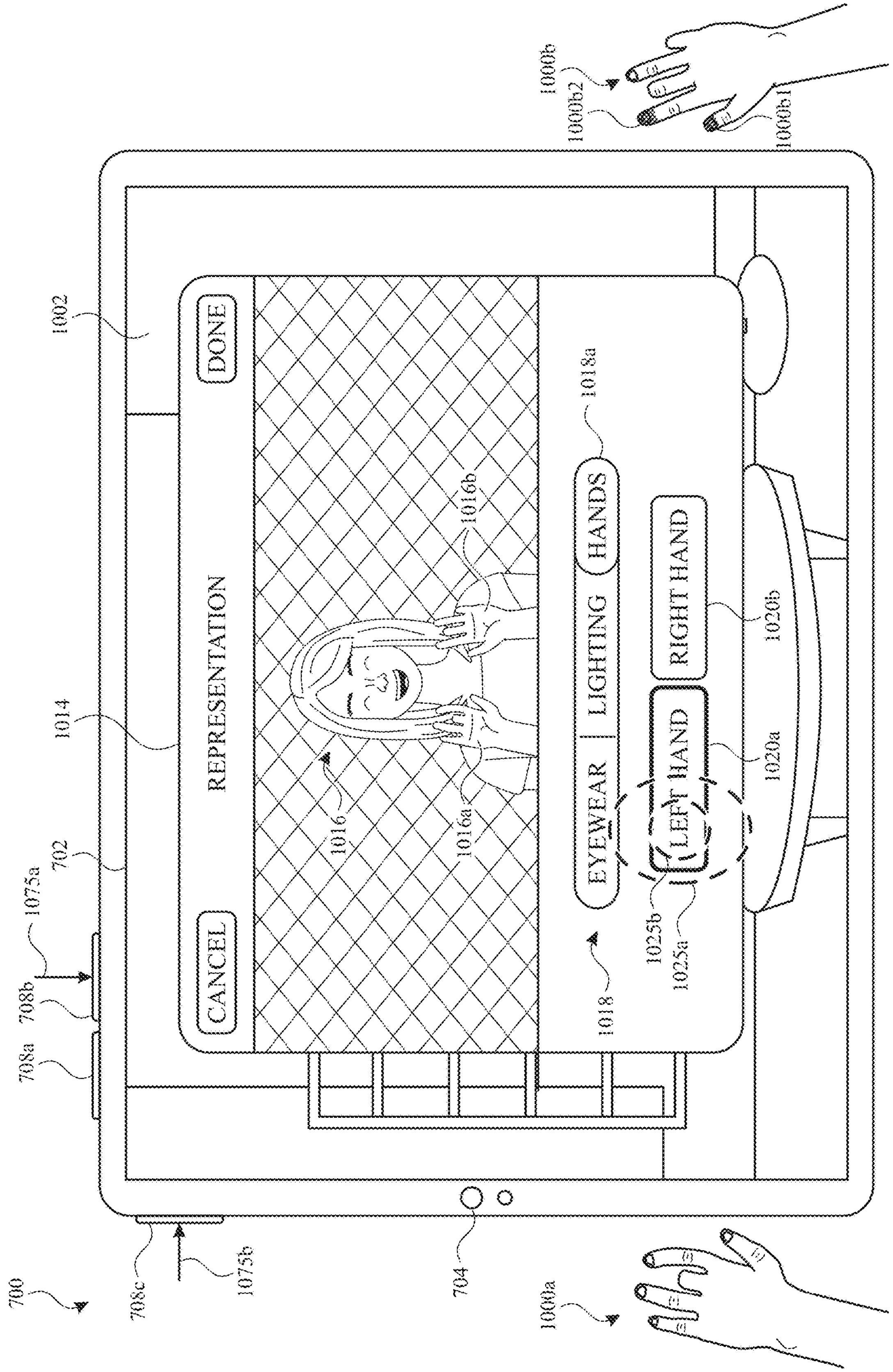

Turning to FIG. 10H, computer system 700 displays configuration user interface 1014 (e.g., in environment 1002). Configuration user interface 1014 includes representation 1016 of the user and options 1018 for configuring representation 1016 of the user. In some embodiments, representation 1016 is based at least in part on data (e.g., image and/or depth data) captured by one or more sensors (e.g., of computer system 700 and/or other sensors). Representation 1016 provides a preview of the appearance of a representation of the user based on current settings. In FIG. 10H, hand option 1018*a* is selected. Because hand option 1018*a* is selected, configuration user interface 1014 includes left hand option 1020*a* and right hand option 1020*b*. In FIG. 10H, computer system 700 detects an input selecting left hand option 1020*a*. In some embodiments, the input selecting left hand option 1020*a* includes a touch input on display 702, represented by input 1025*a*. In some embodiments, the input selecting left hand option 1020*a* includes a gaze, represented by input 1025*b*, and a pinch gesture performed by right thumb 1000*b*1 and right index finger 1000*b*2, represented by the hatching on right thumb 1000*b*1 and right index finger 1000*b*2 in FIG. 10H.

In some embodiments, the input selecting left hand option 1020*a* includes a press (represented by input 1075*a*) of button 708*b* and/or a press (represented by input 1075*b*) of button 708*c*. In some embodiments, the user can navigate a user interface using button 708*a* and/or button 708*b*. For example, computer system 700 designates and/or changes focus to a next element of configuration user interface element 1014 in response to a press of button 708*b* and designates and/or changes focus to a previous element in response to a press of button 708*a*.

Figure 10I:
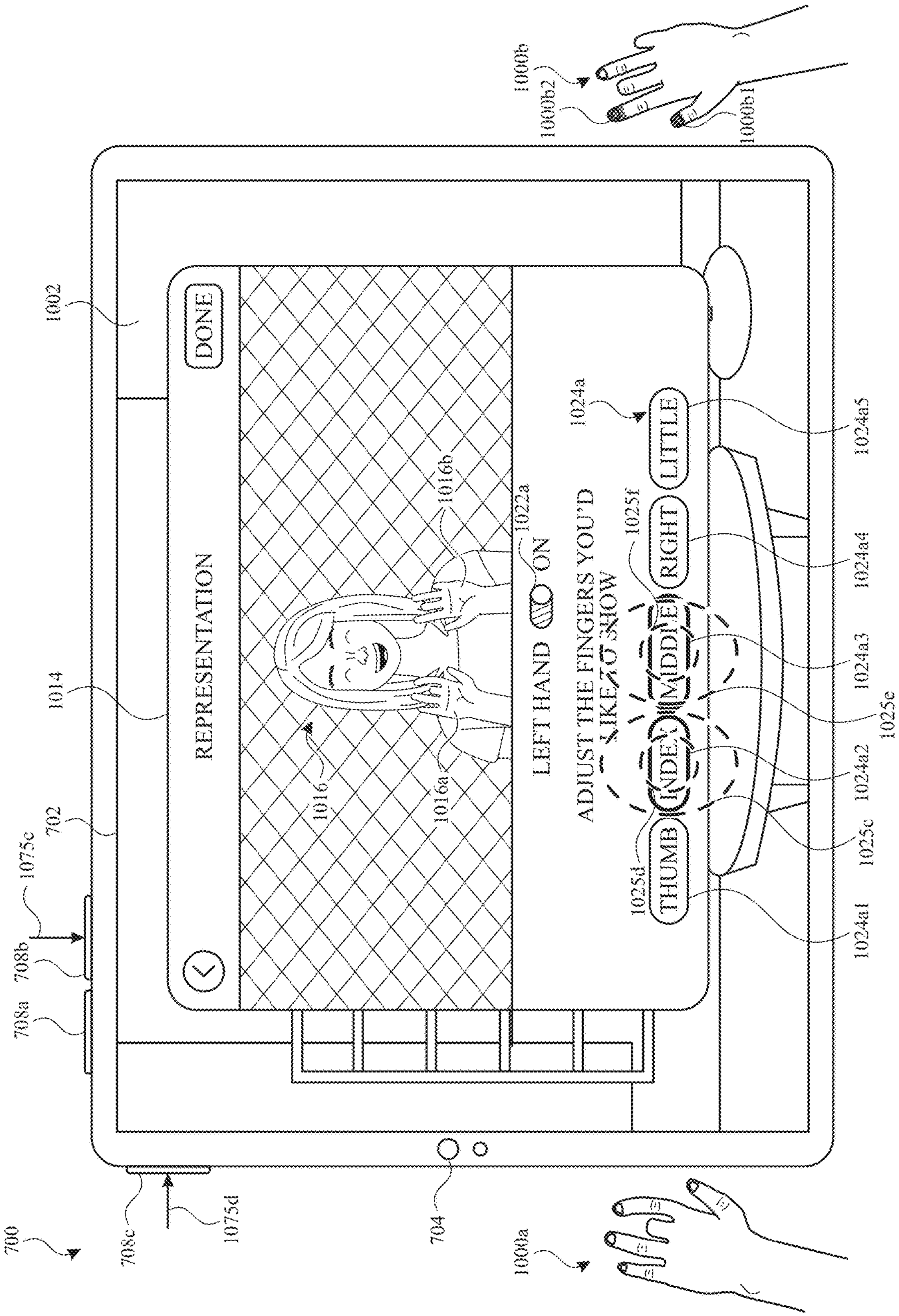

In response to detecting the input selecting left hand option 1020*a*, computer system 700 displays options for setting availability states for left hand 1000*a* and fingers 1000*a*1-1000*a*5 of left hand 1000*a*, as shown in FIG. 10I. In some embodiments, an availability state determines whether and/or how a corresponding appendage is used in a tracking function. In some embodiments, a tracking function is used to display a representation of a person and/or to detect inputs. For example, an availability state of an appendage can determine whether or how a representation of the appendage is displayed. In another example, the availability state of an appendage can determine whether or how an appendage is used to perform an input such as, e.g., an air gesture.

In FIG. 10I, left hand option 1022*a* corresponds to an availability state of left hand 1000*a* (e.g., the entirety of left hand 1000*a*). Left hand finger options 1024*a* include left thumb option 1024*a*1 corresponding to an availability state of left thumb 1000*a*1, left index finger option 1024*a*2 corresponding to an availability state of left index finger 1000*a*2, left middle finger option 1024*a*3 corresponding to an availability state of left middle finger 1000*a*3, left ring finger option 1024*a*4 corresponding to an availability state of left ring finger 1000*a*4, and left little finger option 1024*a*5 corresponding to an availability state of left little finger 1000*a*5. In FIG. 10I, left hand option 1022*a* indicates that left hand 1000*a* is available for tracking and left hand finger options 1024*a* indicate that fingers 1000*a*1-1000*a*5 (e.g., all fingers) of left hand 1000*a* are available for tracking. Accordingly, representation 1016*a* of left hand 1000*a* reflects the actual physical appearance of left hand 1000*a*.

In FIG. 10I, computer system 700 detects selection of left index finger option 1024*a*2 and left middle finger option 1024*a*3. Left index finger option 1024*a*2 and left middle finger option 1024*a*3 are selected via touches on display 1002 (e.g., represented by input 1025*c* and input 1025*e*, respectively), gazes (e.g., represented by input 1025*d* and input 1025*f*, respectively), and/or pinch gestures (e.g., represented by the hatching on right thumb 1000*b*1 and right index finger 1000*b*2). In some embodiments, selection of left index finger option 1024*a*2 and left middle finger option 1024*a*3 includes a press (represented by input 1075*c*) of button 708*b* and/or a press (represented by input 1075*d*) of button 708*c*.

Figure 10J:
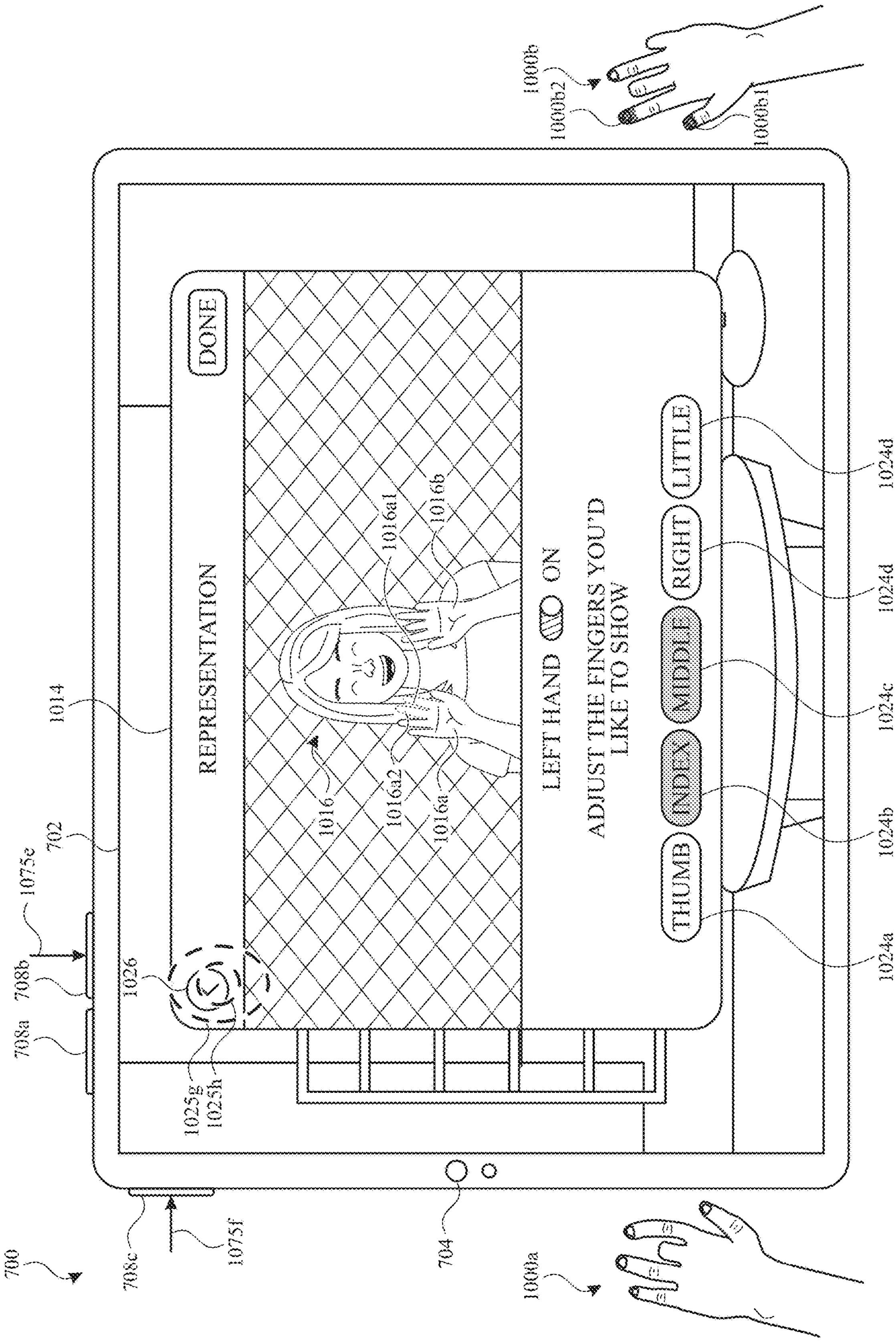

In response to detecting selection of left index finger option 1024*a*2 and left middle finger option 1024*a*3, computer system 700 disables the availability of left index finger 1000*a*2 and left middle finger 1000*a*3, as indicated by the shading of left index finger option 1024*a*2 and left middle finger option 1024*a*3 in FIG. 10J. Because the availability of left index finger 1000*a*2 and left middle finger 1000*a*3 are disabled, representation 1016*a*1 of left index finger 1000*a*2 and representation 1016*a*2 of left middle finger 1000*a*3 are illustrated in a dashed line. In some embodiments, the dashed line indicates that representation 1016*a* of left hand 1000*a* does not include a representation of left index finger 1000*a*2 and left middle finger 1000*a*3. In some embodiments, the dashed line indicates that representation 1016*a* of left hand 1000*a* includes default representations, predetermined representations, synthetic representations, or other representations of left index finger 1000*a*2 and left middle finger 1000*a*3 that do not represent the actual physical appearance of left index finger 1000*a*2 and left middle finger 1000*a*3.

In FIG. 10J, computer system 700 detects selection of back option 1026. Back option 1026 is selected via a touch on display 1002 (e.g., represented by input 1025*g*), a gaze (e.g., represented by input 1025*h*), and/or a pinch gesture (e.g., represented by the hatching on right thumb 1000*b*1 and right index finger 1000*b*2). In some embodiments, selection of back option 1026 includes a press (represented by input 1075*e*) of button 708*b* and/or a press (represented by input 1075*f*) of button 708*c*.

Figure 10K:
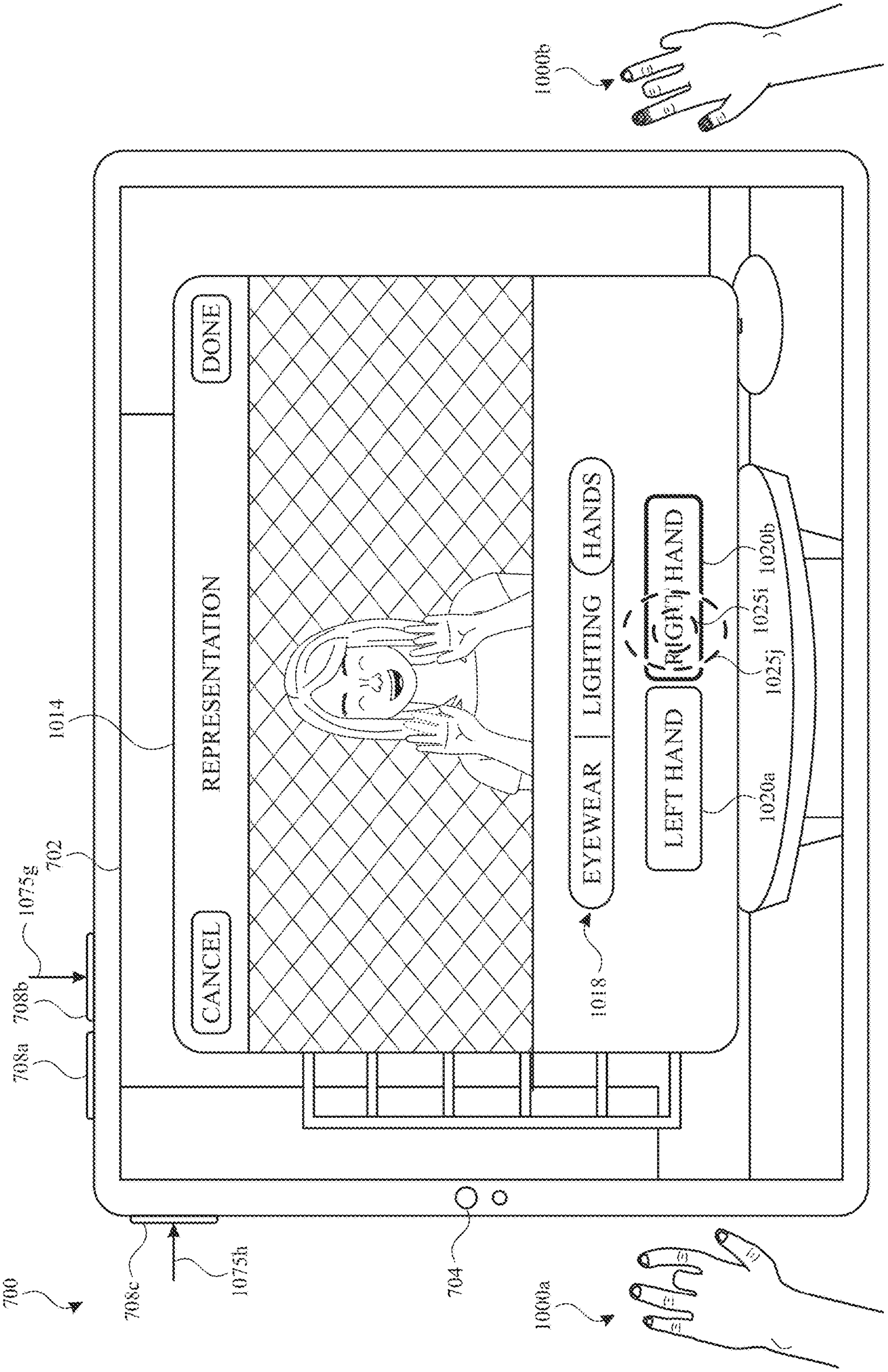

In response to detecting selection of back option 1026, computer system 700 displays (e.g., re-displays) hand option 1018*a*, left hand option 1020*a*, and right hand option 1020*b*, as shown in FIG. 10K. In FIG. 10K, computer system 700 detects an input selecting right hand option 1020*b*. In some embodiments, the input selecting right hand option 1020*b* includes a touch input on display 702, represented by input 1025*i*. In some embodiments, the input selecting right hand option 1020*b* includes a gaze, represented by input 1025*j*, and a pinch gesture performed by right thumb 1000*b*1 and right index finger 1000*b*2, represented by the hatching on right thumb 1000*b*1 and right index finger 1000*b*2 in FIG. 10K. In some embodiments, selection of right hand option 1020*b* includes a press (represented by input 1075*g*) of button 708*b* and/or a press (represented by input 1075*h*) of button 708*c*.

In response to detecting selection of right hand option 1020*b*, computer system displays options for setting availability states for right hand 1000*b* and fingers 1000*b*1-1000*b*5 of right hand 1000*b*, as shown in FIG. 10L1. In FIG. 10L1, right hand option 1022*b* corresponds to an availability state of right hand 1000*b* (e.g., the entirety of right hand 1000*b*). Right hand finger options 1024*b* include right thumb option 1024*b*1 corresponding to an availability state of right thumb 1000*a*1, right index finger option 1024*b*2 corresponding to an availability state of right index finger 1000*a*2, right middle finger option 1024*b*3 corresponding to an availability state of right middle finger 1000*a*3, right ring finger option 1024*b*4 corresponding to an availability state of right ring finger 1000*a*4, and right little finger option 1024*b*5 corresponding to an availability state of left little finger 1000*a*5. In FIG. 10L1, right hand option 1022*b* indicates that right hand 1000*b* is available for tracking and right hand finger options 1024*b* indicate that fingers 1000*b*1-1000*b*5 (e.g., all fingers) of right hand 1000*b* are available for tracking. Accordingly, representation 1016*b* of right hand 1000*b* reflects the actual physical appearance of right hand 1000*b*.

In FIG. 10L1, computer system 700 detects selection of right little finger option 1024*b*5. Right little finger option 1024*b*5 is selected via a touch on display 1002 (e.g., represented by input 1025*k*), a gaze (e.g., represented by input 10251), and/or a pinch gesture (e.g., represented by the hatching on right thumb 1000*bl* and right index finger 1000*b*2). In some embodiments, selection of right little finger option 1024*b*5 includes a press (represented by input 1075*i*) of button 708*b* and/or a press (represented by input 1075*j*) of button 708*c*.

In some embodiments, the techniques and user interface(s) described in FIGS. 10A-10Q2 are provided by one or more of the devices described in FIGS. 1A-IP. For example, FIG. 10L2 illustrates an embodiment in which configuration user interface 1014 (e.g., as described in FIG. 10L1) is displayed on display module X702 of HMD X700 (e.g., as described in FIG. 7B2). In some embodiments, HMD X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth.

In response to detecting selection of right hand option 1020*b*, computer system displays options for setting availability states for right hand 1000*b* and fingers 1000*b*1-1000*b*5 of right hand 1000*b*, as shown in FIG. 10L2. In FIG. 10L2, right hand option 1022*b* corresponds to an availability state of right hand 1000*b* (e.g., the entirety of right hand 1000*b*). Right hand finger options 1024*b* include right thumb option 1024*b*1 corresponding to an availability state of right thumb 1000*a*1, right index finger option 1024*b*2 corresponding to an availability state of right index finger 1000*a*2, right middle finger option 1024*b*3 corresponding to an availability state of right middle finger 1000*a*3, right ring finger option 1024*b*4 corresponding to an availability state of right ring finger 1000*a*4, and right little finger option 1024*b*5 corresponding to an availability state of left little finger 1000*a*5. In FIG. 10L2, right hand option 1022*b* indicates that right hand 1000*b* is available for tracking and right hand finger options 1024*b* indicate that fingers 1000*b*1-1000*b*5 (e.g., all fingers) of right hand 1000*b* are available for tracking. Accordingly, representation 1016*b* of right hand 1000*b* reflects the actual physical appearance of right hand 1000*b*.

In FIG. 10L2, HMD X700 detects selection of right little finger option 1024*b*5. Right little finger option 1024*b*5 is selected via a touch on display 1002 (e.g., represented by input 1025*k*), a gaze (e.g., represented by input 10251), and/or a pinch gesture (e.g., represented by the hatching on right thumb 1000*b*1 and right index finger 1000*b*2). In some embodiments, selection of right little finger option 1024*b*5 includes a press (represented by input X1075*i*) of button X708*b* and/or a press (represented by input X1075*j*) of button X708*c*. In response to detecting selection of right little finger option 1024*b*5 in FIG. 10L2, HMD X700 disables the availability of right little finger 1000*b*5 (e.g., as described in FIG. 10M below).

Any of the features, components, and/or parts, including the arrangements and configurations thereof shown in FIGS. 1B-1P can be included, either alone or in any combination, in HMD X700. For example, in some embodiments, HMD X700 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 includes any of the features, components, and/or parts of display unit 1-102, display unit 1-202, display unit 1-306, display unit 1-406, display generation component 120, display screens 1-122*a-b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 includes a sensor X704 that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a-f*, either alone or in any combination. In some embodiments, input device X703 includes any of the features, components, and/or parts of any of first button 1-128, button 11.1.1-114, second button 1-132, and or dial or button 1-328, either alone or in any combination. In some embodiments, HMD X700 includes one or more audio output components (e.g., electronic component 1-112) for generating audio feedback (e.g., audio output), optionally generated based on detected events and/or user inputs detected by the HMD X700.

Figure 10M:
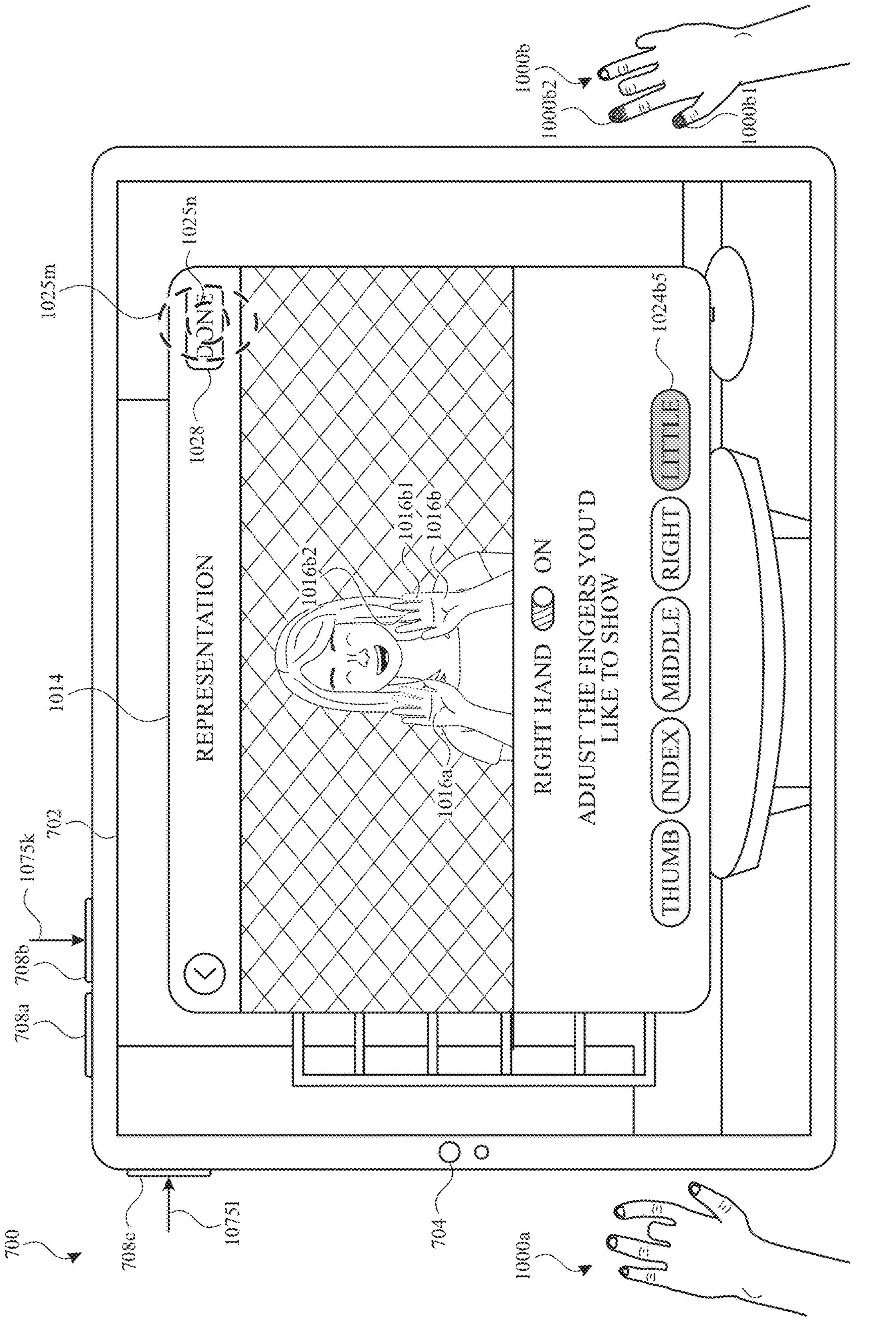

In response to detecting selection of right little finger option 102465 in FIG. 10L1, computer system 700 disables the availability of right little finger 1000*b*5, as indicated by the shading of right little finger option 1024*b*5 in FIG. 10M. Because the availability of right little finger 1000*b*5 is disabled, representation 1016*b*1 of right little finger 1000*b*5 is illustrated in a dashed line. In some embodiments, the dashed line indicates that representation 1016*b* of right hand 1000*b* does not include a representation of right little finger 1000*b*5. In some embodiments, the dashed line indicates that representation 1016*b* of right hand 1000*b* includes a default representation, predetermined representation, synthetic representation, or other representation of right little finger 1000*b*5 that does not represent the actual physical appearance of right little finger 1000*b*5. Because the availability of right middle finger 1000*b*3 is still enabled (e.g., not disabled), representation 1016*b*2 of right middle finger 1000*b*3 is displayed according to its actual physical appearance (e.g., shortened compared to other fingers).

In FIG. 10M, computer system 700 detects selection of done option 1028. Done option 1028 is selected via a touch on display 1002 (e.g., represented by input 1025*m*), a gaze (e.g., represented by input 1025*n*), and/or a pinch gesture (e.g., represented by the hatching on right thumb 1000*b*1 and right index finger 1000*b*2). In some embodiments, selection of done option 1028 includes a press (represented by input 1075*k*) of button 708*b* and/or a press (represented by input 10751) of button 708*c*. In response to detecting selection of done option 1028, computer system 700 ceases display of (e.g., closes) configuration user interface 1014.

Figure 10N:
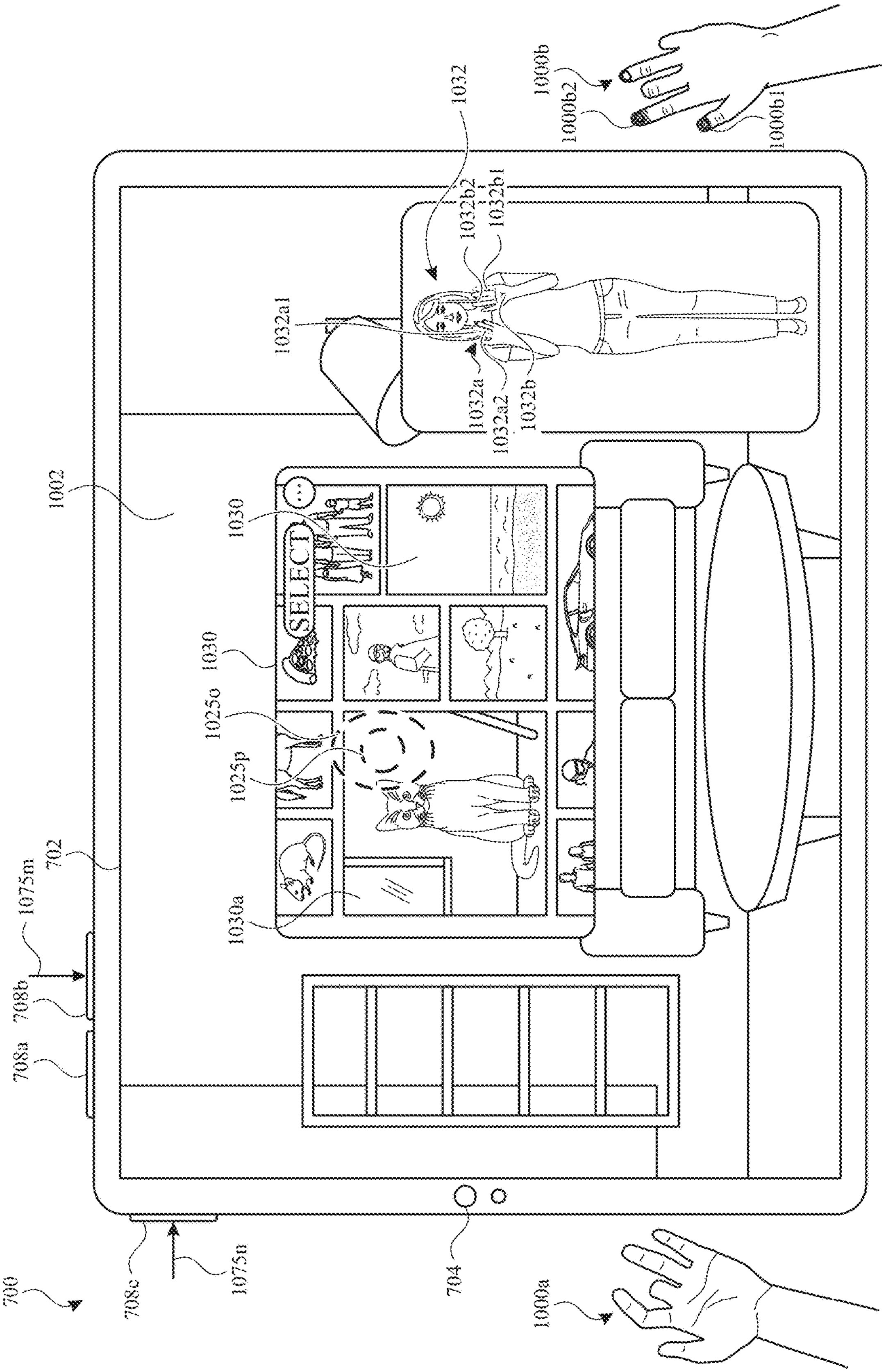

FIG. 10N illustrates computer system 700 displaying user interface 1030 (e.g., a photos application) in environment 1002. User interface 1030 includes selectable items (e.g., photos). While displaying environment 1002, computer system 700 displays representation 1032 of the user of computer system, including representation 1032*a* of left hand 1000*a* and representation 1032*b* of right hand 1000*b*. In some embodiments, representation 1032 is based at least in part on data (e.g., image and/or depth data) captured by one or more sensors (e.g., of computer system 700 and/or other sensors). Representation 1032*a*1 represents left index finger 1000*a*2, representation 1032*a*2 represents left middle finger 1000*a*3, representation 1032*b*1 represents right little finger 1000*b*5, and representation 1032*b*2 represents right middle finger 1000*b*3. Computer system 700 displays representation 1032 according to the availability states selected in configuration user interface 1014. For example, because left index finger option 1024*a*2, left middle finger option 1024*a*3, and right little finger option 1024*b*5 were disabled, computer system 700 displays representation 1032*a* without representation 1032*a*1 and representation 1032*a*2 (corresponding to left index finger 1000*a*2 and left middle finger 1000*a*3, respectively) and displays representation 1032*b* without representation 1032*b*1. Alternatively, computer system 700 displays representation 1032*a*1, representation 1032*a*2, and/or representation 1032*b*1 as a default representation, predetermined representation, synthetic representation, or other representation that does not represent the actual physical appearance of the respective finger.

In FIG. 10N, computer system 700 detects selection of item 1030*a*. Item 1030*a* can be selected via a touch on display 1002 (e.g., represented by input 1025*o*). In some embodiments, selection of item 1030*a* includes a press (represented by input 1075*m*) of button 708*b* and/or a press (represented by input 1075*n*) of button 708*c*. In some embodiments, because right thumb 1000*b*1 and right index finger 1000*b*2 are available (e.g., were not deselected and/or disabled in configuration user interface 1014), item 1030 can be selected via a gaze (e.g., represented by input 1025*p*) and a pinch gesture performed by right thumb 1000*b*1 and right index finger 1000*b*2 (e.g., represented by the hatching on right thumb 1000*b*1 and right index finger 1000*b*2). In response to detecting selection of item 1030*a*, computer system 700 selects item 1030*a*, as indicated by the bold border around item 1030*a* in FIG. 10O.

Figure 10O:
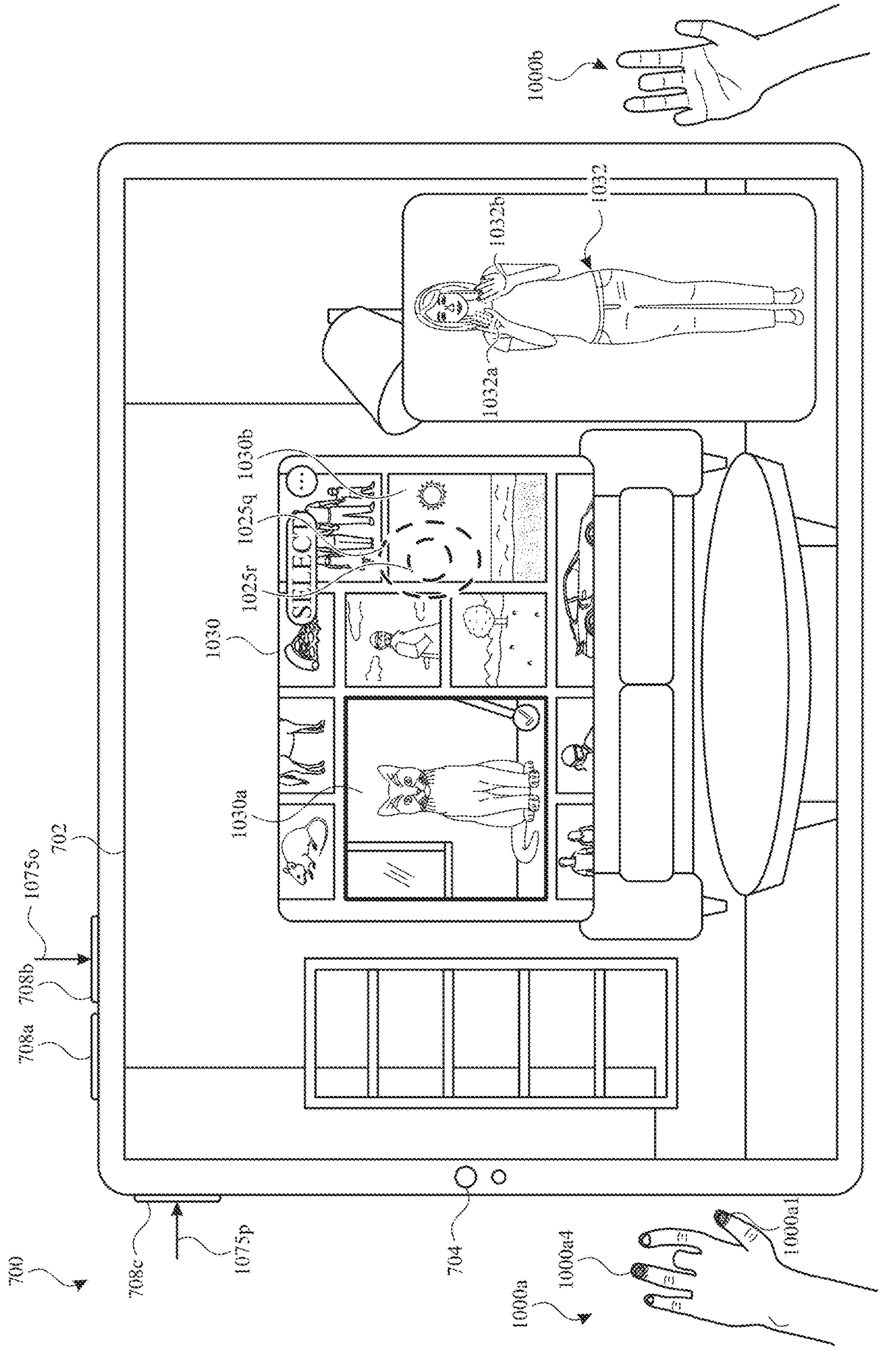
Figure 10P:
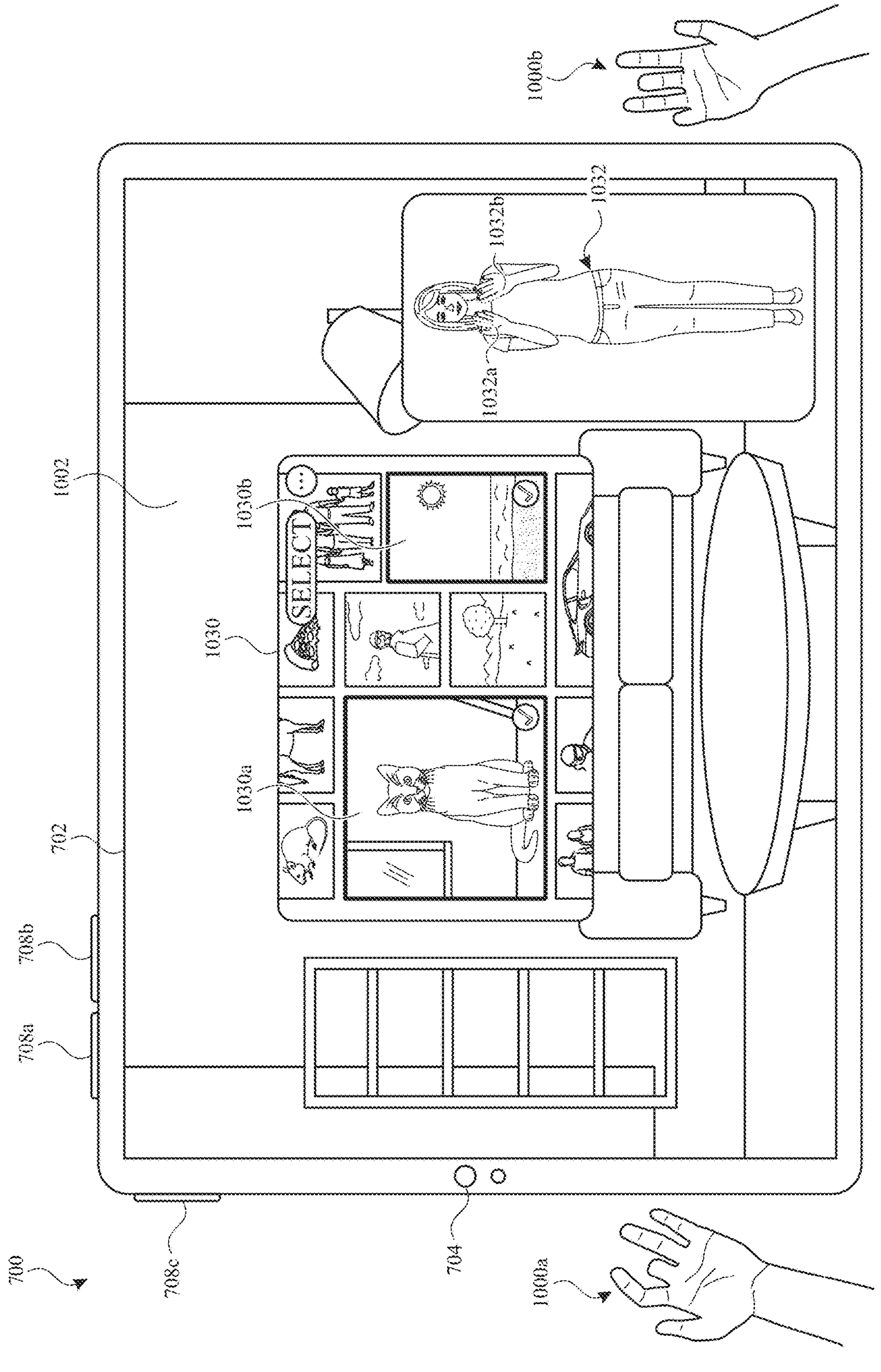

In some embodiments, an item can be selected via a pinch gesture with either left hand 1000*a* or right hand 1000*b*. For example, when left thumb 1000*a*1 and left index finger 1000*a*2 are available for tracking, an item can be selected in response to detecting a pinch gesture performed with left thumb 1000*a*1 and left index finger 1000*a*2. In some embodiments, when a finger is designated in configuration user interface 1014 as not available, that finger cannot be used in an input to perform an action (e.g., a finger set as unavailable is ignored and/or not tracked for the purpose of detecting inputs). For example, in some embodiments, because left index finger 1000*a*2 was designated as unavailable in configuration user interface 1014, a pinch gesture using left thumb 1000*a*1 and left index finger 1000*a*2 cannot be used to select an item in user interface 1030. In FIG. 10O, for example, computer system 700 does not select item 1030*b* when a pinch gesture using left thumb 1000*a*1 and left index finger 1000*a*2 is performed while gaze 1025*r* is on item 1030*b*. However, because left ring finger 1000*a*4 is available, left ring finger 1000*a*4 can be used to perform an input. In FIG. 10O, computer system 700 detects a pinch gesture using left thumb 1000*a*1 and left ring finger 1000*a*4, represented by the hatching on left thumb 1000*a*1 and left ring finger 1000*a*4 in FIG. 10O. In response to detecting the pinch gesture using left thumb 1000*a*1 and left ring finger 1000*a*4 while gaze 1025*r* is on item 1030*b*, computer system 700 selects item 1030*b*, as indicated in FIG. 10P. Alternatively, item 1030*b* can be selected via touch input 1025*q* shown in FIG. 10O. In some embodiments, selection of item 1030*b* includes a press (represented by input 1075*o*) of button 708*b* and/or a press (represented by input 1075*p*) of button 708*c*.

FIGS. 10Q1-10Q2 illustrate a real-time communication session in environment 1002 between the user of computer system 700 and a user of computer system 1050. The user of computer system 700 and the user of computer system 1050 are virtually present in environment 1002. Computer system 700 (e.g., Cathy's device) displays representation 1032 of the user of computer system 700, representation 1036 of the user of computer system 1050, and real-time communication session controls 1034*a*. In some embodiments, representation 1036 is based at least in part on data (e.g., image and/or depth data) captured by one or more sensors (e.g., of computer system 700, computer system 1050, and/or other sensors).

Real-time communication session controls 1034*a* and real-time communication session controls 1034*b* can be used to control functions of the real-time communication session on computer system 700 and computer system 1050, respectively. For example, real-time communication session controls 1034*b* can be used to mute and/or unmute a microphone of computer system 1050, enable and/or disable video of a representation of the user of computer system 1050 in the real-time communication session, and/or disconnect computer system 1050 from the real-time communication session.

Representation 1036 is displayed in environment 1002. Representation 1032 shows how the user of computer system 700 appears in environment 1002 on computer system 1050. Similarly, computer system 1050 (e.g., Tom's device) displays representation 1040 of the user of computer system 1050, representation 1038 of the user of computer system 700, and real-time communication session controls 1034*b*. Representation 1038 is displayed in environment 1002 on computer system 1050. In some embodiments, representation 1038 is based at least in part on data (e.g., image and/or depth data) captured by one or more sensors (e.g., of computer system 700, computer system 1050, and/or other sensors). Representation 1040 shows how the user of computer system 1050 appears in environment 1002 on computer system 700. In some embodiments, representation 1040 is based at least in part on data (e.g., image and/or depth data) captured by one or more sensors (e.g., of computer system 700, computer system 1050, and/or other sensors).

As shown in FIGS. 10Q1 and 10Q2, the user of computer system 700 is represented in the real-time communication session according to the availability states selected in configuration user interface 1014. For example, because left index finger option 1024*a*2, left middle finger option 1024*a*3, and right little finger option 1024*b*5 were disabled, computer system 700 displays representation 1032*a* without representation 1032*a*1 and representation 1032*a*2 (corresponding to left index finger 1000*a*2 and left middle finger 1000*a*3, respectively) and displays representation 1032*b* without representation 1032*b*1. Alternatively, computer system 700 displays representation 1032*a*1, representation 1032*a*2, and/or representation 1032*b*1 as a default representation, predetermined representation, synthetic representation, or other representation that does not represent the actual physical appearance of the respective finger.

Also, computer system 1050 displays representation 1038*a* without representation 1038*a*1 and representation 1038*a*2 (corresponding to left index finger 1000*a*2 and left middle finger 1000*a*3, respectively) and displays representation 1038*b* without representation 1038*b*1. Alternatively, computer system 1050 displays with representation 1038*a*1, representation 1038*a*2, and/or representation 1038*b*1 as a default representation, predetermined representation, synthetic representation, or other representation that does not represent the actual physical appearance of the respective fingers.

FIG. 11 is a flow diagram of an exemplary method 1100 for configuring a representation of a person, in some embodiments. In some embodiments, method 1100 is performed at a computer system (e.g., 700, X700, and/or computer system 101 in FIG. 1A) (e.g., a smart phone, a smart watch, a tablet computer, a laptop computer, a desktop computer, a wearable device, and/or head-mounted device) that is in communication with one or more display generation components (e.g., 702, X702, and/or display generation component 120 in FIGS. 1A, 3, and 4) (e.g., a heads-up display, a display, a monitor, a touchscreen, a projector, a visual output device, a 3D display, a display having at least a portion that is transparent or translucent on which images can be projected (e.g., a see-through display), a projector, a heads-up display, and/or a display controller) and one or more input devices (e.g., 702, a touch-sensitive surface (e.g., a touch-sensitive display); a mouse; a keyboard; a remote control; a visual input device (e.g., one or more cameras (e.g., an infrared camera, a depth camera, a visible light camera, and/or a gaze tracking camera)); an audio input device; and/or a biometric sensor (e.g., a fingerprint sensor, a face identification sensor, a gaze tracking sensor, and/or an iris identification sensor)). In some embodiments, method 1100 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1100 are, optionally, combined and/or the order of some operations is, optionally, changed.

In method 1100, after performing (1102) an enrollment process (e.g., a process that includes capturing data (e.g., image data, sensor data, and/or depth data) indicative of a size, shape, position, pose, color, depth, and/or other characteristic of one or more body parts and/or features of body parts of a user) (e.g., the enrollment process in FIGS. 10B-10G) that includes capturing (e.g., via one or more cameras and/or other sensors) information (e.g., data and/or images) about a physical feature (e.g., a hand, a finger, an arm, and/or a portion of a physical feature) (e.g., 1000, 1000*a*, 1000*b*, 1000*a*1-1000*a*5, and/or 1000*b*1-1000*b*5) of a person (e.g., 710) (e.g., a user of the computer system, such as a person that is holding, operating, logged into, and/or otherwise associated with the computer system): the computer system displays (1104), via the one or more display generation components, a set of one or more appendage options (e.g., selectable options and/or user-interactive graphical elements) (e.g., 1022*a*, 1022*b*, 1024*a*1-1024*a*5, and/or 1024*b*1-1024*b*5) corresponding to one or more respective appendages (e.g., 1000*a*, 1000*b*, 1000*a*1-1000*a*5, and/or 1000*b*1-1000*b*5) (e.g., hands and/or fingers) of the person (or, in some embodiments, of the physical feature of the person), including displaying a first appendage option (e.g., 1022*a*, 1022*b*, 1024*a*1-1024*a*5, and/or 1024*b*1-1024*b*5) corresponding to a first appendage (e.g., a first hand, a first finger, and/or a first finger of the first hand) (e.g., 1000*a*, 1000*b*, 1000*a*1-1000*a*5, and/or 1000*b*1-1000*b*5) of the person (or, in some embodiments, of the physical feature of the person). In some embodiments, the one or more respective appendages are one or more respective appendages of the physical feature. In some embodiments, the physical feature is a hand and the one or more respective appendages of the physical feature are respective fingers of the hand. In some embodiments, the hand is missing one or more fingers (e.g., one or more fingers of the hand do not exist). In some embodiments, one or more of the respective appendages do not physically exist (e.g., the first appendage is an index finger that is missing from a hand). For example, a person may have lost a finger due to an accident or medical condition or have been born without a finger. In some embodiments, one or more parts of one or more of the respective appendages (e.g., a phalanx of a finger) does not physically exist (e.g., the first appendage is an index finger that is missing a distal phalanx). For example, a person may have lost a portion of the finger such as a phalanx due to an accident or medical condition or have been born without the portion of the finger such as the phalanx.

While displaying the first appendage option, the computer system detects (1106), via the one or more input devices, a first set of one or more inputs (e.g., touch gestures, air gestures, voice commands, button presses, and/or other inputs) (e.g., 1025*c*, 1025*d*, 1025*e*, 1025*f*, 1025*k*, 10251, 1075*c*, 1075*d*, 1075*i*, X1075*i*, 1075*j*, X1075*j*, an input selecting 1022*a*, and/or an input selecting 1022*b*) that includes an input selecting the first appendage option. In response to (and/or, in some embodiments, after) detecting the first set of one or more inputs, the computer system sets (1108) (e.g., the computer system enables or disables) a respective availability state (e.g., available or unavailable) of the first appendage (e.g., in accordance with the selection of the first appendage option). In some embodiments, setting the availability state of the first appendage includes changing an appearance (e.g., a fill state, color, size, outlining, highlighting, or other visible feature) of the first appendage option to indicate the availability state of the first appendage. Setting a respective availability state of the first appendage in response to detecting the first set of one or more inputs enables the user quickly and efficiently designate the availability state of the first appendage without displaying additional controls and to provide information that improves tracking of the first appendage, thereby reducing the number of inputs needed to perform an operation and providing additional control options without cluttering the user interface with additional displayed controls. For example, a user might not want the first appendage to be available for displayed due to a characteristic of the first appendage, and/or the user might not want to use the first appendage (or have the first appendage used) for performing an input (e.g., because the first appendage is not available or the input cannot be easily performed with the first appendage).

After setting the respective availability state of the first appendage, the computer system performs (1110) a tracking function based on the respective availability state of the first appendage (e.g., the computer system displays a representation of the physical feature based at least in part on the respective availability state of the appendage and/or detecting a gesture performed by the physical feature based at least in part on the respective availability state of the appendage) (e.g., display 1016*a* based on selected states of 1022*a* and/or 1024*a*1-1024*a*5; display 1016*b* based on selected states of 1022*b* and/or 1024*b*1-1024*b*5; detect (and/or perform an operation in response to) an input by 1000*a* based on selected states of 1022*a* and/or 1024*a*1-1024*a*5; and/or detect (and/or perform an operation in response to) an input by 1000*b* based on selected states of 1022*b* and/or 1024*b*1-1024*b*5). In some embodiments, the tracking function is performed by the computer system (e.g., using one or more processors and/or one or more sensors of the computer system). In some embodiments, the tracking function is performed by one or more remote computer systems and/or one or more remote sensors that are remote from the computer system. In some embodiments, if the respective availability state is enabled (e.g., the respective availability state indicates that the first appendage is available and/or is to be tracked), the first appendage is tracked (or is attempted to be tracked); and if the respective availability state is disabled (e.g., the respective availability state indicates that the first appendage is not available and/or is not to be tracked), the computer system does not track (or does not attempt to track) the first appendage is not tracked (or is not attempted to be tracked) and/or the tracking function is performed (e.g., the person is tracked) without tracking (or without attempting to track) the first appendage. In some embodiments, performing the tracking function includes performing one or more tracking algorithms and/or controlling one or more sensors to track (or attempt to track) the person or a portion of the person (e.g., the first appendage). Performing a tracking function based on the respective availability state of the first appendage enables the user to customize tracking (e.g., display and/or use) of the first appendage and improves tracking of the first appendage (e.g., to identify inputs involving the physical feature more accurately and reduce the number of missed and/or improperly detected inputs), thereby improving privacy, reducing the number of inputs needed to perform an operation, and providing a more varied, detailed, and/or realistic user experience while saving storage space.

In some embodiments, performing the tracking function based on the respective availability state of the first appendage includes: in accordance with a determination that the respective availability state is set to a first availability state (e.g., available and/or enabled) (e.g., the state of 1024*a*2 in FIG. 10J), performing the tracking function in a first mode (e.g., displaying a representation of the first appendage, displaying the representation of the first appendage with a first appearance, and/or detecting a gesture using the first appendage); and in accordance with a determination that the respective availability state is set to a second state (e.g., unavailable and/or disabled) (e.g., the state of 1024*b*2 in FIGS. 10L1 and/or 10L2) that is different from the first availability state, performing the tracking function in a second mode (e.g., displaying a representation of the person without displaying a representation of the first appendage, displaying the representation of the first appendage with a second appearance that is different form the first appearance, and/or detecting a gesture without using the first appendage) that is different from the first mode (e.g., perform the tracking function differently for 1000*a* than for 1000*b* because the state of 1024*a*1-1024*a*5 is different from the state of 1024*b*1-1024*b*5). Performing the tracking function in different modes for different states of the respective availability state enables the user to customize tracking (e.g., display and/or use) of the first appendage and improves tracking of the first appendage, thereby improving privacy and providing a more varied, detailed, and/or realistic user experience while saving storage space.

In some embodiments, the computer system generates (e.g., the computer system creates and/or displays) a visual representation (e.g., an avatar) (e.g., 1016, 1032, and/or 1038) of the person based on the information about the physical feature of the person captured in the enrollment process. In some embodiments, the computer system generates the visual representation of the person based on the respective availability state of the first appendage. In some embodiments, in accordance with a determination that the respective availability state is set to a first availability state (e.g., available and/or enabled), the computer system generates (e.g., creates and/or displays) the visual representation of the person having a first appearance (e.g., the visual representation of the person includes a representation of the first appendage that is based on a physical characteristic of the first appendage); and in accordance with a determination that the respective availability state is set to a second state (e.g., unavailable and/or disabled) that is different from the first availability state, the computer system generates (e.g., creates and/or displays) the visual representation of the person having a second appearance (e.g., the visual representation of the person does not include a representation of the first appendage or includes a representation of the first appendage that is not based on a physical characteristic of the first appendage) that is different from the first appearance. Generating a visual representation of the person based on the information about the physical feature of the person captured in the enrollment process enables the computer system to display a more physically accurate representation of the physical feature, thereby providing improved visual feedback to the user and providing a more varied, detailed, and/or realistic user experience while saving storage space.

In some embodiments, the computer system detects (e.g., after performing the enrollment process), via the one or more input devices, an input (e.g., an air gesture and/or a gesture that includes the first appendage) (e.g., the pinch gesture performed by 1000*b*1 and 1000*b*2 in FIGS. 10H-10N and/or the pinch gesture performed by 1000*a*1 and 1000*a*2 in FIG. 10O); and in response to detecting the input, the computer system performs an action (e.g., a function and/or operation) (e.g., selection of 1030*a* and/or selection of 1030*b*) based on the information about the physical feature of the person captured in the enrollment process (e.g., the information about 1000 captured in FIGS. 10B-10E). In some embodiments, performing the action based on the information about the physical feature of the person captured in the enrollment process includes: in accordance with a determination that first information about the physical feature is captured in the enrollment process, performing a first action; and in accordance with a determination that second information about the physical feature is captured in the enrollment process, wherein the second information is different from the first information, performing a second action that is different from the first action (or, in some embodiments, foregoing performing the first action, for example because the input does not correspond to the first action when the second information about the physical feature is captured in the enrollment process where the input would correspond to the first action when the first information about the physical feature is captured in the enrollment process). Performing an action based on the information about the physical feature of the person captured in the enrollment process in response to detecting an input enables the computer system to respond to inputs (e.g., gestures that include the physical feature) more accurately (e.g., identify inputs more accurately and reduce the number of missed and/or improperly detected inputs), thereby providing improved visual feedback to the user and reducing the number of inputs needed to perform an operation.

In some embodiments, after performing the enrollment process, the computer system displays, via the one or more display generation components, a body part option (e.g., 1022*a* and/or 1022*b*) corresponding to a body part (e.g., a hand) that includes the first appendage; while displaying the body part option, the computer system detects, via the one or more input devices, a second set of one or more inputs (e.g., touch gestures, air gestures, voice commands, button presses, and/or other inputs) (e.g., an input selecting 1022*a* and/or 1022*b*) that includes an input selecting the body part option; in response to detecting the second set of one or more inputs, the computer system sets (e.g., the computer system enables or disables) an availability state (e.g., available or unavailable) of the body part; and after setting the availability state of the body part, the computer system performs the tracking function based on the availability state of the body part (e.g., the computer system displays a representation of the physical feature based at least in part on the availability state of the body part and/or detects a gesture performed by the physical feature based at least in part on the availability state of the body part). In some embodiments, setting the availability state of the body part includes changing an appearance (e.g., a fill state, color, size, outlining, highlighting, or other visible feature) of the body part option to indicate the availability state of the body part. In some embodiments, performing the tracking function based on the availability state of the body part includes: in accordance with a determination that the availability state of the body part is set to a first state, performing the tracking function in a first mode; and in accordance with a determination that the availability state of the body part is set to a second state that is different from the first state, performing the tracking function in a second mode that is different from the first mode. Performing the tracking function based on the availability state of the body part set in response to detecting a set of inputs enables the user to customize tracking (e.g., display and/or use) of the body part and improves tracking of the body part (e.g., to identify inputs involving the body part more accurately and reduce the number of missed and/or improperly detected inputs), thereby improving privacy, reducing the number of inputs needed to perform an operation, and providing a more varied, detailed, and/or realistic user experience while saving storage space.

In some embodiments, the first appendage is a first finger (e.g., 1000*a*1-1000*a*5 and/or 1000*b*1-1000*b*5) of the person (e.g., an index finger). In some embodiments, the computer system displays, via the one or more display generation components, a first body part option (e.g., an option for displaying options corresponding to respective individual fingers of a first hand); the computer system detects, via the one or more input devices, a selection of the first body part option; and displaying the set of one or more appendage options corresponding to the one or more respective appendages is performed in response to detecting the selection of the first body part option. Performing a tracking function based on the respective availability state of a finger enables the user to customize tracking (e.g., display and/or use) of the finger and improves tracking of the finger (e.g., to identify inputs involving the finger more accurately and reduce the number of missed and/or improperly detected inputs), thereby improving privacy, reducing the number of inputs needed to perform an operation, and providing a more varied, detailed, and/or realistic user experience while saving storage space. In some embodiments, displaying the set of one or more appendage options corresponding to one or more respective appendages includes displaying: a second appendage option (e.g., 1024*a*1 or 1024*b*1) corresponding to a second finger of the person (e.g., a thumb, 1000*a*1, or 1000*b*1); a third appendage option (e.g., 1024*a*3 or 1024*b*3) corresponding to a third finger of the person (e.g., a middle finger, 1000*a*3, or 1000*b*3); a fourth appendage option (e.g., 1024*a*4 or 1024*b*4) corresponding to a fourth finger of the person (e.g., a ring finger, 1000*a*4, or 1000*b*4); and a fifth appendage option (e.g., 1024*a*5 or 1024*b*5) corresponding to a fifth finger of the person (e.g., a little finger or pinky finger, 1000*a*5, or 1000*b*5), the second finger is different from the first finger (e.g., an index finger), the third finger is different from the first finger and the second finger, the fourth finger is different from the first finger, the second finger, and the third finger, and the fifth finger is different from the first finger, the second finger, the third finger, and the fourth finger. Displaying appendage options for five fingers enables the computer system to allow the user to customize tracking of any finger of a hand and improves tracking of the physical feature (e.g., to identify inputs involving fingers more accurately and reduce the number of missed and/or improperly detected inputs), thereby improving privacy, reducing the number of inputs needed to perform an operation, and providing a more varied, detailed, and/or realistic user experience while saving storage space. In some embodiments, the set of one or more appendage options (e.g., 1024*a*1-1024*a*5) correspond to one or more respective appendages (e.g., fingers) (e.g., 1000*a*1-1000*a*5) of a first body part (e.g., a first hand and/or a left hand) (e.g., 1000*a*);

and after displaying the set of one or more appendage options corresponding to one or more respective appendages of the first body part, the computer system displays, via the one or more display generation components, a set of one or more appendage options (e.g., **1024*b*1-1024*b*5) corresponding to one or more respective appendages (e.g., fingers) (e.g., 1000*b*1-1000*b*5) of a second body part of the person (e.g., a second hand and/or a right hand of the person) (e.g., 1000*b***). In some embodiments, the computer system displays the set of one or more appendage options corresponding to one or more respective appendages of the second body part in response to selection of a body part option corresponding to the second body part. Displaying appendage options for a first body part and for a second body part enables the user to customize tracking (e.g., display and/or use) of multiple body parts and improves tracking of the person (e.g., to identify inputs more accurately and reduce the number of missed and/or improperly detected inputs), thereby improving privacy, reducing the number of inputs needed to perform an operation, and providing a more varied, detailed, and/or realistic user experience while saving storage space.

In some embodiments, in response to a determination (e.g., during the enrollment process) that a physical characteristic of the physical feature satisfies a set of prompt criteria (e.g., that a hand of the person is missing a finger, that a difference between a physical characteristic of an appendage of the person and a model of the physical characteristic satisfies a threshold, and/or that the physical characteristic includes a predetermined feature) (e.g., FIG. 10G), the computer system provides (e.g., the computer system outputs and/or displays, via the one or more display generation components) an appendage selection prompt (e.g., instructions, a suggestion, a visual prompt, an audio prompt, a sound, and/or a tactile output) (e.g., 1012, 1014, **1018*a*, 1020*a*, and/or 1020*b*); the computer system detects, via the one or more input devices, a second set of one or more inputs (e.g., 1025*a*, 1025*b*, 1075*a*, 1075*b*, 1025*i*, 1025*j*, 1075*g*, and/or 1075*h*) that includes a selection of the appendage selection prompt, wherein displaying the set of one or more appendage options corresponding to respective appendages of the person is performed in response to detecting the second set of one or more inputs; and in response to detecting the second set of one or more inputs, the computer system initiates a process for selecting one or more options (e.g., 1024*a*1-1024*a*5 and/or 1024*b*1-1024*b*5) associated with appendage selection prompt (e.g., 1020*a* and/or 1020*b***). In some embodiments, the set of prompt criteria includes a criterion that is satisfied when a hand of the person is missing a finger, a criterion that is satisfied when a difference between a physical characteristic of an appendage of the person and a model of the physical characteristic satisfies a threshold, and/or a criterion that is satisfied when the physical characteristic includes a predetermined feature. In some embodiments, in response to detecting a selection of the appendage selection prompt, the computer system displays a user interface for selecting respective availability states for one or more portions (e.g., appendages) of the body of the person. Providing a prompt to display the set of one or more appendage options in response to a determination that a set of criteria is satisfied enables the computer system to automatically provide the user with options for setting the availability of the first appendage when the options are relevant to the user, thereby providing improved visual feedback to the user, reducing the number of inputs needed to perform an operation, and performing an operation when a set of conditions has been met without requiring further user input.

In some embodiments, performing the enrollment process includes identifying (e.g., automatically identifying, without user input and/or based on the captured information about the physical feature of the person) a predetermined feature (e.g., a hand of the person is missing a finger and/or a difference between a physical characteristic of an appendage of the person and a model of the physical characteristic) of the physical feature of the person (e.g., determining that the predetermined feature of the physical feature of the person exists) (e.g., as described in FIG. 10G). Identifying a predetermined feature of the physical feature of the person as part of the enrollment process enables the computer system to improve tracking (e.g., display and/or use) of the physical feature (e.g., to display the physical feature more accurately, to identify inputs involving the physical feature more accurately, and reduce the number of missed and/or improperly detected inputs), thereby improving privacy, reducing the number of inputs needed to perform an operation, and providing a more varied, detailed, and/or realistic user experience while saving storage space.

In some embodiments, in accordance with a determination that a threshold number of appendages (e.g., fingers) is identified (e.g., detected and/or determined), the computer system provides (e.g., the computer system outputs and/or displays, via the one or more display generation components) a prompt (e.g., 1012) (e.g., instructions, a suggestion, a visual prompt, an audio prompt, a sound, and/or a tactile output) to set up (e.g., activate and/or configures) an input device (e.g., an accessibility input device, an input device that is different from the one or more input devices, and/or an input device that receives and/or detects inputs in a different manner than the one or more input devices). In some embodiments, a number of appendages is determined automatically (e.g., by the computer system and/or one or more external computer systems and/or sensor) or is entered (e.g., manually) by a user. In some embodiments, indication 1012 includes a prompt to set up the input device. In some embodiments, the computer system is configured for a user to interact with the computer system primarily through input that involves use of one or more hands of a user. In some embodiments, the input device does not require use of a hand, requires limited use of a hand, and/or is configured to detect inputs that can be performed by a user with a hand difference (e.g., a hand with one or more characteristics that vary from a common hand), such that the input device makes it easier for a user with a hand different to provide inputs. Providing a prompt to set up an input device in accordance with a determination that a threshold number of appendages is identified enables the computer system to automatically provide the user with relevant options, thereby providing improved visual feedback to the user, reducing the number of inputs needed to perform an operation, and performing an operation when a set of conditions has been met without requiring further user input.

In some embodiments, a representation (e.g., 1016, **1016*a*, 1016*b*, 1016*a*1, 1016*a*2, 1016*b*1, 1016*b*2, 1032*a*, 1032*b*, 1032*a*1, 1032*a*2, 1032*b*1, 1032*b*2, 1038*a*, 1038*b*, 1038*a*1, 1038*a*2, 1038*b*1, and/or 1038*b*2**) of the physical feature of the person (e.g., one or more hands and/or appendages of the person and/or the first appendage) is displayed (e.g., via the one or more display generation components and/or at a computer system of a user other than the person) with one or more hand representations that have an appearance that is determined based on a set of one or more availability states corresponding to respective appendages (e.g., based, at least in part, on the respective availability state of the first appendage). For example, in accordance with a determination that the respective availability state is set to a first availability state (e.g., available and/or enabled), the representation of the physical feature of the person is displayed having a first visual appearance; and in accordance with a determination that the respective availability state is set to a second state (e.g., unavailable and/or disabled) that is different from the first availability state, the representation of the physical feature of the person is displayed having a second visual appearance that is different from the first visual appearance. In some embodiments, in accordance with a determination that the respective availability state is set to a first availability state (e.g., available and/or enabled), a representation (e.g., an avatar) of the person is displayed having a first representation of a hand (e.g., a representation of a hand with a first visual appearance); and in accordance with a determination that the respective availability state is set to a second state (e.g., unavailable and/or disabled) that is different from the first availability state, the representation of the person is displayed having a second representation of a hand (e.g., a representation of a hand with a second visual appearance) that is different from the first representation of the hand. Displaying a representation of the physical feature of the person based on a set of one or more availability states corresponding to respective appendages enables the user to customize display of the physical feature and/or the respective appendages, thereby improving privacy and providing a more varied, detailed, and/or realistic user experience while saving storage space.

In some embodiments, in accordance with a determination that the set of one or more availability states is set to a first set of values (e.g., a first set of fingers are set as available) (e.g., the set of values represented by **1024*a*1-1024*a*5 in FIG. 10J), the representation of the physical feature of the person (e.g., a hand of the person and/or one or more appendages) is displayed (e.g., via the one or more display generation components and/or at a computer system of a user other than the person) having a first visual appearance; and in accordance with a determination that the set of one or more availability states is set to a second set of values (e.g., the set of values represented by 1024*b*1-1024*b*5 in FIG. 10**M) (e.g., a second set of fingers are set as available) that is different from the first set of values, the representation of the physical feature of the person is displayed (e.g., via the one or more display generation components and/or at a computer system of a user other than the person) having a second visual appearance that is different from the first visual appearance. Displaying the representation of the physical feature with different appearances based on the availability states of the respective appendages enables the user to customize display of the physical feature and/or the respective appendages, thereby improving privacy, performing an operation when a set of conditions has been met without requiring further user input, and providing a more varied, detailed, and/or realistic user experience while saving storage space.

In some embodiments, the computer system displays the representation (e.g., 1016, **1016*a*, 1016*b*, 1016*a*1, 1016*a*2, 1016*b*1, 1016*b*2, 1032*a*, 1032*b*, 1032*a*1, 1032*a*2, 1032*b*1, 1032*b*2, 1038*a*, 1038*b*, 1038*a*1, 1038*a*2, 1038*b*1, and/or 1038*b*2) of the physical feature of the person (e.g., a hand of the person and/or the first appendage) via the one or more display generation components (e.g., 702**), including displaying the representation of the physical feature of the person (e.g., a hand of the person and/or the first appendage) from a viewpoint (e.g., a viewpoint in an avatar editing user interface and/or a viewpoint in an XR environment) of a user of the computer system (e.g., a viewpoint of the person and/or a viewpoint in which the physical feature of the person is visible). Displaying the representation of the physical feature of the person from a viewpoint of a user of the computer system provides the user with improved spatial context and a more realistic experience, thereby providing the use with improved visual feedback and providing a more varied, detailed, and/or realistic user experience while saving storage space.

In some embodiments, an avatar (e.g., 1016, 1032, and/or 1038) of a user of the computer system is displayed (e.g., via the one or more display generation components and/or at a computer system of a user other than the person), and wherein the avatar of the user of the computer system includes the representation (e.g., 1016, **1016*a*, 1016*b*, 1016*a*1, 1016*a*2, 1016*b*1, 1016*b*2, 1032*a*, 1032*b*, 1032*a*1, 1032*a*2, 1032*b*1, 1032*b*2, 1038*a*, 1038*b*, 1038*a*1, 1038*a*2, 1038*b*1, and/or 1038*b*2**) of the physical feature (e.g., one or more hands and/or fingers) of the person. Displaying the representation of the physical feature of the person as part of an avatar of the user of the computer system provides improved spatial context and a more realistic experience, thereby providing the use with improved visual feedback and providing a more varied, detailed, and/or realistic user experience while saving storage space.

In some embodiments, the representation of the physical feature (e.g., one or more hands and/or appendages) of the person is displayed (e.g., at a computer system of a user other than the person) in a real-time communication session that includes a user of the computer system and one or more other (e.g., remote) participants (e.g., the representation of the physical feature is displayed to the one or more remote participants at their respective computer systems that are different from the computer system that the user is using) (e.g., as in FIGS. 10Q1-10Q2). Displaying the representation of the physical feature of the person in a real-time communication session that includes a user of the computer system and one or more other participants provides improved spatial context and a more realistic experience for the participants of the real-time communication session and enables the user of the computer system to communicate more effectively, thereby providing the use with improved visual feedback, reducing the number of inputs needed to perform an operation, and providing a more varied, detailed, and/or realistic user experience while saving storage space. In some embodiments, the computer system provides (e.g., outputs audio and/or displays a user interface of) a real-time (e.g., live) communication session. In some embodiments, a representation of the person is displayed and/or otherwise used to communicate during the real-time communication session. In some embodiments, a real-time communication session includes real-time communication between participants of the real-time communication session, such as a user of the computer system and one or more other persons (e.g., one or more other users associated with other (e.g., different) computer systems). In some embodiments, providing the real-time communication session includes displaying representations of the person's body (e.g., facial expression, body expression, body position, and/or body movement) via the representation of the person. In some embodiments, providing the real-time communication session includes displaying the representation of the person and/or outputting audio corresponding to utterances of the person in real time. In some embodiments, the computer system and one or more other (e.g., remote) computer systems are in communication (e.g., wireless communication) with one another to enable transmission of information indicative of the representation of the person and/or audio corresponding to utterances of the person between the computer system and the one or more other computer systems. In some embodiments, a real-time communication session includes an XR experience (e.g., an XR environment). In some embodiments, the real-time communication session includes displaying the representation of the person (and, optionally, a representation of a second person) in an XR environment via display generation components of the computer system and the one or more other computer systems in communication via the real-time communication session. In some embodiments, the computer system causes display of the representation of the physical feature to remote participants (e.g., at computer systems associated with remote participants) of the real-time communications session by, e.g., transmitting data representing the representation of the physical feature. In some embodiments, the computer system displays representations of the one or more remote participants in the real-time communication session, including representations of the corresponding physical features of the remote participants that are based on availability states of the corresponding physical features (or appendages of the physical features) set by the remote participants.

In some embodiments, displaying the representation of the physical feature includes displaying (e.g., via the one or more display generation components and/or at a computer system of a user other than the person) a representation of the first appendage with an appearance (e.g., based on the respective availability state of the first appendage) that is different from a physical appearance of the first appendage (e.g., displaying a placeholder, default, and/or generic version of the first appendage) (e.g., **1016*a*1 and 1016*a*2 have a different appearance than 1000*a*2 and 1000*a*3, respectively; 1016*b*1 has a different appearance than 1000*b*5 1032*a*1 and 1032*a*2 have a different appearance than 1000*a*2 and 1000*a*3, respectively; 1032*b*1 has a different appearance than 1000*b*5; 1038*a*1 and 1038*a*2 have a different appearance than 1000*a*2 and 1000*a*3, respectively; 1038*b*1 has a different appearance than 1000*b*5**). In some embodiments, the representation of the physical feature is displayed (e.g., via the one or more display generation components and/or at a computer system of a user other than the person) with a representation of the first appendage having an appearance that is different from a physical appearance of the first appendage. Displaying a representation of the first appendage with an appearance that is different from a physical appearance of the first appendage enables the computer system to customize display of the first appendage (e.g., based on an availability state selected by the user), thereby improving privacy and providing a more varied, detailed, and/or realistic user experience while saving storage space.

In some embodiments, displaying the representation of the physical feature includes displaying (e.g., via the one or more display generation components and/or at a computer system of a user other than the person) the representation of the physical feature without a representation of the first appendage (e.g., display 1016 without **1016*a*1, 1016*a*2, and/or 1016*b*1; display 1032 without 1032*a*1, 1032*a*2, and/or 1032*b*1; display 1038 without 1038*a*1, 1038*a*2, and/or 1038*b*1. In some embodiments, representation of the physical feature is displayed (e.g., via the one or more display generation components and/or at a computer system of a user other than the person) without a representation of the first appendage. Displaying the representation of the physical feature without a representation of the first appendage enables the computer system to forego display of the first appendage (e.g., based on an availability state selected by the user), thereby improving privacy and providing a more varied, detailed, and/or realistic user experience while saving storage space. In some embodiments, displaying the representation of the physical feature includes displaying (e.g., via the one or more display generation components and/or at a computer system of a user other than the person) a representation of a first portion (e.g., a first joint and/or first phalanx) of the first appendage without displaying a second portion (e.g., a second joint and/or second phalanx) of the first appendage (e.g., 1016*b*2, 1032*b*2, and/or 1038*b*2 includes only a portion of right middle finger 1000*b*3**). In some embodiments, the computer system displays a representation of only a portion of the first appendage based on what portions of the first appendage are detected and/or what portions of the first appendage are determined to be missing. For example, the computer system can display a finger that ends at a particular joint based on information captured about the finger and/or an availability state set for the finger. In some embodiments, the representation of the physical feature is displayed (e.g., via the one or more display generation components and/or at a computer system of a user other than the person) with a representation of the first portion of the first appendage without displaying the second portion of the first appendage. Displaying a representation of a first portion of the first appendage without displaying a second portion of the first appendage enables the computer system to customize display of the first appendage and display the appendage more accurately, thereby improving privacy and providing a more varied, detailed, and/or realistic user experience while saving storage space.

In some embodiments, displaying the representation of the physical feature includes displaying (e.g., via the one or more display generation components and/or at a computer system of a user other than the person) movement of the representation of the physical feature based on (e.g., in response to) physical movement of the physical feature (e.g., **1016*a*, 1032*a*, and/or 1038*a* (and/or portions thereof) move based on movement of 1000*a* (and/or movement of corresponding portions thereof); and/or 1016*b*, 1032, and/or 1038*b* (and/or portions thereof) move based on movement of 1000*b* (and/or movement of corresponding portions thereof)). In some embodiments, movement of the representation of the physical feature is visible from a viewpoint (e.g., a viewpoint of a user of the computer system and/or a viewpoint of a remote participant) in a real-time communication session (e.g., an XR environment that enables live audio and/or video communication between participants). In some embodiments, the representation of the physical feature includes a first portion (e.g., a representation of a finger) that represents a portion of the physical feature that does not exist (e.g., a missing finger), and the first portion of the representation of the physical feature is moved based on movement of another portion of the physical feature (e.g., a portion of the physical feature that does exist and/or another part of the hand) (e.g., movement of the first portion of the representation is based on movement of part of the physical feature other than the part represented by the first portion of the representation). Displaying movement of the representation of the physical feature based on physical movement of the physical feature enables the computer system to represent a current state (and/or a change in state) of the physical feature via the representation of the physical feature and enables the user to communicate via movement in a real-time communication session, thereby providing improved visual feedback to the user, reducing the number of inputs needed to perform an operation, and providing a more varied, detailed, and/or realistic user experience while saving storage space. In some embodiments, displaying movement of the representation of the physical feature based on the physical movement of the physical feature includes displaying (e.g., via the one or more display generation components and/or at a computer system of a user other than the person) movement of the representation (e.g., 1016***a*, 1032*a*, and/or 1038*a*) of the physical feature (e.g., 1000*a*) based on movement of a first set of one or more appendages (e.g., 1000*a*1, 1000*a*4, and 1000*a*5) of the physical feature that are detected without detecting a second set of one or more appendages of the physical feature (e.g., 1000*a*1 and/or 1000*a*3). In some embodiments, the movement of the representation of the physical feature (and/or a representation of one or more appendages of the physical feature) is determined using inverse kinematic. In some embodiments, a pose of the physical feature is determined based on appendages that are detected and without regard to appendages that are not detected (e.g., because the fingers that are not detected do not exist). Displaying movement of the representation based on movement of a first set of one or more appendages of the physical feature that are detected without detecting a second set of one or more appendages of the physical feature enables the computer system to more accurately represent a current state (and/or a change in state) of the physical feature via the representation of the physical feature and improves the ability of the user to communicate via movement in a real-time communication session, thereby providing improved visual feedback to the user, reducing the number of inputs needed to perform an operation, and providing a more varied, detailed, and/or realistic user experience while saving storage space.

In some embodiments, the computer system detects, via the one or more input device, an input performed at least in part by the physical feature (e.g., a gesture, such as an air gesture, performed at least in part by 1000*a* and/or 1000*b*); and in response to detecting the input performed at least in part by the physical feature: in accordance with a determination that the respective availability state is set to a first availability state (e.g., available and/or enabled), the computer system performs a first operation (e.g., because the input is determined to be a first type of input) (e.g., selection of 1030*a* and/or 1030*b*); and in accordance with a determination that the respective availability state is set to a second state (e.g., unavailable and/or disabled) that is different from the first availability state, the computer system performs a second operation (e.g., forego selection of 1030*a* and/or 1030*b*) that is different from the first operation (e.g., because the input is determined to be a second type of input that is different from the first type of input) (or, in some embodiments, the computer system foregoes performing the first operation). In some embodiments, the input includes an air gesture or other gesture performed at least in part by the physical feature. In some embodiments, an air gesture is based on a position and/or a pose of a hand. In some embodiments, the input includes a pose of a hand and an eye gaze (e.g., a position and/or movement of a person's eyes). In some embodiments, in accordance with a determination that the respective availability state is set to the second state, the computer system foregoes performing an operation (e.g., because the input is determined to not correspond to a type of function). In some embodiments, the computer system detects, determines, and/or interprets an input based on an availability state of one or more appendages (e.g., the respective availability state of the first appendage). Performing different operations for different availability states of the first appendage enables the computer system to customize the operation that is performed in response to an input and/or to customize the types of inputs that can cause performance of an operation, thereby providing improved visual feedback to the user, reducing the number of inputs needed to perform an operation, performing an operation when a set of conditions has been met without requiring further user input, and providing a more varied, detailed, and/or realistic user experience while saving storage space. In some embodiments, the computer system uses different input detection criteria based on the respective availability state. For example, in some embodiments, in response to detecting the input performed at least in part by the physical feature and in accordance with a determination that a set of operation criteria is met, the computer system performs the first operation, wherein: in accordance with a determination that the respective availability state is set to a first state, the set of operation criteria includes a first set of criteria; and in accordance with a determination that the respective availability state is set to a second state that is different from the first availability state, the set of operation criteria includes a second set of criteria that is different from the first set of criteria. In another example, in some embodiments, in response to detecting the input performed at least in part by the physical feature: in accordance with a determination that the respective availability state is set to the first availability state and the input includes a first gesture performed at least in part by the physical feature, the computer system performs the first operation; and in accordance with a determination that the respective availability state is set to the second state and the input includes a second gesture performed at least in part by the physical feature that is different from the first gesture, the computer system performs the first operation (e.g., the same operation as for the first gesture).

In some embodiments, aspects/operations of methods 800, 900, and/or 1100 may be interchanged, substituted, and/or added between these methods. For example, the avatar recited in method 800 is the avatar recited in method 900. In some embodiments, the avatar recited in method 800 and/or the avatar recited in method 900 includes a representation of the first appendage that is based on the availability state of the first appendage described in method 1100. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components and one or more input devices, the computer system comprising:
- one or more processors; and
- memory storing one or more programs configured to be executed by the one or more processors, the one or more programs including instructions for:
  - concurrently displaying, via the one or more display generation components:
    - an avatar at a first location in a three-dimensional environment; and
    - a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user;
  - while concurrently displaying the avatar and the respective user interface, detecting, via the one or more input devices, an input directed to a control in the respective user interface;
  - in response to detecting the input directed to the control in the respective user interface, changing an appearance of the avatar based on the input;
  - while displaying the respective user interface that includes the one or more controls for editing the visual appearance of the avatar at a first user interface location in the three-dimensional environment, detecting, via the one or more input devices, movement by the user; and
  - in response to detecting the movement by the user:
    - in accordance with a determination that the movement by the user exceeds a distance threshold, displaying, via the one or more display generation components, the respective user interface that includes the one or more controls for editing the visual appearance of the avatar at a modified user interface location in the three-dimensional environment different from the first user interface location in the three-dimensional environment; and in accordance with a determination that the movement by the user does not exceed the distance threshold, displaying, via the one or more display generation components, movement of the avatar based on the movement by the user while maintaining display of the respective user interface that includes the one or more controls for editing the visual appearance of the avatar at the first user interface location in the three-dimensional environment.

2. The computer system of claim 1, wherein the avatar is positioned in front of the surface relative to the viewpoint of the user.

3. The computer system of claim 1, wherein the avatar is positioned behind the surface relative to the viewpoint of the user.

4. The computer system of claim 1, the one or more programs further including instructions for:

concurrently displaying, via the one or more display generation components:

the avatar at a first avatar location in the three-dimensional environment; and the respective user interface incorporated into the surface at a second user interface location in the three-dimensional environment that is proximate to the avatar but is spaced apart from the avatar in the simulated depth dimension of the three-dimensional environment relative to the viewpoint of the user;

while concurrently displaying the avatar at the first avatar location in the three-dimensional environment and the respective user interface at the second user interface location in the three-dimensional environment, detecting, via the one or more input devices, second movement by the user; and in response to detecting the second movement by the user, displaying, via the one or more display generation components, movement of the avatar from the first avatar location in the three-dimensional environment to a modified avatar location in the three-dimensional environment different from the first avatar location in the three-dimensional environment while maintaining display of the respective user interface incorporated into the surface at the second user interface location in the three-dimensional environment.

5. The computer system of claim 4, wherein:

the avatar is configured to move in a first direction, and is not configured to move in a second direction different from the first direction; and displaying movement of the avatar from the first avatar location in the three-dimensional environment to the modified avatar location in the three-dimensional environment comprises displaying movement of the avatar in the first direction without moving the avatar in the second direction.

6. The computer system of claim 4, the one or more programs further including instructions for:

while concurrently displaying the avatar at the first avatar location in the three-dimensional environment and the respective user interface at the second user interface location in the three-dimensional environment, detecting, via the one or more input devices, third movement by the user; and in response to detecting the third movement by the user:

in accordance with a determination that the third movement by the user exceeds a second distance threshold, displaying, via the one or more display generation components, movement of the respective user interface incorporated into the surface from the second user interface location in the three-dimensional environment to a second modified user interface location in the three-dimensional environment different from the second user interface location in the three-dimensional environment.

7. The computer system of claim 4, the one or more programs further including instructions for:

while concurrently displaying the avatar at the first avatar location in the three-dimensional environment and the respective user interface at the second user interface location in the three-dimensional environment, detecting, via the one or more input devices, third movement by the user; and in response to detecting the third movement by the user:

in accordance with a determination that the third movement by the user exceeds a second distance threshold, ceasing display of the avatar while maintaining display of the respective user interface incorporated into the surface at the second user interface location in the three-dimensional environment.

8. The computer system of claim 4, the one or more programs further including instructions for:

while concurrently displaying the avatar at the first avatar location in the three-dimensional environment and the respective user interface at the second user interface location in the three-dimensional environment, detecting, via the one or more input devices, fourth movement by the user; and in response to detecting the fourth movement by the user:

in accordance with a determination that the fourth movement by the user exceeds a third distance threshold, ceasing display of the avatar while maintaining display of the respective user interface incorporated into the surface at the second user interface location in the three-dimensional environment; and in accordance with a determination that the fourth movement by the user exceeds a fourth distance threshold different from the third distance threshold:

displaying, via the one or more display generation components, movement of the respective user interface incorporated into the surface from the second user interface location in the three-dimensional environment to a third user interface location in the three-dimensional environment different from the second user interface location in the three-dimensional environment; and displaying, via the one or more display generation components, the avatar at a second avatar location in the three-dimensional environment, wherein:

the third user interface location in the three-dimensional environment and the second avatar location in the three-dimensional environment are centered on the viewpoint of the user after the fourth movement by the user; and the third user interface location in the three-dimensional environment is proximate to the second avatar location in the three-dimensional environment but is spaced apart from the second avatar location in the three-dimensional environment in the simulated depth dimension of the three-dimensional environment relative to the viewpoint of the user after the fourth movement by the user.

9. The computer system of claim 1, the one or more programs further including instructions for:

while concurrently displaying the avatar and the respective user interface incorporated into the surface, detecting, via the one or more input devices, fifth movement by the user; and in response to detecting the fifth movement by the user:

in accordance with a determination that the fifth movement by the user includes movement in a third direction that exceeds a threshold distance of movement in the third direction, cropping at least a portion of the avatar.

10. The computer system of claim 1, wherein displaying the avatar comprises displaying the avatar at a height relative to a floor of the three-dimensional environment that corresponds to a height of the user.

11. The computer system of claim 1, wherein displaying the avatar comprises displaying the avatar at a predetermined height in the three-dimensional environment.

12. The computer system of claim 1, wherein displaying the avatar comprises displaying the avatar at a scale that corresponds to a size of the user.

13. A non-transitory computer-readable storage medium storing one or more programs configured to be executed by one or more processors of a computer system that is in communication with one or more display generation components and one or more input devices, the one or more programs including instructions for:

concurrently displaying, via the one or more display generation components:

an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user;

while concurrently displaying the avatar and the respective user interface, detecting, via the one or more input device, an input directed to a control in the respective user interface;

in response to detecting the input directed to the control in the respective user interface, changing an appearance of the avatar based on the input;

while displaying the respective user interface that includes the one or more controls for editing the visual appearance of the avatar at a first user interface location in the three-dimensional environment, detecting, via the one or more input devices, movement by the user; and in response to detecting the movement by the user:

in accordance with a determination that the movement by the user exceeds a distance threshold, displaying, via the one or more display generation components, the respective user interface that includes the one or more controls for editing the visual appearance of the avatar at a modified user interface location in the three-dimensional environment different from the first user interface location in the three-dimensional environment; and in accordance with a determination that the movement by the user does not exceed the distance threshold, displaying, via the one or more display generation components, movement of the avatar based on the movement by the user while maintaining display of the respective user interface that includes the one or more controls for editing the visual appearance of the avatar at the first user interface location in the three-dimensional environment.

14. The non-transitory computer-readable storage medium of claim 13, wherein the avatar is positioned in front of the surface relative to the viewpoint of the user.

15. The non-transitory computer-readable storage medium of claim 13, wherein the avatar is positioned behind the surface relative to the viewpoint of the user.

16. The non-transitory computer-readable storage medium of claim 13, the one or more programs further including instructions for:

concurrently displaying, via the one or more display generation components:

the avatar at a first avatar location in the three-dimensional environment; and the respective user interface incorporated into the surface at a second user interface location in the three-dimensional environment that is proximate to the avatar but is spaced apart from the avatar in the simulated depth dimension of the three-dimensional environment relative to the viewpoint of the user;

while concurrently displaying the avatar at the first avatar location in the three-dimensional environment and the respective user interface at the second user interface location in the three-dimensional environment, detecting, via the one or more input devices, second movement by the user; and in response to detecting the second movement by the user, displaying, via the one or more display generation components, movement of the avatar from the first avatar location in the three-dimensional environment to a modified avatar location in the three-dimensional environment different from the first avatar location in the three-dimensional environment while maintaining display of the respective user interface incorporated into the surface at the second user interface location in the three-dimensional environment.

17. The non-transitory computer-readable storage medium of claim 16, wherein:

the avatar is configured to move in a first direction, and is not configured to move in a second direction different from the first direction; and displaying movement of the avatar from the first avatar location in the three-dimensional environment to the modified avatar location in the three-dimensional environment comprises displaying movement of the avatar in the first direction without moving the avatar in the second direction.

18. The non-transitory computer-readable storage medium of claim 16, the one or more programs further including instructions for:

while concurrently displaying the avatar at the first avatar location in the three-dimensional environment and the respective user interface at the second user interface location in the three-dimensional environment, detecting, via the one or more input devices, third movement by the user; and in response to detecting the third movement by the user:

in accordance with a determination that the third movement by the user exceeds a second distance threshold, displaying, via the one or more display generation components, movement of the respective user interface incorporated into the surface from the second user interface location in the three-dimensional environment to a second modified user interface location in the three-dimensional environment different from the second user interface location in the three-dimensional environment.

19. The non-transitory computer-readable storage medium of claim 16, the one or more programs further including instructions for:

while concurrently displaying the avatar at the first avatar location in the three-dimensional environment and the respective user interface at the second user interface location in the three-dimensional environment, detecting, via the one or more input devices, third movement by the user; and in response to detecting the third movement by the user:

in accordance with a determination that the third movement by the user exceeds a second distance threshold, ceasing display of the avatar while maintaining display of the respective user interface incorporated into the surface at the second user interface location in the three-dimensional environment.

20. The non-transitory computer-readable storage medium of claim 16, the one or more programs further including instructions for:

while concurrently displaying the avatar at the first avatar location in the three-dimensional environment and the respective user interface at the second user interface location in the three-dimensional environment, detecting, via the one or more input devices, fourth movement by the user; and in response to detecting the fourth movement by the user:

in accordance with a determination that the fourth movement by the user exceeds a third distance threshold, ceasing display of the avatar while maintaining display of the respective user interface incorporated into the surface at the second user interface location in the three-dimensional environment; and in accordance with a determination that the fourth movement by the user exceeds a fourth distance threshold different from the third distance threshold:

displaying, via the one or more display generation components, movement of the respective user interface incorporated into the surface from the second user interface location in the three-dimensional environment to a third user interface location in the three-dimensional environment different from the second user interface location in the three-dimensional environment; and displaying, via the one or more display generation components, the avatar at a second avatar location in the three-dimensional environment, wherein:

the third user interface location in the three-dimensional environment and the second avatar location in the three-dimensional environment are centered on the viewpoint of the user after the fourth movement by the user; and the third user interface location in the three-dimensional environment is proximate to the second avatar location in the three-dimensional environment but is spaced apart from the second avatar location in the three-dimensional environment in the simulated depth dimension of the three-dimensional environment relative to the viewpoint of the user after the fourth movement by the user.

21. The non-transitory computer-readable storage medium of claim 13, the one or more programs further including instructions for:

while concurrently displaying the avatar and the respective user interface incorporated into the surface, detecting, via the one or more input devices, fifth movement by the user; and in response to detecting the fifth movement by the user:

in accordance with a determination that the fifth movement by the user includes movement in a third direction that exceeds a threshold distance of movement in the third direction, cropping at least a portion of the avatar.

22. The non-transitory computer-readable storage medium of claim 13, wherein displaying the avatar comprises displaying the avatar at a height relative to a floor of the three-dimensional environment that corresponds to a height of the user.

23. The non-transitory computer-readable storage medium of claim 13, wherein displaying the avatar comprises displaying the avatar at a predetermined height in the three-dimensional environment.

24. The non-transitory computer-readable storage medium of claim 13, wherein displaying the avatar comprises displaying the avatar at a scale that corresponds to a size of the user.

25. A method, comprising:

at a computer system that is in communication with one or more display generation components and one or more input devices:

concurrently displaying, via the one or more display generation components:

an avatar at a first location in a three-dimensional environment; and a respective user interface that includes one or more controls for editing a visual appearance of the avatar that are incorporated into a surface that is displayed proximate to the avatar but is spaced apart from the avatar in a simulated depth dimension of the three-dimensional environment relative to a viewpoint of a user;

while concurrently displaying the avatar and the respective user interface, detecting, via the one or more input devices, an input directed to a control in the respective user interface;

in response to detecting the input directed to the control in the respective user interface, changing an appearance of the avatar based on the input;

while displaying the respective user interface that includes the one or more controls for editing the visual appearance of the avatar at a first user interface location in the three-dimensional environment, detecting, via the one or more input devices, movement by the user; and in response to detecting the movement by the user:

in accordance with a determination that the movement by the user exceeds a distance threshold, displaying, via the one or more display generation components, the respective user interface that includes the one or more controls for editing the visual appearance of the avatar at a modified user interface location in the three-dimensional environment different from the first user interface location in the three-dimensional environment; and in accordance with a determination that the movement by the user does not exceed the distance threshold, displaying, via the one or more display generation components, movement of the avatar based on the movement by the user while maintaining display of the respective user interface that includes the one or more controls for editing the visual appearance of the avatar at the first user interface location in the three-dimensional environment.

26. The method of claim 25, wherein the avatar is positioned in front of the surface relative to the viewpoint of the user.

27. The method of claim 25, wherein the avatar is positioned behind the surface relative to the viewpoint of the user.

28. The method of claim 25, further comprising:

concurrently displaying, via the one or more display generation components:

the avatar at a first avatar location in the three-dimensional environment; and the respective user interface incorporated into the surface at a second user interface location in the three-dimensional environment that is proximate to the avatar but is spaced apart from the avatar in the simulated depth dimension of the three-dimensional environment relative to the viewpoint of the user;

while concurrently displaying the avatar at the first avatar location in the three-dimensional environment and the respective user interface at the second user interface location in the three-dimensional environment, detecting, via the one or more input devices, second movement by the user; and in response to detecting the second movement by the user, displaying, via the one or more display generation components, movement of the avatar from the first avatar location in the three-dimensional environment to a modified avatar location in the three-dimensional environment different from the first avatar location in the three-dimensional environment while maintaining display of the respective user interface incorporated into the surface at the second user interface location in the three-dimensional environment.

29. The method of claim 28, wherein:

the avatar is configured to move in a first direction, and is not configured to move in a second direction different from the first direction; and displaying movement of the avatar from the first avatar location in the three-dimensional environment to the modified avatar location in the three-dimensional environment comprises displaying movement of the avatar in the first direction without moving the avatar in the second direction.

30. The method of claim 28, further comprising:

while concurrently displaying the avatar at the first avatar location in the three-dimensional environment and the respective user interface at the second user interface location in the three-dimensional environment, detecting, via the one or more input devices, third movement by the user; and in response to detecting the third movement by the user:

in accordance with a determination that the third movement by the user exceeds a second distance threshold, displaying, via the one or more display generation components, movement of the respective user interface incorporated into the surface from the second user interface location in the three-dimensional environment to a second modified user interface location in the three-dimensional environment different from the second user interface location in the three-dimensional environment.

31. The method of claim 28, further comprising:

while concurrently displaying the avatar at the first avatar location in the three-dimensional environment and the respective user interface at the second user interface location in the three-dimensional environment, detecting, via the one or more input devices, third movement by the user; and in response to detecting the third movement by the user:

in accordance with a determination that the third movement by the user exceeds a second distance threshold, ceasing display of the avatar while maintaining display of the respective user interface incorporated into the surface at the second user interface location in the three-dimensional environment.

32. The method of claim 28, further comprising:

while concurrently displaying the avatar at the first avatar location in the three-dimensional environment and the respective user interface at the second user interface location in the three-dimensional environment, detecting, via the one or more input devices, fourth movement by the user; and in response to detecting the fourth movement by the user:

in accordance with a determination that the fourth movement by the user exceeds a third distance threshold, ceasing display of the avatar while maintaining display of the respective user interface incorporated into the surface at the second user interface location in the three-dimensional environment; and in accordance with a determination that the fourth movement by the user exceeds a fourth distance threshold different from the third distance threshold:

displaying, via the one or more display generation components, movement of the respective user interface incorporated into the surface from the second user interface location in the three-dimensional environment to a third user interface location in the three-dimensional environment different from the second user interface location in the three-dimensional environment; and displaying, via the one or more display generation components, the avatar at a second avatar location in the three-dimensional environment, wherein:

the third user interface location in the three-dimensional environment and the second avatar location in the three-dimensional environment are centered on the viewpoint of the user after the fourth movement by the user; and the third user interface location in the three-dimensional environment is proximate to the second avatar location in the three-dimensional environment but is spaced apart from the second avatar location in the three-dimensional environment in the simulated depth dimension of the three-dimensional environment relative to the viewpoint of the user after the fourth movement by the user.

33. The method of claim 25, further comprising:

while concurrently displaying the avatar and the respective user interface incorporated into the surface, detecting, via the one or more input devices, fifth movement by the user; and in response to detecting the fifth movement by the user:

in accordance with a determination that the fifth movement by the user includes movement in a third direction that exceeds a threshold distance of movement in the third direction, cropping at least a portion of the avatar.

34. The method of claim 25, wherein displaying the avatar comprises displaying the avatar at a height relative to a floor of the three-dimensional environment that corresponds to a height of the user.

35. The method of claim 25, wherein displaying the avatar comprises displaying the avatar at a predetermined height in the three-dimensional environment.

36. The method of claim 25, wherein displaying the avatar comprises displaying the avatar at a scale that corresponds to a size of the user.

* * * * *